(12) United States Patent
Yamada et al.

(10) Patent No.: US 6,577,341 B1
(45) Date of Patent: Jun. 10, 2003

(54) IMAGING APPARATUS

(75) Inventors: Eiji Yamada, Tenri (JP); Toshiaki Harada, Tenri (JP); Tetsuo Iwaki, Yamatokoriyama (JP); Tohru Okuda, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 08/950,361

(22) Filed: Oct. 14, 1997

(30) Foreign Application Priority Data

Oct. 14, 1996 (JP) .............................................. 8-271169

(51) Int. Cl.[7] .......................... H04N 3/14; H04N 5/225
(52) U.S. Cl. .................. 348/272; 348/218.1; 348/219.1
(58) Field of Search ................................. 348/218, 219, 348/272, 273, 279, 280, 218.1, 219.1, 574

(56) References Cited

U.S. PATENT DOCUMENTS

| 4,535,363 | A | * | 8/1985 | Harada et al. ............... | 348/219 |
| 4,998,164 | A | * | 3/1991 | Endo et al. .................. | 348/219 |
| 5,402,171 | A | * | 3/1995 | Tagami et al. .............. | 348/219 |
| 5,637,861 | A | | 6/1997 | Okada et al. | |
| 5,754,226 | A | | 5/1998 | Yamada et al. | |
| 5,786,588 | A | * | 7/1998 | Takahashi .................... | 348/273 |
| 5,786,901 | A | * | 7/1998 | Okada et al. ............... | 348/219 |
| 5,805,217 | A | * | 9/1998 | Lu et al. ..................... | 348/273 |
| 5,834,761 | A | | 11/1998 | Okada et al. | |
| 5,969,757 | A | * | 10/1999 | Okada et al. ............... | 348/219 |
| 6,211,910 | B1 | * | 4/2001 | Kino et al. .................. | 348/208 |

FOREIGN PATENT DOCUMENTS

| EP | 08-250692 | 9/1996 | | |
| JP | 60-77733 | 5/1985 | | |
| JP | 62-115985 | 5/1987 | | |
| JP | 62-226789 | 10/1987 | | |
| JP | 1-307375 | 12/1989 | | |
| JP | 2-137590 | * | 5/1990 | ............ H04N/9/07 |
| JP | 3-248695 | | 11/1991 | |
| JP | 4-70273 | | 3/1992 | |
| JP | 4-78292 | | 3/1992 | |
| JP | 4-154294 | | 5/1992 | |
| JP | 4-172093 | | 6/1992 | |
| JP | 5-344432 | | 12/1993 | |
| JP | 5-347766 | | 12/1993 | |
| JP | 6225317 | | 8/1994 | |
| JP | 7-15732 | | 1/1995 | |
| JP | 7099664 | | 4/1995 | |
| JP | 7-123421 | | 5/1995 | |
| JP | 7-240932 | | 9/1995 | |
| JP | 7-322121 | * | 12/1995 | .......... H04N/5/228 |
| JP | 7-322152 | | 12/1995 | |
| JP | 8-37628 | | 2/1996 | |
| JP | 8-275184 | | 10/1996 | |
| JP | 9-261670 | | 10/1997 | |
| JP | 9-261674 | | 10/1997 | |

* cited by examiner

Primary Examiner—Aung S. Moe
(74) Attorney, Agent, or Firm—Birch, Stewart, Kolasch & Birch, LLP

(57) ABSTRACT

An imaging apparatus reduces the influence of the movement of hands and of the motion of an object on a high resolution picture image. Picture image light from the object passes through an optical system and light-transmitting domains of a color filter provided at the light incident side of an imaging device. The light-transmitting domains transmit only predetermined chromatic lights of the picture image light to input to corresponding photo-receiving domains of the imaging device. The imaging device is a two-picture element mixed reading type device. In a high resolution mode, an image forming point of the picture image light is moved to two places in parallel, and the picture image light is formed at each image forming point to image the picture image light. Then, the signal processing circuit combines the two original picture image signals whose image forming points during the imaging operation are different to generate a single output picture image signal. Thereby, an equivalent imaging time in imaging a single output picture image may be shortened.

11 Claims, 41 Drawing Sheets

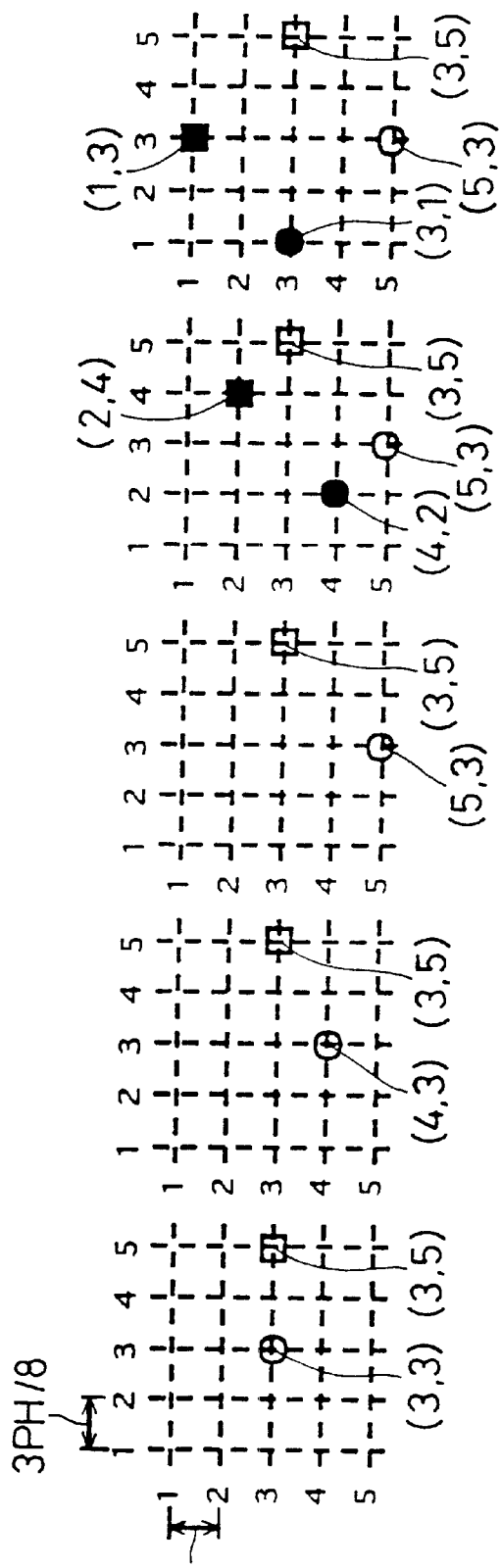

IMAGING APPARATUS

BACKGROUND OF THE INVENTION

1. Field of the Invention

The present invention relates to an imaging apparatus which allows a color picture image to be obtained by using a single imaging device.

2. Description of Related Art

Hitherto, a single plate type imaging apparatus for imaging a color picture image by using a single imaging device has been used to image video and still picture images. While this imaging apparatus allows a picture image having a number of picture elements equal to a number of photo-receiving domains of the imaging device to be imaged, the resolution of the picture image drops when there is less number of photo-receiving domains in the imaging device. First and second prior art technologies related to imaging apparatuses for improving the resolution of the picture image will be explained below.

The first prior art imaging apparatus is disclosed in Japanese Unexamined Patent Publication JP-A 7-99664 (1995). This imaging apparatus is provided with a color filter which transmits only predetermined three chromatic lights at the light incident side of the photo-receiving domains of the imaging device. In the color filter, only light-transmitting domains which transmit either one of the three colors are arrayed in a diced pattern.

In obtaining an output picture image by this imaging apparatus, the imaging apparatus sequentially shifts the spatial sampling position of the imaging device in the horizontal and vertical directions H and V by a length of a half of a pitch of picture elements so that the spatial sampling position returns to the original position by four fields. The imaging device images picture image light every time when the spatial sampling position is shifted. Then, the picture images obtained by these four times of imaging operations are combined to generate an output picture image composed of picture elements whose number is greater than that of the photo-receiving domains of the imaging device.

The second prior art electronic still camera is disclosed in Japanese Unexamined Patent Publication 6-225317 (1994). FIG. 68 is a block diagram showing the electrical structure of the above-mentioned electronic still camera 1. The electronic still camera 1 has a high definition mode for imaging a high quality picture image. In the high definition mode, a single output picture image signal is generated from four original picture image signals to obtain an output picture image composed of picture elements whose number is greater than a number of photo-receiving domains of an imaging device 4.

When the mode is switched to the high definition mode, picture image light from an object is condensed to a desired state by an optical system 3 and is formed on an image forming plane of the imaging device 4 after passing through a color filter described later. The image forming plane is a two-dimensional plane on which a plurality of photo-receiving domains are arrayed in a matrix form. The color filter is disposed on the light incident side of the image forming plane and transmits only predetermined four chromatic lights. The position for forming the picture image light on the image forming plane is shifted sequentially to first through fourth different image forming positions by a so-called image shifting operation.

FIG. 69 is a diagram showing an array of light-transmitting domains 17 of the color filter 16 of the imaging device 4. The color filter has the same number of light-transmitting domains 17 with the photo-receiving domains of the imaging device 4. The array of the light-transmitting domains 17 is equivalent to the array of the photo-receiving domains and the light-transmitting domains 17 are arrayed in a matrix form with periods PH and PV along the horizontal and vertical directions H and V.

The light-transmitting domains 17 are divided into four kinds of domains each of which transmits only either one of chromatic lights of yellow, cyan, magenta and green. In FIG. 69, each rectangular domain surrounded by a solid line is the light-transmitting domain 17. Symbols "Ye", "Cy", "Mg" and "G" written within the respective rectangular domains denote that color of the chromatic light which can transmit through the light-transmitting domain 17 is yellow, cyan, magenta or green. The array of colors of the light-transmting domains 17 of each chromatic light is a periodic array whose basic array pattern is the array of eight light-transmitting domains 17 in four rows and two columns surrounded by a two-dot chain line 21.

FIG. 70 is a diagram showing the positional relationship of the aforementioned first through fourth image forming positions Qa through Qd. Based on the first position Qa, the second position Qb is the position shifted in the horizontal direction H from the first position Qa by a shift length PH. The third and fourth positions Qc and Qd are the positions shifted from the first position Qa in the same vertical direction V by a shift length PV/2, though in the opposite directions horizontally by a shift length PH/2.

Reference will be made again to FIG. 68. The imaging device 4 receives the formed picture image light by each photo-receiving domain to image the picture image light only for a predetermined exposure time every time when the position for forming the picture image light is shifted to the above-mentioned respective four shift positions and outputs four original picture image signals to a preprocessor circuit 5. This original picture image signal is composed of data of received light which corresponds to a quantity of light received by each photo-receiving domain. The preprocessor circuit 5 amplifies the original picture image signal given from the imaging device 4 and implements a necessary signal processing thereto. The processed signal is converted into a digital signal by an analog/digital converter circuit (abbreviated as an "A/D circuit" in the figures) 6 and is then stored in a picture image memory 7.

A signal processing circuit 8 shifts the original picture image represented by the original picture image signals thus obtained in the direction opposite from the shift direction of each of the image forming positions Qa through Qd by the same shift length to superimpose and composite them. Then, based on the received light data of this composite picture image, it generates a luminance signal and a color difference signal of a single output picture image. The generated luminance signal and the color difference signal are recorded in a recording medium 9.

FIG. 71 is a diagram showing an array of picture elements in a part composed of parts corresponding to the aforementioned basic array pattern of each original picture image in the above-mentioned composite picture image. In the figure, rectangular domains indicated by a solid line represent actual picture elements from which components of the luminance signal and the color difference signal of the output picture image may be obtained directly in unit of picture element. Rectangular domains indicated by a broken line represent imaginary picture elements which are obtained by interpolating the luminance signal and the color difference signal from the luminance signal and the color difference signal of the actual picture elements. The actual picture elements marked with "Fa" correspond directly only to received light data from the photo- receiving domains which receive the light which has passed through the yellow and cyan light-transmitting domains 17. The actual picture elements marked with "Fb" correspond directly only to received light data from the photo-receiving domains which receive the light which has passed through the green and magenta light-transmitting domains.

In the composite picture image, the actual picture elements which correspond to the yellow and cyan received light data and the actual picture elements which correspond to the green and magenta received light data are arrayed alternately per two rows each. The actual picture elements and the imaginary picture elements adjoin in the horizontal and vertical directions H and V and are arrayed in a diced pattern. The array of picture elements of the output picture image is the same with that of the composite picture image. That is, a number of arrays of the picture elements in the horizontal and vertical directions H and V is doubled and the array period of the picture elements is reduced to a half, respectively.

FIG. 72 is a diagram showing another exemplary positional relationship among the first through fourth image forming positions Qa through Qd in the high resolution mode. Comparing FIG. 72 with FIG. 70, the positional relationship between the first position Qa and the second position Qb is the same. The third and fourth positions Qc and Qd are shifted from the first position Qa in the same vertical direction V by the shift length PV, though in the opposite direction horizontally H by the shift length PH/2.

FIG. 73 is a diagram showing an array of picture elements of the composite picture image in the high resolution mode generated from the four original picture image signals imaged at the shift positions in FIG. 72. Each symbol in the figure means the same with those in FIG. 71. In the composite picture image, the actual picture elements which correspond to the yellow and cyan received light data and the actual picture elements which correspond to the green and magenta received light data are arrayed alternately along the horizontal and vertical directions H and V. Further, rows composed of only the actual picture elements and rows composed of only imaginary picture elements are arrayed alternately. A number of picture elements of the output picture image obtained from this composite picture image is doubled to that of the output picture image in the normal mode with respect to the horizontal direction H and an area per picture element is cut into a half.

Because the array of picture elements is two-dimensional and there are more than three chromatic lights which can transmit the light-transmitting domains of the color filter in the two types of prior art imaging apparatus and the electronic still camera described above, the single output picture image signal is generated based on the four original picture image signals whose image forming positions are different. It is so arranged to be able to generate the luminance signal and the color difference signal separately per each picture element because the output from the photo-receiving domain which receives the chromatic light which has passed through the four kinds of light-transmitting domains corresponds per each picture element of the output picture image when the original picture image signals are composited as described above.

Because the image shifting operation involves the shift in two different directions in obtaining the four kinds of original picture image signals which meet with such condition, the mechanism for shifting the image forming position is complicated. The apparatus having such complicated shift mechanism requires a large number of parts, increasing the production cost. Further, because it requires four picture images of original picture image signals for one output picture image, it requires a memory of four times of capacity, increasing the production cost further, as compared to an apparatus for imaging only in the normal mode.

It is presupposed that an object stands still and the positional relationship between the object and the imaging apparatus does not shift in obtaining the four original picture image signals in the operation for imaging the picture image light in the high resolution mode by these imaging apparatuses. When this presupposition is met, a number of picture elements with respect to the image of the object is increased by registering and superimposing the corresponding images of each of the original picture images by canceling the dislocation caused by the image shifting operation of the four original picture images with respect to the image of the object within the original picture images. At this time, an equivalent imaging time for obtaining the single output picture image is the sum of four times of exposure time of the picture image light and three times of transition time for shifting the image forming position. This equivalent imaging time has the same meaning with a so-called shutter speed of a still camera using a silver-salt film.

When the object moves or the positional relationship is shifted within the equivalent imaging time, the image of the object shifts more than the shift caused by the image shifting operation. In this case, the dislocation of the image of the object cannot be canceled just by the composite process described above. As a result, the image of the object blurs within the composite picture image and the quality of the composite picture image degrades. In particular, the equivalent imaging time is a quite long time which is more than four times of the exposure time in the high resolution mode of the above-mentioned two types of imaging apparatuses. Accordingly, they are susceptible to an influence of the movement of hands and the motion of the object, degrading the quality of the output picture image.

The imaging condition which meets with this presupposition with the above-mentioned imaging apparatuses is a condition in which the object is at rest and the imaging apparatus is used by fixing by a tripod. Accordingly, its use condition has been quite limited as compared to a still camera using a silver-salt film and it has been difficult to use the high resolution mode during the actual imaging operation.

SUMMARY OF THE INVENTION

Hence, it is an object of the present invention to provide a single plate type imaging apparatus which allows a high resolution output picture image to be obtained without being influenced by the motion of an object, the movement of hands and the like.

The present invention provides an imaging apparatus comprising;

color separating filter means having a plurality of light-transmitting domains each of which corresponds to one of a plurality of chromatic lights, separately transmits only corresponding chromatic light of a picture image light inputted from an object and which are arrayed in a predetermined array on a two-dimensional plane;

an imaging device for imaging the picture image light and outputting a picture image signal, the imaging device having photo-receiving domains separately corresponding to the light-transmitting domains of the color separating filter means, the photo-receiving domains being arrayed on a two-dimensional plane with the same array with the predetermined array of the light-transmitting domains, each of the photo-receiving domains receiving only chromatic light which has passed through the corresponding light-transmitting domain, the imaging device outputting the picture image signal composed of picture element data representing a quantity of received light of each photo-receiving domain;

moving means for moving an image forming point of the picture image light inputted to the imaging device to predetermined first and second positions;

exposure permitting means for permitting the imaging device to receive the picture image light for only a predetermined exposure time every time when the image forming point is moved by the moving means;

picture image generating means for generating a composite picture image signal by shifting and superimposing the two outputted picture image signals in a direction opposite from a moving direction of the image forming point by a distance of the image forming points at the time of the imaging operation in response to the output of the imaging device; and control means for causing the moving means to move the image forming point of the picture image light either to the first or second position when the operation for imaging the picture image light is started, for causing the imaging device to image the picture image light only during the time permitted by the exposure permitting means at that position to give the picture image signal to the picture image generating means, for causing the moving means to move the image forming point to the other position and for causing the imaging device to image the picture image light only during the time permitted by the exposure permitting means at that position to give the picture image signal to the picture image generating means.

According to the invention, the imaging apparatus is a single plate type imaging apparatus for imaging a color picture image by a single imaging device.

The picture image light inputted from the object to the imaging apparatus is inputted to the imaging means after passing through the above-mentioned color separating filter means. The picture image light is separated into a plurality of chromatic lights by passing through the color separating filter means.

A spectrum of each chromatic light exists within a predetermined frequency band and presents an angled waveform centering on one or a plurality of frequencies set in advance. The combination of the plurality of chromatic lights separated by the color separating filter means is selected so as to produce white light when all the chromatic lights are mixed. The combination of such chromatic lights is that of the primary colors of red, blue and green or of the complementary colors of green, yellow, cyan and magenta.

The picture image light which has passed through the color separating filter means is formed on the image forming plane of the imaging device. The luminance of the above-mentioned picture image light changes continuously on spatial axes which are parallel in the one and other directions which are the directions of array of the light-transmitting domains. The imaging device receives each chromatic light component of the picture image light by the plurality of photo-receiving domains arrayed in parallel with the spatial axes. Therefore, an original picture image is a picture image in which the continuous picture image light is smoothed in unit of the photo-receiving domain. It is equivalent to that the picture image light whose luminance changes continuously is sampled in unit of the photo-receiving domain. It is preferable to form the color separating filter means in a body with the imaging device described above.

In connection with the imaging device, the exposure permitting means is provided. The exposure permitting means causes each photo-receiving domain of the imaging device to receive the picture image light only for a predetermined exposure time during one time of operation for imaging the picture image light. The picture element data of the above-mentioned original picture image signal indicates a quantity of chromatic light received by each light receiving element during the exposure time. The imaging device outputs the picture element data from each photo-receiving domain by a certain method after the elapse of the exposure time. Thereby, the picture image light is imaged. The original picture image is a picture image obtained by imaginarily and visually displaying the original picture image signal.

The moving means is provided on the light incident side of the image forming plane of the imaging device for example. The operation for moving the image forming point which is the point where the inputted picture image light is formed on the image forming position to the predetermined two locations as described above will be referred to as a two-position image shifting operation. Every time when the image forming point is moved by the moving means, the imaging device capture the picture image light by the procedure described above and outputs the original picture image signal. Thereby, the imaging device outputs the two original picture image signals whose image forming points are different.

The picture image generating means generates the composite picture image signal representing the composite picture image by the above-mentioned method from these two original picture image signals. The picture image generating means also generates a luminance signal and two kinds of color difference signals from picture element data with respect to each picture element of the composite picture image and generates an output picture image signal composed of those signals. It may also perform an interpolation process of the output picture image signal based on the composite picture image.

As described above, the inventive imaging apparatus generates the single composite picture image signal from the two original picture image signals obtained by performing the two-position image shifting operation. An equivalent imaging time may be considered as a criterion of the degree of influence given to the quality of the composite picture image by the movement of hands and the motion of the object during the imaging operation of the imaging apparatus which performs the image shifting operation. The equivalent imaging time is an operation time in imaging the picture image light to obtain the single output picture image signal and has the same meaning with a so-called shutter speed of a still camera using a silver salt film. The greater the equivalent imaging time, the more susceptible the composite picture image and the output picture image based on that is to the movement of hands and the motion of the object during the imaging operation. Accordingly, the blur of the picture image caused by the movement of hands and the motion of the object becomes larger in almost proportion to the increase of the equivalent imaging time for example.

The equivalent imaging time of the inventive imaging apparatus is the sum of two times of the exposure times and one time of the image forming point transition time. As described before, the equivalent imaging time of the prior art imaging apparatus is the sum of four times of exposure times and three times of transition time. When the exposure time and the transition time of the prior art and the present invention are equal, the equivalent imaging time of the inventive imaging apparatus is shorter by the two times of exposure times and transition times as compared to the equivalent imaging time of the prior art imaging apparatus. Because the transition time is longer than the exposure time in general, the equivalent imaging time of the present invention is less than the half of the equivalent imaging time of the prior art. Accordingly, the inventive imaging apparatus receives less influence of the movement of hands and the motion of the object and the quality of the composite picture image degrades less as compared to the prior art imaging apparatus. Therefore, the imaging condition which allows the resolution to be improved is eased by the imaging apparatus using the image shifting operation.

Because there have been two or more directions in which the image forming point is moved from the reference position to the other positions in the four-position image shifting operation of the prior art, the moving means has had a structure having two or more displacement axes of the image forming point. The more the number of the displacement axes, the more complicated the structure of the moving means becomes in general. The inventive imaging apparatus performs the two-position image shifting operation, so that the image forming point is moved only in the one direction from a first position to a second position or in the one direction opposite from that. Thereby, the structure of the moving means is simplified because it just needs to be provided with a single displacement axis. Thereby, the control of the moving means is also simplified and the production cost of the moving means is reduced.

The imaging apparatus using the image shifting means obtains the plurality of original picture image signals by using the imaging device in a time-division manner. Because the imaging device itself has often no structure for storing the plurality of original picture image signals, the picture image composing means has a memory for storing the original picture image signals which cannot be stored by the imaging device from the time of imaging the picture image light at the first time to the last imaging operation. In the prior art imaging apparatus performing the four-position image shifting operation, the memory has had to store at least three previous original picture image signals before the last imaging operation. Because the inventive imaging apparatus performs the two-position image shifting operation, it needs to store just a single original picture image signal at the last imaging operation. Accordingly, the capacity of the memory to be prepared may be reduced. Thereby, the production cost with regard to the memory may be reduced.

The invention is characterized in that:
the composite picture image signal is composed of plurality of picture element data,
the imaging apparatus further comprises display means having a visual display area for visually displaying the composite picture image represented by the composite picture image signal,
the visual display area being formed by a plurality of display picture elements for visually displaying each picture element data of the composite picture image signal arrayed in a matrix form on a two-dimensional plane in parallel with the predetermined main scan and sub-scan directions which cross each other at right angles,
the display picture elements along the main scan direction having an arrayed number greater than an arrayed number of the display picture elements along the sub-scan direction; and
the first and second positions are separated in the direction in which Moire of a spatial frequency in the main scan direction of the composite picture image may be canceled.

According to the invention, the imaging apparatus is provided with the above-mentioned display means. This display means may be realized by a cathode ray tube for example. For instance, a cathode ray tube for visually displaying video signals of the NTSC system television scans the phosphor screen by an electron beam of analog signals sequentially along the main and sub-scan directions. A number of picture elements in the main scan direction is almost infinite in the cathode ray tube. Because a number of picture elements in the sub-scan direction is equivalent to a number of so-called scan lines, it is finite and is 512 in the NTSC system.

The number of picture elements composing the composite picture image is increased in improving the resolution of the composite picture image by the above-mentioned imaging apparatus. At this time, unless the display means for visually displaying the composite picture image signal is constructed so as to be able to display the increased picture elements separately, the improved picture image cannot be displayed even if its resolution is improved in the signal stage. While a finite number of photo-receiving domains are arrayed in parallel with the main and sub-scan directions, the number of picture elements in the sub-scan direction often coincides with the number of scan lines in that direction in the display means in a typical imaging device. Therefore, it is preferable to improve the resolution in the main scan direction in which the display picture elements can be increased at least in the visual display area of the display means in improving the resolution of the picture image by performing the two-position image shifting operation by the imaging apparatus using this imaging device.

As a method for improving the resolution of the picture image in the main scan direction, there may be cited a method of extinguishing Moire on the spatial frequency axis corresponding to the spatial axis parallel with the main scan direction among Moire appearing within a normal band of a signal on the spatial frequency plane of the picture image signal for example. The reason why the resolution is improved by this method will be shown below.

The resolution of a picture image in the direction parallel to a certain spatial axis improves in proportion to a width of a normal band of a picture image signal on a spatial frequency axis corresponding to that spatial axis. When the picture image signal causes color Moire, an optical low-pass filter is inserted to the optical system of the imaging apparatus for example to damp the spatial frequency component which causes the color Moire from the picture image light to eliminate the color Moire. Although the color Moire fringe is eliminated from the picture image by carrying out this processing, the width of the normal band is limited to be less than the spatial frequency which caused the color Moire. As a result, the substantial width of the normal band of the picture image signal is narrowed, reducing the resolution of the picture image.

When the Moire on the spatial frequency axis in the main scan direction is extinguished, the width of the normal band of the picture image signal needs not be limited for the Moire, so that the original width of the normal band may be kept. Accordingly, it allows the same effect with expanding the width of the normal band to be obtained and the resolution of the picture image to be improved. The aforementioned first and second positions are selected so as to have the positional relationship so that the effect of extinguishing the Moire as described above can be obtained in generating the composite picture image signal.

The color Moire on the spatial frequency axis in the main scan direction appears as color Moire fringes to a fringe pattern parallel to the sub-scan direction on the picture image. This color Moire is caused when a desired signal component of the luminance signal interferes with the return component of the color difference signal because there is a difference between sampling frequencies of the luminance signal and the color difference signal of the picture image signal on the spatial frequency axis. The sampling frequency of the luminance signal corresponds an array period of all the picture elements composing the picture image represented by the picture image signal. The sampling frequency of the color difference signal corresponds to an array period of an array composed only of picture elements corresponding to photo-receiving domains receiving a single chromatic light among all the picture elements of the picture image. The color Moire is extinguished when these two sampling frequencies are made to coincide.

In the original picture image signal obtained by the single plate type imaging apparatus, an array corresponding to the color difference signal is equivalent to an array of only light-transmitting domains corresponding to a certain chromatic light in the color separating filter means. Further, in the composite picture image signal of the apparatus, the array corresponding to the color difference signal is equivalent to an array of only light-transmitting domains corresponding to a certain chromatic light in the imaginary color separating filter means. This imaginary color separating filter is assumed to be a filter in which two color separating filters of the imaging apparatus are registered by shifting in the direction of separation and by the distance of the first and second positions. Accordingly, the closer the above-mentioned array in the imaginary color separating filter is to the array of all the light-transmitting domains of the imaginary color separating filter means, the closer the sampling frequencies of the luminance signal and the color difference signal becomes, thus hardly causing the color Moire. Accordingly, it is preferable to set the first and second positions so that such imaginary color separating filter means can be assumed in imaging the composite picture image.

The invention is also characterized in that:
the light-transmitting domains of the color separating filter means are divided into first through fourth light-transmitting domains which transmit predetermined first through fourth chromatic lights;
the predetermined array of the light-transmitting domains is an array in a matrix form in which the light-transmitting domains are arrayed respectively in parallel with one and other predetermined directions which cross each other at right angles in the one direction with a predetermined first period and in the other direction with a predetermined second period,
a first group in which the first and fourth light-transmitting domains are arrayed alternately and linearly in the one direction and a second group in which the second and third light-transmitting domains are arrayed alternately and linearly in the one direction are disposed alternately in the other direction,
the first light-transmitting domain and the fourth light-transmitting domain adjoin the second light-transmitting domain in the other direction and a direction opposite thereto, respectively, and
the second light-transmitting domains adjoin the fourth light-transmitting domain in the other direction and the direction opposite thereto;
the imaging device mixes the picture element data from each photo-receiving domain per two each photo-receiving domain adjoining in the other direction or in the direction opposite thereto to output in a batch;
the first position is a predetermined reference position; and
the second position is a position shifted in parallel to the one direction by the length of the first period from the first position.

According to the invention, it is preferable to obtain the composite picture image signal by performing the two-position image shifting operation in parallel to the one direction in the imaging apparatus having the aforementioned color separating filter means which transmit the four complementary colors of chromatic lights for example and using a so-called two-picture element mixed reading type imaging device.

As compared to the original picture image signal, although the shape of the normal band of the composite picture image signal does not change, the array period of the array of picture elements in the one direction corresponding to the above-mentioned chromatic lights is reduced to a half. Thereby, Moire appearing on the spatial frequency axis corresponding to the one direction in the original picture image signal all disappear in the composite picture image signal. Therefore, it becomes unnecessary to limit the spatial frequency component of the picture image light in the one direction by the optical low-pass filter. Accordingly, the substantial width of the normal band of the picture image signal is expanded with respect to the one direction.

When the one direction is the main scan direction of the display means described above, the Moire of the composite picture image displayed on the display means is reduced and the picture image quality is improved. Thereby, the picture image quality may be improved further not only by preventing the degradation of the picture image quality caused by the movement of hands and the motion of the object by the two-position image shifting operation but also by eliminating the drop of the resolution caused by the Moire.

The invention is also characterized in that:
the light-transmitting domains of the color separating filter means are divided into first through fourth light-transmitting domains which transmit predetermined first through fourth chromatic lights, respectively;
the predetermined array of the light-transmitting domains is an array in a matrix form, in which the light-transmitting domains are arrayed respectively in parallel with one and other predetermined directions which cross each other at right angles in the one direction with a predetermined first period and in the other direction with a predetermined second period,
the fourth light-transmitting domains adjoin the first light-transmitting domain in the one direction and in a direction opposite thereto, the second light-transmitting domain adjoins thereto in the other direction and the third light-transmitting domain also adjoin thereto in a direction opposite to the other direction, and
the second light-transmitting domain adjoins the fourth light-transmitting domain in the direction opposite from the other direction;
the imaging device outputs the picture element data from each of the photo-receiving domains separately;

the first position is the predetermined reference position; and the second position is a position shifted in parallel to the one direction by the length of the first period from the first position.

According to the invention, it is preferable to obtain the composite picture image signal by performing the parallel two-position image shifting operation in parallel to the one direction in the imaging apparatus having the aforementioned color separating filter means which transmit the four complementary colors of chromatic lights for example and using a so-called whole picture element reading type imaging device.

As compared to the original picture image signal, although the shape of the normal band of the composite picture image signal does not change, the array period of the array of picture elements in the one direction corresponding to the above-mentioned chromatic lights is reduce to a half. Thereby, Moire appearing on the spatial frequency axis corresponding to the one direction in the original picture image signal all disappear in the composite picture image signal. Therefore, it becomes unnecessary to limit the spatial frequency component of the picture image light by the optical low-pass filter and the substantial width of the normal band of the picture image signal is expanded.

The return frequency of the return component of the color difference signal which causes Moire remains only at the intersection of the spatial frequency axis in the other direction with the boundary of the normal band in the composite picture image signal. The the desired signal component of the luminance signal and color difference signal necessary in displaying the picture image changes angularly centering on the origin of the spatial frequency axis, so that the amplitude near the boundary of the normal band is small. Even if the signal amplitude near the boundary is reduced, there is less influence to the desired signal component. Further, even if the optical low-pass filter is inserted to the optical system to limit the width of the normal band to eliminate the Moire, the width barely changes before and after the limitation. Accordingly, the influence of Moire with respect to the other direction is small.

When either one of the one direction or the other direction is assumed to be the main scan direction of the display means described above, the Moire of the composite picture image displayed on the display means is reduced and the picture image quality is improved. Thereby, the picture image quality may be improved further not only by preventing the degradation of the picture image quality caused by the movement of hands and the motion of the object by the two-position image shifting operation but also by eliminating the drop of the resolution caused by the Moire.

The present invention is also characterized in that:

the light-transmitting domains of the color separating filter means are divided into first through third light-transmitting domains which transmit predetermined first through third chromatic lights, respectively;

the predetermined array of the light-transmitting domains is an array in a matrix form in which the light-transmitting domains are arrayed respectively in parallel with one and other predetermined directions which cross each other at right angles in the one direction with a predetermined first period and in the other direction with a predetermined second period, the second light-transmitting domain adjoins the first light-transmitting domain in the one direction, the third light-transmitting domain adjoins thereto in a direction opposite to the one direction, and the other first light-transmitting domains also adjoin thereto in the other direction and in a direction opposite thereto, the third light-transmitting domain adjoins the second light-transmitting domain in the one direction and the other second light-transmitting domains also adjoin thereto in the other direction and in the direction opposite thereto, and the other third light-transmitting domains adjoin the third light-transmitting domain in the other direction and in the direction opposite thereto;

the imaging device mixes the picture element data from each photo-receiving domain per two each photo-receiving domain adjoining in the other direction or in the direction opposite thereto to output in a batch;

the first position is a predetermined reference position; and

The second position is a position shifted in parallel to the one direction by a length of one and one-half times the length of the first period from the first position and in parallel to the other direction by a length of a half of the length of the second period from the first position.

According to the invention, it is preferable to obtain the composite picture image signal by performing the diagonal two-position image shifting operation to the first and second positions in the above-mentioned positional relationship in the imaging apparatus having the aforementioned color separating filter means which transmit the three primary colors of chromatic lights for example and using a so-called two-picture element mixed reading type imaging device.

As compared to the original picture image signal, the width of the normal band on the spatial frequency axes in one and other directions of the composite picture image signal is doubled. Further, the array period of the array of picture elements corresponding to the color difference signal is doubled with respect to the one direction, so that the distance from the origin of Moire appearing on the spatial frequency axis in the one direction in the original picture image signal is doubled. Thereby, the substantial width of the normal band of the composite picture image signal after inserting the optical low-pass filter is doubled with respect to the both of one and other directions as compared to the substantial width of the original picture image signal.

When the one direction is assumed to be the main scan direction of the display means described above, the resolution is improved twice after removing the Moire and the quality of the composite picture image is improved. Thereby, the picture image quality may be improved further not only by preventing the degradation of the picture image quality caused by the movement of hands and the motion of the object by the two-position image shifting operation but also by eliminating the drop of the resolution caused by the Moire.

The invention is characterized in that:

the light-transmitting domains of the color separating filter means are divided into first through third light-transmitting domains which transmit predetermined first through third chromatic lights, respectively;

the predetermined array of the light-transmitting domains is an array in a matrix form in which the light-transmitting domains are arrayed respectively in parallel with one and other predetermined directions which cross each other at right angles in the one direction with a predetermined first period and in the other direction with a predetermined second period, the second light-transmitting domain adjoins the first light-transmitting domain in the one direction, the third light-transmitting domain adjoins thereto in a direction opposite from the one direction, and the other first light-transmitting domains also adjoin thereto in the other direction and in a direction opposite thereto, the third light-transmitting domain adjoins the second light-transmitting domain in the one direction and the other second light-transmitting domains also adjoin thereto in the other direction and in the direction opposite thereto, and the other third light-transmitting domains adjoin the third light-transmitting domain in the other direction and in the direction opposite thereto;

the imaging device outputs the picture element data from each photo-receiving domain separately;

the first position is a predetermined reference position; and the second position is a position shifted in parallel to the one direction by a length of two-thirds of the length of the first period from the first position and in parallel to the other direction by a length of a half of the length of the second period from the first position Qa4.

According to the invention, it is preferable to obtain the composite picture image signal by performing the diagonal two-position image shifting operation to the first and second positions in the above-mentioned positional relationship in the imaging apparatus having the aforementioned color separating filter means which transmit the three primary colors of chromatic lights for example and using the so-called whole picture element reading type imaging device.

As compared to the original picture image signal, the width of the normal band on the spatial frequency axes in one and other directions of the composite picture image signal is doubled. Further, the array period of the array of picture elements corresponding to the color difference signal is doubled with respect to the one direction, so that the position of Moire appearing on the spatial frequency axis in the one direction in the original picture image signal becomes distant from the origin twice. Thereby, the substantial width of the normal band of the composite picture image signal after inserting the optical low-pass filter is doubled with respect to the both of one and other directions as compared to the substantial width of the original picture image signal.

Accordingly, when either one of one or the other direction is assumed to be the main scan direction of the display means described above, the resolution is improved twice after removing the Moire and the quality of the composite picture image is improved. Thereby, the picture image quality may be improved further not only by preventing the degradation of the picture image quality caused by the movement of hands and the motion of the object by the two-position image shifting operation but also by eliminating the drop of the resolution caused by the Moire.

The invention is also characterized in that:

the plurality of light-transmitting domains of the color separating filter means are divided into first through third light-transmitting domains which transmit predetermined first through third chromatic lights, respectively;

the predetermined array of the light-transmitting domains is an array in which groups of light-transmitting domains arrayed linearly with a first period in parallel to a predetermined one direction are arrayed in an other direction which crosses at right angles with the one direction with a second period and the position of each light-transmitting domain in the two groups adjoining in the other direction is shifted in the one direction by a length of the half of the first period, the second light-transmitting domain adjoins the first light-transmitting domain in the one direction and the third light-transmitting domain adjoins thereto in a direction opposite from the one direction, and the third light-transmitting domain adjoins the second light-transmitting domain in the one direction and the first light-transmitting domain adjoins thereto in a third direction shifted in the one direction by a half of the first period and in the other direction by a length of the second period;

the imaging device outputs the picture element data from each photo-receiving domain separately;

the first position is a predetermined reference position; and the second position is a position shifted in parallel to the other direction by a length of the second period from the first position.

According to the invention, it is preferable to obtain the composite picture image signal by performing the vertical two-position image shifting operation vertical to the one direction in the imaging apparatus having the aforementioned color separating filter means which transmit the three primary colors of chromatic lights for example and using the so-called whole picture element reading type imaging device.

As compared to the original picture image signal, the width of the normal band on the spatial frequency axis in the diagonal direction of the composite picture image signal is doubled. The diagonal direction is defined by a vector which reaches to a point shifted from the origin of the spatial frequency axis in parallel to the one direction by the length of the first period and in parallel to the other direction by a length of a half of the second period. Thereby, the substantial width of the normal band of the composite picture image signal after inserting the optical low-pass filter is expanded with respect to the diagonal direction.

Accordingly, when either the one or the other direction is assumed to be the main scan direction of the display means described above, the resolution is improved after removing the Moire and the quality of the composite picture image is improved. Thereby, the picture image quality may be improved further not only by preventing the degradation of the picture image quality caused by the movement of hands and the motion of the object by the two-position image shifting operation but also by eliminating the drop of the resolution caused by the Moire.

The invention is also characterized in that:

the plurality of light-transmitting domains of the color separating filter means are divided into first through third light-transmitting domains which correspond to predetermined first through third chromatic lights, respectively;

the predetermined array of the light-transmitting domains is an array in a matrix form in which the light-transmitting domains are arrayed respectively in parallel with one and other predetermined directions which cross each other at right angles in the one direction with a predetermined first period and in the other direction with a predetermined second period;

a first linear group in which the first and second light-transmitting domains are arrayed alternately in parallel to the one direction and a second linear group in which the first and third light-transmitting domains are arrayed alternately in parallel to the one direction are disposed alternately in the other direction, and the third light-transmitting domains adjoin the first light-transmitting domain in the first group in the other direction and a direction opposite thereto;

the imaging device outputs the picture element data from each photo-receiving domain separately;

the first position is a predetermined reference position; and the second position is a position shifted in parallel to the one direction by a length of the first period from the first position.

According to the invention, it is preferable to obtain the composite picture image signal by performing the two-position image shifting operation parallel to the one direction in the imaging apparatus having the aforementioned color separating filter means which transmit the three primary colors of chromatic lights for example and using the so-called whole picture element reading type imaging device.

As compared to the original picture image signal, although the shape of the normal band does not change, the array period of the array of picture elements corresponding to the above-mentioned chromatic lights in the one direction is reduced to a half. Thereby, the Moire appearing on the spatial frequency axis corresponding to the one direction in the original picture image signal all disappear in the composite picture image signal. Accordingly, it becomes unnecessary to limit the frequency component of the picture image light by the optical low-pass filter and the substantial width of the normal band is expanded.

The return frequency of the return component of the color difference signal which causes Moire remains only at the intersection of the spatial frequency axis in the other direction with the boundary of the normal band in the composite picture image signal. When the width of the normal band is limited so as to remove the Moire, the width barely changes before and after the limitation, so that the influence of Moire with respect to the other direction is considered to be small.

When either one of one or the other direction is assumed to be the main scan direction of the display means described above, the Moire of the composite picture image displayed on the display means is reduced and the quality of the composite picture image is improved. Thereby, the picture image quality may be improved further not only by preventing the degradation of the picture image quality caused by the movement of hands and the motion of the object by the two-position image shifting operation but also by eliminating the drop of the resolution caused by the Moire.

The invention is also characterized in that:

the plurality of light-transmitting domains of the color separating filter means are divided into first through third light-transmitting domains which correspond to predetermined first through third chromatic lights, respectively;

the predetermined array of the light-transmitting domains is an array in which a first group in which the first and second light-transmitting domains are arrayed linearly in parallel to one predetermined direction with a first period and a second group in which the first and third light-transmitting domains are arrayed linearly in parallel to the one direction with the first period are arrayed alternately with a predetermined second period in an other direction which crosses at right angles with the one direction, and the third light-transmitting domain adjoins the first light-transmitting domain in the first group in a direction shifted in parallel to the one direction by a length of a half of the first period and in parallel to the other direction by a length of the second period;

the imaging device outputs the picture element data from each photo-receiving domain separately;

the first position is a predetermined reference position; and the second position is a position shifted in parallel to the one direction by a length of the first period from the first position.

According to the invention, it is preferable to obtain the composite picture image signal by performing the parallel two-position image shifting operation parallel to the one direction in the imaging apparatus having the aforementioned color separating filter means which transmit the three primary colors of chromatic lights for example and using the so-called whole picture element reading type imaging device.

As compared to the original picture image signal, although the shape of the normal band does not change, the array period of the array of picture elements corresponding to the above-mentioned chromatic lights in the one direction is reduced to a half. Thereby, the distance of the position of the Moire appearing on the spatial frequency axis corresponding to the one direction in the original picture image signal from the origin is doubled and the position of Moire moves on the intersection of the boundary of the normal band with the spatial frequency axis. Accordingly, the substantial width of the normal band after inserting the optical low-pass filter expands.

The return frequency of the return component of the color difference signal which causes Moire remains only at the intersection of the spatial frequency axis in the other direction with the boundary of the normal band in the composite picture image signal. When the width of the normal band is limited so as to remove the Moire, the width barely changes before and after the limitation, so that the influence of Moire with respect to the other direction is considered to be small.

When either one of one or the other direction is assumed to be the main scan direction of the display means described above, the Moire of the composite picture image displayed on the display means is reduced and the quality of the composite picture image is improved. Thereby, the picture image quality may be improved further not only by preventing the degradation of the picture image quality caused by the movement of hands and the motion of the object by the two-position image shifting operation but also by eliminating the drop of the resolution caused by the Moire.

Further, the invention is characterized in that:

the exposure permitting means comprises first permitting means for permitting/inhibiting electric charge to be accumulated in the photo-receiving domains of the imaging device, and second permitting means for transmitting/shutting off the picture image light to be inputted to the imaging device; and in imaging the image light at the either one position among the first and second positions, the control means causes the second permitting means to transmit the picture image light and causes the first permitting means to permit to accumulate electric charge only during the exposure time, and in imaging the image light at the other position among the first and second positions, the control means causes the first permitting means to permit to accumulate electric charge in the photo-receiving domains and causes the second permitting means to transmit the picture image light only during the exposure time.

According to the invention, the above-mentioned imaging device may be realized by a so-called two-dimensional CCD image sensor. When the chromatic light enters the photo-receiving domains within a photoelectric conversion time set in advance for the imaging device, the sensor transforms the chromatic light photoelectrically and accumulates the obtained electric charge. The charge accumulated within the photoelectric conversion time is output out of the imaging device after the elapse of the time as the picture element data via transfer charge coupled devices (CCD). The time from the end of the photoelectric conversion time till when the picture element data is output from all the photo-receiving domains to the outside will be referred to as a transfer time. The transfer time is longer than the sum of the exposure time and the transition time described before in general.

Such imaging device includes an electronic shutter utilizing an overflow drain as the first permitting means of the exposure control means. This electronic shutter operates by opening the overflow drain and inhibiting the photo-receiving element from holding the charge. Using such first permitting means in imaging the picture image light in the first time at either one position allows the exposure time during the imaging operation of the first time to be shortened to be less than the photoelectric conversion time intrinsic to the imaging device.

The electronic shutter cannot be used when electric charge of the other picture element data is included in the transfer charge coupled devices. Therefore, when the exposure time is controlled only by the electronic shutter, the time from the end of the exposure of the first time to the beginning of the exposure of the second time is determined by the transfer time. Accordingly, the equivalent imaging time at this time is the sum of the two times of exposure time and the transfer time.

The imaging apparatus has mechanical shutter means for example as second permitting means of the exposure control means. In imaging the picture image light in the second time at either of the other position, the control means control the exposure time by directly transmitting/shutting off the picture image light itself which is to enter the imaging device by the second permitting means, instead of the electronic shutter. Controlling the exposure time as described above allows the exposure of the second time to be implemented in the photo-receiving domains in parallel even during the time when the transfer charge coupled devices transfer the original picture image signal of the first time.

Thus, the imaging apparatus controls the exposure time in imaging the picture image light by using the electronic shutter of the two-dimensional CCD image sensor together with the mechanical shutter means. Thereby, the imaging operation of the image light in the second time may be implemented even if the transfer charge coupled devices of the image sensor are in the operation state. Because the equivalent imaging time is the sum of the two times of exposure time and the transition time at this time, the equivalent imaging time may be shortened as compared to the case of controlling the exposure time only by the electronic shutter. Therefore, it further allows to prevent the degradation of quality of the composite picture image caused by the movement of hands and the motion of the object.

The invention is characterized in that:
the imaging apparatus further comprises an optical system for condensing the picture image light to form on the two-dimensional plane of the imaging device; and
the moving means comprises:
a plate-like refracting plate having a light-transmitting quality,
a pair of bimorph type piezoelectric elements which are disposed on the both sides of the refracting plate so that the surface thereof is almost parallel to the surface of the refracting plate, in which one free end in a longitudinal direction of the elements is bonded with one end of the refracting plate to support the refracting plate so that the other end of the refracting plate extends toward the fixed end on the other side of the elements and which inclines the refracting plate centering on an imaginary center of rotation which passes within the refracting plate,
detecting means for detecting an inclination formed between an optical axis of the optical system and a normal line of the refracting plate,
comparator means for comparing output of the detecting means with a predetermined target value to output the error thereof, and
driving means for driving the pair of bimorph type piezoelectric elements in response to output of the comparator means so that the inclination of the refracting plate coincides with the predetermined target value.

According to the invention, the moving means has the above-mentioned structure. This moving means has less components and facilitates the miniaturization of each component including the inclined plate. Accordingly, it allows the structure of the whole moving means to be simplified and miniaturized. It allows to use as a portable imaging apparatus. Further, because the moving means is controlled by the so-called feedback control, the image forming point may be displaced reliably by moving the optical axis in parallel by a desired distance.

The invention is characterized in that:
the imaging apparatus further comprises an optical system for condensing the picture image light to form on the two-dimensional plane of the imaging device; and
the moving means comprises:
a pair of transparent plates having imaginary centers of rotation which cross each other at right angles, inclining means for inclining the transparent plates centering on each imaginary center of rotation,
a refracting substance layer which is interposed between the transparent plates, which can be deformed and which has a refractive index greater than that of air,
detecting means for detecting an inclination formed between an optical axis of the optical system and a normal line of each transparent plate,
comparator means for comparing output of the detecting means with a predetermined target angle to output the error thereof, and
driving means for driving the inclining means in response to output of the comparator means so that the inclination coincides with the predetermined target angle.

According to the invention, the moving means may be realized by a so-called variable vertical angle prism. Because the variable vertical angle prism is used in an optical blur compensator of a video camera, the prism of that apparatus may be used also as the moving means for shifting the picture image. Accordingly, a number of parts of the apparatus may be reduced by assembling the blur compensator within the imaging apparatus.

The invention is characterized in that:
the imaging apparatus further comprises:
move determining means for permitting/inhibiting the move of the image forming point in the moving means; and a variable spatial filter for damping the spatial frequency component of the picture image light to be inputted to the imaging device, i.e. damping the spatial frequency component by a first decrement when the move of the image forming point is inhibited and damping it by a second decrement when it is permitted.

According to the invention, the imaging apparatus has two modes and outputs picture image signals having two kinds of resolution. It outputs the original picture image signals as they are in one mode and generates and outputs a composite picture image signal from the original picture image signals in the other mode. The number and positions of Moires are different in these two picture image signals as described before. Accordingly, when the decrement of the optical low-pass filter interposed in the optical system is adjusted to the original picture image signal, the normal band of the composite picture image signal whose resolution has been improved is limited excessively, degrading the resolution of the composite picture image after the limitation more than that of the composite picture image before the limitation. When the decrement is adjusted to the composite picture image signal on the other hand, the normal band of the original picture image signal is limited insufficiently, causing Moire in the original picture image.

In the inventive imaging apparatus, the quality of the both original picture image and composite picture image may be fully kept by switching the two modes by permitting/inhibiting the move of the image forming point as described above and by changing the decrement of the spatial filter which is the optical low-pass filter.

BRIEF DESCRIPTION OF THE DRAWINGS

Other and further objects, features, and advantages of the invention will be more explicit from the following detailed description taken with reference to the drawings wherein:

FIGS. 48A through 48E are diagrams indicating imaginary image forming planes showing image forming positions of the picture image light which has passe d through the birefringence plates 221 through 225 of the variable spatial filter 200 in the first state;

DETAILED DESCRIPTION OF THE PREFERRED EMBODIMENTS

Figure 1:
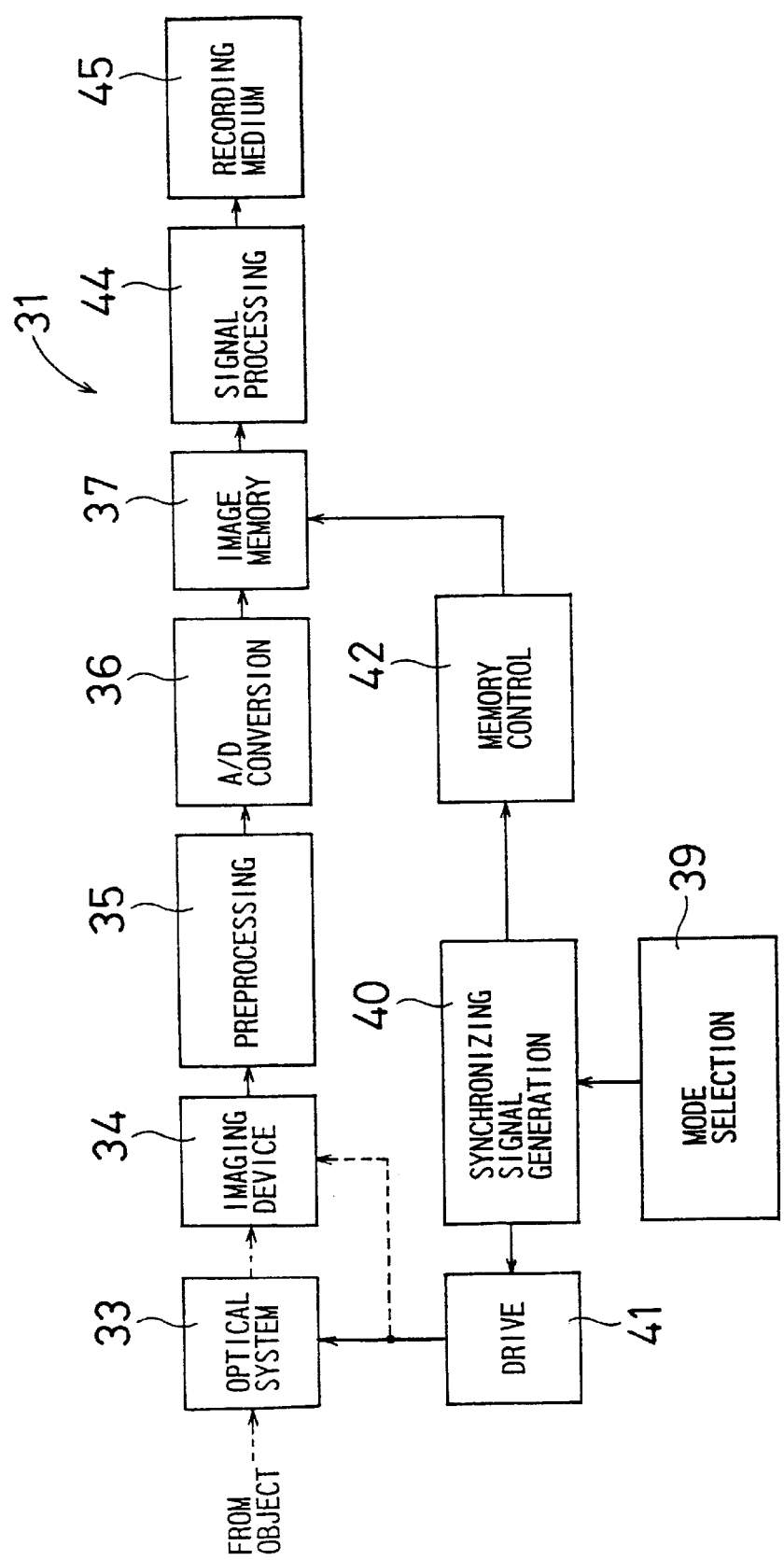
FIG. 1 is a block diagram showing the structure of an imaging apparatus 31 according to a first embodiment of the present invention.

Now referring to the drawings, preferred embodiments of the invention are described below.

FIG. 1 is a block diagram showing a structure of an imaging apparatus 31 according to a first embodiment of the present invention. This imaging apparatus 31 is a so-called single plate type color imaging apparatus.

The imaging apparatus 31 has two imaging modes of normal and high resolution modes. In the normal mode, it obtains a first output picture image composed of the same number of picture elements D with photo-receiving domains PD of an imaging device 34 described later. In the high resolution mode, it performs a so-called image shifting operation to obtain a second output picture image which is composed of a number of picture elements D which is equal to or greater than the number of the photo-receiving domain PD of the imaging device 34. A second output picture image signal representing the second output picture image is obtained by composing two original picture image signals obtained by the imaging device 34.

Picture image light from an object is condensed by a condenser lens within an optical system 33 and is then imaged on an image forming plane of the imaging device 34 after passing through a color filter described later. A plurality of photo-receiving domains PD are arrayed on the image forming plane of the imaging device 34 in a predetermined arrangement described later.

Beside the condenser lens for condensing the picture image light, the optical system 33 includes an image shifting mechanism and a variable spatial filter. The image shifting mechanism shifts an image forming point which is the point at which the picture image light is imaged on the image forming plane to first and second image forming positions per predetermined time when the high resolution mode is selected. This operation will be referred to as an image shifting operation hereinafter. The variable spatial filter is a so-called optical low-pass filter and limits the spatial frequency component of the picture image light with a decrement corresponding to each mode. The image shifting mechanism and the variable spatial filter will be detailed later.

The color filter has the same number of light-transmitting domains L with the photo-receiving domains PD, while corresponding with each photo-receiving domain PD separately. The light-transmitting domains L are arrayed on a two-dimensional plane in the same arrangement with that of the photo-receiving domains PD. The color filter is disposed on the light incident side of the imaging device 34 and transmits only predetermined chromatic lights in the picture image light to be inputted to each photo-receiving domain PD. A single color filter transmits a plurality of predetermined chromatic lights and each light-transmitting domain L corresponds to each different chromatic light. Each light-transmitting domain L separately separates the picture image light and transmits only chromatic light corresponding to that light-transmitting domain L. Each chromatic light which has passed through each light-transmitting domain L is received by the photo-receiving domain PD corresponding to each light-transmitting domain L. This color filter is formed in a body with the imaging device 34 for example.

The imaging device 34 images picture image light by causing each photo-receiving domain PD to receive the chromatic light by a predetermined exposure time. As the exposure time elapses, the imaging device 34 derives received light data from each photo-receiving domain PD to a preprocessing circuit 35 as first or second original picture image signal per predetermined time. The first and second original picture image signals are picture image signals obtained by imaging the picture image light when the respective picture image lights are formed on the first and second image forming positions. Each original picture image signal is composed of the received light data corresponding to the quantity of received chromatic light at each photo-receiving domain PD. Each received light data is an analog electrical signal on a level corresponding to the quantity of received light in the stage when it is output from the imaging device 34.

The preprocessing circuit 35 implements a predetermined processing to each original picture image signal output from the imaging device 34 after amplifying it. The predetermined processing includes, for example, a white balance correction and a γ correction. The electric-optical conversion characteristics of a cathode ray tube (Braun tube) is non-linear, so that the received light data corresponding to the quantity of received light is corrected so that the quantity of the received light of the imaging apparatus is proportional to a luminous intensity of the cathode ray tube. This correction will be referred to as the γ correction. The original picture image signals processed by the preprocessing circuit 35 are converted into digital signals by an analog/digital converter circuit (hereinafter abbreviated as an "A/D circuit" in the figures) 36 and are then stored in a picture image memory 37.

A user of the imaging apparatus 31 can select the aforementioned normal or high resolution mode by manipulating a control button provided on the imaging apparatus 31 for example. Corresponding to the selection of the user, a mode switching circuit 39 supplies an output corresponding to the selected mode to a synchronous signal generating circuit 40.

When the normal mode is selected, the synchronous signal generating circuit 40 generates a synchronous signal corresponding to the operation for imaging the single original picture image signal. The generated synchronous signal is supplied to a driving circuit 41 and a memory control circuit 42,. The driving circuit 41 fixes the image forming point of the picture image light at the predetermined first image forming point by fixing the image shifting mechanism of the optical system 33 at a predetermined first state. Then, in response to the synchronous signal, it causes the received light data to be output from each photo-receiving domain PD of the imaging device 34 to the preprocessing circuit 35 every predetermined period. In the same time, in response to the synchronous signal, the memory control circuit 42 stores the received light data to the picture image memory 37 while interlinking per single original picture image signal.

When the high resolution mode is selected, the synchronous signal generating circuit 40 generates a synchronous signal corresponding to the operation for imaging the two original picture image signals and supplies it to the driving circuit 41 and the memory control circuit 42. The driving circuit 41 performs the image shifting operation described later by using the image shifting mechanism within the optical system 33. Thereby, the chromatic light received by each photo-receiving domain PD shifts from the chromatic light before the move within the image of the object on the imaging device 34. The memory control circuit 42 stores the received light data in the picture image memory 37 while interlinking per two original picture image signals whose image forming position is different.

The original picture image signals stored within the picture image memory 37 is supplied to a signal processing circuit 44 in correspondence to the mode in imaging the picture image light of the original picture image signals. Based on the mode selected in imaging picture images, the signal processing circuit 44 computes luminance and color difference signals of the output picture image signal from the single or two original picture image signals to interpolate them further. The computed and interpolated luminance and the color difference signals are stored within a recording medium 45 as the output picture image signal of the output picture image. The synchronous signal generating circuit 40, the driving circuit 41 and the memory control circuit 42 compose control means for controlling the operation of the imaging apparatus as described above in response to the modes.

Figure 2:
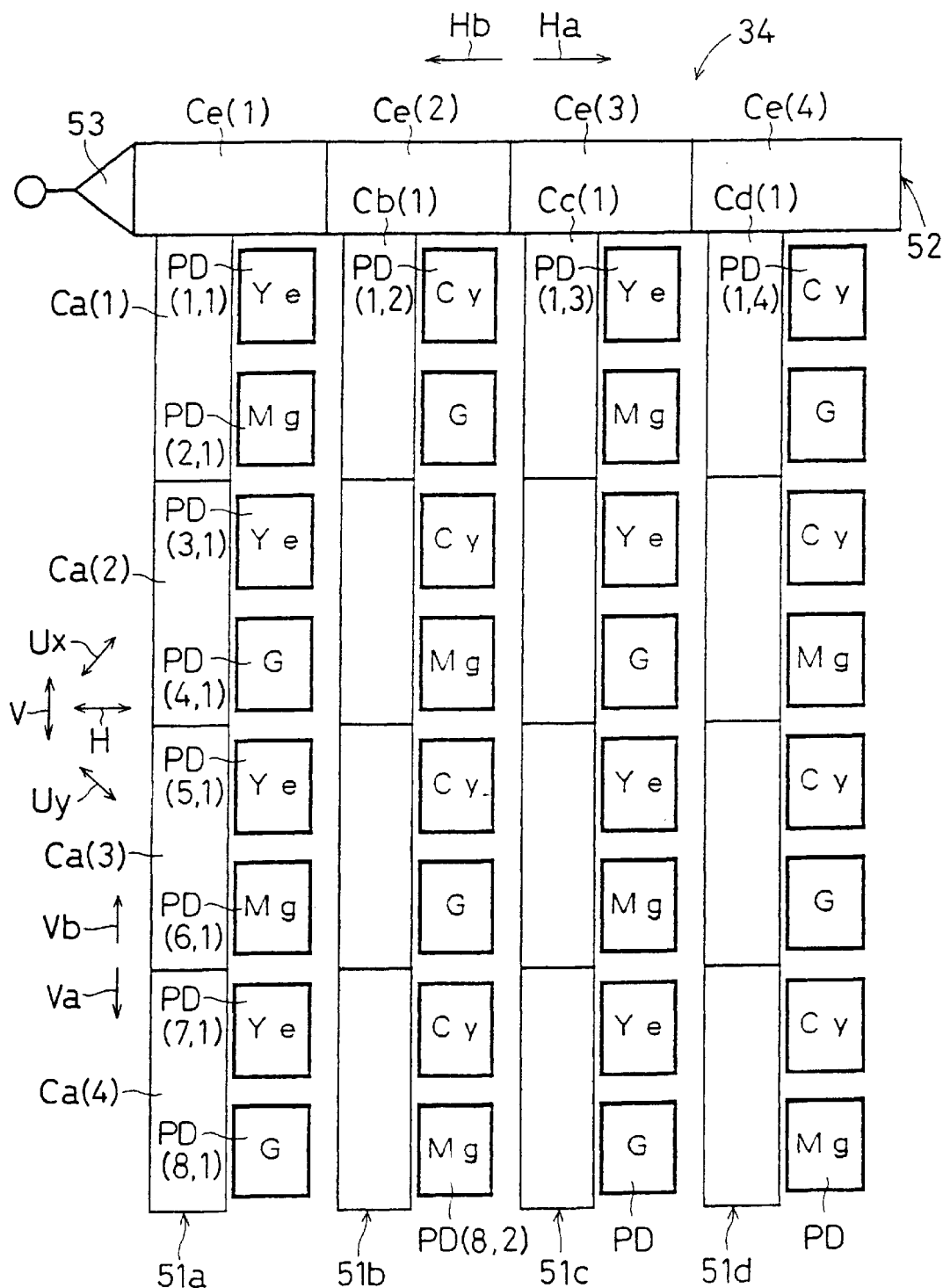
FIG. 2 is a plan view showing the concrete structure of an image forming plane of an imaging device 34.

FIG. 2 is a plan view showing a concrete structure of the image forming plane of the imaging device 34. The imaging device 34 is a so-called two-picture element mixed reading type imaging device. N×M photo-receiving domains PD are arrayed in a matrix form in parallel to the horizontal and vertical directions H and V with array periods of PH and PV on the image forming plane of the imaging device 34. The horizontal and vertical directions H and V cross each other at right angles.

In the imaging device 34, sampling frequencies fH and fV in the horizontal and vertical directions H and V of the picture image light are inverse numbers of the array periods in the horizontal and vertical directions H and V and are expressed as follows:

$$fH=1/PH \quad (1)$$

$$fV=1/PV \quad (2)$$

Diagonal directions Ux and Uy are also considered on the image forming plane. The diagonal directions Ux and Uy are spatial axes specified by two basic vectors which are parallel respectively with the horizontal and vertical directions H and V and whose sizes are the array periods PH and PV, respectively.

The array periods PUx and PUy in the diagonal directions Ux and Uy may be expressed as follows:

$$PUx=PUy=\sqrt{(PH^2+PV^2)}/2 \quad (3)$$

The sampling frequencies fux and fuy of the picture image light in the diagonal directions Ux and Uy are inverse numbers of the array periods PUx and PUy in the above expression, respectively.

$$fux=fuy=2/\{\sqrt{(PH^2+PV^2)}\} \quad (4)$$

Hereinafter, the diagonal directions Ux and Uy, their array periods PUx and PUy and their sampling frequencies fux and fuy will be referred to as a "diagonal direction U", an "array period PU" and a "frequency fu", respectively.

Further, a group of components arranged linearly in parallel with the horizontal direction H will be referred to as a "row" and a group of components arranged linearly in parallel with the vertical direction V will be referred to as a "column" hereinafter. In the group of components arranged in a matrix form, each row will be referred to as a first row, a second row, . . . and an N-th row from the top to the bottom of the figure. Further, each column will be referred to as a first column, a second column, . . . and a M-th column from the left to the right of the figure. In indicating a single component belonging to the n row and m column of these components, it will be marked with a code (n, m) together with a reference numeral/character denoting the component generically. n and m are arbitrary integers more than or equal to 1 and less than or equal to N and M.

Based on the length of one period of the array periods PH, PV and PU, an element whose unit is a length of n times or 1/n of the period will be indicated further by a reference numeral "n" or "/n" before or after the reference numeral/character of each array period. Further, based on the spatial frequencies fH, fV, and fU described later, a spatial frequency of n times or 1/n of that frequency will be also shown by the reference numeral "n" or "/n" before or after the reference numeral/character of each spatial frequency in the same manner.

In FIG. 2, the array pattern of the photo-receiving domains PD is represented by 32 photo-receiving domains PD (1,1) through PD (8,4) in eight rows and four columns. The structure shown In FIG. 2 is repeated periodically in the horizontal and vertical directions H and V on the actual Image forming plane of the imaging device 34.

Receiving the chromatic light within a predetermined exposure time, each photo-receiving domain PD converts the chromatic light photoelectrically into electric charge and stores the charge. After the elapse of the exposure time, it outputs the stored charge to the preprocessing circuit 35 as received light data. Because the imaging device 34 is the two-picture element mixed reading type imaging device, it mixes the received light data from the two photo-receiving domains PD adjoining in the vertical direction V to prepare mixed data and outputs the mixed data.

Vertical transfer charge coupled device (CCD) groups 51*a* through 51*d* are interposed between each column of the photo-receiving domains PD. The vertical transfer CCD groups 51*a* through 51*d* are arrayed adjacent to the first through fourth columns of the photo-receiving domains PD, respectively, and contain charge coupled devices Ca through Cd whose number is a half of the number of the photo-receiving domains PD in the adjacent column. For example, the vertical transfer CCD group 51*a* contains the charge coupled devices Ca(1) through Ca(4). These charge coupled devices Ca through Cd are arrayed linearly in the vertical direction V and are electrically connected one after another per each of the groups 51*a* through 51*d*. The vertical transfer CCD groups 51 exist by a number equal to the number of columns of the photo-receiving domains PD on the actual imaging device.

A horizontal CCD group 52 is provided at one end of each column of the photo-receiving domains PD. The horizontal transfer CCD group 52 comprises charge coupled devices Ce(1) through Ce(4) whose number is equal to the number of columns of the photo-receiving domains PD, and an output section 53. These charge coupled devices Ce(1) through Ce(4) are arrayed linearly in parallel with the horizontal direction R and are electrically connected one after another. The charge coupled devices Ce(1) through Ce(4) are electrically connected with the charge coupled devices Ca(1), Cb(1), Cc(1) and Cd(1) at one end of the vertical transfer CCD groups 51*a* through 51*d*, respectively. The output section 53 is electrically connected with the device Ce(1) at the end on the side of the other direction Hb which is parallel to the horizontal direction H. These vertical and horizontal transfer. CCD groups 51*a* through 51*d* and 52 are used to transfer the received light data from each photo-receiving domain PD to the outside of the imaging device 34.

Because the imaging device 34 is the two-picture element mixed reading type device, it performs an exposure operation of each photo-receiving domain PD twice in one time of operation for imaging the picture image light and performs a scan operation for transferring the received light data from each photo-receiving domain PD to the adjacent charge coupled devices Ca through Cd after finishing each exposure operation, respectively. The original picture image signal in the imaging operation is generated by combining the results of two times of scan. Hereinafter, the first and second exposure and scan operations in one time of operation for imaging the picture image light will be referred to as imaging operations in odd and even fields, respectively.

The imaging operation in each field will be explained below.

In the imaging operation in each field, the imaging device 34 permits each photo-receiving domain PD to accumulate the electric charge obtained by the photoelectric conversion only by a predetermined exposure time at first. Whether to permit or inhibit the accumulation of the charge is switched by closing or opening an overflow drain. The imaging device 34 causes each photo-receiving domain PD to perform the exposure operation only for the exposure time by a so-called electronic shutter using this overflow drain.

The photo-receiving domains PD of the imaging device 34 described above may be realized by photodiodes formed on a silicon substrate for example. The overflow drain is provided between the photo-receiving domains PD and the silicon substrate. When the overflow drain is opened, the charge in the photo-receiving domains PD is all swept to the silicon substrate. It inhibits the charge from being accumulated in the photo-receiving domains PD. It is equivalent to that the chromatic light is blocked from entering the photo-receiving domains PD and it is considered that the electronic shutter is closed. When the overflow drain is closed, the charge in the photo-receiving domains PD is not swept to the silicon substrate, so that the charge obtained by the photo-electric conversion is accumulated in the photo-receiving domains PD. It is equivalent to that the chromatic light enters the photo-receiving domains PD and it is considered that the electronic shutter is opened at this time.

When the exposure time elapses, the imaging device 34 closes the electronic shutter to stop the photoelectric conversion. Each photo-receiving domain PD transfers the charge accumulated within the exposure time to the outside of the imaging device 34 via the charge coupled devices Ca through Ce as the received light data representing the quantity of received light within the exposure time approximately before the next exposure operation finishes. A transfer time for transferring the received light data from each photo-receiving domain PD to the outside of the imaging device 34 is divided into a vertical fly-back period and a horizontal fly-back period.

In concrete, each photo-receiving domain PD transfers the received light data to either one of the charge coupled devices Ca through Cd of the adjacent vertical transfer CCD groups 51*a* through 51*d* during the vertical fly-back period. The photo-receiving domains PD of the imaging device 34 are scanned in order of raster for example. The order of raster is an order for point-scanning the photo-receiving domains PD one by one sequentially by setting the vertical direction V as the main scanning direction and the horizontal direction H as the sub-scanning direction for example. In scanning each photo-receiving domain PD in the raster order on the imaging device 34 for example, the photo-receiving domains PD (1, 1) through PD (1, 4) on the first row are scanned sequentially along the one direction Ha in the horizontal direction H and then each photo-receiving domain PD on the second row are scanned along the direction Ha. Thus, each photo-receiving domain PD is scanned in unit of row and the scan in the unit of row is moved in the one direction Va in the vertical direction V in the raster scan.

Because the number of charge coupled devices Ca through Cd of each of the CCD groups 51*a* through 51*d* is a half of the number of the photo-receiving domains PD of the adjacent column, each one of the charge coupled devices Ca through Cd receives the received light data from the two adjacent photo-receiving domains PD, respectively. This received light data is mixed in each of the charge coupled devices Ca through Cd during the vertical fly-back period as the mixed data which is the sum of the quantities of charge representing the two received light data. The two-picture element mixed reading type imaging device 34 generates the mixed data from each received light data and outputs the mixed data.

Each of the charge coupled devices Ca through Cd transfers the mixed data to the other adjacent charge coupled devices Ca through Cd within the same group in the other direction Vb in parallel with the vertical direction V during the horizontal fly-back period. The charge coupled devices Ca(1), Cb(1), Cc(1) and Cd(1) at one end transfer the mixed data which has been transferred to the device to each of the charge coupled devices Ce in the horizontal transfer CCD group connected with those devices.

The horizontal transfer CCD group 52 transfers the mixed data which has been transferred to each of the charge coupled devices Ce(4) through Ce(1) sequentially in the other direction Hb in parallel with the horizontal direction H during the horizontal scan period obtained by subtracting the horizontal fly-back period and the vertical fly-back period from the period of the imaging operation. The mixed data transferred to the device Ce(1) is output from the output section 53 to the preprocessing circuit 35 on the outside of the imaging device 34. The other directions Hb and Vb are directions parallel with the horizontal and vertical directions H and V and opposite from the one directions Ha and Va, respectively.

While each operation described above is the same in the odd and even fields, only the combination of the photo-receiving domains PD giving the received light data to the same charge coupled devices Ca through Cd is different. The received light data from one photo-receiving domain PD is mixed with the received light data from the other photo-receiving domains PD adjacent thereto in one and other directions Va and Vb of the vertical direction V in the odd and even fields.

In the odd field for instance, the received light data from the photo-receiving domains PD(8, 1) and PD(7, 1) is transferred to the charge coupled device Ca(4) of the vertical transfer CCD group 51a to generate the mixed data. Similarly, in each of the charge coupled devices Ca(3) through Ca(1), each of the received light data from the photo-receiving domains PD(5, 1), PD(6, 1); PD(3, 1), PD(4, 1); PD(1, 1) and PD(2, 1) is transferred to the charge coupled devices Ca(3), Ca(2) and Ca(1) of the vertical-transfer CCD group 51a to be mixed. In the even field on the other hand, the received light data from the photo-receiving domains PD(6, 1) and PD(7, 1) is transferred to the charge coupled device Ca(4) to generate mixed data. Similarly, the received light data from the photo-receiving domains PD(4, 1), PD(5, 1); PD(2, 1) and PD(3, 1) is transferred to the charge coupled devices Ca(3) and Ca(2) of the vertical transfer CCD group 51a, respectively, to be mixed.

An-equivalent imaging time necessary for imaging a single field by such imaging device 34 is equal to one time of exposure time. Further, an equivalent imaging time necessary for imaging a single frame is the sum of the exposure time in the odd fields the transfer time in the odd field and the exposure time in the even field, i.e. the sum of two times of exposure time and one time of transfer time.

The color filter will be explained below.

The combination of a plurality of chromatic lights which can pass through the color filter is selected such that they turn out to be white light when all the chromatic lights are mixed. These chromatic lights are the complementary colors of yellow, magenta, cyan and green in the color filter of the present embodiment. Hereinafter, the light-transmitting domain L which corresponds separately to each of the chromatic lights of yellow, magenta, cyan and green and which transmits only each chromatic light will be referred to as a light-transmitting domain L of yellow, magenta, cyan and green, respectively. The light-transmitting domains L of these chromatic lights are arrayed along a predetermined periodic array of colors of the chromatic lights and such that the array of all the light-transmitting domains L is equivalent to the array of the photo-receiving domains PD of the imaging device 34.

Figure 3:
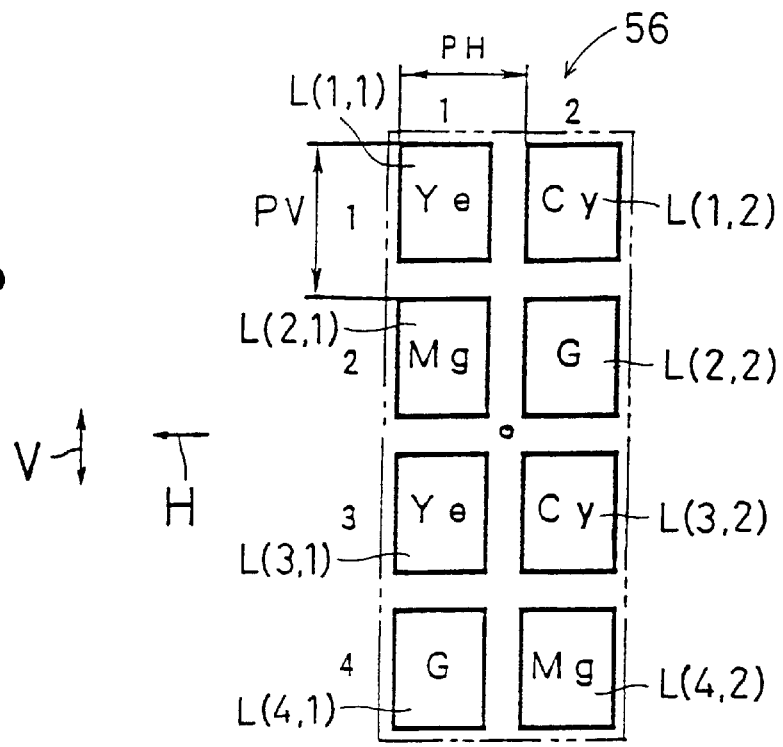
FIG. 3 is a diagram showing a basic array pattern 56 of an array of colors of light-transmitting domains L of a color filter.

FIG. 3 is a diagram showing a basic array pattern 56 of the array of colors of each chromatic light described above. The basic array pattern 56 is an array of four rows and two columns in which the light-transmitting domains L are arrayed by two in the horizontal direction H and by four in the vertical direction V and contains the light-transmitting domains L of each chromatic light by two each. The array of colors of each chromatic light of the color filter is formed by periodically repeating this basic array pattern 56 in the vertical direction V and the horizontal direction H.

Hereinafter, the arrayed position of the light-transmitting domains L is represented by a rectangular area drawn by a solid line and the reference character marked within the area denotes a chromatic light which can pass through the light-transmitting domain corresponding to the light-transmitting domain L in the figures showing the basic array pattern of the array of colors of the light-transmitting domains L. The chromatic lights of yellow, magenta, green and cyan are represented as "Ye", "Mg", "G", and "Cy", respectively.

In the basic array pattern 56, the light-transmitting domains L(1, 1) and L(3, 1) are the yellow light-transmitting domains. The light-transmitting domains L(2, 1) and L(4, 2) are the magenta light-transmitting domains. The light-transmitting domains L(4, 1) and L(2, 2) are the green light-transmitting domains. The light-transmitting domains L(1, 2) and L(3, 2) are the cyan light-transmitting domains.

The original picture image signals obtained by the imaging device 34 having the above-mentioned color filter will be explained below.

The imaging apparatus 31 images the picture image light by disposing the above-mentioned color filter on the light incident side of the image forming plane of the imaging device 34. Because the imaging device 34 is the two-picture element mixed reading type imaging device, the original picture image signals are composited by rearranging the mixed data of the two scan results along a predetermined array based on the scan results of the odd and even fields so as to be able to be obtained the original picture images described below. The rearrangement of the mixed data of the original picture image signals is implemented by adjusting the address for storing the mixed data to the following array in storing the mixed data to the picture image memory 37 for example.

In the color filter comprising the basic array pattern 56 described above, different chromatic lights correspond to two light-transmitting domains L adjoining in the vertical direction V. Because each mixed data may be obtained by mixing the received light data from the photo-receiving domains PD which receive the chromatic lights which have passed through these light-transmitting domains L, it is the sum of the quantity of received light of two kinds of chromatic lights. Hereinafter, the received light data obtained by receiving the chromatic light which has passed through the light-transmitting domain L of a chromatic light a will be referred to as "received light data of $\alpha$". Further, the mixed data in which received light data of two kinds of chromatic lights $\alpha$ and $\beta$ are mixed will be referred to as "mixed data of $\alpha$ and $\beta$".

Figure 4:
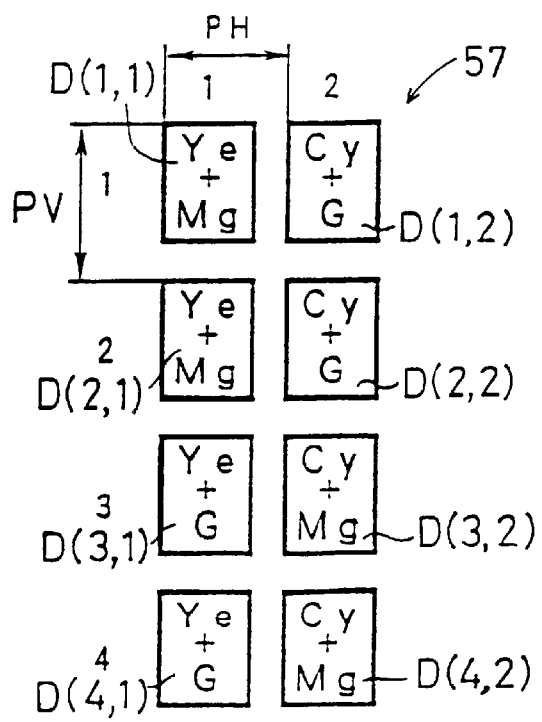
FIG. 4 is a diagram showing an equivalent basic array pattern 57 of an array of picture elements D of an original picture image.

FIG. 4 is a diagram showing an equivalent basic array pattern 57 of the array of picture elements D of the original picture image. The original picture image is a picture image obtained by imaginarily and visually representing the original picture image signal. The array of the picture elements D of the original picture image is analogous to the array of the photo-receiving domains PD of the imaging device 34 and its array period is a predetermined constant-times of the array period of the photo-receiving domains PD. Hereinafter, it is assumed that the array period of the picture elements D of the original picture image coincides with the array period of the photo-receiving domains PD of the imaging device 34 to simplify the explanation in the present specification.

In the imaging apparatus 31 of the present embodiment, the picture elements D of the original picture image are arrayed periodically in the horizontal, vertical and diagonal directions H, V and U with the array periods PH, PV and PU, respectively. The basic array pattern 57 of the picture elements D of the original picture image is composed of eight picture elements D of four rows and two columns similarly to the basic array pattern 56 of the array of colors of the light-transmitting domains L. Further, with respect to each picture element D of the original picture image, one kind of mixed data is obtained corresponding to the array of the photo-receiving domains PD and the array of colors of the light-transmitting domains L.

In the basic array pattern 57, the mixed data of yellow and magenta correspond to the picture elements D(1, 1) and D(2, 1). The mixed data of yellow and green correspond to the picture elements D(3, 1) and D(4, 1). The mixed data of cyan and green correspond to the picture elements D(1, 2) and D(2, 2). The mixed data of cyan and magenta correspond to the picture elements D(3, 2) and D(4, 2). Among the picture elements D of four rows and two columns, the mixed data of the picture elements D of the first and third rows is obtained through the imaging operation in the odd field. The mixed data of the picture elements D of the second and fourth rows is obtained through the imaging operation in the even field.

With respect to the picture elements D, a picture element D from which the mixed data from the photo-receiving domain PD can be directly obtained will be referred to as a "corresponding picture elements" hereinafter. In the diagrams showing the basic array patterns of the picture elements D, the array position of the corresponding picture element will be represented by a rectangular area drawn by a solid line Further, the reference character within the rectangular area denotes received light data or mixed data corresponding to that picture element D. "Ye", "Mg", "G", and "Cy" denote the received light data, of yellow, magenta, green and cyan, respectively. "α+β" denotes the mixed data of α and β and α and β correspond to any one of "Ye", "Mg", "G", and "Cy".

The optical system 33 will be explained below in detail.

Figure 5:
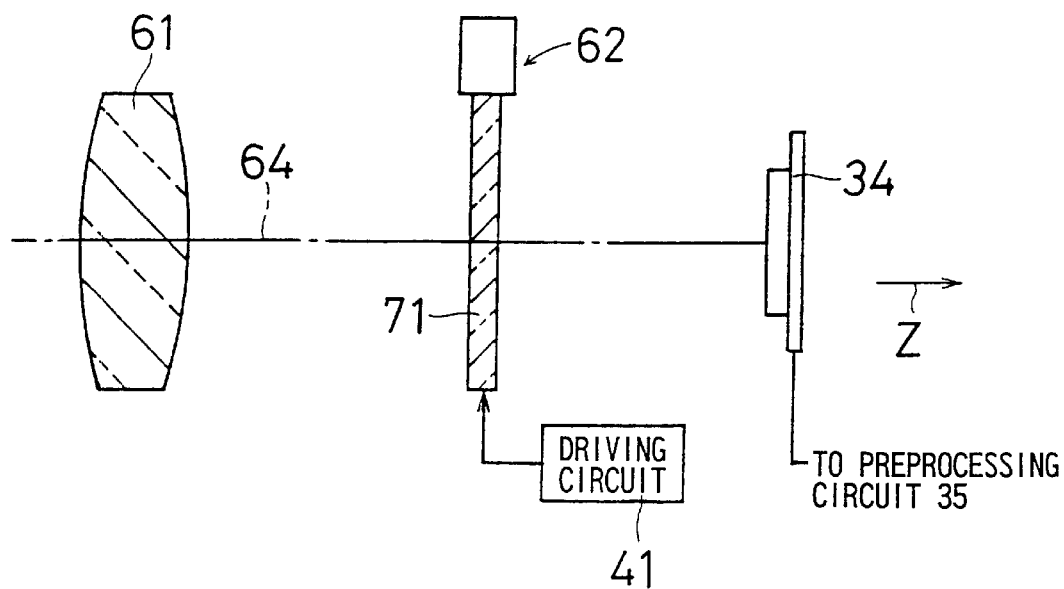
FIG. 5 is a diagram showing the positional relationship among a condenser lens 61 of an optical system 33, a refracting plate 71 of an image shifting mechanism 62 and the imaging device 34.

FIG. 5 is a diagram showing the positional relationship among the condenser lens 61, a refracting plate 71 of the image shifting mechanism 62 and the image forming plane of the imaging device 34.

The condenser lens 61 condenses the picture image light so that the picture image light inputted to the imaging device 34 via the optical system 33 forms its picture image on the image forming plane. The Image shifting mechanism 62 has the refracting plate 71 which is interposed between the condenser lens 61 and the imaging device 34. An optical axis 64 of the picture image light after passing through the condenser lens 61 passes through the refracting plate 71 and reaches the image forming plane of the imaging device 34 via the color filter. The direction parallel with this optical axis of the picture image light will be referred to as an optical axis direction Z. The variable spatial filter 90 is disposed at an arbitrary position around these components 61 and 62. An intersection of the optical axis 64 and the image forming plane of the imaging device 34 is considered to be the image forming point.

Figure 6:
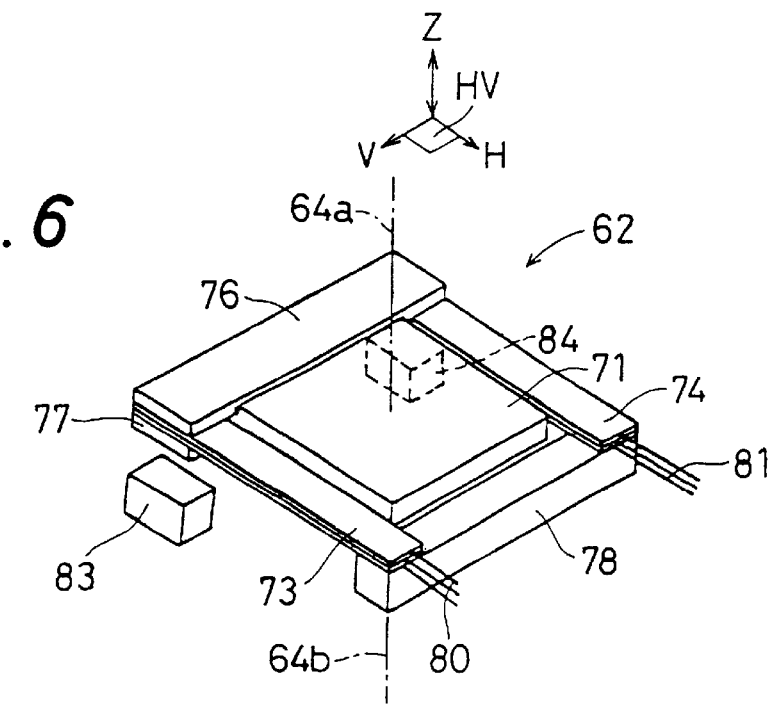
FIG. 6 is a perspective view showing the concrete structure of the image shifting mechanism 62.

FIG. 6 is a perspective view showing the concrete structure of the image shifting mechanism 62.

The refracting plate 71 is a rectangular plate-like member having a light-transmitting quality and is made of a glass member for example. It is desirable to lighten the weight of the refracting plate 71 as less as possible in order to reduce inertia.

A pair of piezoelectric elements 73 and 74 are disposed on the both sides of the refracting plate 71 in the horizontal direction H. These piezoelectric elements 73 and 74 are so-called bimorph piezoelectric elements and have a structure in which a piezoelectric ceramic is interposed between stripped three electrodes. The longitudinal direction of these piezoelectric elements 73 and 74 is parallel with the horizontal direction H which is in turn parallel with the shifting direction of the image shifting operation. Each of the piezoelectric elements 73 and 74 has a cantilever structure in which, among the both ends in the longitudinal direction, one end at the front side of the figure is set as a fixed end and the other end at the inside is set as a free end. Lead wires 80 and 81 are led out from each electrode of the piezoelectric elements 73 and 74 via the fixed ends of the piezoelectric elements 73 and 74. These lead wires 80 and 81 are connected to the driving circuit 41.

The part of the piezoelectric elements 73 and 74 at the free end side is pinched by upper and lower holding plates 76 and 77. The upper and lower holding plates 76 and 77 are made of a light-weight material such as plastic. The upper and lower holding plates 76 and 77 are nearly stripped members in which the both ends in the longitudinal direction thereof are formed thick and which have a shape of nearly U when seen from the horizontal direction H.

The upper and lower holding plates 76 and 77 are provided so that its longitudinal direction is parallel with the vertical direction V, pinch the pair of piezoelectric elements 73 and 74 by the thick parts thereof which face from each other and pinch the refracting plate 71 by the middle part thereof in the same time, thus forming a sandwiched bonding structure. Film-like adhesive of epoxy resin and the like is used to bond each component. Thereby, the refracting plate 71 is fixed at the part of the piezoelectric elements 73 and 74 on the free end side via the upper and lower holding plates 76 and 77. The refracting plate 71, the piezoelectric elements 73 and 74 and the upper and lower holding plates 76 and 77 are arranged so as to be vertically symmetrical about an imaginary HV plane including the center of the refracting plate 71 as a plane of object. When the piezoelectric elements 73 and 74 operate as a cantilever, the free end part thereof can be displaced freely without being restricted by other components.

The fixed end part of the piezoelectric elements 73 and 74 are fixed by being bonded with a stage 78. The stage 78 is fixed at a predetermined position of a case of the imaging apparatus not shown. The aforementioned optical system 33 is disposed within the case so that all fluxes of the picture image light from the object pass through the refracting plate 71. Position sensors 83 and 84 for detecting the position of the piezoelectric elements 73 and 74 in the optical axis direction are also disposed within the case. The method for fixing the piezoelectric elements 73 and 74 are not limited to that described above. For example, they may be fixed by pinching the fixed end part thereof by the stage 78 and another member having nearly the same shape therewith and by fixing those members by machine screws.

The position sensors 83 and 84 may be realized by a reflecting type photo-interrupter for example. The position sensors 83 and 84 receive reflected light from the lower holding plate 77 which has been mirror-surfaced to detect the displacement of the lower holding plate and to estimate the displacement of the piezoelectric elements 73 and 74 from the displacement of the plate. The detected result of the position sensors 83 and 84 is given to the driving circuit 41.

The image shifting mechanism 62 having such a structure operates equally with a mechanism provided with an imaginary reference axial line which passes through the center of the refracting plate 71 and extends in parallel with the vertical direction V. The size of the whole image shifting mechanism 62 is small as compared to the prior art image shifting mechanism.

In performing the image shifting operation by this image shifting mechanism 62, the image shifting mechanism 6two-dimensionalisplaces the refracting plate 71 angularly centering on the imaginary reference axial line in correspondence to the image forming position where the picture image light is to be imaged to change the angle formed between the refracting plate 71 and an optical axis 64$a$ of the picture image light on the light incident side. States which the image shifting mechanism 62 should assume in imaging the picture image light on the first and second image forming positions will be referred to first and second states, respectively. The first and second states are switched by the existence of a signal sent from the driving circuit 41.

In the first state, the driving circuit 41 supplies no signal to the piezoelectric elements 73 and 74. At this time, the piezoelectric elements 73 and 74 keep a horizontal state with respect to the RV plane, so that the incident plane of the refracting plate 71 crosses at right angles with the optical axis 64$a$ on the light incident side. The first image forming position is an intersection of an optical axis 64$b$ of the picture image light which has passed through the refracting plate 71 in this state and the image forming plane of the imaging device 34.

In the second-state, the driving circuit 41 supplies a predetermined signal to each electrode pinching the piezoelectric ceramics of the piezoelectric elements 73 and 74 via the lead wires 80 and 81. Thereby, a predetermined voltage Is applied between the two pairs of electrodes, so that the part of, the piezoelectric elements 73 and 74 from the fulcrum to the free end continuously warp on the fulcrum of the fixed end and the edge of the free end is displaced in the optical axis direction Z. Corresponding to the displacement of the free end, the refracting plate 71 is displaced angularly centering on the imaginary reference axial line. Thereby, the incident plane of the refracting plate 71 inclines by a predetermined inclination with respect to the optical axis 64$a$ on the light incident side.

At this time, the position sensors 83 and 84 estimate and detect the displacement of the piezoelectric elements 73 and 74 from the displacement of the lower holding plate and give the result to the driving circuit 41. The driving circuit 41 compares the detected result of the position sensors 83 and 84 with a predetermined target value to detect its error. Then the driving circuit 41 finely controls the voltage of the signal supplied to the electrodes of the piezoelectric elements 73 and 74 so that the displacement coincides with the target value, to finely control the inclination of the. refracting plate 71.

The optical axis of the picture image light after passing through the refracting plate 71 shifts from the extension of the optical axis 64$a$ on the light incident side in parallel with the direction crossing at right angles with the imaginary reference axial line by a shift length corresponding to the inclination of the refracting plate 71. Thereby when the image shifting mechanism 62 is in the second state, the optical axis of the picture image light after passing through the refracting plate 71 shifts in parallel along the horizontal direction H by the predetermined shift length. The second image forming position is an intersection of the optical axis after the parallel move and the image forming plane of the imaging device 34. Therefore, seeing from the first image forming position, the second image forming position is shifted in the same direction with the shift direction of the optical axis by the same shift length. The image forming point of the picture image light is shifted by such operation.

The variable spatial filter will be explained below, referring to FIGS. 7 through 11. The variable spatial filter 90 is switched between a first and second states in response to the normal and high resolution modes of the imaging apparatus 31 of the present embodiment to damp the amplitude of spatial frequency component of the picture image light with a decrement corresponding to each mode.

Figure 7:
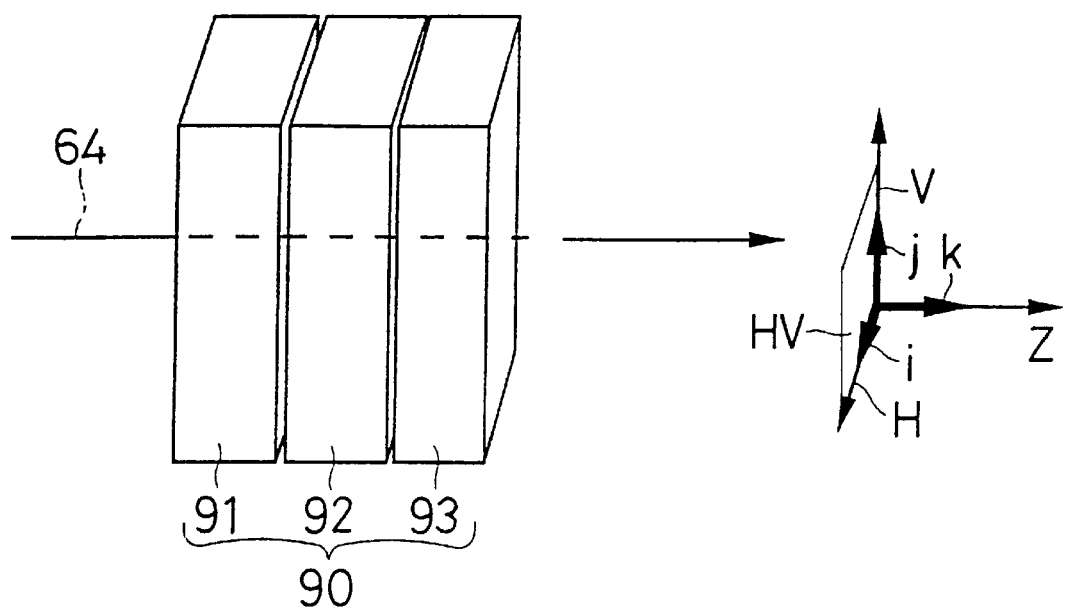
FIG. 7 is a perspective view showing the concrete structure of a variable spatial filter 90.

FIG. 7 is a perspective view showing the concrete structure of the variable spatial filter 90. The variable spatial filter 90 comprises three birefringence plates 91 through 93 disposed on the optical axis 64 of the picture image light in this order from the light incident side. The birefringence plates 91 through 93 have incident and output planes which cross at right angles with the optical axis 64 of the picture image light on the light incident side, respectively. The birefringence plate 93 can be turned centering on an imaginary axial center of rotation which coincides with the optical axis 64 and is turned so as to angularly displaced by 90 degrees in the same time when the first and second states are switched.

Hereinafter, each of unit vectors in the horizontal, vertical and optical axis directions H, V and Z will be represented as vectors i, j and k. An imaginary plane which is parallel with the vectors i and j and crosses at right angles with the vector k will be referred to as the HV plane. The HV plane is parallel with the incident and output planes of the birefringence plates 91 through 93.

Figures 8A, 8B, 8C:
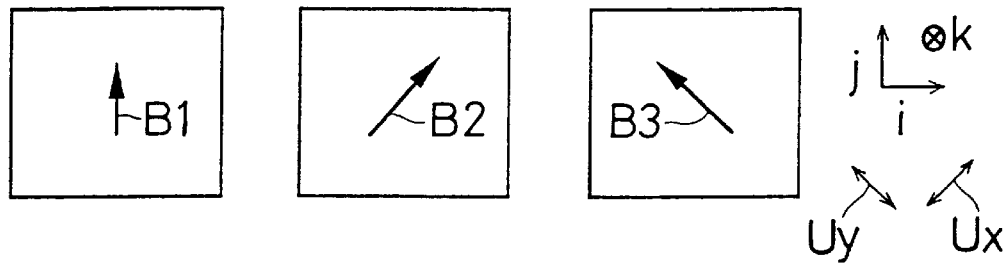
FIGS. 8A through 8c are diagrams showing separation vectors B1 through B3 of birefringence plates 91 through 93 of the variable spatial filter 90 in a first state.

The birefringence plates 91 through 93 may be realized by quartz plates for example. FIGS. 8A through 8C are diagrams showing states when separation. vectors B1 through B3 of each of the birefringence plates 91 through 93 are projected on the HV plane when. the, variable spatial filter 90 is in the first state. The orientations of the separation vectors B1 through B3 represent the orientations heading from the extensions of the optical axis of the picture image light on the light incident side of the birefringence plates 91 through 93 to the optical axis of the picture image light output from each of the birefringence plates 91 through 93 at the outside of the output plane of each of the birefringence plates 91 through 93. That is, they represent the orientations in which the optical axis is moved by the birefringence plates. The magnitude of the separation vector, i.ee the separation length, of each of the birefringence plates 91 through 93 is determined in proportional to the thickness of each of the birefringence plates 91 through 93 in the optical axis direction Z. Therefore, the thickness of each of the birefringence plates 91 through 93 is set respectively so that it causes the separation length described later.

The separation vectors are specified by the aforementioned unit vectors i, j and k as follows:

$$B1 = PV \cdot j \tag{5}$$

$$B2 = \tfrac{1}{2}PH \cdot i + \tfrac{1}{2}PH \cdot j \tag{6}$$

$$B3 = -\tfrac{1}{2}PH \cdot i + \tfrac{1}{2}PH \cdot j \tag{7}$$

It can be seen from the above expressions that the orientations of the separation vectors B1 through B3 of the birefringence plates 91 through 93 are the orientations which form 90°, 45° and 135° with the unit vector i in the horizontal direction H counterclockwise, respectively. The separation lengths of the birefringence plates 91 through 93 are as follows:

Separation Length of the birefringence plate 91=PV
Separation Length of the birefringence plate $$92 = \frac{PH}{\sqrt{2}}$$

Separation Length of the birefringence plate $$93 = \frac{PH}{\sqrt{2}}$$

When the picture image light which polarizes in the direction crossing with the separation vectors B1 through B3 enters such birefringence plates 91 through 93, the picture image light is separated into ordinary and extraordinary rays. The ordinary ray travels within the birefringence plates 91 through 93 in parallel with the extension of the optical axis on the incident side and is output as it is. At this time, the optical axis of the ordinary ray on the output side coincides with the extension of the optical axis on the incident side. The extraordinary ray is output after being separated from the ordinary ray within the birefringence plates 91 through 93. The optical axis of the extraordinary ray on the output side is shifted in parallel in the same orientation and by the same length with the separation vectors B1 through B3 predetermined on the HV plane from the extension of the optical axis on the incident side.

When the variable spatial filter 90 described above is in the first state, the birefringence plate 93 is kept in the state in which the separation vector orients as shown in FIG. 8C. The behavior of the picture image light which passes through the variable spatial filter 90 at this time will be explained below with reference to FIG. 9.

Figures 9A, 9B, 9C:
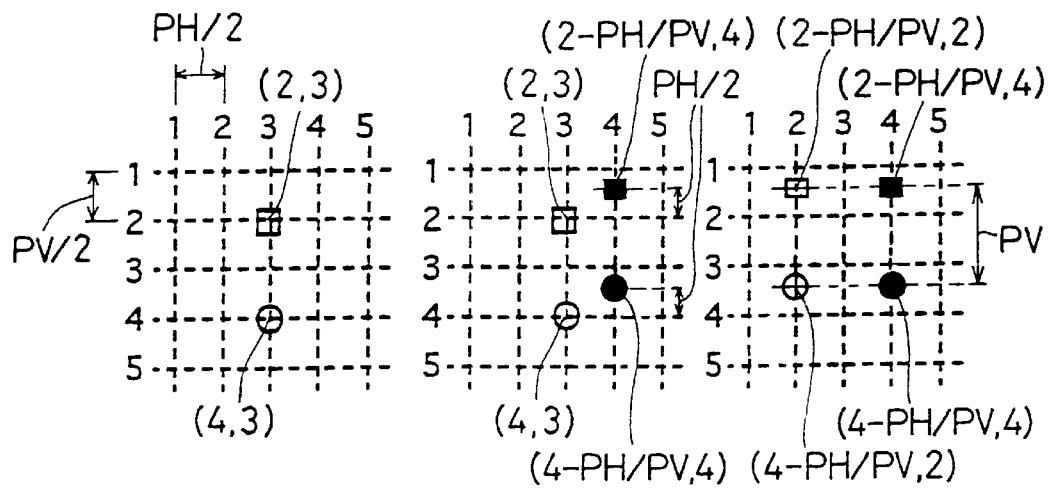
FIGS. 9A through 9C are diagrams indicating imaginary image forming planes showing image forming positions of the picture image light which has passed through the birefringence plates 91 through 93 of the variable spatial filter 90 in the first state.

FIGS. 9A through 9C are diagrams showing imaginary image forming planes which indicate positions where the ordinary and extraordinary rays of the picture image light have passed through the birefringence plates 91 through 93 in the variable spatial filter 90 in the first state. These imaginary image forming planes are parallel with the HV plane and the spatial positions of the grids drawn on each of the imaginary image forming planes all coincide each other. Axial lines of the grid are arrayed in the horizontal and vertical directions H and V with intervals PH/2 and PV/2, respectively. The coordinate of the intersection of the grids will be denoted as "Coordinate (α, β)" by using numbers α and β of each of the axial lines of the horizontal and vertical directions H and V marked in the margin of the grids. Hereinafter, this coordinate will be used to represent the intersection of the ordinary and extraordinary rays with the imaginary image forming plane.

In the variable spatial filter 90 in the first state, the intersection of the optical axis of the picture image light before entering the filter with the imaginary image forming plane is assumed to be Coordinate (4, 3). When this picture image light is inputted to the birefringence plate 91, it is separated into ordinary and extraordinary rays to the birefringence plate 91. The intersection of the optical axis of the ordinary ray on the output side with the imaginary image forming plane is Coordinate (4, 3). The optical axis of the extraordinary ray on the output side is shifted in the same orientation and by the same length with the separation vector B1 seeing from the extension of the optical axis on the incident side and the intersection of the optical axis is Coordinate (2, 3).

The pair of the ordinary and extraordinary rays enter the birefringence plate 92 from Coordinates (4, 3) and (2, 3) and are separated respectively into ordinary and extraordinary rays to the birefringence plate 92. The ordinary ray to the birefringence plate 92 of the ordinary ray of the birefringence plate 91 passes through the birefringence plate 91 as it is, so that its intersection of the optical axis is kept to be Coordinate (4, 3). Similarly, the coordinate of the intersection of the optical axis of the ordinary ray to the birefringence plate 92 of the extraordinary ray of the birefringence plate 91 is Coordinate (2, 3). The optical axes of the extraordinary rays to the birefringence plate 92 of the ordinary and extraordinary rays of the birefringence plate 91 are shifted in the same orientation and by the same length with the separation vector B2 seeing from the extensions of the optical axes at Coordinates (4, 3) and (2, 3), respectively. Because the optical axis at Coordinate (4, 3) is shifted in the orientation forming an angle of 45 degrees with the axial line of the grid at this time, the position of the intersection of the optical axis on the output side with the imaginary image forming plane is shifted from the intersection of the grid in the vertical direction V. The magnitude of the shift is a length PH/PV and is equal to the length PH/2 in FIG. 9. The orientation of the shift is the direction heading from Coordinate (4, 4) to Coordinate (3, 4). Such intersection is represented as (4−PH/PV, 4). Hereinafter, the coordinate shifted from the intersection of the grids is represented by adding the magnitude from a nearby intersection of the grids and the direction of the shift. "−" denotes that the intersection of the optical axis is shifted heading to the direction in which the number of axial line becomes smaller in FIG. 9. Similarly to the optical axis on the output side at Coordinate (4, 3), the intersection of the optical axis on the output side with the imaginary image forming plane at Coordinate (2, 3) also is shifted. Its intersection may be found by the aforementioned method and is represented as Coordinate (2−PH/PV, 2).

The two pairs of the ordinary and extraordinary rays are inputted to the birefringence plate 93 from the same coordinates. Because the separation vectors B5 and B6 of the birefringence plates 92 and 93 cross at right angles each other, the ordinary and extraordinary rays of the birefringence plate 92 turn out to be extraordinary and ordinary rays to the birefringence plate 93, respectively. Therefore, the ordinary rays of the birefringence plate 92 at coordinates (4, 3) and (2, 3) turn out to be the extraordinary rays of the birefringence plate 93. Thereby, the optical axes of the extraordinary rays of the birefringence plate 93 are shifted in the same direction with the separation vector B3 by the same length, seeing from the extension of the optical axes at coordinates (4, 3) and (2, 3), and the intersections thereof are located at Coordinates (4−PH/PV, 2) and (2−PH/PV, 2), respectively. Similarly, the extraordinary rays of the birefringence plate 92 at Coordinates (4−PH/PV, 4) and (2−PH/PV, 4) turn out to be the ordinary rays of the birefringence plate 93, so that they pass through the birefringence plate 93 as they are. Therefore, the intersection of the optical axis lines of the ordinary rays of the birefringence plate 93 are coordinates (4−PH/PV, 4) and (2−PH/PV, 4), respectively.

Thus, the picture image light which has passed sequentially through the birefringence plates 91 through 93 is separated into the two pairs of ordinary rays and extraordinary rays. The, intersections of the optical axes of these ordinary rays and extraordinary rays with the imaginary image forming plane are separated in parallel with the horizontal and vertical directions H and V by the Intervals PH and PV, respectively. When a transfer function which represents a first decrement is found about the picture image light thus separated, it can be seen that the amplitude of spatial frequency components is damped so that response of the components of spatial frequencies ±fH/2 and ±fV/2 are eliminated among the components of the spatial frequency of the picture image light. The response in an arbitrary spatial frequency f is defined by the ratio of a contrast in that spatial frequency f to a contrast in a reference spatial frequency O.

Figure 10:
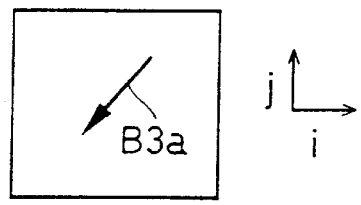
FIG. 10 is a diagram showing a separation vector B3a of the birefringence plate 93 of the variable spatial filter 90 in a second state.

Further, when the variable spatial filter 90 described above is in the second state, the birefringence plate 93 is angularly displaced by 90 degrees from the first state and the separation vector B3*a* is kept in a state shown in FIG. 10. This separation vector B3*a* may be represented by using the above-mentioned unit vectors i and j, as follows:

$$B3a = -\tfrac{1}{2}PH \cdot i - \tfrac{1}{2}PH \cdot j = -\tfrac{1}{2}PH(i+j) \tag{8}$$

The orientation of the separation vector B3*a* is the direction forming −135 degrees with the unit vector i in the horizontal direction H counterclockwise and crosses at right angles with the separation vector B3 in the first state.

Figure 11:
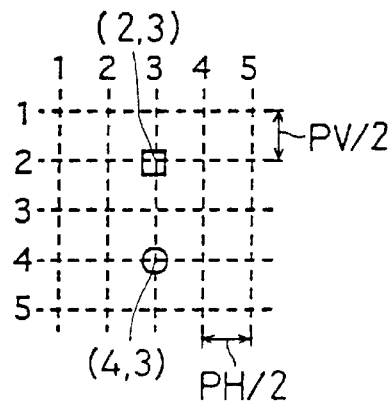
FIG. 11 is a diagram showing an imaginary image forming plane indicating image forming positions of the picture image light which has passed through the birefringence plate 93 of the variable spatial filter 90 in the second state.

The behavior of the picture image light passing through the variable spatial filter 90 at this time will be explained below by using the imaginary image forming planes shown in FIGS. 9A and 9B and 11. Each element of the imaginary image forming plane in FIG. 11 has the same meaning with that in the imaginary image forming plane shown in FIGS. 9A through 9C.

In the variable spatial filter 90 in the second state, the intersection of the optical axis of the picture image light before entering the filter with the imaginary image forming plane is assumed to be Coordinate (4, 3). The behaviors of the picture image light in passing through the birefringence plates 91 and 92 are the same with that in the first state, so that its explanation will be omitted here.

The ordinary rays to the birefringence plate 92 at Coordinates (4, 3) and (2, 3) and the extraordinary rays to the birefringence plate 92 at Coordinates (4−PH/PV, 4) and (2−PH/PV, 4) enter the birefringence plate 93 from the same coordinates. The separation vectors B2 and B3*a* of the birefringence plates 92 and 93 are parallel from each other and only the orientation thereof is opposite. Accordingly, the ordinary and extraordinary rays of the birefringence plate. 92 become ordinary and extraordinary rays to the birefringence plate 93 as they are. Accordingly, the ordinary rays of the birefringence plate 92 at Coordinates (4, 3) and (2, 3) become the ordinary rays of the birefringence plate 93, so that they pass through the birefringence plate 93 as they are. Therefore, the coordinates of the intersections of the optical axes of the ordinary rays of the birefringence plates are Coordinates (4, 3) and (2, 3). Further, the extraordinary rays of the birefringence plate 92 at Coordinates (4−PH/PV, 4) and (2−PH/PV, 4) become extraordinary rays of the birefringence plate 93. Thereby, the optical axes of the extraordinary rays of the birefringence plate 93 are shifted in the same orientation by the same length with the separation vector B3*a* seeing from the extension of the optical axis at Coordinates (4−PH/PV, 4) and (2−PH/PV, 4) and coordinates of their intersections are Coordinates (4, 3) and (2, 3), respectively.

When the separation vectors B2 and B3*a* of the birefringence plates 92 and 93 are parallel and their orientation is opposite as described above, the intersections of the optical axes of the ordinary and extraordinary rays to the birefringence plate 92 coincide after passing through the birefringence plate 93. Thereby, the light separating effect in the birefringence plates 92 and 93 is canceled. Therefore, the separation state of the picture image light after passing through the birefringence plate 93 is returned to the state right after passing through the birefringence plate 91.

The picture image light which has passed sequentially through the birefringence plates 91 through 93 are separated into a pair of ordinary and extraordinary rays as described above. The intersections of the optical axes of the ordinary and extraordinary rays with the imaginary image forming plane are separated by the interval PV in parallel with the vertical direction V. When a transfer function indicating a second decrement is found with respect to the picture image light thus separated, it can be seen that the amplitude of the spatial frequency component is damped so that the response of only the component of the spatial frequency ±fV/2 is eliminated among the spatial frequency components of the picture image light. Comparing the second decrement with the first decrement in the normal mode, it can be seen that the decrement of the spatial frequency component with respect to the horizontal direction R is zeroed and the decrement with respect to the vertical direction V is unchanged.

The operation of the imaging apparatus 31 described above for imaging the picture image light in the normal mode will be explained below in detail.

The image shifting mechanism 62 is fixed in the first state in the normal mode and the picture image light is formed on the first image forming position on the image forming plane of the imaging device 34. The variable spatial filter 90 is switched to the first state and the spatial frequency components of the picture image light in the horizontal and vertical directions H and V are limited to be less than the spatial frequencies ±fH/2 and ±fV/2, respectively. The imaging device 34 images the picture image light inputted in this state and outputs a first original picture image signal. The image forming point of the picture image light at this time may coincide with the second image forming position.

Based only on the above-mentioned first original picture image signal, the signal processing circuit 44 generates a luminance signal Y and two kinds of color difference signals (B−Y) and (R−Y) of a single first output picture image signal.

These three kinds of signals are digital signals composed of a plurality of elements found in unit of each picture element D. The elements in the unit of each picture element D of the luminance signal and the color difference signals will be referred to as luminance data and color difference data hereinafter. The luminance data of each picture element D is the sum of received light data of all chromatic lights to be received by the picture element D. The two kinds of color difference data are a difference of received light data of all chromatic lights. Therefore, the received light data of all chromatic lights is required per each picture element D in order to obtain the luminance data and the color difference data of each picture element D.

Only one kind of mixed data in which two kinds of received light data are mixed corresponds to each picture element D in the aforementioned original picture image. The luminance data of each picture element D is found by interpolating the missing received light data by mixed data of the other adjacent picture elements D. For instance, luminance data Y(6, 2) of a picture element D(6,2) belonging to the sixth row and second column may be found based on the following expression:

$$Y(6,2) = (Cy+G)(6,2) + (Ye+Mg)(6,3) \tag{9}$$

"(α+β)(n, m)" represents mixed data of α and β corresponding to the picture element D in the n-th row and m-th column. α and β are either one of green, yellow, cyan and magenta and are denoted by "G", "Ye", "Cy" and "Mg".

The color difference data is also found by interpolating missing received light data with mixed data of the other adjacent picture elements D similarly to the luminance data. At this time, two corresponding picture elements to which the same kind of mixed data corresponds are arrayed in the vertical direction V continuously in the original picture image, so that only one kind of color difference data corresponding to each picture element D may be found corresponding to the mixed data of the picture elements D. For example, color difference data (R−Y)(6, 2) of the picture element D(6, 2) may be found based on the following expression:

$$(R-Y)(6,2)=-(Cy+G)(6,2)+½\{(Ye+Mg)(6,1)+(Ye+Mg)(6,3)\} \quad (10)$$

Further, the other color difference data (B−Y)(6, 2) which cannot be obtained directly from the mixed data of the picture elements D is interpolated by using the same kind of color difference data (B−Y) directly obtained by other picture elements D around that picture element D(6, 2) based on the following expression:

$$(B-Y)(6,2)=½\{(B-Y)(4,2)+(B-Y)(8,2)\} \quad (11)$$

Hereinafter, the picture element D through which at least one of the luminance data and color difference data may be directly found from the received light data in the output picture image will be referred to as an "actual picture element" of that data. The picture element D through which the luminance data and color difference data may be found through the interpolation process will be referred to as an "imaginary picture elements" of that data.

The sampling frequencies of the luminance signal and the color difference signals may be found easily from the array period of the corresponding picture element of each chromatic light of the original picture image signal which is the basis of the calculation of the first output picture image signal. A length of one period of the array period of the corresponding picture element of an arbitrary chromatic light in the direction of one spatial axis is equal to an interval between two imaginary straight lines which are supposed so as to cross at right angles with the spatial axis on the original picture image, which are parallel from each other and are adjacent each other by passing respectively through centers of two or more corresponding picture elements of the received light data or mixed data of the chromatic light.

The sampling frequency of the luminance signal may be found from the array period of the corresponding picture elements of the mixed data of all the chromatic lights. Because the array period can be found to be the array periods PH, PV and PU In the horizontal, vertical and diagonal directions H, V and U from FIG. 4, the sampling frequencies are the spatial frequencies fH, fV and fu, respectively. Further, the sampling frequency of the color difference signal may be found from the array period of only the corresponding picture elements of the mixed data of the same kind. Because the array period can be found to be at least the array periods 2PH and 4PV in the horizontal and vertical directions H and V from FIG. 4, the sampling frequencies are the spatial frequencies fH/2 and fV/4, respectively.

A spatial frequency plan view is used as a method for evaluating the resolution of the output picture image represented by the output picture image signal. The spatial frequency plan view indicates a normal band of luminance and carrier frequencies of Moire of the color difference signal and corresponds to a so-called CZP (Circular Zone Plate) chart. Moire appearing on the CZP chart is generated at the same position with Moire appearing by the return component whose center frequency is the carrier frequency of Moire shown in the spatial frequency plane. The CZP chart is disclosed in "Picture image and Moire of Solid Imaging Apparatus" Report on Technological Research, IE-80-96, Institute of Electronics and Communication Engineers of Japan. The range of the normal band of luminance on each spatial frequency axis has been found by a simplified method in the present specification. The simplified method will be explained below by exemplifying the normal band of luminance of the first output picture image signal described above.

Figure 12:
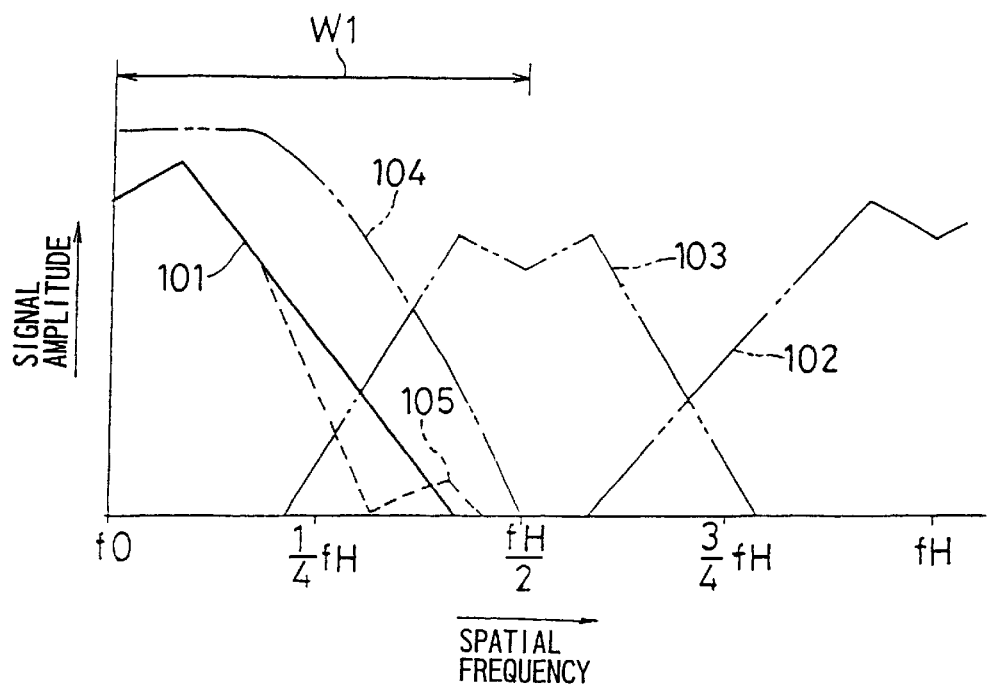
FIG. 12 is a graph showing spectra of a luminance signal and a color difference signal with respect to a spatial frequency axis in the horizontal direction H.

FIG. 12 is a graph showing the spectra of the luminance signal and the color difference signals with respect to the spatial frequency axis in the horizontal direction H in the first quadrant of the spatial frequency plan view. The sampling frequency of the luminance signal in the horizontal direction is the spatial frequency fH as described above.

The spectrum of a desired signal component of the luminance signal necessary in visually displaying the first output picture image signal is an angular waveform 101 centered on the spatial frequency 0. Because the luminance signal is a digital signal as described before, it contains a return component. The spectrum of this return component is an angular waveform 102 centering on a spatial frequency of integer times of the sampling frequency fH other than zero. The spatial frequency of integer times of the sampling frequency other than zero will be referred to as the carrier frequency.

The range on the spatial frequency axis of the normal band of luminance on the spatial frequency axis in the horizontal direction is defined to be a range W1 whose width is a half of the sampling frequency fH of the luminance signal centering on the spatial frequency 0. The spectrum of the desired signal component of the luminance signal is contained within this normal band. The normal band of luminance may be found two-dimensionally within the first through fourth quadrants of the spatial frequency plane including the spatial frequency axes of the horizontal, vertical and diagonal directions H, V and U. This spatial frequency plane is an imaginary plane which contains the horizontal axis and crosses at right angles with the page in the graph in FIG. 12.

The spectrum of the desired signal component of the color difference signal presents an angular waveform centering on the spatial frequency 0. Because the color difference signal is also digital data, it contains a return component. The spectrum of the return component is an angular waveform 103 centering on a carrier frequency of integer times of the sampling frequency fH/2 of the color difference signal other than zero.

While the sampling frequency of the color difference signal is defined by the array of actual picture elements of each color difference data of the output picture image, the color difference data may not be found in all of the picture elements D, even if the luminance data is found in all of the picture elements D, depending on the array of colors of the color filter as described before. At this time, the sampling frequency of the luminance signal differs from that of the color difference signal. When the sampling frequency of the color difference signal is smaller than the sampling frequency of the luminance signal, the carrier frequency of the color difference signal exists within the normal band of luminance. The return component centering on this carrier frequency overlaps with and interferes the desired signal component of the luminance signal. When this interference occurs, the waveform of the desired signal component of the luminance signal distorts, generating color Moire. The carrier frequency of the return component of the color difference signal which overlaps with the waveform of the desired signal component of the luminance signal and causes the color Moire will be referred to as a "carrier frequency of Moire" hereinafter.

Because the quality of a picture image which causes the color Moire degrades, the spatial frequency component of the picture image light near the carrier frequency of color Moire is eliminated by the variable spatial filter 90 of the optical system 33 in order to prevent the degradation of the picture image quality. A wave filtering zone of the variable spatial filter 90 to be inserted is indicated by a two-dot chain line 104. The spectrum of the return component 103 of the color difference signal is damped to the level indicated by a broken line 105 by inserting such filter. At this time, the spectrum of the desired signal component 101 of the luminance signal is also damped by the same decrement in the same time, distorting its waveform.

Thereby, the desired signal component of the luminance signal is limited to the range of less than the carrier frequency of the color Moire, so that the normal band of luminance is reduced. The width of the normal band of luminance on the spatial frequency axis in the one direction corresponds to the resolution of the picture image on the spatial axis in that direction and the wider the width, the greater the resolution is. Accordingly, it is necessary to reduce a number of Moire contained within the normal band of luminance in order to improve the quality of the output picture image.

Further, the farther the carrier frequency from the center frequency of the desired signal component of the luminance signal, the smaller the overlap of waveforms of the desired signal component of the luminance signal and the return component of the color difference signal and the smaller the signal intensity at the overlapping position are. Thereby, the distortion of the waveform of the desired signal component of the luminance signal is reduced when the filter is inserted. Accordingly, when the carrier frequency of Moire cannot be eliminated and remains, it is preferable that the carrier frequency exists around the normal band of luminance.

Among the spatial frequency components appearing in the spatial frequency plan view, the component of an arbitrary spatial frequency (fh, fs) and that of a spatial frequency (−fh, −fv) are related in the conjugate relationship:

$$F(fh, fv) = F(-fh, -fv)^* \tag{12}$$

In the above expression, "F(fh, fv)" represents the spatial frequency component of the spatial frequency (fh, fv) and "*F( )*" denotes the conjugate of the spatial frequency component.

It can be seen from this fact that the graph of the normal band of luminance and the positions of the carrier frequency of Moire appearing in the third and fourth quadrants are a graph and positions which are point-symmetrical to the graph and position in the first and second quadrants about the origin of the spatial frequency axis of the plan view. In the present specification, the first and second quadrants showing the range in which the spatial frequency in the vertical direction V is zero or more is shown in the spatial frequency plan view.

Figure 13:
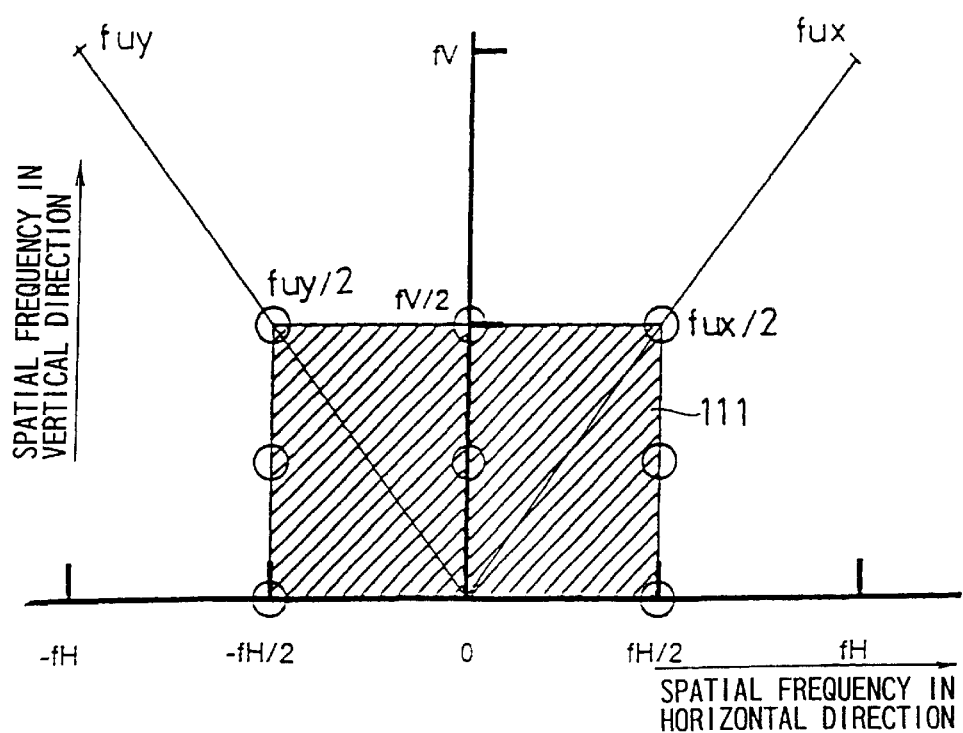
FIG. 13 is a spatial frequency plan view showing a normal band 111 of luminance of a first output picture image signal and carrier frequencies of Moire of the color difference signal.

FIG. 13 is a spatial frequency plan view showing the normal band of luminance of the first output picture image signal and the carrier frequencies of Moire of the color difference signal. The hatched part in FIG. 13 is the normal band 111 of luminance determined based on the aforementioned sampling frequency. The range of the normal band 111 of luminance in the spatial frequency axes in the horizontal, vertical and diagonal directions H, V and U is represented by the following expressions:

$$(-fH/2) \leq f \leq (fH/2) \tag{13}$$

$$(-fV/2) \leq f \leq (fV/2) \tag{14}$$

$$(-fu/2) \leq f \leq (fu/2) \tag{15}$$

Accordingly, the normal band 111 of luminance in the first and second quadrants is a rectangular area having the following four vertexes:
(−fH/2, 0)
(fH/2, 0)
(−fH/2, fV/2)
(fH/2, fV/2)

Within the normal band 111 described above, the carrier frequencies of Moire exist at the following eight positions. These positions are indicated by white circles in FIG. 13.
(−fH/2, 0)
(fH/2, 0)
(−fH/2, fV/4)
(fH/2, fV/4)
(−fH/2, fV/2)
(0, fV/2)
(fH/2, fV2)
(0, fV/4)

The first decrement of the variable spatial filter 90 in the first state described above is defined so as to damp the spatial frequency component near the boundary of the normal band 111. Among the carrier frequencies of Moire at the above-mentioned eight spots, the seven spots are located around the normal band 111, so that they are eliminated by the spatial frequency limiting effect of the variable spatial filter 90. In the same time, the desired signal component of the luminance signal near the boundary of the normal band 111 is also damped by the variable spatial filter 90, so that the range of the normal band 111 of the first output picture image signal on the spatial frequency axes in the horizontal and vertical directions H and V is assumed to be a range less than the spatial frequencies ±fH/2 and ±fV/2. Thereby, the substantial width of the normal band 111 on the spatial frequency axes in the horizontal and vertical directions H and V is reduced, so that the substantial resolution of the first output picture image drops by that as compared to the ideal resolution supposed from the normal band 111.

The operation of the imaging apparatus 31 for imaging the picture image light in the high resolution mode described above will be explained below in detail.

In the high resolution mode, the variable spatial filter 90 is switched to the second state to limit only the spatial frequency component of the picture image light in the vertical direction V to be less than the spatial frequency ±fV/2. The image shifting mechanism 62 is switched sequentially from the first to the second state per predetermined imaging timing based on the synchronous signal supplied from the synchronous signal generating circuit 40.

Figure 14:
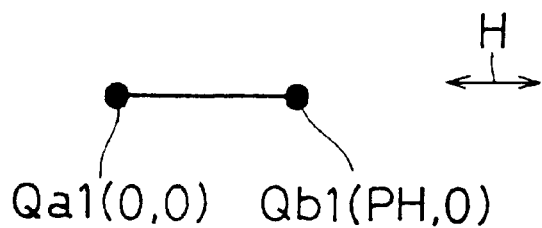
FIG. 14 is a diagram showing the positional relationship between the first and second image forming positions Qa1 and Qb1 of the picture image light on the image forming plane of the imaging device 34 in the high resolution mode.

FIG. 14 is a diagram showing the positional relationship between the first and second image forming positions. The first and second image forming positions Qa1 and Qb1 are the intersections of the optical axes of the picture image light after passing through the refracting plate 71 of the image shifting mechanism 62 in the first and second states with the image forming plane of the imaging device 34 as described before. Based on the first image forming position Qa1, the second image forming position Qb1 is a position moved from the first image forming position Qa1 in the horizontal direction H by a length PH of one period of the array period PH of the photo-receiving domains PD in the horizontal direction H. The setting of the imaginary reference axial line of the refracting plate 71 of the image shifting mechanism 62 and the inclination between the refracting plate 71 in the second state and the optical axis 64a of the picture image light before the input are set so that the first and second image forming positions take the above-mentioned positional relationship.

The Imaging device 34 images the picture image light when the picture image light is formed on the first and second image forming positions Qa1 and Qb1 and obtains the first and second original picture image signals. The signal processing circuit 44 generates the second output picture image signal from the first and second original picture image signals.

The method for generating the second output picture image signal will be explained below. The signal processing circuit 44 superimposes the first and second original picture image signals so that the spatial imaging positions coincide to generate the composite picture image signal. The composite picture image which is imaginarily and visually represented by this composite picture image signal is assumed to be a picture image in which two original picture images are superimposed by shifting the reference point of the picture image. In the direction opposite from the shift direction by the same shift length of the image forming point for example At this time, points corresponding respectively to the image forming positions Qa1 and Qb1 within the first and second original picture images coincide within the composite picture image.

According the present embodiment, the composite picture image is assumed to be the picture image in which the first and second original picture images are superimposed by shifting in the horizontal direction H by the length PH. The array of picture elements of the whole composite picture image is equal to the array of picture elements of the original picture image and N×M picture elements are arrayed in a matrix form with the array periods PH and PV in the horizontal and vertical directions H and V, respectively.

Figure 15:
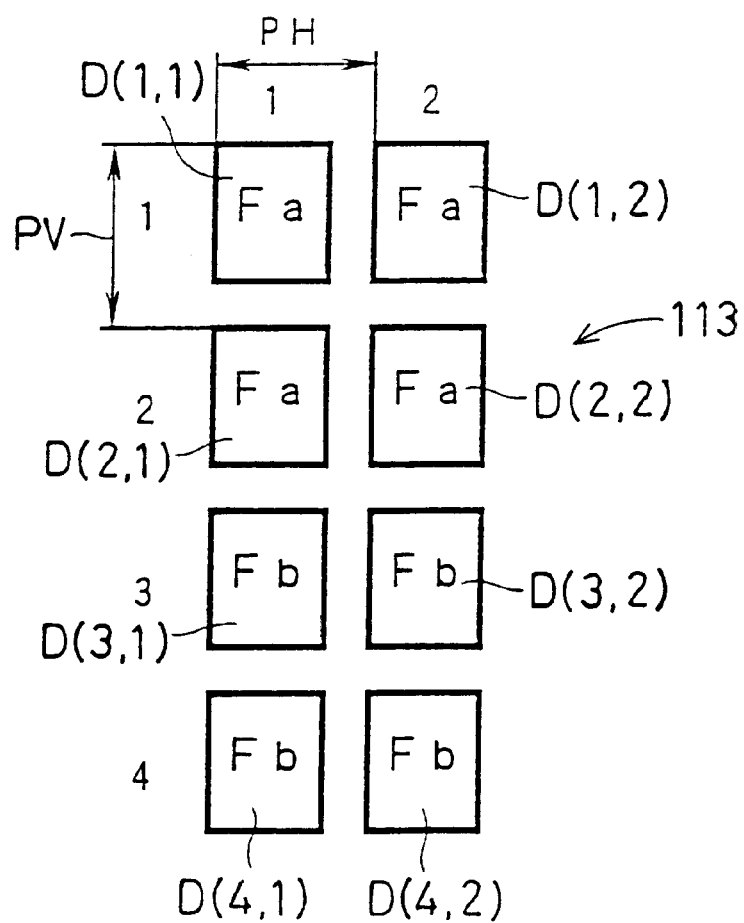
FIG. 15 is a diagram showing an equivalent basic array pattern of the array of picture elements D of a composite picture image.

FIG. 15 is a diagram showing an equivalent basic array pattern 113 of the array of picture elements D of the composite picture image. In the composite picture image, this basic array pattern 113 is repeated periodically in the horizontal and vertical directions H and V The basic array pattern 113 of the composite picture image is composed of eight picture elements D of four rows and two columns and two kinds of mixed data corresponds to each picture element D.

In the basic array pattern 113, the mixed data of yellow and magenta and the mixed data of cyan and green correspond to the picture elements D(1, 1), D(1, 2), D(2, 1) and D(2, 2). The mixed data of yellow and green and the mixed data of cyan and magenta correspond to the picture elements D(3, 1), D(3, 2), D(4, 1) and D(4, 2). The array of colors of the basic array pattern 113 of the picture elements D is equivalent to an array of colors of an imaginary color filter to be provided on the light incident side of the image forming plane of the imaging device in obtaining the composite picture image directly by one time of operation for imaging the picture image light.

Next, the signal processing circuit 44 calculates each data of the luminance and color difference signals of the second output picture image signal from the mixed data corresponding to each picture element D of the composite picture image. It then compares the array of picture elements of the desired output picture image with the array of picture elements of the composite picture image and interpolates each signal to imaginary picture elements from which no luminance data nor color difference data is generated based on the luminance data and color difference data of the actual picture elements.

In the composite picture image, two kinds of mixed data in which two kinds of received light data are mixed correspond to each picture element D. The luminance data can be obtained directly from these mixed data per each picture element with respect to such picture element D. For instance, luminance data Y(6, 2) of the picture element D(6, 2) belonging to the sixth row and the second column may be found based on the following expression:

$$Y(6,2)=(Cy+G)(6,2)+(Ye+Mg)(6,2) \qquad (16)$$

In the composite picture image, two rows composed of only corresponding picture elements to which the same kind of mixed data corresponds are arrayed successively in the vertical direction V. In the composite picture image, only one kind of color difference data among two kinds of color difference data is obtained directly from the mixed data of the picture elements D in correspondence to the combination of the mixed data of the picture elements D with respect to each picture element D. Accordingly, only the same kind of color difference data is obtained directly in the two rows of picture elements D successive in the vertical direction V. For instance, color difference data (R−Y)(6, 2) of the picture element D(6, 2) may be found based on the following expression:

$$(R-Y)(6,2)=(Cy+G)(6,2)-(Ye+Mg)(6,2) \qquad (17)$$

With respect to the picture element D(6, 2) described above, one kind of color difference data (B−Y)(6, 2) which cannot be obtained directly from the mixed data of the picture element D among the two kinds of color difference data may be interpolated by using the same kind of color difference data (B−Y) obtained in the other picture elements D around the picture element D(6, 2) based on the following expression:

$$(B-Y)(6,2)=\tfrac{1}{2}\{(B-Y)(4,2)+(B-Y)(8,2)\} \qquad (18)$$

The sampling frequency of the luminance signal and that of the color difference signals of the second output picture image signal may be readily found from the array period of the corresponding picture elements of each chromatic light of the composite picture image which is the base in calculating the signals. The method for calculating the array period is the same with the method for calculating the array period of the first output picture image signal, except of that the original picture image signal is replaced by the composite picture image signal in that method.

Comparing the original picture image with the composite picture image with respect to the array of corresponding picture elements of all the chromatic lights, it can be seen that the arrays of the both are the same. Accordingly, the array periods in the horizontal, vertical and diagonal directions H, V and U of the composite picture image are equal to those of the original picture image and are assumed to be periods PH, PV and PU. Therefore, the sampling frequencies of the luminance signal of the second output picture image signal are spatial frequencies fH, fV and fu in the horizontal, vertical and diagonal directions H, V and U, respectively.

Further, comparing the original picture image with the composite picture image with respect to the array of only corresponding picture elements of the same kind of mixed data, it can be seen that a number of the corresponding picture elements in the horizontal direction H is increased because the corresponding picture elements which have been arrayed in every other column in the original picture image are arrayed in the whole columns in the composite picture image with respect to the horizontal direction H. From this fact, the array periods of the composite picture image in the horizontal and vertical directions H and V are considered to be periods PH and 4PV, respectively. Therefore, sampling frequencies of the color difference signal of the second output picture image signal are spatial frequencies fH and fV/4, respectively.

Figure 16:
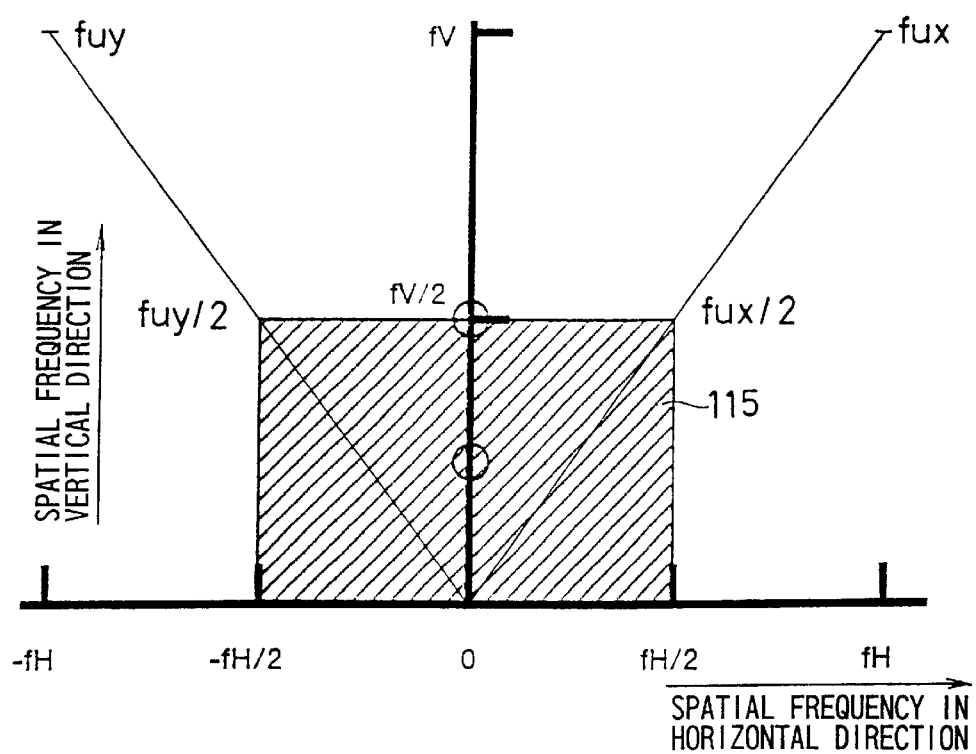
FIG. 16 is a spatial frequency plan view showing a normal band 115 of luminance of a second output picture image signal and carrier frequencies of Moire of the color difference signal.

FIG. 16 is a spatial frequency plan view showing a normal band 115 of luminance and the carrier frequencies of Moire of the color difference signal of the second output picture image signal described above. The hatched part in FIG. 16 indicates the normal band 115 of luminance of the second output picture image signal.

The range of the normal band 115 of the luminance in the spatial frequency axes of the horizontal, vertical and diagonal directions H, V and U is equal to the range of the first output picture image signal and is represented by the following expression:

$$(-fH/2) \leq f \leq (fH/2) \quad (13)$$

$$(-fV/2) \leq f \leq (fV/2) \quad (14)$$

$$(-fu/2) \leq f \leq (fu/2) \quad (15)$$

Accordingly, the normal band 115 of luminance in the first and second quadrants is a rectangular area having the following four vertexes:
(−fH/2, 0)
(fH/2, 0)
(−fH/2, fV/2)
(fH/2, fV/2)

The positions where the carrier frequencies of the color difference signal which cause Moire exist are the following two spots within the normal band 115 of luminance:
(0, fV/4)
(0, fV/2)

The second decrement of the variable spatial filter 90 of the optical system 33 described above is determined so as to be able to damp the return component of the color difference signal centering on these carrier frequencies.

Comparing the normal bands 111 and 115 of the first and second output picture image signals shown in FIGS. 13 and 16, it can be seen that although there is no change in the size and shape thereof, the carrier frequencies of Moire on the spatial frequency axis in the horizontal direction H appearing in the normal band 111 are extinguished totally in the normal band 115. Accordingly, it becomes unnecessary to limit the spatial frequency component in the horizontal direction H by the variable spatial filter 90. Thereby, the substantial width of the normal band 115 on the spatial frequency axis in the horizontal direction H after limiting by the filter is expanded to the whole range of the normal band 111 of less than or equal to the frequency ±fH/2.

Therefore, the normal band of the second output picture image signal after the limitation is expanded along the spatial frequency axis in the horizontal direction H as compared to the normal band of the first output picture image signal after the limitation. Thereby, the horizontal resolution of the second output picture image is improved more than the horizontal resolution of the first output picture image.

The first and second output picture image signals are displayed visually on a display unit realized by a cathode ray tube for example. In such a display unit, a visual display area is formed on a flat phosphor screen by arraying in the vertical direction V a plurality of so-called scan lines extending in the horizontal direction H. The display unit displays each picture element D of the picture image by causing fluorescent paint on the scan lines in the visual display area to emit light by an electron beam which is continuously changed by an analog signal. While a number of picture elements D of the picture image in the vertical direction V is defined by a number of scan lines in the display unit having such a visual display area, a number of picture elements D in the horizontal direction H is assumed to be infinite because the luminance can be changed continuously.

Even if the width of the normal band is expanded in the stage of the picture image signal in improving the resolution of the picture image, the picture image of improved resolution cannot be displayed without a display unit which can display the spatial frequency component of that signal. Because picture elements D which are arrayed with an array period which is a half of an inverse number of one spatial frequency are necessary in order to display the signal component of the spatial frequency, an array of picture elements whose array period is small is required to improve the resolution further by expanding the width of the normal band. Although the number of picture elements D in the vertical direction V is finite, it is considered to be infinite in the horizontal direction H in the display unit described above, so that the array period of the picture elements D is considered to be readily reduced in the horizontal direction H. Therefore, it is preferable to improve the resolution in the horizontal direction H in improving the resolution of the picture image to be displayed on the display unit.

An imaging apparatus of a second embodiment of the present invention will be explained below. The components of the imaging apparatus of the present embodiment other than the optical system, the color filter and the imaging device are the same with those of the imaging apparatus 31 of the first embodiment. Therefore, the same or like components are denoted by the same reference numerals and an explanation thereof will be omitted here. An imaging device 131 is used instead of the two-picture element mixed reading type imaging device 34 in the present embodiment. This imaging apparatus operates in the normal and high resolution modes and obtains first and second output picture image signals whose resolution is different.

Figure 17:
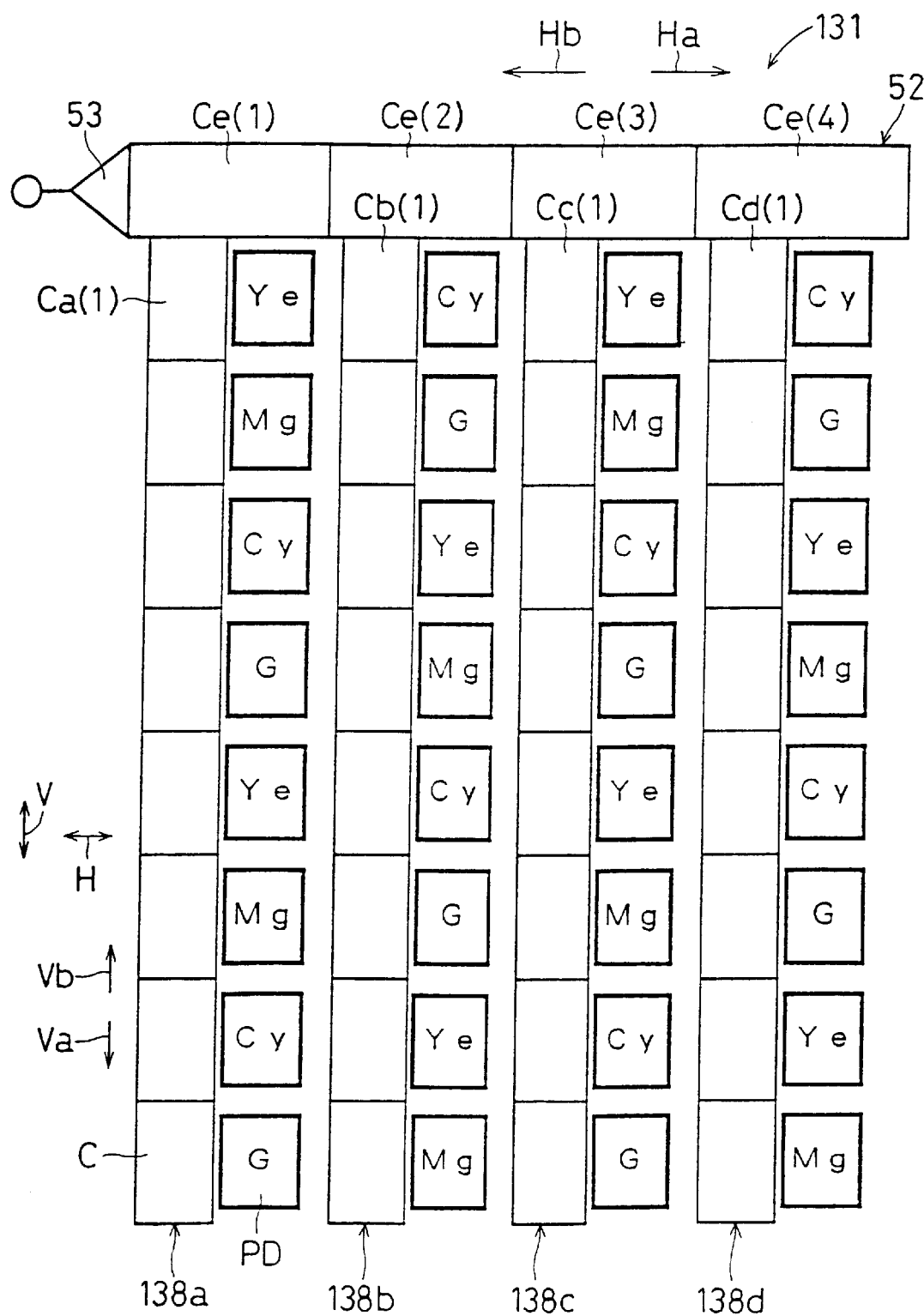
FIG. 17 is a plan view showing the concrete structure of an image forming plane of an imaging device 131 of an imaging apparatus according to a second embodiment of the present invention.

FIG. 17 is a plan view showing a concrete structure of an image forming plane of the imaging device 131. This imaging device 131 is a so-called whole picture element reading type imaging device. The imaging device 131 has a similar structure with the imaging device 34, so that the same or like components are denoted by the same reference numerals and their detailed explanation will be omitted here.

Similarly to the imaging device 34, N×M photo-receiving domains PD are arrayed on the image forming plane of the imaging device 131 in a matrix form in parallel with the horizontal and vertical directions H and V, respectively. In FIG. 17, the array of the photo-receiving domains PD is represented by 32 photo-receiving domains PD(1, 1) through PD(4, 8) of eight rows and four columns.

A color filter described later is provided on the light incident side of the image forming plane of the imaging device 131. The array of corresponding N×M light-transmitting domains L of this color filter is equal to the array of the photo-receiving domains PD. An array of colors of the color filter will be described later. Each photo-receiving domain PD receives chromatic light which has passed through the corresponding light-transmitting domain L during a predetermined exposure time and generates received light data corresponding to the quantity of received light.

In adjacent to each column of the photo-receiving domains PD, vertical transfer CCD groups 138*a* through 138*d* (generically denoted Just by the reference numeral "138") are arrayed. Each of the vertical transfer CCD groups 138 contains the same number of charge couple devices C with the number of the photo-receiving domains PD in the column of the adjacent photo-receiving domains PD, respectively. Each charge coupled devices C in each group 135 is arrayed linearly in the vertical direction V and are electrically connected each other. There exists the vertical transfer CCD groups 138 by the same number with the number of columns of the photo-receiving domains PD. Because the number of the photo-receiving domains PD in each column is equal with the number of charge coupled devices C in each group 138, each photo-receiving domain PD corresponds in one-to-one with the charge coupled device C in the vertical transfer CCD groups 138.

A horizontal transfer CCD group 52 which is electrically connected with the charge coupled devices Ca(1), Cb(1), Cc(1) and Cd(1) at one end of each of the vertical transfer CCD groups 138 is provided at one end of the columns of the photo-receiving domains PD on the image forming plane. An output section 53 is attached at one end of the horizontal transfer CCD group 52.

The received light data of each photo-receiving domain PD is transferred to the charge coupled device C of the separately corresponding vertical transfer CCD group 138 adjacent to the photo-receiving domain PD during the vertical fly-back period. The received light data transferred to the charge coupled device C is transferred sequentially through each of the charge coupled devices C of the vertical transfer CCD group 138 in the other direction Vb in the vertical direction V during the horizontal fly-back period. When the received light data is transferred to the charge coupled devices Ca(1) through Cd(1) at one end of the groups 138*a* through 138*d*, the received light data is then transferred to the charge coupled devices Ce(1) through Ce(4) of the horizontal transfer CCD group 52 connected to the charge coupled devices Ca(1) through Cd(1). The horizontal transfer CCD group 52 transfers the received light data sequentially in the other direction Hb of the horizontal direction H during the horizontal scan period, i.e. the period in which the horizontal fly-back period and the vertical fly-back period are excluded from the period for the imaging operation to output from the output section 53 to the pre-processing circuit 35.

The received light data is derived separately from the imaging device 131 by such operation. The original picture image signal output in one time of imaging is composed of N×M received light data.

The photo-receiving domains PD and each of the CCD groups 138 and 52 of the imaging device 131 are formed in a body on a silicon substrate for example. An overflow drain is provided between the photo-receiving domains PD and the silicon substrate. The imaging device 131 can control the exposure time by an electronic shutter using the overflow drain.

According to the imaging apparatus of the present embodiment, the exposure time in imaging the picture image light is controlled by using the electronic shutter of the imaging device 131 together with a mechanical shutter mechanism 141. The electronic shutter and the shutter mechanism 141 compose exposure control means for controlling the imaging operation of the imaging device 131.

Beside the condenser lens 61, the image shifting mechanism 62 and the variable spatial filter 90, the shutter mechanism 141 is provided in the optical system 33*a* of the imaging apparatus. The shutter mechanism 141 is interposed between any two components adjoining at an interval among the above-mentioned components 61, 62, 90 and the imaging device 131. The shutter mechanism 141 is a so-called lens shutter and is used to switch whether to shut off or transmit picture image light and to stop the optical system 33*a* by the single mechanism.

Figure 18A:
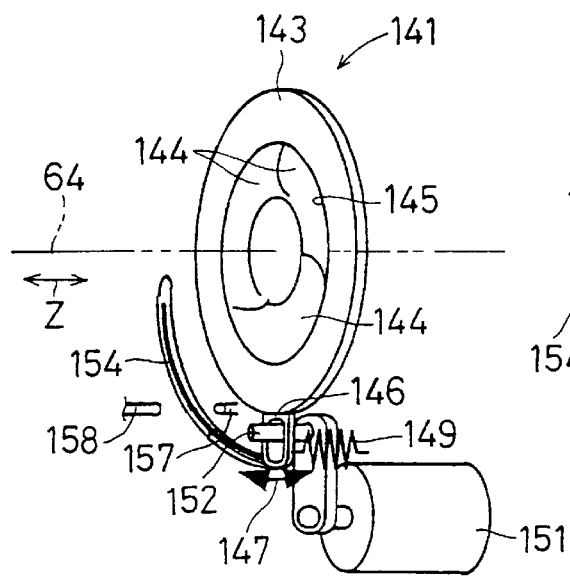
FIG. 18A is a perspective view showing the concrete structure of a shutter mechanism 141 provided in the imaging apparatus of the second embodiment and FIG. 18B is a front view of a shutter plate.
Figure 18B:
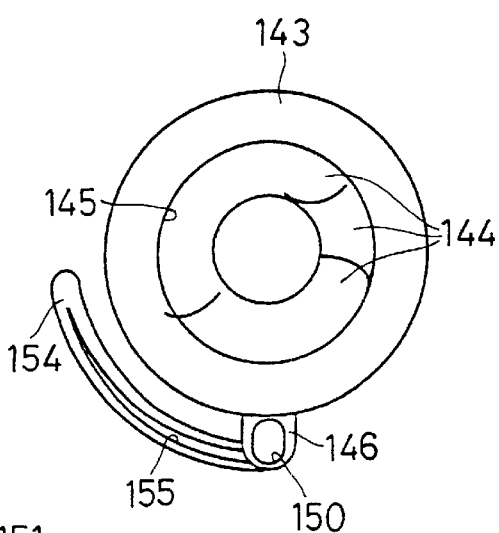

FIG. 18A is a perspective view showing the mechanical structure of the shutter mechanism 141. FIG. 18B is a view of a shutter plate 143 of the shutter mechanism 141 seen from the optical axis direction Z. These two drawings will be explained together.

The disc-like shutter plate 143 is interposed vertically on the optical axis 64 of the picture image light so that its center axial line coincides with the optical axis 64. A circular opening 145 for transmitting the picture image light is provided at the center of the shutter plate 143. The shutter plate 143 includes a plurality of shutter blades 144, a drive pin 146 and a detecting plate 154.

The shutter blades 144 are provided to control a degree of opening of the shutter mechanism 141 by changing the inner diameter of the opening 145 of the shutter plate 143. The degree of opening of the shutter mechanism 141 corresponds to an area of the opening 145 not closed by the shutter blades 144 in the shutter plate 143. The shutter blades 144 reduces the inner diameter of the opening 145 in correspondence to the displacement of the drive pin 146.

The shutter is closed to shut off the picture image light by completely closing the opening 145 by driving the shutter blades 144 in the shutter mechanism 141. The shutter blades 144 are also driven in the opposite direction from that during the closing operation and are stopped when the inner diameter of the opening 145 reaches a predetermined length to release the shutter mechanism 141 at a predetermined degree of stop. The degree of stop in releasing the shutter mechanism 141 is also controlled by conducting the closing and releasing operations minutely.

One end of a spring 149 which is the power source of the closing operation of the shutter mechanism 141 is connected to the drive pin 146. The other end of the spring 146 is fixed to any one of fixing members of the imaging apparatus. The drive pin 146 is also provided with a groove 150 which penetrates through in the optical axis direction Z. A driving shaft 152 which is driven by a power source 151 of the imaging apparatus described below is inserted through the groove 150. The power source 151 is realized by a motor for example and is used to control the speed of the releasing/closing operations of the shutter blades 144.

When the drive pin 146 is displaced in the circumferential direction of the shutter plate 143 indicated by an arrow 147, the shutter blades 144 are displaced so as to reduce or expand the area of the opening 145. The spring 149 always exerts a spring force in the direction in which the shutter blades 144 close the opening 145 to close the shutter mechanism 141. The releasing and closing operations of the shutter mechanism 141 are performed through the displacement of a drive shaft 152 of the power source 151. During the releasing operation, the shutter blades 144 are released, going against the spring force, by driving the drive shaft 152 in the direction opposite from the direction in which the spring force is applied to the driving pin 146. During the closing operation, the shutter blades 144 are closed by the resultant force of the force from the power source 151 and the spring force by driving the drive shaft 152 in the same direction in which the spring force is exerted. The releasing and closing operations are controlled by a driving unit described later.

The detecting plate 154 is used to detect the degree of opening of the shutter mechanism 141. The detecting plate 154 is a thin and long plate-like member which is curved circularly in the longitudinal direction. Its one end is linked with the drive pin 146 of the shutter blades 144 and moves in linkage when the shutter blades 144 are displaced. A groove 155 which is created along the longitudinal direction of the detecting plate 154 and which penetrates through in the optical axis direction Z is created in the detecting plate 154. The further from one end of the plate to the other end at the opposite side thereof, the narrower the width thereof becomes.

A light source 157 and a photo sensor 158 are disposed facing each other with the groove 155 of the detecting plate 154 between. The light source 157 always outputs a predetermined quantity of light. The photo sensor 158 receives the light from the light source 157 via the groove 155 of the detecting plate 154 and derives an output whose level is changed corresponding to the quantity of received light. The quantity of light received by the photo sensor 158 reduces in proportional to the width of the groove 155 on an imaginary line connecting the light source 157 with the photo sensor 158. Because the detecting plate 154 is displaced in linkage with the drive pin 146, its displacement corresponds to the change of the degree of opening of the shutter mechanism 141. The further the shutter blades 144 are stopped and the smaller the degree of opening, the narrower the width of the groove 155 on the imaginary line becomes and the light from the light source 157 is blocked by the detecting plate 154, so that the quantity of light entering the photo sensor 158 reduces.

The shutter mechanism 141 keeps the released state always in the normal mode. At this time, the exposure time of the picture image light is controlled only by the releasing and closing operations of the electronic shutter.

In the high resolution mode, the exposure time in imaging picture image light in the first time is specified by the electronic shutter. The exposure time in imaging the picture image light in the second time is specified by the shutter mechanism 141. It is assumed that in the high resolution mode, the picture image light is formed on the first image forming position in imaging the picture image light in the first time and on the second image forming position in imaging the picture image light in the second time.

Figure 19:
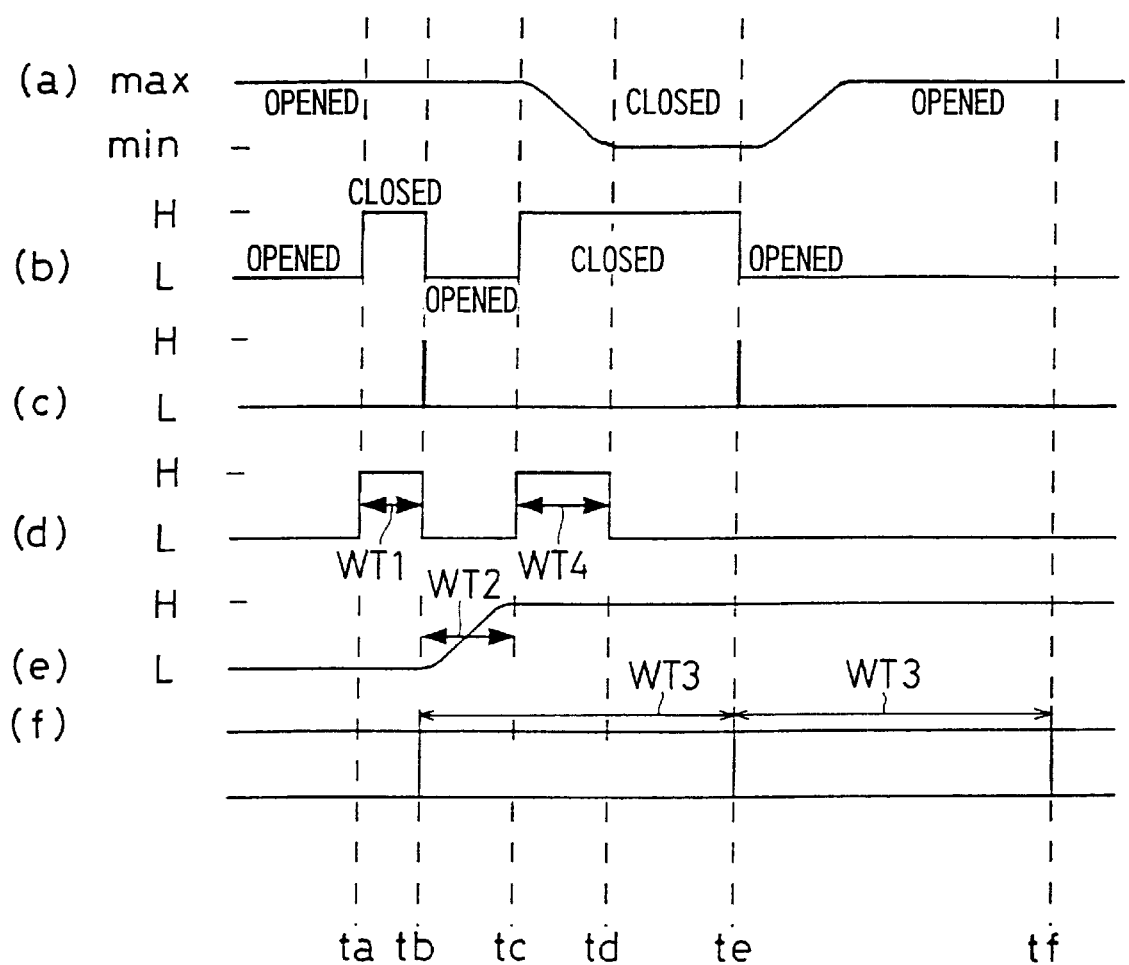
FIG. 19 is a timing chart showing operation timings of a shutter opening/closing operation, an opening/closing operation of an overflow drain, a charge reading operation, an exposure operation, an optical axis displacing operation and a data transfer operation in the high resolution mode of the imaging device of the second embodiment.

FIG. 19 is a timing chart showing operation timing of each component of the imaging apparatus in imaging the picture image light in the high resolution mode. FIG. 19*a* shows the degree of opening of the shutter mechanism 141, indicating that the shutter mechanism 141 is released when the degree of opening is on the maximum level max and is closed when it is on the minimum level min. FIG. 19*b* shows timing for switching the released and closed states of the overflow drain, indicating that the drain is closed when the timing is on the high level and is released when it is on the low level. Releasing and closing of the overflow drain correspond to those of the electronic shutter, respectively. FIG. 19*c* shows timing for applying charge reading pulses. FIG. 19*d* shows timing for operating the exposure step of the imaging device 131 in which the chromatic light is exposed only when the timing is on the high level. FIG. 19*e* shows timing for switching the image shifting mechanism 62, indicating that the image shifting mechanism 62 keeps the first state when the timing is on the low level and keeps the second state when it is on the high level. FIG. 19*f* shows transfer timing of each CCD group of the imaging device 131. The operation of the imaging apparatus of the present embodiment for imaging the picture image light in the high resolution mode will be explained below by using this timing chart.

When no picture image light is imaged, the shutter mechanism 141 is released and the picture image light enters the imaging device 131. At the same time, the overflow drain is released and the electronic shutter is closed. Thereby, the accumulation of charge in the photo-receiving domains PD of the imaging device is inhibited.

The operation for imaging the picture image light of the first time is started from Time ta. At first, the overflow drain is closed from Time ta while releasing the shutter mechanism 141. Thereby, each photo-receiving domain PD is allowed to accumulate electric charge and the exposure operation of the first time is started.

When an exposure time WT1 of the first exposure operation elapses from Time ta, a charge reading pulse is applied to each photo-receiving domain PD of the imaging device at Time tb. When the pulse is applied, the electric charge accumulated in the photo-receiving domain PD is transferred to the separately corresponding charge coupled device C of the vertical transfer CCD group 138 as received light data. A time required for this first transfer operation is in an order of nano-seconds (ns). Right after the application of the pulse, the overflow drain is released and the electronic shutter is closed. Thereby, the first exposure operation ends. Although the picture image light enters the image forming plane thereafter, the photo-receiving domain PD is inhibited from accumulating electric charge.

The image shifting operation of the image shifting mechanism 62 is started from Time tb. When a transition time WT2 elapses from Time tb, the image forming point of the picture image light moves to the second image forming position. This transition time WT2 is in an order of milli-seconds and is quite long as compared to the time of the first transfer operation described above. When the transition time WT2 elapses, the second operation for imaging the picture image light is started from Time tc.

When the transfer of the received light data in Time tb is finished, each of the CCD groups 138 and 52 start the second transfer operation for outputting the received light data to the outside circuit 35. A transfer time WT3 for this second transfer operation is longer than the transition time WT2, so that the second transfer operation is carried out in parallel with the second operation for imaging the picture image light.

When the second imaging operation is started, the overflow drain is closed at Time tc at first. Thereby, each photo-receiving domain PD is allowed to accumulate electric charge and the second exposure operation is started. After closing the drain, the closing operation of the shutter mechanism 141 is started. Supposing that the same quantity of picture image light is inputted to the imaging apparatus during the first and second imaging operations, an exposure time WT4 during the second imaging operation is set so that the whole exposure of the exposure time WT4 is equal to the whole exposure of the exposure time WT1 during the imaging operation of the first time. The closing operation of the shutter mechanism 141 will be detailed later.

The shutter mechanism 141 is completely closed at Time td when the exposure time WT4 has elapsed from Time tc to shut off the picture image light to be inputted to the image forming plane. Thereby, the second exposure operation ends.

Because the overflow drain is closed at this time, the charge accumulated within the exposure time is retained within the photo-receiving domains PD as it is. The second transfer operation during the first operation for imaging the picture image light has not finished yet at this finishing time td, so that each of the CCD groups 138 and 52 continue the second transfer operation of the first time as it is.

When the second transfer operation of the first time is finished, the received light data during the second operation for imaging the picture image light is derived to the outside pre-processing circuit 35. In concrete, when the second transfer operation in the first time is finished at Time te, the charge reading pulse is applied to each photo-receiving domain PD to carry out the first transfer operation in the second time and then the second transfer operation of the second time. The shutter mechanism 141 may be released at any point of time after finishing the first transfer operation. All the received light data is output to the outside within the transfer time WT3 also during the second transfer operation of the second time, so that the operation for imaging the picture image light is finished at Time tf after elapsing by the transfer time WT3 from Time te.

The closing operation of the shutter mechanism 141 described above will be explained below in detail.

Figure 20:
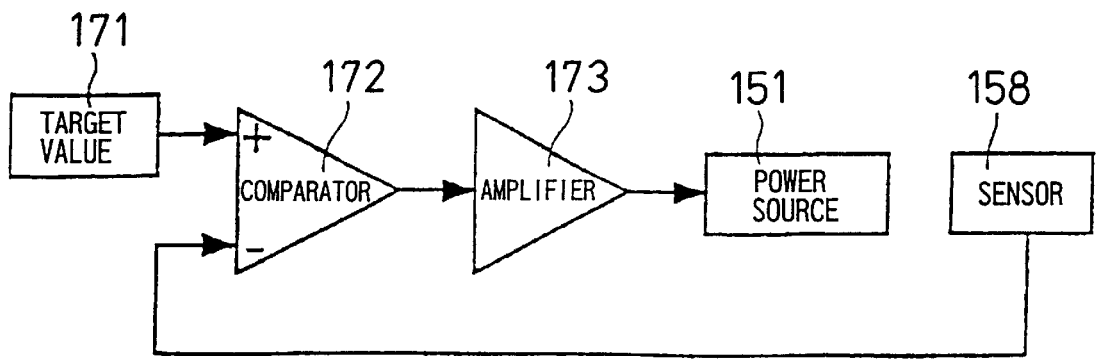
FIG. 20 is a block diagram showing an electrical structure of the shutter mechanism 141 of the second embodiment.

FIG. 20 is a block diagram showing an electrical structure of the driving unit of the shutter mechanism 141. The driving unit of the shutter mechanism 141 comprises, beside the power source 151 and the photo sensor 158, a target value setting circuit 171, a comparator circuit 172 and an amplifier circuit 173.

The elapsed change of the degree of opening in the closing operation of the shutter mechanism 141 is set in advance so that the exposures within the exposure times during the aforementioned first and second imaging operations become equal. The target value setting circuit 171 generates a basic driving pattern signal for operating the shutter mechanism 141 in correspondence to this elapsed change of the degree of opening and gives it to the comparator circuit 172. An output signal from the aforementioned photo sensor 158 is also given to the comparator circuit 172. The comparator circuit 172 computes a difference between the basic driving pattern signal and the output signal of the photo sensor 158 and gives it to the amplifier circuit 173. The amplifier circuit 173 amplifies the output signal of the comparator circuit 172 representing the difference by a predetermined amplification factor to generate a driving signal for the power source 151. The power source 151 operates in correspondence to this driving signal and drives the shutter blades 144 of the shutter mechanism 141. The shutter mechanism 141 transmits or shuts of f the picture image light by such method.

The equivalent imaging time of the imaging operation of the imaging apparatus in the high resolution mode will be explained below.

As explained with respect to the first embodiment, the equivalent imaging time is a time from the beginning of exposure in the operation for imaging the first picture image light to the end of exposure in the operation for imaging the last picture image light during the operation for imaging the picture image light to generate a single out put picture image signal. The longer the time, the more susceptible the quality of the output picture image of the apparatus is to the motion of an object and to the movement of hands, thus degrading the picture image quality.

Figure 21:
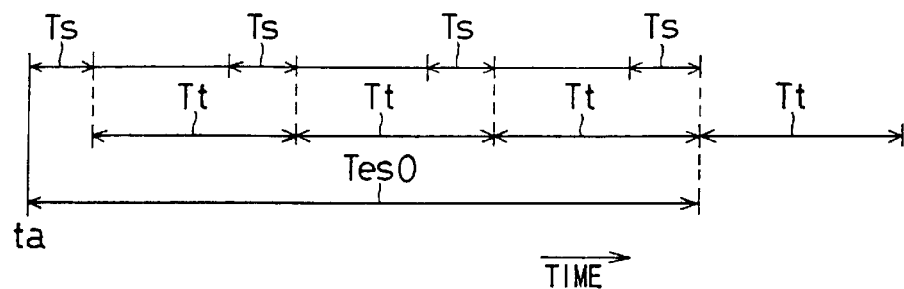
FIG. 21 is a timing chart for explaining an equivalent imaging time Tes0 in the high resolution mode in the prior art imaging apparatus.

FIG. 21 is a timing chart for explaining the equivalent imaging time in the high resolution mode in a prior art imaging apparatus which implements four-position image shifting. This imaging apparatus has the whole picture element reading type imaging device 131 shown in FIG. 17 and controls an exposure time by the electronic shutter. In the high resolution mode, this imaging apparatus generates a single output picture image signal from four original picture image signals, so that it carries out the exposure operation by four times. When each exposure operation ends, it carries out the operation for transferring the received light data. It carries out the exposure operations on and after the second time so that the ending timing thereof comes after the ending timing of the second transfer operation of the previous imaging operation due to the following reason.

The closing operation of the electronic shutter is realized concretely by transferring electric charge from the photo-receiving domain PD to the charge coupled device C and by closing the overflow drain right after that. Therefore, when the electronic shutter is closed in the imaging operation on and after the second time, each CCD group 138 of the imaging device 131 is put into the state in which each charge coupled device C can receive new received light data by finishing the second transfer operation of the received light data so that the received light data of the previous imaging operation is not mixed with the new received light data. Accordingly, the ending timing of the exposure operation is set after the ending timing of the second transfer operation.

Due to that, the equivalent imaging time Tes0 of the prior art imaging apparatus is the sum of the exposure time Ts of the first time and the transfer time Tt of the first through third time:

$$Tes0 = Ts + 3 \cdot Tt \qquad (19)$$

Figure 22:
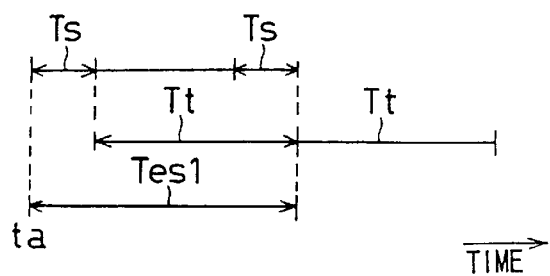
FIG. 22 is a timing chart for explaining an equivalent imaging time Tes1 in a whole picture element reading type imaging apparatus performing the two-position image shifting operation using only an electronic shutter.

FIG. 22 is a timing chart showing the equivalent imaging time in the high resolution mode when the exposure is controlled only by the electronic shutter in the imaging apparatus of the present embodiment. When the ending timing of the first and second exposure operations is controlled only by the electronic shutter, the ending timing of the second exposure operation is set after the second transfer operation in the first time from the same reason of the prior art imaging apparatus described above. Therefore, the equivalent imaging time Tes1 at this time is the sum of the first exposure time Ts and the first transfer time Tt:

$$Tes1 = Ts + Tt \qquad (20)$$

Figure 23:
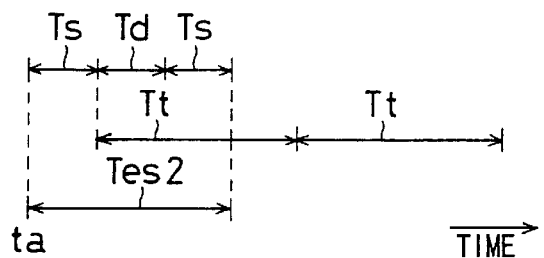
FIG. 23 is a timing chart for explaining an equivalent imaging time Tes2 in the high resolution mode of the imaging apparatus of the second embodiment.

FIG. 23 is a timing chart showing the equivalent imaging time in the high resolution mode in controlling the exposure by using the electronic shutter and the shutter mechanism 141 together in the imaging apparatus of the present embodiment. Because the shutter mechanism 141 shuts off the picture image light regardless of the second transfer operation of the imaging device 131, the operation timing of the exposure operation of the second time is nothing to do with the operation timing of the second transfer operation of the first time in this case differing from the above-mentioned case. Therefore, the second exposure operation may be carried out at any time after ending the transition operation of the image shifting mechanism 62. Accordingly, supposing that the exposure times in the first and second times are equal, the equivalent imaging time Tes2 at this time is the sum of the exposure times Ts of the first and second times and the transition time Td:

$$Tes2 = 2 \cdot Ts + Td \qquad (21)$$

Table 1 shows the equivalent imaging times Tes0, Tes1, and Tes2 in the high resolution mode when the transfer time Tt is 1/30 seconds, the exposure time Ts is 1/240 seconds and the transition time Td is 1/240 seconds or 1/480 seconds.

| Transistion Time Td (Sec.) | Equivalent Prior Art Tes0 | Imaging Present Only Electronic Shutter Tes1 | Time (Sec.) Embodiment Together with Shutter Tes2 |
|---|---|---|---|
| 1/240 | 1/10 | 1/27 | 1/80 |
| 1/480 | 1/10 | 1/28 | 1/120 |

From the above table, when the transition time Td is 1/240 seconds, the equivalent imaging time Tes1 of the imaging apparatus of the present embodiment using only the electronic shutter is reduced to about 1/3 of the equivalent imaging time Tes0 of the prior art. The equivalent imaging time Tes2 using the shutter together is reduced further to about 1/8 of the equivalent imaging time Tes0. When the transition time Td is reduced to 1/480 seconds, the equivalent imaging time Tes2 using the shutter together is reduced further to about 1/12 of the equivalent imaging time Tes0. It can be seen from above that when the shutter is used together in the imaging apparatus of the present embodiment, the equivalent imaging time in the high resolution mode is considerably reduced as compared to the prior art imaging apparatus. Therefore, using the imaging apparatus of the present embodiment allows the second output picture image which is less influenced by the motion of the object and the movement of hands to be obtained.

Figure 24:
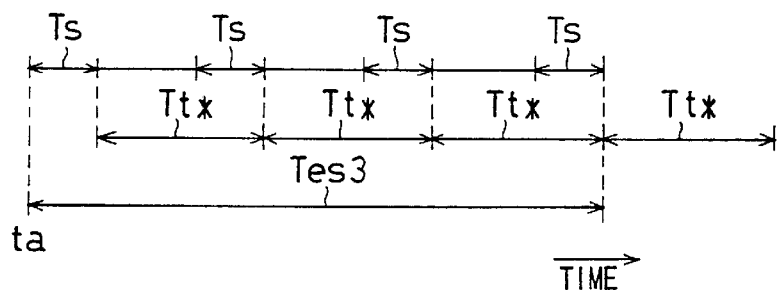
FIG. 24 is a timing chart for explaining an equivalent imaging time Tes3 in the high resolution mode of the imaging apparatus 31 of the first embodiment.

It can be also seen from FIG. 24 that the equivalent imaging time Tes3 in the high resolution mode of the imaging apparatus 31 of the first embodiment described above is the sum of the exposure time Ts of the first field of the first time and the transfer time Tt* of the second field of the first time and the first and second fields of the second time:

$$Tes3 = Ts + 3 \cdot Tt* \quad (22)$$

Figure 25:
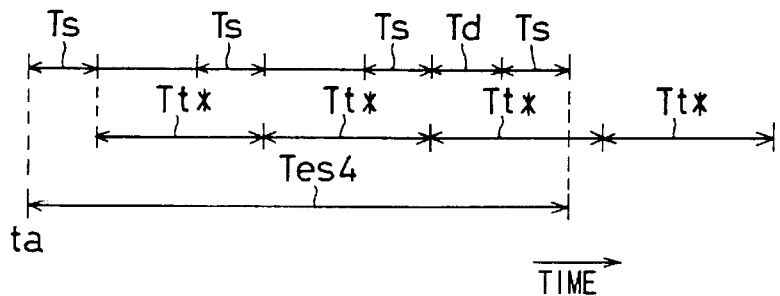
FIG. 25 is a timing chart for explaining an equivalent imaging time Tes4 in a two-picture element mixed reading type imaging apparatus performing the two-position image shifting operation using the electronic shutter together with a shutter mechanism.

When the shutter mechanism 141 is provided in the imaging apparatus 31 to use together with the electronic shutter, it can be seen from FIG. 25 that the equivalent imaging time Tes4 thereof in the high resolution mode is the sum of the exposure time Ts of the first field of the first time and the second field of the second time, the transfer time Tt* of the first field of the first time and the second field of the first time and the transition time Td of the second time. It can be seen that this equivalent imaging time Tes4 is reduced further than the equivalent imaging time Tes3 of the first embodiment.

$$Tes4 = 2 \cdot Ts + 2 \cdot Tt* + Td \quad (23)$$

It is noted that the transfer time Tt* of the field is a half of the transfer time Tt of the frame described above.

A color filter is attached on the light incident side of the imaging device 131 described above. The color filter has the same number of light-transmitting domains L with the photo-receiving domains PD of the imaging device 131 and is formed by arranging the light-transmitting domains L on the two-dimensional plane in an array equivalent to the photo-receiving domains PD. Therefore, the number of the light-transmitting domains L is M×N and they are arrayed in a matrix form of M rows and N columns. The array periods of the light-transmitting domains L in the horizontal and vertical directions H and V are periods PH and PV, respectively. Each light-transmitting domain L separates color of the picture image light and transmits only one color of the predetermined first through fourth chromatic lights. The first through fourth chromatic lights are four complementary colors of yellow, magenta, green and cyan.

Figure 26:
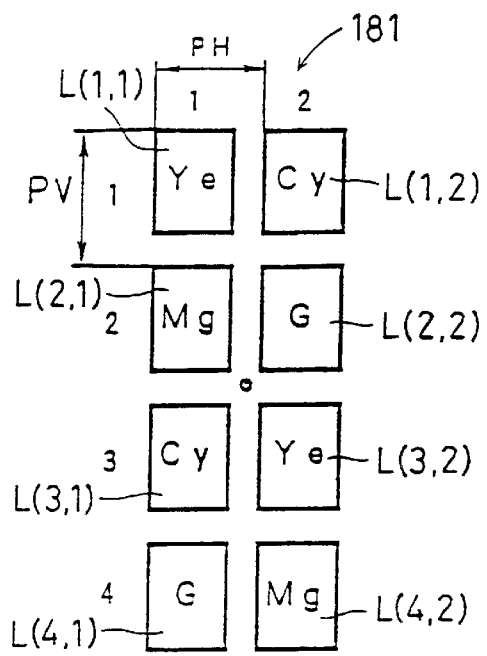
FIG. 26 is a diagram showing a basic array pattern 181 of an array of colors of light-transmitting domains L of a color filter of the imaging apparatus of the second embodiment.

FIG. 26 is a diagram showing a basic array pattern 181 of an array of colors of the light-transmitting domains L of the above-mentioned color filter. The basic array pattern 181 is composed of eight light-transmitting domains L arrayed in four rows and two columns and contains the same kind of light-transmitting domains by two each. In the basic array pattern 181, the light-transmitting domains L(1, 1) and L(3, 2) are yellow light-transmitting domains L which transmit yellow chromatic light. The light-transmitting domains L(2, 1) and L(4, 2) are magenta light-transmitting domains L. The light-transmitting domains L(3, 1) and L(1, 2) are cyan light-transmitting domains L. The light-transmitting domains L(4,1) and L(2, 2) are green light-transmitting domains L.

The operation for imaging the picture image light of the above-mentioned imaging apparatus in the normal mode will be explained below. The behavior of each component of the imaging apparatus in this case is similar to that of the imaging apparatus 31 in the normal mode in the first embodiment, so that a detailed explanation with regard to the same operation will be omitted here.

In imaging the picture image light in the normal mode, the image shifting mechanism 62 and the variable spatial filter 90 of the optical system 33a are fixed to the predetermined first state. The shutter mechanism 141 is released. The picture image light is inputted via the optical system 33a and is formed on the first image forming position. The imaging device 131 images the picture image light and outputs the original picture image signal. The original picture image signal is converted into a digital signal after being processed in the pre-processing circuit 35 and is stored separately in the picture image memory 37.

The array of the picture elements D of the original picture image signal and the correspondence between each picture element D and the received light data are equivalent to the array of picture elements and array of colors of the light-transmitting domains L of the color filter. That is, the basic array pattern of the picture elements D of the original picture image is equal to a basic array pattern 181 of the array of colors of the light-transmitting domains L in FIG. 26. It is composed of eight picture elements D arrayed in four rows and two columns and each picture element D has only received light data of chromatic light transmitting through the corresponding light-transmitting domain L within the pattern 181.

The signal processing circuit 44 finds a luminance signal and two kinds of color difference signals of the first output picture image signal from the composite picture image signal. For instance, luminance data Y(6, 2) and color difference data (R−Y)(6, 2) and (B−Y)(6, 2) of the picture element D(6, 2) in the sixth row and the second column may be represented by the following expressions. It is noted that the picture element D(6, 2) is a corresponding picture element of only green received light data:

$$Y(6,2) = G(6,2) + Mg(6,3) + Ye(7,2) + Cy(7,3) \quad (24)$$

$$(R-Y)(6,2) = -G(6,2) + \tfrac{1}{2}\{Mg(6,1) + Mg(6,3)\} + \tfrac{1}{4}\{Ye(5,1) + Ye(5,3) + 2 \cdot Ye(7,2)\} - \tfrac{1}{4}\{Cy(7,1) + Cy(7,3) + 2 \cdot Cy(5,2)\} \quad (25)$$

$$(B-Y)(6,2) = -G(6,2) + \tfrac{1}{2}\{Mg(6,1) + Mg(6,3)\} - \tfrac{1}{4}\{Ye(5,1) + Ye(5,3) + 2 \cdot Ye(7,2)\} + \tfrac{1}{4}\{Cy(7,1) + Cy(7,3) + 2 \cdot Cy(5,2)\} \quad (26)$$

Data Y, (R−Y), and (B−Y) of these signals may be directly found separately per each picture element D. Therefore, since the corresponding picture elements of the original picture image are actual picture elements of all the luminance data and the two kinds of color difference data, number and array of actual picture elements of the first output picture image are equal to the number and array of the corresponding picture elements of the original picture image.

Because the array of all the corresponding picture elements of the original picture image is equivalent to the array of the light-transmitting domains L, it can be seen from FIG. 26 that the array periods in the horizontal, vertical and diagonal directions H, V and U of the array are periods PH, PV and PU, respectively. It is assumed from this fact that the sampling frequencies of the luminance signal of the first output picture image signal in the horizontal, vertical and diagonal directions H, V and U are spatial frequencies fH, fV and fu, respectively. Further, because the array of only the corresponding picture elements of the same kind is equivalent to the array of colors of the light-transmitting domains L, it can be seen from FIG. 26 that the array periods in the horizontal and vertical directions H and V of the array are periods PH and 2PV, respectively. From this fact, the sampling frequencies of the color difference signal in the horizontal and vertical directions H and V are assumed to be spatial frequencies fH and fV/2, respectively.

Figure 27:
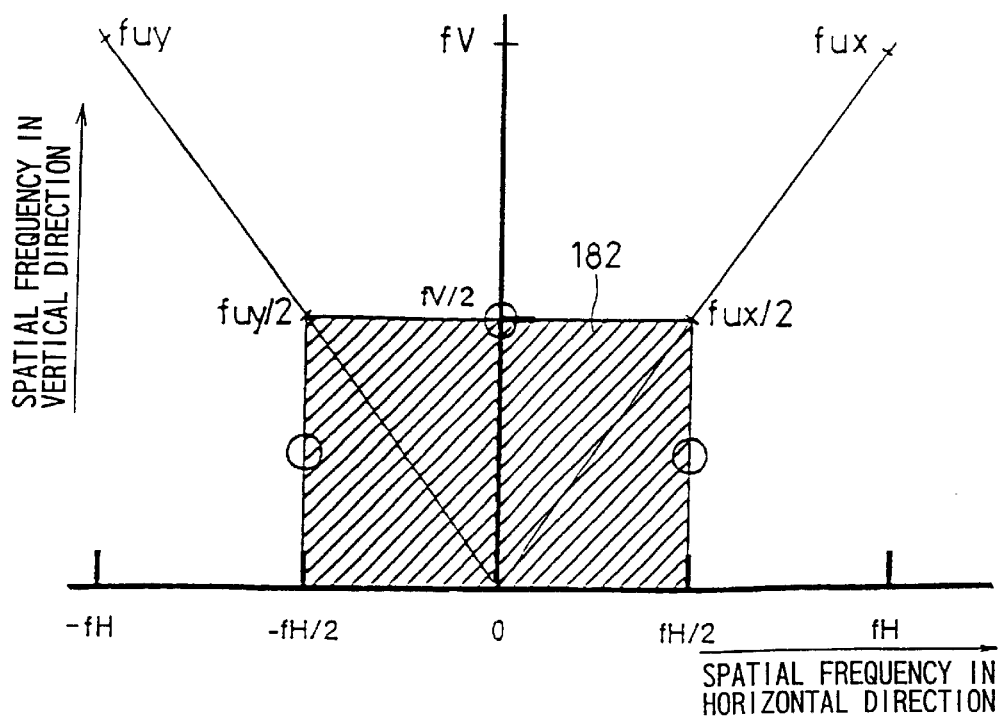
FIG. 27 is a spatial frequency plan view showing a normal band 182 of luminance of a first output picture image signal and carrier frequencies of Moire of the color difference signal of the imaging apparatus of the second embodiment.

FIG. 27 is a spatial frequency plan view showing a normal band 182 of luminance of the above-mentioned first output picture image signal and positions of carrier frequency of Moire of the color difference signal. The ranges of the normal band 182 of luminance on the spatial frequency axes in the horizontal, vertical and diagonal directions H, V and U are equal to the ranges of the normal band 111 of luminance of the first output picture image signal of the imaging apparatus 31 of the first embodiment.

$(-fH/2) \leq f \leq (fH/2)$ (13)

$(-fV/2) \leq f \leq (fV/2)$ (14)

$(-fu/2) \leq f \leq (fu/2)$ (15)

Therefore, the normal band 182 of luminance in the first and second quadrants is a rectangular area having the following four vertexes:
(−fH/2, 0)
(fH/2, 0)
(−fH/2, fV/2)
(fH/2, fV/2)

The carrier frequencies of Moire of the color difference signal appearing within the normal band 182 exist at the following three spots:
(−fH/2, fV/4)
(0, fV/2)
(fH/2, fV/4)

The carrier frequencies of these three spots may be obtained all from the array periods of the corresponding picture elements of yellow, cyan, magenta and green received light data.

The first output picture image signal of the imaging apparatus of the present embodiment using the whole picture element reading type imaging device 131 will be compared with the first output picture image signal of the imaging apparatus 31 of the first embodiment using the two-picture element mixed reading type imaging device 34 by using its spatial frequency plan view. Comparing to the signal of the first embodiment, although the first output picture image signal of the present embodiment has the normal band 182 whose size and shape are equal, no carrier frequency of Moire exists on the spatial frequency axis in the horizontal direction H. Therefore, the spatial frequency can be kept up to spatial frequency ±fH/2 without damping the spatial frequency component in the horizontal direction H, so that the resolution in the horizontal direction H may be improved as compared to the first output picture image of the first embodiment.

Further, because the carrier frequencies of Moire (0, fV/4), (fH/2, 0), (−fH/2, 0), (fH/2, fV/2), and (−fH/2, fV/2) have disappeared among the carrier frequencies appearing in the first output picture image signal of the first embodiment, color Moire caused by the return components which have those frequencies as the center frequency disappear. Accordingly, the color Moire is reduced, improving the quality of the picture image.

The operation for imaging the picture image light in the high resolution mode of the above-mentioned imaging apparatus will be explained below. Behavior of each component of the imaging apparatus at this time is similar to the behavior of the imaging apparatus 31 of the first embodiment in the high resolution mode, so that a detailed explanation with regard to the same operation will be omitted here.

In imaging the picture image light, the variable spatial filter 90 is fixed to the predetermined second state. The image shifting mechanism 62 moves the image forming point of the picture image light to the aforementioned first and second image forming positions Qa1 and Qb1 which are separated in the horizontal direction H by the length PH. The imaging device 131 images the picture image light inputted via the optical system 33a through the procedure shown in FIG. 19 and outputs first and second original picture image signals. Each original picture image signal is converted into a digital signal after being processed in the pre-processing circuit 35 and is stored with respect to the picture image memory 37.

The signal processing circuit 44 shifts the first and second original picture image signals in the direction opposite from the moving direction of the image forming point during the imaging operation by the same shift length to superimpose them to generate a composite picture image signal. This composite method is the same with that of the first embodiment. Received light data of two kinds of chromatic lights corresponds to each corresponding picture element of this composite picture image. A number and array of the corresponding picture elements of the composite image are the same with a number and array of corresponding picture elements of an original picture image and array periods in the horizontal and vertical directions H and V are periods PH and PV, respectively.

Figure 28:
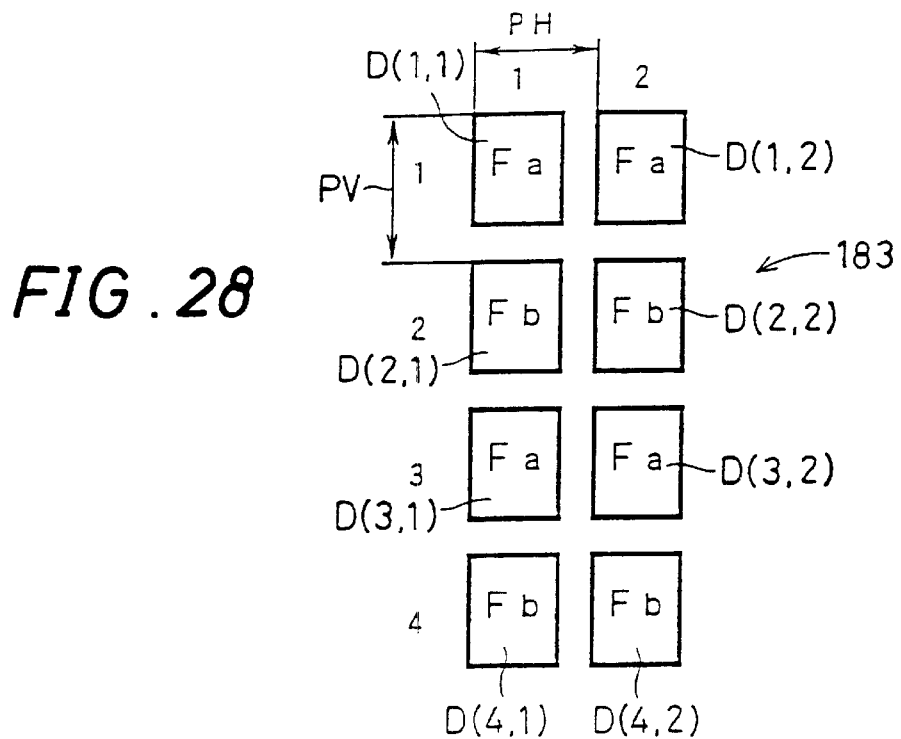
FIG. 28 is a diagram showing an equivalent basic array pattern 183 of the array of picture elements of a composite picture image in the high resolution mode of the imaging apparatus of the second embodiment.

FIG. 28 is a diagram showing a basic array pattern 183 of the array of the equivalent picture elements D of the composite picture image described above. This basic array pattern 183 is composed of eight picture elements D arrayed in eight rows and two columns. Yellow and cyan received light data correspond to the picture elements D(1, 1), D(1, 2), D(3, 1), and D(3, 2), respectively. Green and magenta received light data correspond to the picture elements D(2, 1), D(2, 2), D(4, 1) and D(4, 2), respectively.

Then, the signal processing circuit 44 finds a luminance signal and two kinds of color difference signals of the second output picture image signal from the composite picture image signals of this basic array pattern 183. For instance, luminance data Y(6, 2) and color difference data (R−Y)(6, 2) and (B−Y)(6, 2) of the picture element D(6, 2) at the sixth row and second column are represented by the following expression. The picture element D(6, 2) is a corresponding picture element of the green and magenta received light data.

$$Y(6,2)=G(6,2)+Mg(6,2)+Ye(7,2)+Cy(7,3) \tag{27}$$

$$(R-Y)(6,2)=-G(6,2)+Mg(6,2)+\tfrac{1}{2}\{Ye(5,2)+Ye(7,2)\}-\tfrac{1}{2}\{Cy(5,2)+Cy(7,2)\} \tag{28}$$

$$(B-Y)(6,2)=-G(6,2)+Mg(6,2)-\tfrac{1}{2}\{Ye(5,2)+Ye(7,2)\}+\tfrac{1}{2}\{Cy(5,2)+Cy(7,2)\} \tag{29}$$

Each of these signals Y, (R−Y) and (B−Y) may be directly found separately per each picture element D. Therefore, because the corresponding picture elements of the original picture image become actual picture elements of all the luminance data, a number and array of the actual picture elements of the luminance data of the second output picture image are equal to the number and array of the corresponding picture elements of the original picture image.

Figure 29:
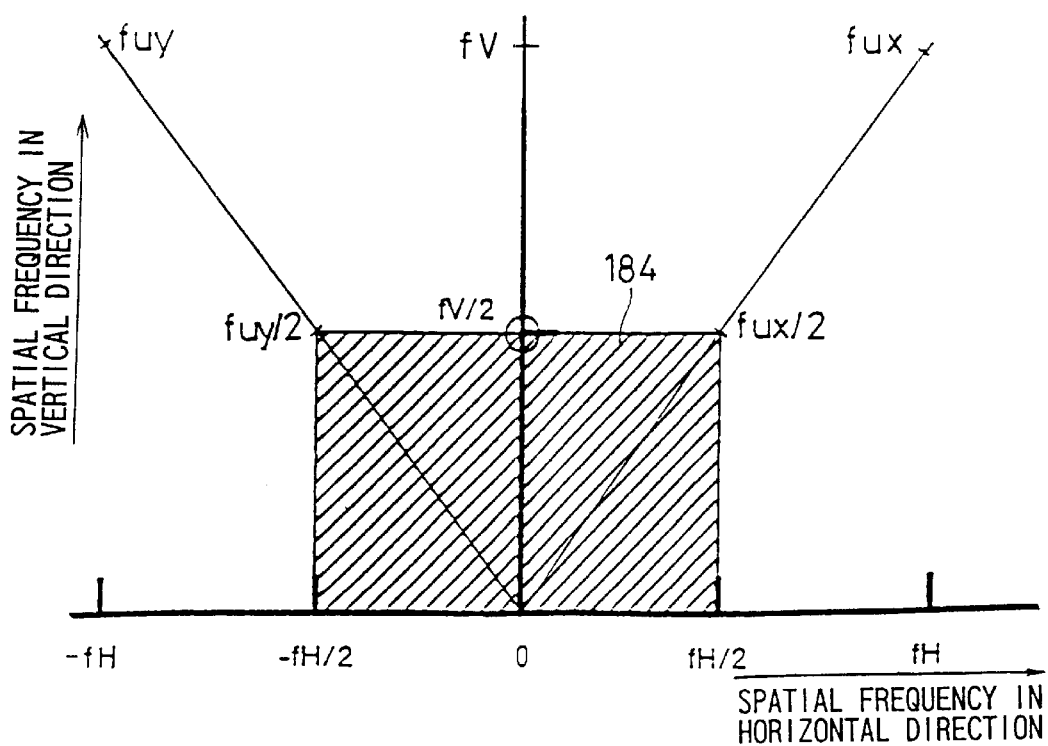
FIG. 29 is a spatial frequency plan view showing a normal band 184 of luminance of a second output picture image signal and carrier frequencies of Moire of the color difference signal of the imaging apparatus of the second embodiment.

FIG. 29 is a spatial frequency plan view showing a normal band 184 of luminance of the second output picture image signal described above and positions of carrier frequency of Moire of the color difference signal. The range of the normal band 184 of luminance on the spatial frequency axes of the horizontal, vertical and diagonal directions H, V and U is equal to the range of the normal band 182 of luminance of the first output picture image signal described above:

$$(-fH/2) \leq f \leq (fH/2) \tag{13}$$

$$(-fV/2) \leq f \leq (fV/2) \tag{14}$$

$$(-fu/2) \leq f \leq (fu/2) \tag{15}$$

Therefore, the normal band 184 in the first and second quadrants is a rectangular area having the following four vertexes:
(−fH/2, 0)
(fH/2, 0)
(−fH/2, fV/2)
(fH/2, fV/2)

The carrier frequency of Moire of the color difference signal appearing within the normal band 184 exists only at the following one spot:
(0, fV/2)

Comparing the normal bands 182 and 184 of luminance of the first and second output picture image signals shown in FIGS. 27 and 29, it can be seen that although their size and shape are no different, all the carrier frequencies of Moire disappeared in the normal band 184 except of that (0, fV/2) on the spatial frequency axis in the vertical direction V. Thereby, the substantial width of the normal band 184 on the spatial frequency axis in the horizontal direction H after the limit by the filter is expanded to the whole range of the normal band 184 of less than or equal to spatial frequency ±fH/2. Further, the substantial width in the vertical direction V is expanded up to the vicinity of the spatial frequency ±fV/2. Thereby, the horizontal and vertical resolution of the second output picture image is improved as compared to the first output picture image.

An imaging apparatus of a third embodiment of the present invention will be explained below. The structure of the components of the imaging apparatus of the present embodiment is the same with the imaging apparatus of the second embodiment, except of the optical system and the color filter, so that the same components will be denoted by the same reference numerals and an explanation thereof will be omitted here. Using the whole picture element reading type imaging device 131, the imaging apparatus of the present embodiment images the picture image light in the normal and high resolution modes and obtains first and second output picture image signals whose resolution is different.

In the optical system of the imaging apparatus, although the internal structure of the image shifting mechanism 62 and the variable spatial filter 90 is the same, the state of setting thereof is different. The image shifting mechanism 62 will be described later. The variable spatial filter 90 is disposed so that the separation vector B1 of the birefringence plate 91 is parallel with the horizontal direction H. Thereby, the variable spatial filter 90 in the second state damps the amplitude of components of spatial frequencies ±fH/2 among the spatial frequency components in the horizontal direction H, respectively.

As for the color filter, while the location where the color filter is disposed, the combination of chromatic lights which can transmit the color filter, the number and array of the light-transmitting domains L are the same with the color filter shown in the second embodiment, only the array of colors is different. Therefore, the first through fourth chromatic lights are four complementary colors of yellow, magenta, green and cyan. The array periods of the light-transmitting domains L in the horizontal and vertical directions H and V are periods PH and PV, respectively.

Figure 30:
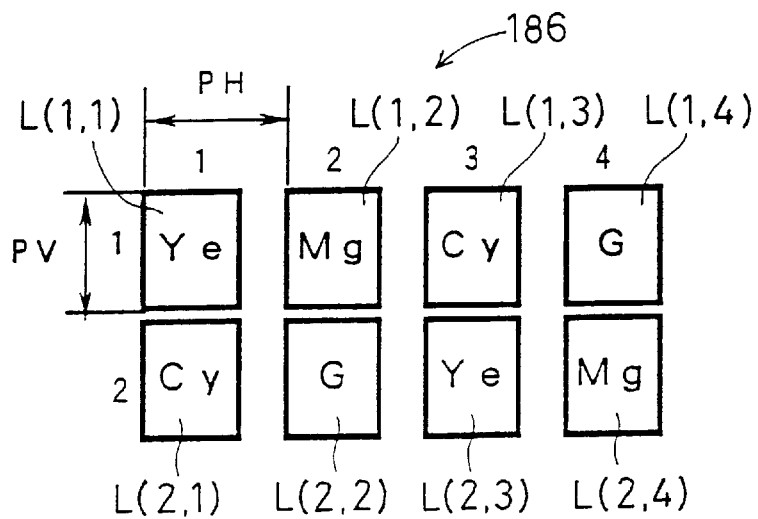
FIG. 30 is a diagram showing a basic array pattern 186 of an array of colors of light-transmitting domains L of a color filter in an imaging apparatus of a third embodiment.

FIG. 30 is a diagram showing a basic array pattern 186 of an array of colors of the light-transmitting domains L of the above-mentioned color filter. The basic array pattern 186 is composed of eight light-transmitting domains L arrayed in two rows and four columns and contains the same kind of light-transmitting domains by two each. In the basic array pattern 186, the light-transmitting domains L(1, 1) and L(2, 3) are yellow light-transmitting domains L. The light-transmitting domains L(1, 2) and L(2, 4) are magenta light-transmitting domains L. The light-transmitting domains L(1, 3) and L(2, 1) are cyan light-transmitting domains L. The light-transmitting domains L(1, 4) and (2, 2) are green light-transmitting domains L. The basic array pattern 186 is an array in which only the array of colors of the light-transmitting domains L of the basic array pattern 181 of the color filter of the imaging apparatus of the second embodiment is replaced with respect to the horizontal and vertical directions H and V while keeping the array periods of the horizontal and vertical directions H and V.

The imaging device 131 images the picture image light to be formed via the color filter and outputs the original picture image signal. The array of the picture elements of the original picture image signal and the correspondence of each picture element with received light data are equivalent to the array of the light-transmitting domains L and the array of colors of the color filter and each corresponding picture element has received light data of a single chromatic light.

The operation for imaging the picture image light in the normal mode is similar to the operation for imaging the picture image light in the normal mode of the second embodiment and the behaviors of the optical system, the imaging device 34, the circuits 35 and 36 and the picture image memory 37 are the same with those of the second embodiment. The signal processing circuit 44 finds a luminance signal and two kinds of color difference signals of the first output picture image signal from the single original picture image signal. Calculation expressions of this case are the same with the expressions (24) through (26) described above except of that the numbers of row and column of the picture element to which each received light data belongs are replaced with respect to the row and column.

The normal band of luminance of the first output picture image signal thus obtained is a line-symmetrical graphic whose reference axis is the spatial frequency axis in the first diagonal direction Ux in the normal band 182 in FIG. 27. Carrier frequencies of Moire of the color difference signals appearing within the normal band also have the reference axis of the spatial frequency axis in the first diagonal direction Ux and appear at the positions line-symmetrical to the positions of the carrier frequencies of Moire shown in FIG. 27. Therefore, the spatial frequency plan view showing the normal band and the carrier frequencies of Moire is equal to the plan view in which only the spatial frequencies in the horizontal and vertical directions H and V in the spatial frequency plan view in FIG. 27 are replaced. The reason thereof will be explained below.

As described before, the components of arbitrary spatial frequency (fh, fv) and spatial frequency (−fh, −fv) among the components of spatial frequencies appearing on the spatial frequency plan view have a conjugate relationship:

$$F(fh, fv) = F(-fh, -fv)^* \quad (12)$$

Supposing a case when the spatial frequencies fh and fv are replaced with respect to the first and second quadrants in which the range of the spatial frequency fv is more than 0 based on the above expression, the component of the replaced spatial frequency Fa(fh, fv) has the following relationship:

$$\begin{aligned} Fa(fh, fv) &= Fa(-fh, -fv)* \quad (30) \\ &= F(fv, fh) \\ &= F(-fv, -fh)* \end{aligned}$$

From this relationship, the spatial frequency plan view of the present embodiment is equal to the plan view in FIG. 27 whose spatial frequency axes are replaced.

It can be seen from the plan view that carrier frequencies of Moire exist on the boundary line of the normal band on the spatial frequency axis in the horizontal direction H. Therefore, the spatial frequency component in the horizontal direction H of the first output picture image signal is limited to be less than spatial frequency ±fH/2. Further, there exists the carrier frequency of Moire within the normal band (±fH/4, fV/2) on the spatial frequency axis in the vertical direction V and color Moire fringes centering on that frequency as the center frequency appear.

The operation for imaging the picture image light in the high resolution mode is similar to the operation for imaging the picture image light in the high resolution mode described in the second embodiment and the behaviors of the optical system, the imaging device 34, the circuits 35 and 36 and the picture image memory 37 are the same with those of the second embodiment. At this time, the first and second image forming positions keep the positional relationship that they are separated by the length PV of the array period of the photo-receiving domains PD along the vertical direction V. The imaginary reference axial line of the refracting plate 71 of the image shifting mechanism 62 and the inclination of the refracting plate 71 of the second state are set by replacing the horizontal and vertical directions H and V of each member as compared to the state of disposition of the second embodiment so that the optical axis of the picture image light can be shifted in parallel in correspondence to this positional relationship. The signal processing circuit 44 finds a luminance signal and two kinds of color difference signals of the second output picture image signal from two original picture image signals. In this case, the method for forming the composite picture image is the same with that of the second embodiment. The calculation expressions are also the same with the aforementioned expressions (27) through (29), except of that the numbers of row and column of the picture element D to which each received light data belongs are replaced with respect to the row and column.

The normal band of luminance of the second output picture image signal is a graphic of the normal band 184 shown in FIG. 29 line-symmetrical about the spatial frequency axis in the first diagonal direction Ux. A carrier frequency of Moire of the color difference signal appearing within the normal band also appears at the position line symmetrical to the position of the carrier frequency of Moire in FIG. 29 about the spatial frequency axis. Accordingly, the spatial frequency plan view showing the normal band and the carrier frequency of Moire is equivalent to the plan view in which only the spatial frequency axes in the horizontal and vertical directions H and V of the spatial frequency plan view of FIG. 29 are replaced.

It can be seen from the plan view that the normal band of luminance of the first and second output picture image signals are equal. Further, because the carrier frequency of Moire of the color difference signal on the spatial frequency axis in the vertical direction V disappears, color Moire whose frequency is center on that also disappears. Thereby, the resolution in the vertical direction V of the second output picture image signal improves more than that of the first output picture image signal, improving the quality of the picture image.

An imaging apparatus of a fourth embodiment of the invention will be described. The components of the imaging apparatus of the present embodiment other than the color filter and imaging device are the same with the imaging apparatus of the first embodiment, so that the same components will be denoted by the same reference numerals and an explanation thereof will be omitted here. The imaging apparatus uses a two-picture-element mixed reading type imaging device 34 to image picture image light in the normal and high resolution modes and obtain first and second output picture image signals whose resolution is different.

The optical system has the same structure with the optical system 33 shown in the first embodiment, except of the following points. At first, the disposition of the image shifting mechanism 62 is changed in accordance to the first and second image forming positions described later. Further, a variable spatial filter 200 described later is provided instead of the variable spatial filter 90. The filter 200 will be detailed later.

Although the color filter is the same with the color filter of the first embodiment with respect to the location where it is disposed, the number and array of the light-transmitting domains L, it is different in terms of the combination of chromatic lights and the array of colors. This color filter transmits either one of transmissible first through third colors per each light-transmitting domain L. The first through third chromatic lights are three primary colors of red, blue and green. The array periods in the horizontal and vertical directions H and V of the light-transmitting domains L are periods PH and PV, respectively.

Figure 31:
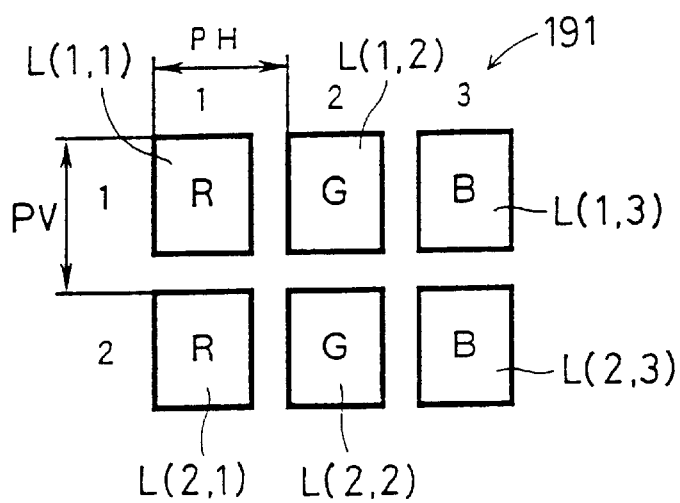
FIG. 31 is a diagram showing a basic array pattern 191 of an array of colors of light-transmitting domains L of a color filter in an imaging apparatus of a fourth embodiment.

FIG. 31 is diagram showing a basic array pattern 191 of the array of colors of the light-transmitting domains L of the above-mentioned color filter. This basic array pattern 191 is composed of six light-transmitting domains L arrayed in two rows and three columns and contains the same kind of light-transmitting domains L by two each. In the basic array pattern 191, the light-transmitting domains L(1, 1) and L(2, 1) are red light-transmitting domains L which transmit red chromatic light. The light-transmitting domains L(1, 2) and L(2, 2) are green light-transmitting domains L. The light-transmitting domains L(1, 3) and L(2, 3) are blue light-transmitting domains L. Because the light-transmitting domains L of the same kind of chromatic light are arrayed along the vertical direction V in the color filter, the light-transmitting domains L in each column transmit only the same kind of chromatic light.

The imaging device 34 images the picture image light to be formed via the color filter and outputs an original picture image signal. The array of picture elements of the original picture image signal is equivalent to the array of the light-transmitting domains L of this color filter. It can be also seen from the array of colors of the above-mentioned color filter that the photo-receiving domains PD composing each column receive the same kind of chromatic light. Thereby, the two received light data of the same chromatic light are mixed in each charge coupled device C of the vertical transfer CCD group 51 to generate mixed data. Therefore, this mixed data indicates a quantity of received light of the single chromatic light. It can be seen from this fact that the correspondence between the picture elements of the original picture image signal and the mixed data is equivalent to the array of colors of the color filter shown in FIG. 31.

The variable spatial filter 200 will be explained below. The variable spatial filter 200 is disposed at an arbitrary position within the optical system. The variable spatial filter 200 is switched between the first and second states in response to the normal and high resolution modes of the imaging apparatus of the present embodiment to damp the amplitude of spatial frequency component of the picture image light with a decrement corresponding to each mode. The variable spatial filter 200 has a structure similar to that of the variable spatial filter 90 in the first embodiment.

Figure 32:
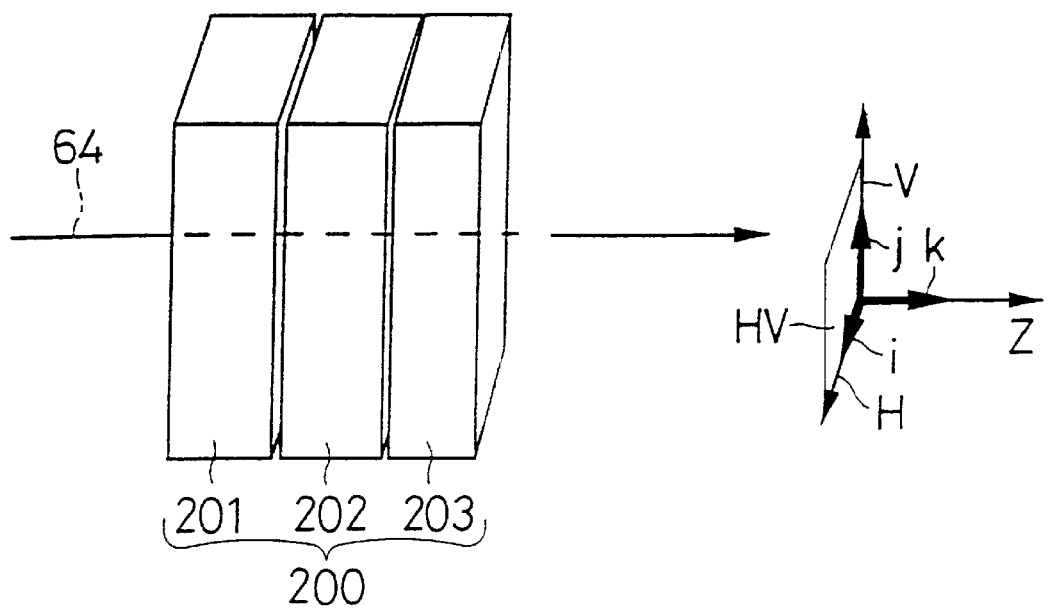
FIG. 32 is a perspective view showing the concrete structure of a variable spatial filter 200 provided in the imaging apparatus of the fourth embodiment.

FIG. 32 is a perspective view showing the concrete structure of the variable spatial filter 200. The variable spatial filter 200 comprises three birefringence plates 201 through 203 disposed on the optical axis 64 of the picture image light in this order from the light incident side. The birefringence plates 201 through 203 have incident and output planes which cross at right angles with the optical axis 64 of the picture image light on the light incident side, respectively. The birefringence plate 203 can be turned centering on an imaginary axial center of rotation which coincides with the optical axis 64 and is turned so as to angularly displaced by 90 degrees in the same time when the first and second states are switched.

FIG. 33 are diagrams showing separation vectors B4 through B6 of the birefringence plates 201 through 203 when the variable spatial filter 200 is in the first state. The separation vectors B4 through B6 are defined by the following expressions using the above-mentioned unit vectors i, and k:

$$B4 = \frac{3}{4}PH \cdot i \quad (31)$$

$$B5 = \frac{3}{4}PH \cdot (i-j) \quad (32)$$

$$B6 = \frac{3}{4}PH \cdot (-i-j) \quad (33)$$

It can be seen from the above expressions that the orientations of the separation vectors B4 through B6 of the birefringence plates 201 through 203 are the orientations which form 0°, −45° and −135° with the unit vector i in the horizontal direction H counterclockwise, respectively. The separation lengths of the birefringence plates 201 through 203 are as follows:

Separation Length of the birefringence plate 201=¾PH
Separation Length of the birefringence plate $$202 = \frac{3\sqrt{2}}{4}PH$$

Separation Length of the birefringence plate $$203 = \frac{3\sqrt{2}}{4}PH$$

The behaviors of the ordinary and extraordinary rays within the birefringence plates 201 through 203 are the same with the behaviors in the birefringence plates 91 through 93 of the variable spatial filter 90, except of that the orientation of the separation vectors and the separation lengths of the extraordinary ray.

Figures 33A, 33B, 33C:
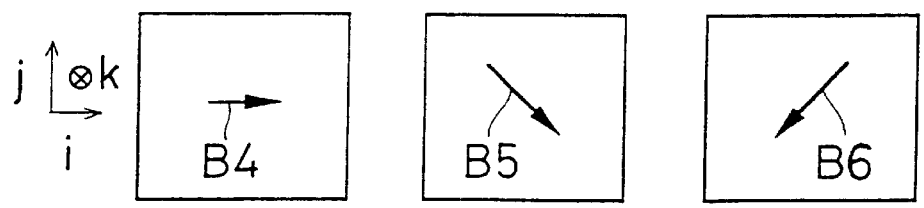
FIGS. 33A through 33C are diagrams showing separation vectors B4 through B6 of birefringence plates 201 through 203 of the variable spatial filter 200 in a first state.

When the variable spatial filter 200 described above is in the first state, the birefringence plate 203 is kept in the state in which the separation vector orients as shown in FIG. 33C. The behavior of the picture image light which passes through the variable spatial filter 200 at this time will be explained below with reference to FIG. 34.

Figures 34A, 34B, 34C:
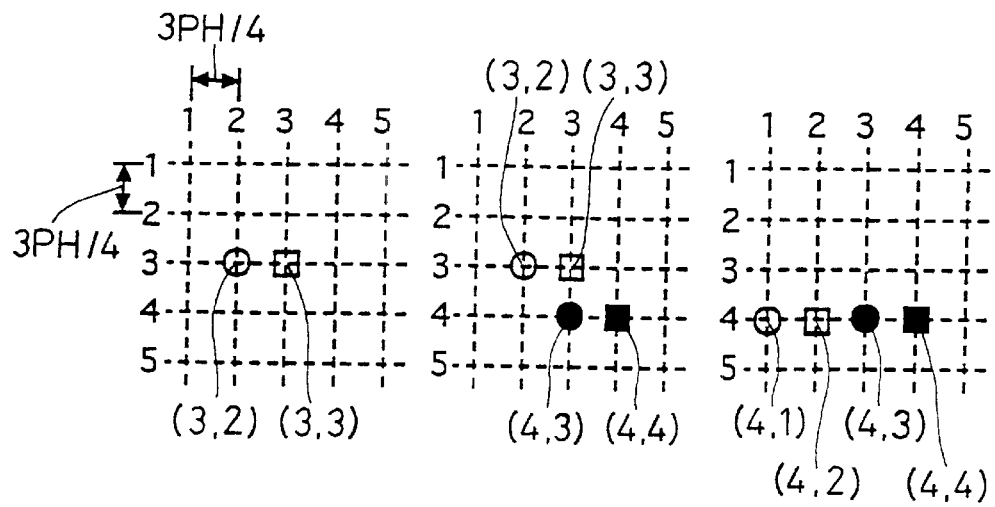
FIGS. 34A through 34C are diagrams indicating imaginary image forming planes showing image forming positions of the picture image light which has passed through the birefringence plates 201 through 203 of the variable spatial filter 200 in the first state.

FIGS. 34A through 34C are diagrams of imaginary image forming planes showing positions where the ordinary and extraordinary rays of the picture image light have passed through the birefringence plates 201 through 203 in the variable spatial filter 200 of the first state. The setting of the imaginary image forming planes is the same with the imaginary image forming plane shown in FIG. 9, except of the intervals of the axial lines of the grid, and it is dealt in the same manner. The axial lines of the grid drawn on each imaginary image forming planes are arrayed at intervals of 3PH/4 and 3PH/4 in the horizontal and vertical directions H and V, respectively.

In the variable spatial filter 200 in the first state, the intersection of the optical axis of the picture image light before entering the filter with the imaginary image forming plane is assumed to be Coordinate (3, 2). When this picture image light is inputted to the birefringence plate 201, it is separated into ordinary and extraordinary rays to the birefringence plate 201. The intersection of the optical axis of the ordinary ray on the output side with the imaginary image forming plane is Coordinate (3, 2). The optical axis of the extraordinary ray on the output side is shifted in the same orientation and by the same length with the separation vector B4 seeing from the extension of the optical axis on the incident side and the intersection of the optical axis is Coordinate (3, 3).

The pair of ordinary and extraordinary rays is inputted to the birefringence plate 202 respectively from the same coordinates and are separated into ordinary and extraordinary rays to the birefringence plate 202, respectively. Among the ordinary and extraordinary rays of the birefringence plate 201, the ordinary rays to the birefringence plate 202 transmit through the birefringence plate 201 as they are, so that the intersections of the optical axes thereof are located at Coordinates (3, 2) and (3, 3). The optical axes of the extraordinary rays to the birefringence plate 202 of the ordinary and extraordinary rays of the birefringence plate 201 are shifted in the same direction with the separation vector B5 by the same length, seeing from the extension of the optical axes at Coordinates (3, 2) and (3, 3), and the intersections of the optical axes are located at Coordinates (4, 3) and (4, 4), respectively.

The two pairs of the ordinary and extraordinary rays are inputted to the birefringence plate 203 from the same coordinates. Because the separation vectors B5 and B6 of the birefringence plates 202 and 203 cross at right angles each other, the ordinary and extraordinary rays of the birefringence plate 202 turn out to be extraordinary and ordinary rays to the birefringence plate 203, respectively. Therefore, the ordinary rays of the birefringence plate 202 at Coordinates (3, 2) and (3, 3) turn out to be the extraordinary rays of the birefringence plate 203. Thereby, the optical axes of the extraordinary rays of the birefringence plate 203 are shifted in the same direction with the separation vector B6 by the same length, seeing from the extension of the optical axes at Coordinates (3, 2) and (3, 3), and the intersections thereof are located at Coordinates (4, 1) and (4, 2), respectively. Similarly, the extraordinary rays of the birefringence plate 202 at Coordinates (4, 3) and (4, 4) turn out to be the ordinary rays of the birefringence plate 203, so that they pass through the birefringence plate 203 as they are.

Thus, the picture image light which has passed sequentially through the birefringence plates 201 through 203 is separated into the two pairs of ordinary and extraordinary rays. The intersections of the optical axes of each pair of ordinary and extraordinary rays with the imaginary image forming plane, i.e. the intersections of the pair denoted by white circle and black circle and the pair denoted by white square and black square, are separated by intervals 3PH/2 in parallel to the horizontal direction H, respectively. The pair of intersections of the ordinary ray denoted by the white circle and white square and the pair of intersections of the extraordinary ray denoted by the black circle and black square are separated by intervals 3PH/4, respectively, in parallel to the horizontal direction H. When a transfer function representing the first decrement is found about the picture image light thus separated, it can be seen that the amplitude of the component of the spatial frequency is damped so that the response of the components of spatial frequencies ±fH/3 and ±2fH/3 is eliminated with respect to the horizontal direction H among the spatial frequency components of the picture image light.

Figure 35:
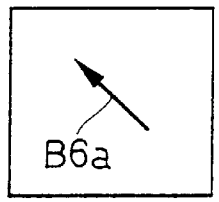
FIG. 35 is a diagram showing a separation vector B6a of the birefringence plate 203 of the variable spatial filter 200 in a second state.

Further, when the variable spatial filter 200 described above is in the second state, the birefringence plate 203 is angularly displaced by 90 degrees from the first state and the separation vector B6a is kept in a state shown in FIG. 35. This separation vector B6a may be represented by using the above-mentioned unit vectors i and j, as follows:

$$B6a = \tfrac{3}{4} PH \cdot (-i+j) \qquad (34)$$

The orientation of the separation vector B6a is the direction forming 135 degrees with the unit vector i in the horizontal direction H counterclockwise.

Figure 36:
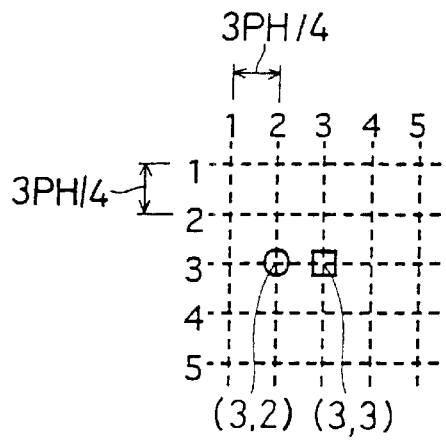
FIG. 36 is a diagram showing an imaginary image forming plane indicating image forming positions of the picture image light which has passed through the birefringence plate 203 of the variable spatial filter 200 in the second state.

The behavior of the picture image light passing through the variable spatial filter 200 at this time will be explained below with reference to the imaginary image forming planes shown in FIGS. 34A and 34B and FIG. 36. The image forming plane shown in FIG. 36 is the same with the image forming plane shown in FIG. 34C, except of the position of the intersection of the optical axis of the picture image light, and is dealt in the same manner.

In the variable spatial filter 200 in the second state, the intersection of the optical axis of the picture image light before entering the filter with the imaginary image forming plane is assumed to be Coordinate (3, 2). The behaviors of the picture Image light in passing through the birefringence plates 201 and 202 are the same with that in the first state, so that its explanation will be omitted here.

The ordinary rays to the birefringence plate 203 at Coordinates (3, 2) and (3, 3) and the extraordinary rays at Coordinates (4, 3) and (4, 4) enter the birefringence plate 93 from the same coordinates.

The separation vectors B5 and B6a of the birefringence plates 202 and 203 are parallel from each other and only the orientation thereof is opposite. Accordingly, the ordinary and extraordinary rays of the birefringence plate 202 become ordinary and extraordinary rays to the birefringence plate 203 as they are. Accordingly, the ordinary rays of the birefringence plate 202 at Coordinates (3, 2) and (3, 3) become the ordinary rays of the birefringence plate 203, so that they pass through the birefringence plate 203 as they are.

Therefore, the coordinates of the intersections of the optical axes of the ordinary rays of the birefringence plates are Coordinates (3, 2) and (3, 3). Further, the extraordinary rays of the birefringence plate 202 at Coordinates (4, 3) and (4, 4) become extraordinary rays of the birefringence plate 203. Thereby, the optical axes of the extraordinary rays of the birefringence plate 203 are shifted in the same orientation by the same length with the separation vector B6a seeing from the extension of the optical axis at Coordinates (4, 3) and (4, 4) and coordinates of their intersections are Coordinates (3, 2) and (3, 3), respectively.

When the separation vectors B5 and B6a of the birefringence plates 202 and 203 are parallel and the orientations are opposite from each other, the intersections of the optical axes of the ordinary and extraordinary rays to the birefringence plates 202 and 203 coincide after passing through the birefringence plates 203. Thereby, the light separating effect in the birefringence plates 202, 203 is canceled. Accordingly, the state of separation of the picture image light after passing through the birefringence plate 203 returns to the state right after passing through the birefringence plate 201.

Thus, the picture image light which has passed sequentially through the birefringence plates 201 through 203 is separated into the pair of ordinary and extraordinary rays. The intersections of the optical axes of the ordinary and extraordinary rays with the imaginary image forming plane are separated by intervals 3PH/4 in parallel to the horizontal direction H. When a transfer function representing the second decrement is found about the picture image light thus separated, it can be seen that the amplitude of the component of the spatial frequency is damped so that the response of the components of spatial frequency ±2fH/3 is eliminated among the spatial frequency components of the picture image light. Comparing the second decrement with the first decrement in the normal mode, it can be seen that the distance between the position on the spatial frequency axis where the response of the spatial frequency component with respect to the horizontal direction H is eliminated and the origin of the axis is doubled.

The imaging operation of the imaging apparatus having such structure in the normal and high resolution modes will be explained below.

The operation for imaging the picture image light in the normal mode is similar to the operation for imaging the picture image light in the normal mode described in the first embodiment and the behaviors of the optical system, the imaging device 34, the circuits 35 and 36 and the picture image memory 37 are the same with those in the first embodiment. The signal processing circuit 44 finds a luminance signal and two kinds of color difference signals of the first output picture image signal from a signal original picture image signal. For instance, luminance data Y(1, 5), color difference data (R−Y)(1, 5) and (B−Y)(1, 5) of the picture element D(1, 5) at the first row and the fifth column may be expressed as follows. It is noted that the picture element D(1, 5) is a corresponding picture element for only green mixed data.

$$Y(1,5)=0.30 \cdot R(1,4)+0.59 \cdot G(1,5)+0.11 \cdot B(1,6) \tag{35}$$

$$(R-Y)(1,5)=0.70 \cdot \tfrac{1}{3}\{2 \cdot R(1,4)+R(1,7)\}-0.59 \cdot G(1,5)-0.11 \cdot \tfrac{1}{3}\{B(1,3)+2 \cdot B(1,6)\} \tag{36}$$

$$(B-Y)(1,5)=-0.30 \cdot \tfrac{1}{3}\{2 \cdot R(1,4)+R(1,7)\}-0.59 \cdot G(1,5)+0.89 \cdot \tfrac{1}{3}\{B(1,3)+2 \cdot B(1,6)\} \tag{37}$$

The luminance data Y may be directly found separately per each picture element D. Therefore, the corresponding picture elements of the original picture image is the actual picture elements of all the luminance data, the number and array of the actual picture elements of the luminance signal of the first output picture image signal is equal to the number and array of the corresponding picture elements of the original picture image.

It can be seen from FIG. 31 that the array periods of the arrays of all the corresponding picture elements of the original picture image in the horizontal, vertical and diagonal directions H, V and U are periods PH, PV and PU, respectively. From this fact, the sampling frequencies of the luminance signal of the first output picture image signal in the horizontal, vertical and diagonal directions H, V and U are assumed to be spatial frequencies fH, fV and fu, respectively. It can be also seen from FIG. 31 that the array periods of the array of only the same kind of corresponding picture elements in the horizontal and vertical directions H and V are periods 3PH and PV, respectively. From this fact, the sampling frequencies of the color difference signal in the horizontal and vertical directions H and V are assumed to be spatial frequencies fH/3 and fV, respectively.

Figure 37:
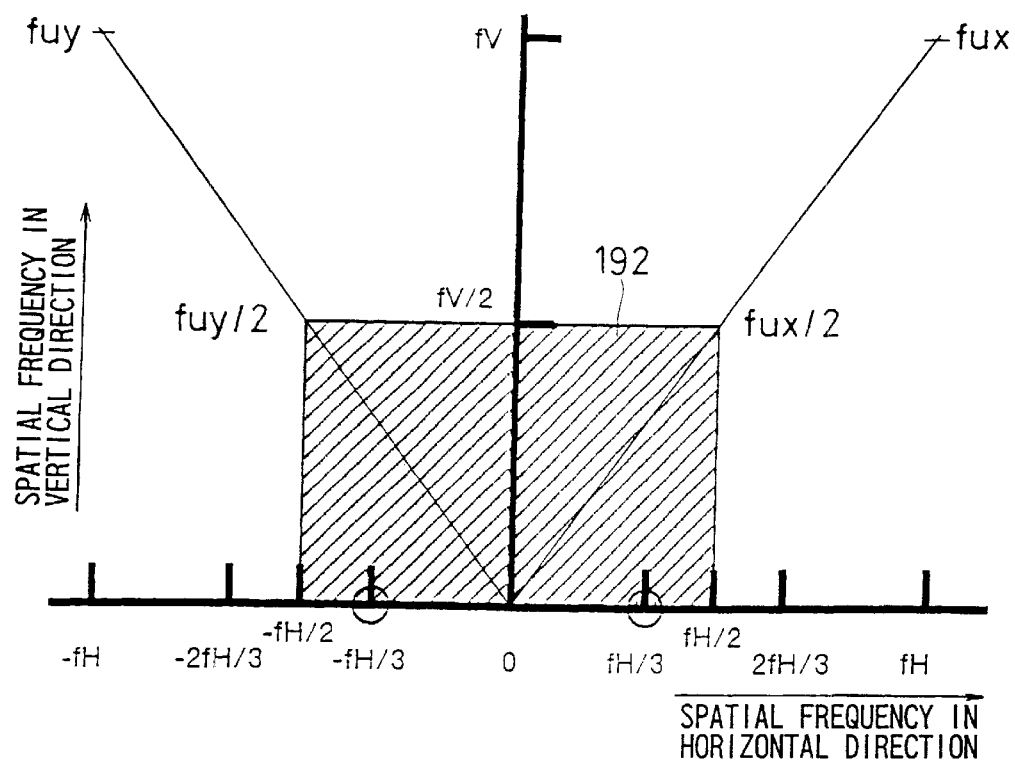
FIG. 37 is a spatial frequency plan view showing a normal band 192 of luminance of a first output picture image signal and carrier frequencies of Moire of the color difference signal of the imaging apparatus of the fourth embodiment.

FIG. 37 is a spatial frequency plan view showing a normal band 192 of luminance of the above-mentioned first output picture image signal and positions of carrier frequency of Moire of the color difference signal. The range of the normal band 192 of luminance on the spatial frequency axes of horizontal, vertical and diagonal directions H, V and U is equal to the normal band 111 of luminance of the first output picture image signal of the imaging apparatus 31 of the first embodiment:

$$(-fH/2) \leq f \leq (fH/2) \tag{13}$$

$$(-fV/2) \leq f \leq (fV/2) \tag{14}$$

$$(-fu/2) \leq f \leq (fu/2) \tag{15}$$

Accordingly, the normal band 192 of luminance of the first and second quadrants is a rectangular area having the four vertexes:
(−fH/2, 0)
(fH/2, 0)
(−fH/2, fV/2)
(fH/2, fV/2)

The carrier frequencies of Moire of the color difference signal appearing within the normal band 192 exist at the following two locations:
(−fH/3, 0)
(fH/3, 0)

The first decrement of the variable spatial filter 200 in the first state described above is set so as to damp the spatial frequency component near the spatial frequency ±fH/3 within the normal band 192. Thereby, the amplitude of the desired signal component of the normal band 192 in the horizontal direction H is limited so that it is zeroed at the part of the spatial frequency ±fH/3 in the horizontal direction H. Due to that, the substantial width of the normal band 192 on the spatial frequency axis in the horizontal direction H is reduced to be less than the spatial frequency ±fH/3. Accordingly the substantial resolution of the first output picture image in the horizontal direction H is lowered by that than the ideal resolution estimated from the normal band 192.

The operation for imaging the picture image light in the high resolution mode is similar to the operation for imaging the picture image light in the high resolution mode in the first embodiment and the behaviors of the optical system, the imaging device 34, the circuits 35 and 36 and the picture image memory 37 are the same with those in the first embodiment. At this time, the image shifting mechanism 62 moves the image forming point of the picture image light to the following two spots.

Figure 38:
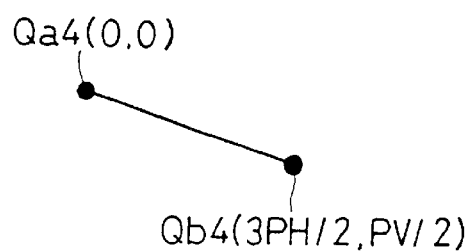
FIG. 38 is a diagram showing the positional relationship between the first and second image forming positions Qa4 through Qb4 of the picture image light on the image forming plane of the imaging device in the high resolution mode in the imaging apparatus of the fourth embodiment.

FIG. 38 is a diagram showing the positional relationship between the first and second image forming positions in imaging the picture image light in the above-mentioned high resolution mode. Based on the first image forming position Qa4, the second image forming position Qb4 is separated by the length 3PH/2 of the array period of the photo-receiving domains PD in the horizontal direction H and by the length PV/2 of the array period in the vertical direction V. The imaginary reference axial line of the image shifting mechanism 62 and the inclination of the refracting plate 71 in the second state are set so that those image forming positions take the above-mentioned positional relationship.

The signal processing circuit 44 generates a composite picture image signal from the first and second original picture image signals by the same method with the first embodiment. The composite picture image is composed of 2M×2N picture elements D which are arrayed in 2M rows and 2N columns. Among these picture elements D, a half of picture elements are corresponding picture elements and the remaining picture elements are imaginary picture elements to which no mixed data corresponds. The array periods of the picture elements of the composite picture image in the horizontal and vertical directions H and V are periods PH/2 and PV/2, respectively.

Figure 39:
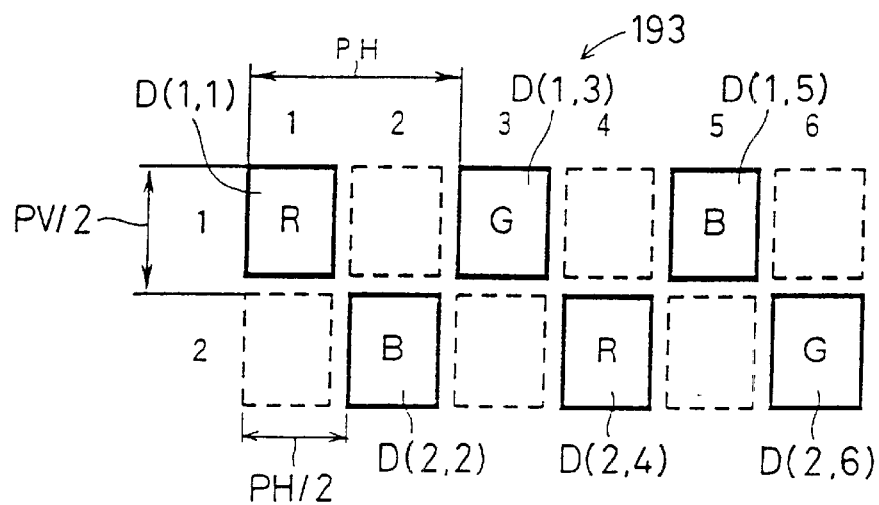
FIG. 39 is a diagram showing an equivalent basic array pattern 193 of the array of picture elements D of a composite picture image in the high resolution mode in the imaging apparatus of the fourth embodiment.

FIG. 39 is a diagram showing an equivalent basic array pattern 193 of the array of picture elements D of the composite picture image represented by the above-mentioned composite picture image signal. Hereinafter, the Imaginary picture elements will be indicated by rectangular areas of broken line in the drawings showing the basic array pattern of picture elements. This basic array pattern 193 is composed of 12 picture elements arrayed in two rows and six columns. The picture elements D(1, 1) and D(2, 4) are the corresponding picture elements of red mixed data. The picture elements D(1, 3) and D(2, 6) are the corresponding picture elements of green mixed data. The picture elements D(1, 5) and D(2, 2) are the corresponding picture elements of blue mixed data. The remaining picture elements D other than those described above are all imaginary picture elements. It can be seen from this fact that the actual picture elements are arrayed in dice in the composite picture image.

The signal processing circuit 44 finds a luminance signal and two kinds of color difference signals of the second output picture image signal from the composite picture image signal. For instance, luminance data Y(2, 6) and color difference data (R−Y)(2, 6) and (B−Y)(2,6) of the picture element D(2, 6) in the second row and the sixth column may be represented by the following expressions. It is noted that the picture element D(2, 6) is a corresponding picture element of only green mixed data:

$$Y(2,6)=0.30 \cdot \tfrac{1}{3}\{R(2,4)+R(1,7)+R(3,7)\}+0.59 \cdot G(2,6)+0.11 \cdot \tfrac{1}{3}\{B(1,5)+B(3,5)+B(2,8)\} \tag{38}$$

$$(R-Y)(2,6)=0.70 \cdot \tfrac{1}{3}\{R(2,4)+R(3,7)\}-0.59 \cdot G(2,6)-0.11 \cdot \tfrac{1}{3}\{B(1,5)+B(3,5)+B(2,8)\} \tag{39}$$

$$(B-Y)(2,6)=-0.30 \cdot \tfrac{1}{3}\{R(2,4)+R(1,7)+R(3,7)\}-0.59 \cdot G(2,6)+0.89 \cdot \tfrac{1}{3}\{B(1,5)+B(3,5)+B(2,8)\} \tag{40}$$

The luminance data Y may be directly found separately per only each corresponding picture element of the composite picture image. The luminance data of the imaginary picture elements is interpolated from the calculation result of the corresponding picture elements around that. Therefore, the corresponding picture elements of the composite picture image turn out to be the actual picture elements of all the luminance data, so that a number and array of the actual picture elements of the luminance signal of the first output picture image signal are equal to the number and array of the corresponding picture elements of the composite picture image and the actual picture elements are arrayed in dice.

It can be seen from FIG. 39 that the array periods of the array of all the corresponding picture elements of the composite picture image in the horizontal, vertical and diagonal directions H, V and U are the periods PH/2, PV/2 and PU, respectively. It is assumed from this fact that sampling frequencies of the luminance signal of the second output picture image signal in the horizontal, vertical and diagonal directions H, V and U are the spatial frequencies 2fH, 2fV and fu, respectively. Further, it can be seen from FIG. 39 that the array periods of the array of only the same kind of corresponding picture elements in the horizontal and vertical directions H and V are the periods 3PH/2 and PV/2, respectively. It is assumed from this fact that the sampling frequencies of the color difference signal in the horizontal and vertical directions H and V are the spatial frequencies 2fH/3 and 2fV, respectively.

Figure 40:
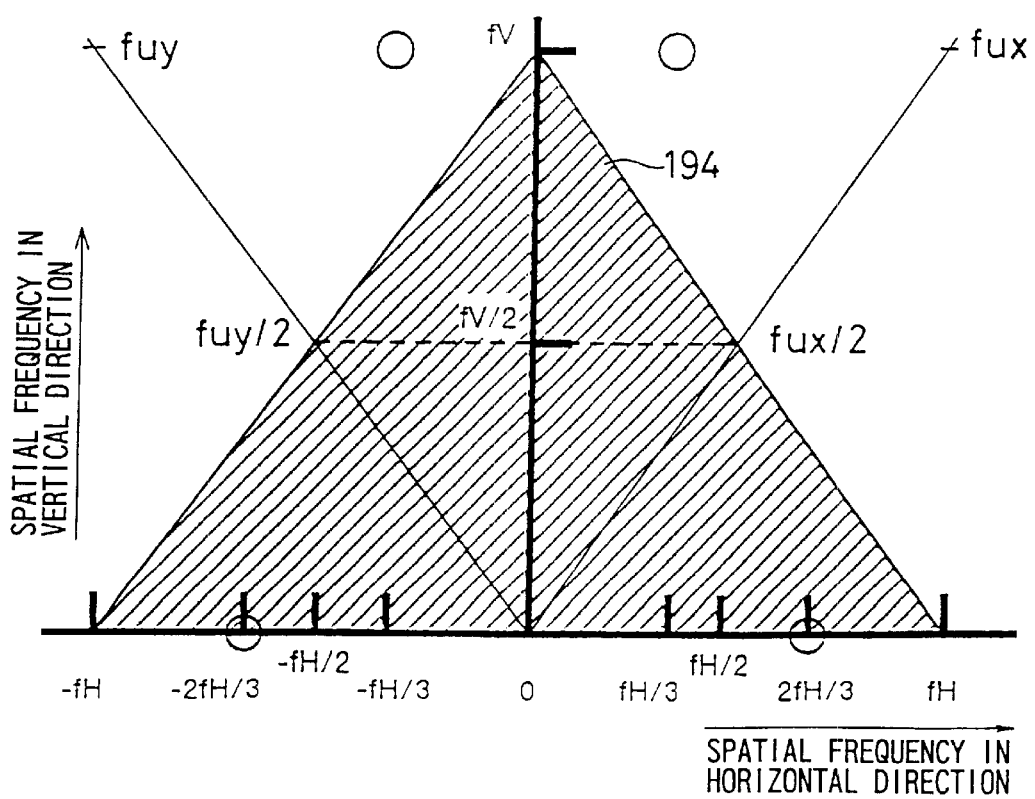
FIG. 40 is a spatial frequency plan view showing a normal band 194 of luminance of a second output picture image signal and carrier frequencies of Moire of the color difference signal of the imaging apparatus of the fourth embodiment.

FIG. 40 is a spatial frequency plan view showing a normal band 194 of luminance of the above-mentioned second output picture image signal and positions of carrier frequency of Moire of the color difference signal. The range of the normal band 194 of luminance on the spatial frequency axes in the horizontal and vertical directions H and V is enlarged twice of each range of the normal band 192 of luminance of the first output picture image signal. The range on the spatial frequency axis in the diagonal direction U is equal to the range of the first output picture image signal. Each range of the normal band 194 may be expressed as follows:

$$-fH \leq f \leq fH \quad (41)$$

$$-fV \leq f \leq fV \quad (42)$$

$$(-fu/2) \leq f \leq (fu/2) \quad (15)$$

Therefore, the normal band 194 of luminance in the first and second quadrants is a triangular area having the following three vertexes:
(−fH, 0)
(fH, 0)
(0, fV)

The carrier frequencies of Moire of the color difference signal appearing within the normal band 194 exist at the following two spots:
(−2fH/3, 0)
(2fH/3, 0)

Further, the carrier frequencies of Moire of the color difference signal exist at the following two spots near the normal band 194:
(−fH/3, fV)
(fH/3, fV)

Designing each component in accordance to the imaging apparatus having the above-mentioned structure, the optical system has a spatial frequency characteristic (MTF: Modulation Transfer Function) such that the spatial frequency component of the picture image light is damped around spatial frequencies ±fH and ±fV. Therefore, the return component of the color difference signal whose center frequency is the aforementioned carrier frequency near the normal band 194 is fully damped by the spatial frequency characteristics of the optical system and the aperture effect of the imaging device 34, so that it exerts almost no effect to the desired signal component of the luminance signal of the second output picture image signal.

The second decrement of the variable spatial filter 200 in the first state described above is set so as to damp the spatial frequency component near the spatial frequency ±2fH/3 in the normal band 194. Thereby, the amplitude of the desired signal component within the normal band 194 is limited such that it is zeroed at the part of the spatial frequency ±2fH/3 in the horizontal direction H. Thereby, although the substantial width of the normal band 194 on the spatial frequency axis in the horizontal direction H is reduced to be less than the spatial frequency ±2fH/3, the substantial width after the limitation is expanded about twice of the substantial width of the first output picture image signal.

Further, the amplitude of the component near the spatial frequency ±fV/2 is damped with respect to the spatial frequency component in the vertical direction V among the original picture image signals to be output in the two-picture element mixed reading type imaging device 34. Thereby, a filtering effect by which the signal amplitude of the luminance signal and the color difference signal is damped at the part near the spatial frequency ±fV/2 indicated by a broken line within the normal band 194 in FIG. 40. This filtering effect is a phenomenon peculiar to the two-picture element mixed reading type imaging device 34. The substantial width of the normal band 194 in the vertical direction V is limited to be less than the spatial frequency ±fV/2. Thereby, although the substantial width in the vertical direction V after the limitation of the second output picture image is reduced to a half of the ideal width estimated from the normal band 194, the substantial width does not change as compared to the first output picture image because the ideal width is expanded in advance.

From these facts, the resolution of the second output picture image in the horizontal direction H is improved twice of the first output picture image. Further, although the resolution in the diagonal direction U does not change, it will draw no attention visually due to the spatial anisotropic characteristic of the visual spatial frequency characteristic.

The spatial anisotropic characteristic will be explained below. The aforementioned spatial frequency characteristic (MTF: Modulation Transfer Function) may be cited as an index indicating visual characteristics when a person perceives a picture image. When a sine wave pattern in which light and darkness change only in the one direction is displayed on a screen of two-dimensional plane, this spatial frequency characteristic shows the relationship between the picture image of the pattern displayed on the screen and the spatial frequency when the viewer perceives no difference of the light and darkness.

The one direction of this sine wave pattern is displayed by inclining so as to form a predetermined angle with the horizontal direction H based on the horizontal direction H for example. Under this condition, the sensitivity of human eyes to the high harmonic component of the spatial frequency becomes the lowest when the one direction of the pattern forms ±45° with the horizontal direction H. The phenomenon that the visual spatial frequency characteristic changes depending on the spatial direction of the change of the picture image as described above is called as the visual spatial anisotropic characteristic. From this fact, it is generally known that the spatial frequency component in the diagonal direction U is hardly perceived by human eyes as compared to the frequency components in the horizontal and vertical directions H and V. It can be seen from this spatial anisotropic characteristic that the picture image degrades less visually even if the high harmonic component of the diagonal direction U in the picture image is eliminated. Therefore, even if the resolution in the diagonal direction U does not change when the resolution in the horizontal and vertical directions H and V change, it draws no attention visually.

An imaging apparatus of a fifth embodiment of the present invention will be explained below. The structure of the components of the imaging apparatus of the present embodiment is the same with the imaging apparatus of the fourth embodiment, except of the imaging device, so that the same components will be denoted by the same reference numerals and an explanation thereof will be omitted here. The imaging apparatus uses a whole picture element reading type imaging device 131, instead of the two-picture element mixed reading type imaging device 34. A color filter having a basic array pattern 191 shown in FIG. 31 is disposed on the light incident side of the imaging device 131. The variable spatial filter 200 limits the spatial frequency component of the picture image light with the first and second quantities of damp similarly to the fourth embodiment. Using the whole picture element reading type imaging device 131, the imaging apparatus of the present embodiment images the picture image light in the normal and high resolution modes and obtains first and second output picture image signals whose resolution is different.

The imaging device 131 images the picture image light to be formed via the above-mentioned color filter and outputs an original picture image signal. The detailed single operation for imaging the picture image light of the imaging device 131 and the picture image memory 37 are the same with the single imaging operation of the second embodiment. The array of the picture elements D of the original picture image signal and the correspondence between each picture element and received light data are equivalent to the array of light-transmitting domains L and the array of colors of the color filter and each corresponding picture element has received light data of a single chromatic light. Comparing the original picture image signal with the original picture image signal of the fourth embodiment, it can be seen that the array of the corresponding picture elements of each chromatic light is the same and that each corresponding picture element which has corresponded to mixed data in the fourth embodiment corresponds to received light data of the same kind of chromatic light in the present embodiment. Accordingly, the signal composition of the original picture image signals of the fourth and fifth embodiments are assumed to be equivalent.

The operation of the above-mentioned imaging apparatus for imaging the picture image light in the normal mode is the same with the operation for imaging the picture image light in the normal mode in the fourth embodiment, except of the operation for imaging the picture image light. The calculation expressions in calculating luminance data and color difference data from the original picture image signals in the signal processing circuit 44 are the same with the aforementioned expressions (35) through (37), except of that the received light data of the identical corresponding picture elements is substituted instead of each mixed data. Accordingly, sampling frequencies of the luminance signal and color difference signal of the first output picture image signal are equal to the sampling frequencies of the signals of the fourth embodiment. The spatial frequency plan view showing the normal band of luminance and the positions of carrier frequency of Moire of the first output picture image signal thus obtained is the same with FIG. 37. Therefore, it can be seen that the substantial width of the normal band of the first output picture image signal in the normal mode and the resolution of the first output picture image are also equal to those in the fourth embodiment.

The operation of the above-mentioned imaging apparatus for imaging the picture image light in the high resolution mode is the same with the operation for imaging the picture image light in the high resolution mode in the fourth embodiment, except of the operation for imaging the picture image light. The positional relationship between the first and second image forming positions Qa4 and Qb4 in this case is the same with that shown in FIG. 38. The method for producing the composite picture image signal produced in the signal processing circuit 44 is the same with that shown in the fourth embodiment and the equivalent basic array pattern of the array of picture elements is the same with the basic array pattern 193 shown in FIG. 39. Further, the calculation expressions in calculating luminance data and color difference data from the composite picture image signal by the signal processing circuit 44 are the same with the aforementioned expressions (38) through (40), except of that the received light data of the identical corresponding picture elements is substituted instead of each mixed data. Accordingly, sampling frequencies of the luminance signal and color difference signal of the second output picture image signal are equal to the sampling frequencies of the signals of the fourth embodiment.

Figure 41:
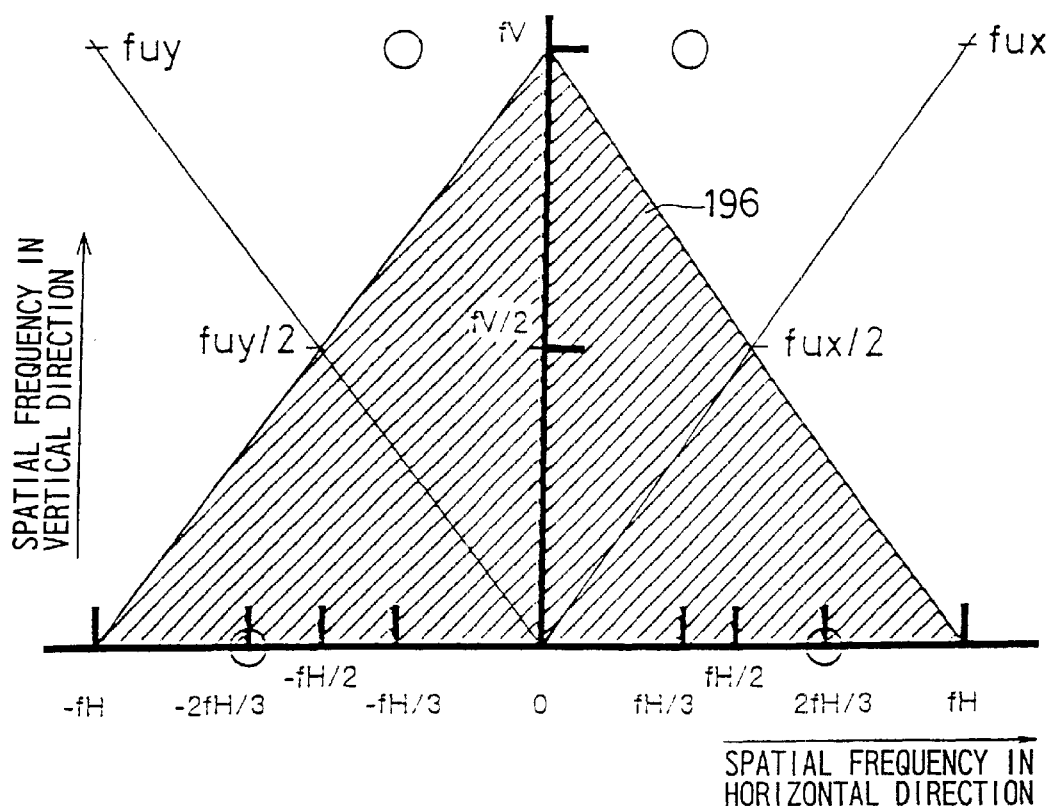
FIG. 41 is a spatial frequency plan view showing a normal band 196 of luminance of a second output picture image signal and carrier frequencies of Moire of the color difference signal of an imaging apparatus of a fifth embodiment.

FIG. 41 is a spatial frequency plan view showing a normal band 196 of luminance of the above-mentioned second output picture image signal and positions of carrier frequency of Moire of the color difference signal. The normal band 196 of luminance is equal to the normal band 194 of luminance shown in FIG. 40 and each range in the horizontal, vertical and diagonal directions H, V and U may be expressed as follows:

$$-fH \leq f \leq fH \tag{41}$$

$$-fV \leq f \leq fV \tag{42}$$

$$(-fu/2) \leq f \leq (fu/2) \tag{15}$$

Therefore, the normal band 196 of luminance in the first and second quadrants is a triangular area having the following three vertexes:
(−fH, 0)
(fH, 0)
(0, fV)

The carrier frequencies of Moire of the color difference signal appearing within the normal band 196 exist at the following two spots:
(−2fH/3, 0)
(2fH/3, 0)

Further, the carrier frequencies of Moire of the color difference signal exist at the following two spots near the normal band 196:
(−fH/3fV)
(fH/3, fV)

Because the return component of the color difference signal whose center frequency is the aforementioned carrier frequency near the normal band 196 is fully damped by the spatial frequency characteristics (MTF) of the optical system and the aperture effect of the imaging device 131, it exerts almost no effect to the desired signal component of the luminance signal of the second output picture image signal.

In the imaging apparatus of the present embodiment, the spatial frequency component of the picture image light imaged in the high resolution mode is limited so that the amplitude of the desired signal component is zeroed at the part of spatial frequency ±2fH/3 in the horizontal direction H by the variable spatial filter 200 in the second state, similarly to the imaging apparatus of the fourth embodiment. Thereby, although the substantial width of the normal band 196 on the spatial frequency axis in the horizontal direction H is reduced to be less than the spatial frequency ±2fH/3, the substantial width after the limitation is expanded about twice of the substantial width of the first output picture image signal.

Differing from the imaging apparatus of the fourth embodiment, no filtering effect peculiar to the two-picture element mixed reading type imaging device in the imaging apparatus of the present embodiment, so that the substantial width of the normal band 196 on the spatial frequency axis in the vertical direction V is expanded to the whole range of the normal band 196 in the vertical direction V. Therefore, the substantial width on the spatial frequency axis in the vertical direction V after the limitation is expanded twice of the substantial width of the first output picture image signal.

From these facts, the resolution of the second output picture image in the horizontal and vertical directions H and V is improved twice of the first output picture image, respectively. Further, although the resolution in the diagonal direction U does not change, it will draw no attention visually due to the spatial anisotropic characteristic of the visual spatial frequency characteristic. Therefore, the resolution of the second output picture image of the imaging apparatus of the present embodiment is improved twice in the vertical direction V as compared to the second output picture image of the fourth embodiment.

An imaging apparatus of a sixth embodiment of the present invention will be explained below. The structure of the components of the imaging apparatus of the present embodiment is the same with the imaging apparatus of the fifth embodiment, except of the optical system and the color filter, so that the same components will be denoted by the same reference numerals and an explanation thereof will be omitted here. Using the whole picture element reading type imaging device 131, the imaging apparatus of the present embodiment images the picture image light in the normal and high resolution modes and obtains first and second output picture image signals whose resolution is different.

In the optical system, although the internal structure of the image shifting mechanism 62 and the variable spatial filter 200 is the same, the state of setting thereof is different. The image shifting mechanism 62 will be described later. The variable spatial filter 200 is disposed so that the separation vector B4 of the birefringence plate 201 is parallel with the vertical direction V. Thereby, the variable spatial filter 200 in the first and second states damps the amplitude of components of spatial frequencies ±fV/3 and ±2fV/3 among the spatial frequency components in the vertical direction V, respectively.

Although the color filter is the same with the color filter of the fifth embodiment with respect to the location where it is disposed, the combination of transmissible chromatic lights, and the number and array of the light-transmitting domains L, it is different in terms of only the array of colors. The first through third chromatic lights are three primary colors of red, blue and green. The array periods in the horizontal and vertical directions H and V of the light-transmitting domains L are periods PH and PV, respectively.

Figure 42:
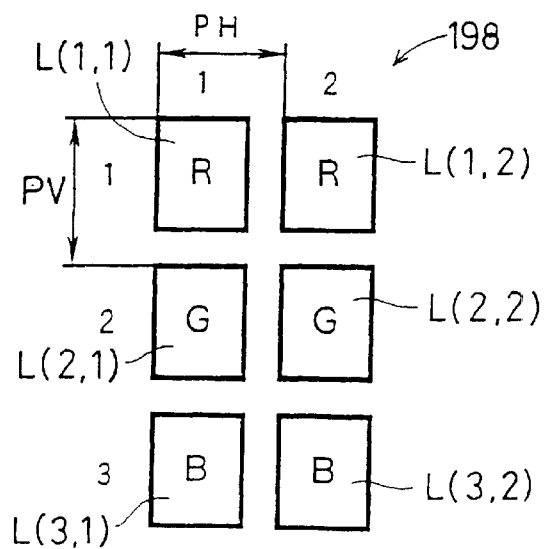
FIG. 42 is a diagram showing a basic array pattern 198 of an array of colors of light-transmitting domains L of a color filter in an imaging apparatus of a sixth embodiment.

FIG. 42 is a diagram showing a basic array pattern 198 of an array of colors of the light-transmitting domains L of the above-mentioned color filter. The basic array pattern 198 is composed of six light-transmitting domains L arrayed in three rows and two columns and contains the same kind of light-transmitting domains by two each. In the basic array pattern 198, the light-transmitting domains L(1, 1) and L(1, 2) are red light-transmitting domains L which transmit red chromatic light. The light-transmitting domains L(2, 1) and L(2, 2) are green light-transmitting domains L. The light-transmitting domains L(3, 1) and L(3, 2) are blue light-transmitting domains L. The basic array pattern 198 is an array in which only the array of colors of the light-transmitting domains L of the basic array pattern of the color filter of the imaging apparatuses of the fourth and fifth embodiments is replaced with respect to the horizontal and vertical directions H and V while keeping the array periods of the horizontal and vertical directions H and V. Because the light-transmitting domains of the same kind of chromatic light are arrayed along the horizontal direction H in the color filter, the light-transmitting domains L in each row transmit only the same kind of chromatic light.

The imaging device 131 images the picture image light to be formed via the color filter and outputs the original picture image signal. The array of the picture elements of the original picture image signal and the correspondence of each picture element with received light data are equivalent to the array of the light-transmitting domains L and the array of colors of the color filter and each corresponding picture element has received light data of a single chromatic light.

The operation of the above-mentioned imaging apparatus for imaging the picture image light in the normal mode is similar to the operation for imaging the picture image light in the normal mode of the fifth embodiment and the behaviors of the optical system, the imaging device 131, the circuits 35 and 36 and the picture image memory 37 are the same with those of the fifth embodiment. The signal processing circuit 44 finds a luminance signal and two kinds of color difference signals of the first output picture image signal from the single original picture image signal Calculation expressions of this case are the same with the expressions (35) through (37) described above except of that the numbers of row and column of the corresponding picture element are replaced with respect to the row and column and the received light data of the identical corresponding picture element is substituted instead of each mixed data. A spatial frequency plan view showing the normal band of luminance of the first output picture image signal and the carrier frequency of Moire thus obtained is a graphic line-symmetrical to FIG. 37 about the spatial frequency axis in the first diagonal direction Ux. Therefore, it is equal to a graph in which only the spatial frequency axes in the horizontal and vertical directions H and V in the spatial frequency plan view in FIG. 37 are replaced.

It can be seen from this graph that although there exists no carrier frequency of Moire on the spatial frequency axis in the horizontal direction H. Therefore, the substantial width of the normal band in the horizontal direction H is equal to an ideal width equivalent to the range in the horizontal direction R of the normal band, and is enlarged up to the spatial frequency ±fH/2. Further, it can be seen that there exist a carrier frequency of Moire on the spatial frequency ±fV/3 on the spatial frequency axis in the vertical direction V. Therefore, the substantial width of the normal band in the vertical direction V of the first output picture image signal is limited to be less than the spatial frequency ±fV/3. Therefore, the resolution in the horizontal direction H of the first output picture image of the present embodiment in the normal mode is improved as compared to the first output picture image in the fifth embodiment.

The operation of the above-mentioned imaging apparatus for imaging the picture image light in the high resolution mode is similar to the operation for imaging the picture image light in the high resolution mode in the fifth embodiment and the behaviors of the optical system, the imaging device 131, the circuits 35 and 36 and the picture image memory 37 are the same with those in the fifth embodiment. At this time, the image shifting mechanism 62 moves the image forming point of the picture image light to the following two image forming positions.

Figure 43:
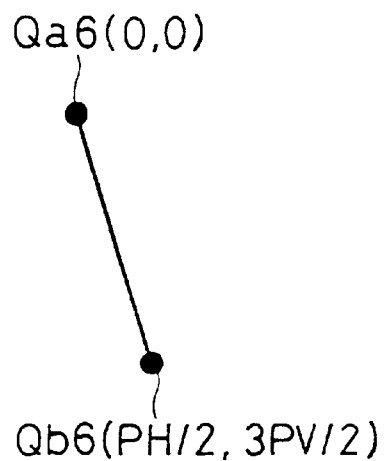
FIG. 43 is a diagram showing the positional relationship between the first and second image forming positions Qa6 and Qb6 of the picture image light on the image forming plane of the solid imaging device in the high resolution mode of the sixth embodiment.

FIG. 43 is a diagram showing a relative positional relationship between the aforementioned first and second image forming positions Qa6 and Qb6. Based on the first image forming position Qa6, the second image forming position Qb6 is located at the position shifted from the first image forming position Qa6 in the horizontal direction H by a length Ph/2 and in the vertical direction V by a length 3PV/2. The positional relationship between these first and second image forming positions Qa6 and Qb6 is what is line-symmetrical to the positional relationship between the first and second image forming positions Qa4 and Qb4 shown in FIG. 38 about the first diagonal direction Ux. The imaginary reference axis of the refracting plate 71 of the image shifting mechanism 62 and the inclination of the refracting plate 71 in the second state are set by replacing the horizontal and vertical directions H and V of each member as compared to the setting of the fourth and fifth embodiments so as to be able to shift the optical axis of the picture image light in parallel in correspondence to this positional relationship.

The equivalent basic array pattern of the array of picture elements D of a composite picture image signal generated by the signal processing circuit 44 is similar to the basic array pattern 193 in FIG. 39. The picture element array of the corresponding picture elements and imaginary picture elements as well as the array periods of the whole picture elements are the same, except of that the horizontal and vertical directions H and V of the array of colors of the corresponding picture elements are replaced. The signal processing circuit 44 finds a luminance signal and two kinds of color difference signals of the second output picture image signal from the composite picture image signal. Calculation expressions in this case are the same with the aforementioned expressions (38) through (40), except of that the numbers of row and column of each corresponding picture element are replaced with respect to the row and column and that the received light data of the corresponding picture element is substituted instead of the mixed data. A spatial frequency plan view showing the normal band of luminance and a carrier frequency of Moire of this second output picture image signal is a plan view line-symmetrical to FIG. 41 about the spatial frequency axis in the first diagonal direction Ux. That is, it is the same with a plan view in which only the spatial frequency axes in the horizontal and vertical directions H and V in the spatial frequency plan view of FIG. 41 are replaced.

It can be seen from this plan view that the normal band of luminance of the second output picture image signal is expanded twice in the horizontal and vertical directions H and V and is not changed with respect to the diagonal direction U as compared to the normal band of luminance of the first output picture image signal. Further, because the carrier frequency of Moire on the spatial frequency axis in the vertical direction V appears at spatial frequency ±2fV/3, while the substantial width of the normal band in the vertical direction V is reduced to be less than the spatial frequency ±2fV/3 after the limitation of the spatial frequency component of the picture image light, the substantial width after the limitation is expanded about twice as compared to the substantial width of the first output picture image signal.

From these facts, the resolutions in the horizontal and vertical directions H and V of the second output picture image is improved twice of the first output picture image, respectively. Although the resolution in the diagonal direction U does not change, it will draw no attention visually due to the spatial anisotropic characteristic of the visual spatial frequency characteristic. Therefore, the resolution of the second output picture image of the imaging apparatus of the present embodiment is improved with respect to the horizontal direction H as compared to the second output picture image in the fifth embodiment.

An imaging apparatus of a seventh embodiment of the invention will be described in the following. The structures of the components of the imaging apparatus of the present embodiment other than the optical system, the color filter and imaging device are the same with the imaging apparatus of the second embodiment, so that the same components will be denoted by the same reference numerals and an explanation thereof will be omitted here. Instead of the whole picture element reading type imaging device 131, the imaging apparatus uses a whole picture element reading type imaging device to image picture image light In the normal and high resolution modes and obtains first and second output picture image signals whose resolution is different.

Within the optical system, although the internal structure of the image shifting mechanism 62 is the same, the state of setting thereof is different as described later. Further, a variable spatial filter 220 is provided, instead of the variable spatial filter 90, at an arbitrary position within the optical system. The variable spatial filter 220 is switched to the first/second state corresponding to the normal and high resolution modes of the imaging apparatus of the present embodiment and damps the amplitude of spatial frequency component of the picture image light with a decrement corresponding to each mode.

The imaging device is the whole picture element reading type imaging device having M×N photo-receiving domains PD. The photo-receiving domains PD are arrayed on the image forming plane so that rows thereof composed of M photo-receiving domains arrayed in a period PH are arrayed by N in a array period PV along the vertical direction V. Further, the two adjacent rows are arrayed so that the center of each photo-receiving domain PD is shifted in the horizontal direction H by a length Ph/2. The array of the photo-receiving domains PD is equivalent to an array in which each photo-receiving domain PD is arrayed while interposing one each imaginary photo-receiving domain PD in the horizontal and vertical directions H and V with respect to an imaginary array of M rows and 2N columns and the photo-receiving domains PD are arrayed in dice on the image forming plane as a whole. The array periods of the photo-receiving domains PD in the horizontal and vertical directions H and V are periods Ph/2 and PV, respectively.

One each vertical transfer CCD group of this imaging device is prepared for two columns of photo-receiving domains PD for example and has the same number of charge coupled devices C with the number of two columns of actual photo-receiving domains PD. The charge coupled devices C of the CCD group are arrayed like a polygonal line so as to adjoin with each of the two columns of actual photo-receiving domains PD. Therefore, M columns of vertical transfer CCD groups are arrayed in the horizontal direction H and each vertical transfer CCD group is composed of N charge coupled devices C arrayed like the polygonal line in the vertical direction V. Each photo-receiving domain PD transfers received light data to the adjacent charge coupled device C, respectively. The behavior of the vertical transfer CCD group after transferring the data is the same with the behavior of the vertical transfer CCD group 138 of the imaging device 131 shown in FIG. 17. That is, the vertical transfer CCD group of the imaging device of the present embodiment deals the two rows of actual photo-receiving domains PD to be equivalent to the one row of the photo-receiving domain PD of the imaging device 131 and transfers the received light data of each photo-receiving domain PD separately.

A color filter whose number and array of the light-transmitting domains L are the same with the actual photo-receiving domains PD and have an array of colors of the following basic array pattern is attached on the light incident side of the image forming plane of the imaging device. The color filter transmits either one of first through third chromatic lights per each light-transmitting domain L. The first through third chromatic lights are three primary colors of red, blue and green. The array periods of the light-transmitting domains L in the horizontal and vertical directions H and V are periods Ph/2 and PV, respectively.

Figure 44:
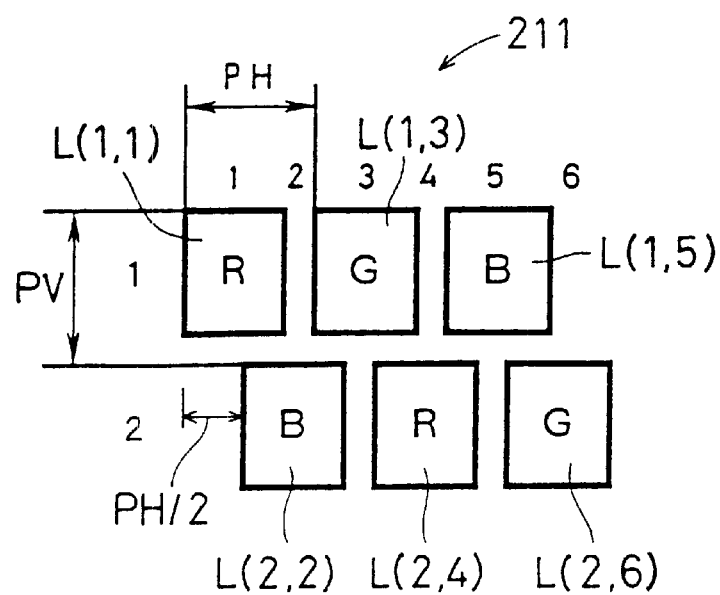
FIG. 44 is a diagram showing a basic array pattern 211 of an array of colors of light-transmitting domains L of a color filter in an imaging apparatus of a seventh embodiment.

FIG. 44 is a diagram showing the basic array pattern 211 of the array of colors of the light-transmitting domains L of the above-mentioned color filter. The basic array pattern 211 is composed of six light-transmitting domains L and contains the same kind of light-transmitting domains by two each. These light-transmitting domains may be assumed that they are equivalent to an array in which imaginary picture elements of two rows and six columns are arrayed in dice and that there exists imaginary light-transmitting domains between the light-transmitting domains L of each row. In the basic array pattern 211, the light-transmitting domains L(1, 1) and L(2, 4) are the red light-transmitting domains, the light-transmitting domains L(1, 3) and L(2, 6) are the green light-transmitting domains and the light-transmitting domains L(1, 5) and L(2, 2) are the blue light-transmitting domains. The color filter of the array of colors having such basic array pattern 211 is set so that the actual light-transmitting domains L are arrayed on the light incident side of at least one actual photo-receiving domain PD.

The above-mentioned imaging device images the picture image light to be formed via the color filter and outputs an original picture image signal. The array of picture elements D of the original picture image signal and the correspondence between the picture elements D and received light data are equivalent to the array of light-transmitting domains L and the array of colors of the color filter in FIG. 44 and each corresponding picture element has received light data of a single chromatic light.

The variable spatial filter 220 will be explained below with reference to FIGS. 45 through 50.

Figure 45:
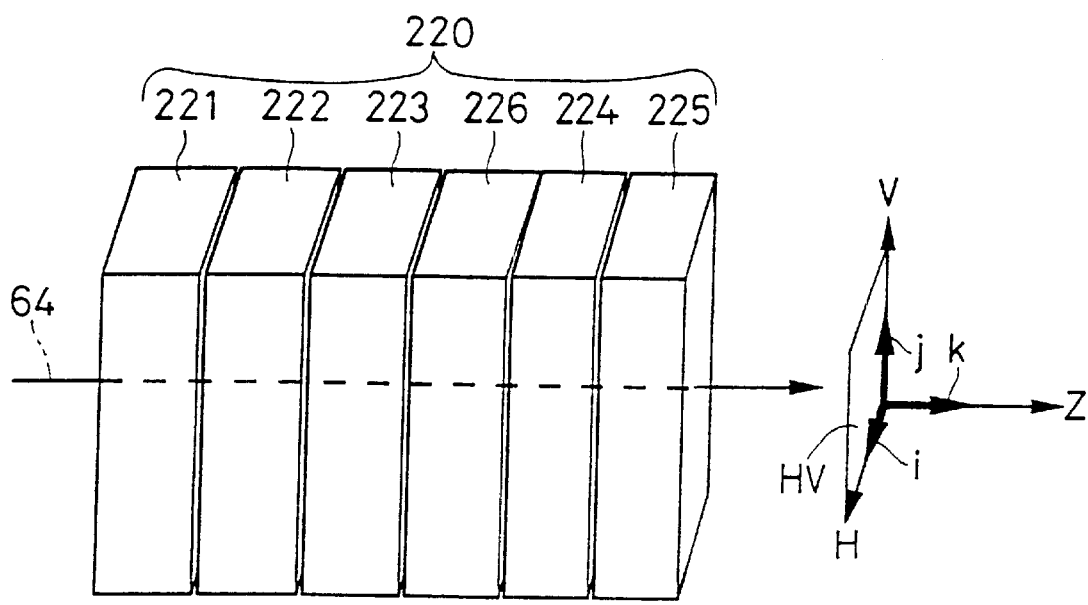
FIG. 45 is a perspective view showing the concrete structure of a variable spatial filter 220 provided in the imaging apparatus of the seventh embodiment.

FIG. 45 is a perspective view showing the detailed structure of the variable spatial filter 220. The variable spatial filter 220 comprises five birefringence plates 221 through 225 and an optical rotary plate 226. The birefringence plates 221 through 225 are arrayed on the optical axis 64 of the picture image light on the light incident side from the light incident side in that order. The optical rotary plate 226 is interposed between the birefringence plates 223 and 224. The birefringence plates 221 through 225 is realized by a quartz plate for example. The incident and output planes of each of the birefringence plates 221 through 225 and the optical rotary plate 226 cross at right angles with the optical axis 64 of the picture image light on the light incident side. The birefringence plates 223 and 225 are set so as to be turnable centering on an imaginary rotary center axis which is coincident with the optical axis 64 and are turned so as to be angularly displaced by 180 degrees when the first and second states are switched.

FIGS. 46a through 46e are diagrams showing separation vectors B11 through B15 of each of the birefringence plates 221 through 225 when the variable spatial filter 220 is in the first state. Among them, the separation vectors B11 through B13 are specified by the following expressions by the aforementioned unit vectors i, j and k:

$$B11 = \frac{3}{4}PH \cdot i \tag{43}$$

$$B12 = B13 = -\frac{1}{4}PV \cdot j \tag{44}$$

It can be seen from the above expressions that the separation vector B11 of the birefringence plate 221 is parallel with the horizontal direction H and the separation vectors B12 and B13 of the birefringence plates 222 and 223 are parallel with the vertical direction V.

The separation vectors B14 and B15 of the birefringence plates 224 and 225 will be explained with reference to FIG. 47. FIG. 47 is a graph showing a HV plane which is the same with FIGS. 46d and 46e. A reference axial line L1 is the extension of the separation vector B11 of the birefringence plate 221 and is parallel with the horizontal direction H. An angle θ1 formed between the extension L2 of the separation vectors B14 and B15 and the reference axial line L1 may be represented by the following expression:

$$\theta 1 = \tan^{-1}\left\{\frac{PV/2}{3PH/4}\right\} \tag{45}$$

The angle θ1 is 33.7° when the imaging device is a square grid type imaging device and the values of the array periods PH and PV of the photo-receiving domains PD are equal. The imaging device having such array periods is an imaging device having an array of photo-receiving domains PD of 640 rows and 480 columns for example and corresponding to the NTSC system.

The separation length of these birefringence plates 221 through 225 are 3PH/4, PV/4, PV/4, √{(3PH/8)²+(PV/4)²} and √{(3PH/8)²+(PV/4)²}, respectively. The behaviors of ordinary and extraordinary rays within the birefringence plates 221 through 225 are the same with their behaviors within the birefringence plates 91 through 93 of the variable spatial filter 90, except of the orientation of the separation vector and the separation length.

Further, the optical rotary plate 226 turns and displaces the plane of polarization representing the polarizing direction of incident light by an angle θ2 in the direction indicated by an arrow 228 in FIG. 47. The angle θ2 may be expressed as follows:

$$\theta 2 = 45° - \theta 1 \tag{46}$$

The angle θ2 is an angle formed between a reference axial line L3 which crosses with the reference axial line L1 with an angle of 45 degrees and the extension L2 of the above-mentioned separation vectors B14 and B15.

Figures 46A, 46B, 46C, 46D, 46E:
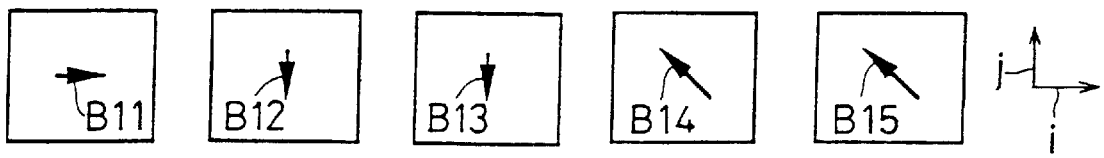
FIGS. 46A through 46E are diagrams showing separation vectors B11 through B15 of birefringence plates 221 through 225 of the variable spatial filter in a first state.
Figure 47:
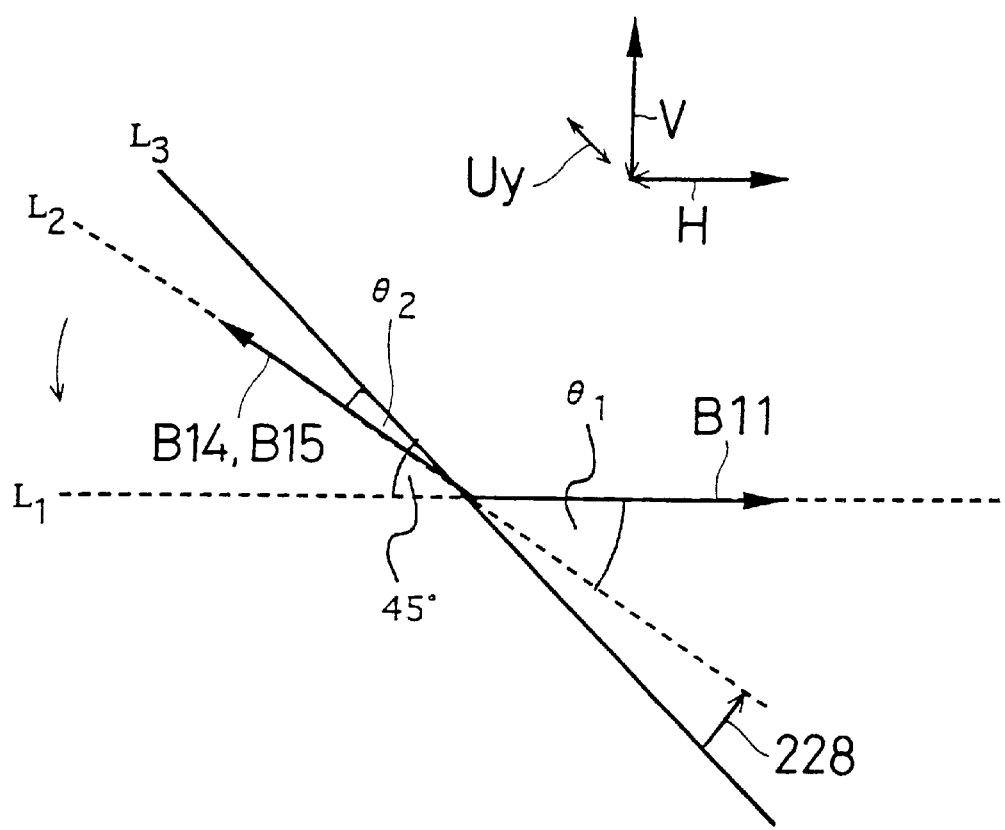
FIG. 47 is a diagram showing the relationship among the separation vectors B11, B14 and B15 of the birefringence plates 221, 224 and 225.

When the above-mentioned variable spatial filter 220 is in the first state, the birefringence plates 223 and 225 are kept such that the separation vectors assume the states shown in FIGS. 46C and 46E. The behavior of the picture image light passing through the variable spatial filter 220 at this time will be explained below with reference to FIGS. 48A through 48E.

FIGS. 48A through 48E are diagrams of imaginary image forming planes showing positions where the ordinary and extraordinary rays of the picture image light have passed through the birefringence plates 221 through 225 in the variable spatial filter 220 of the first state. The setting of the imaginary image forming planes is the same with the imaginary image forming plane shown in FIG. 9, except of the intervals of the axial lines of the grid, and it is dealt in the same manner. The axial lines of the grid drawn on each imaginary image forming planes are arrayed at intervals of 3PH/8 and PV/4 in the horizontal and vertical directions H and V, respectively.

In the variable spatial filter 220 in the first state, the intersection of the optical axis of the picture image light before entering the filter with the imaginary image forming plane is assumed to be Coordinate (3, 3). When this picture image light is inputted to the birefringence plate 221, it is separated into ordinary and extraordinary rays to the birefringence plate 221. The intersection of the optical axis of the ordinary ray on the output side with the imaginary image forming plane is Coordinate (3, 3). The optical axis of the extraordinary ray on the output side is shifted in the same orientation and by the same length with the separation vector B11 seeing from the extension of the optical axis on the incident side and the Intersection of the optical axis is Coordinate (3, 5).

The pair of ordinary and extraordinary rays are inputted to the birefringence plate 222 respectively from the same coordinates. Because the separation vectors B11 and B12 of the birefringence plates 221 and 222 cross each other at right angles, the ordinary and extraordinary rays of the birefringence plate 221 turn out to be extraordinary and ordinary rays to the birefringence plate 222, respectively. Therefore, the ordinary ray of the birefringence plate 221 at Coordinate (3, 3) turns out to be the extraordinary ray of the birefringence plate 222 and its optical axis is moved in the same direction and by the same length with the separation vector B12, seeing from the extension of the optical axis at Coordinate (3, 3). Accordingly, the intersection of the optical axis of the ordinary ray of the birefringence plate 222 is located at Coordinate (4, 3). Similarly, because the extraordinary ray of the birefringence plate 221 at Coordinate (3, 5) turns out to be the ordinary ray of the birefringence plate 222, it passes through the birefringence plate 222 as it is. Therefore, the intersection of the optical axis of the ordinary ray of the birefringence plate 222 is located at Coordinate (3, 5).

The pair of ordinary and extraordinary rays are inputted to the birefringence plate 223 respectively from the same coordinates. Because the separation vectors B12 and B13 of the birefringence plates 222 and 223 are parallel, the ordinary and extraordinary rays of the birefringence plate 222 turn out to be ordinary and extraordinary rays to the birefringence plate 223 as they are. Therefore, because the ordinary ray of the birefringence plate 222 at Coordinate (3, 5) turns out to be ordinary ray of the birefringence plate 223, it passes through the birefringence plate 223 as it is. Therefore, the intersection of the optical axis of the ordinary ray of the birefringence plate 223 is located at Coordinate (3, 5). The extraordinary ray of the birefringence plate 222 at Coordinate (4, 3) turns out to be the extraordinary ray of the birefringence plate 223 and its optical axis is moved in the same direction and by the same length with the separation vector B13, seeing from the extension of the optical axis at Coordinate (4, 3). Accordingly, the intersection of the optical axis of the extraordinary ray of the birefringence plate 223 is located at Coordinate (5, 3).

This pair of ordinary and extraordinary rays are inputted to the optical rotary plate 226 respectively from the same coordinates. The optical rotary plate 226 turns and displaces the plane of polarization of the above-mentioned ordinary and extraordinary rays from the original plane of polarization respectively only by the angle θ2 and outputs them. Because the optical axes of the ordinary and extraordinary rays are not moved in parallel at this time, the intersection of the optical axis of each keeps the position before entering the optical rotary plate 226.

The pair of ordinary and extraordinary rays are inputted to the birefringence plate 224 respectively from Coordinates (3, 5) and (5, 3). Because the plane of polarization has been rotated and displaced by the optical rotary plate 226, an angle formed between each polarizing plane of the above-mentioned ordinary and extraordinary rays and the extension L3 of the separation vector B14 of the birefringence plate 224 is 45 degrees. Thereby, the above-mentioned ordinary and extraordinary rays are separated into ordinary and extraordinary rays to the birefringence plate 224 with the same intensity, respectively.

Among the ordinary and extraordinary rays of the birefringence plate 223, the ordinary ray to the birefringence plate 224 passes through the birefringence plate 224 as it is, so that the intersections of the optical axes thereof are located at Coordinates (3, 5) and (5, 3). Further, the optical axes of the extraordinary rays to the birefringence plate 224 of the ordinary and extraordinary rays of the birefringence plate 223 are moved in the horizontal direction H by a length 3PH/8 and in the vertical direction V by a length PV/4 of separation length, i.e. in the same direction and by the same length with the separation vector B14, seeing from the extension of the optical axis at Coordinates (3, 5) and (5, 3), respectively, and the intersections of the optical axes thereof are located at Coordinates (2, 4) and (4, 2), respectively.

The two pairs of ordinary and extraordinary rays are inputted to the birefringence plate 225 from the above-mentioned coordinates. Because the separation vectors B14 and B15 of the birefringence plates 224 and 225 are the same, the ordinary and extraordinary rays of the birefringence plate 224 turn out to be ordinary and extraordinary rays to the birefringence plate 225 as they are. Therefore, because the ordinary rays of the birefringence plate 224 at Coordinates (3, 5) and (5, 3) turn out to be the ordinary rays of the birefringence plate 225, they pass through the birefringence plate 225 as they are. Therefore, the intersections of the optical axes of the ordinary rays of the birefringence plate 225 are located at Coordinates (3, 5) and (5, 3). Further, the extraordinary rays of the birefringence plate 224 at Coordinates (2, 4) and (4, 2) turn out to be the extraordinary rays of the birefringence plate 225 and the optical axes thereof are moved in the horizontal direction H by the length 3PH/8 and in the vertical direction V by the length PV/4 of separation length, i.e. in the same direction and by the same length with the separation vector B15, seeing from the extension of the optical axis before the input. Therefore, the intersections of the optical axes of the extraordinary rays of the birefringence plate 225 are located at Coordinates (3, 1) and (1, 3).

The picture image light which has passed sequentially through the birefringence plates 221 through 225 is separated into the two pairs of ordinary and extraordinary rays as described above. The intersections of the optical axes of the ordinary and extraordinary rays with the imaginary image forming plane are separated in the horizontal direction H by an interval 3PH/4 and in the vertical direction V by an interval PV/2 per each pair represented by white and black circles and each pair represented by white and black squares, respectively. As for the picture image light thus separated, a transfer function H1(fh, fv) of the spatial frequency (fh, fv) representing the first decrement may be expressed as follows:

$$H1(fh,fv)=F[¼δ(h−¾PH, v)+¼δ(h+¾PH, v)+¼δ(h, v−½PV)+¼δ(h, v+½PV)] \quad (47)$$

In the above expression, "h" denotes the spatial coordinate in the horizontal direction H, "v" denotes the spatial coordinate in the vertical direction V, "δ(h, v)" denotes a two-dimensional δ function of the spatial coordinate (h, v) and "F" denotes a Fourier transformation, respectively. It can be seen from this expression that the variable spatial filter 220 in the first state damps the amplitude of the component of the spatial frequency so that the response of the component satisfying the following expression is eliminated among the components of the spatial frequency (fh, fv) of the picture image light:

$$\pm \frac{3}{2} fV \cdot fh - fH \cdot fv \pm fH \cdot fV = 0 \quad (48)$$

The signs of the first and third terms of the above expression may be combined regardless of the order of the description and there exists four ways of combination.

Considering the spatial frequency axes in particular, the response of the component of a spatial frequency ±2fH/3 on the spatial frequency axis in the horizontal direction is eliminated and the response of the component of a spatial frequency ±fV on the spatial frequency axis in the vertical direction is eliminated. Further, the response of those components appropriate to the imaginary line connecting (±2fH/3, 0) and (0, ±fV) is eliminated within the first and second quadrants of the spatial frequency plane.

Figure 49A:
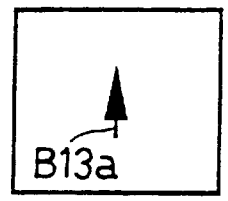
FIGS. 49A and 49B are diagrams showing separation vectors B13a through B15a of the birefringence plates 223 and 225 of the variable spatial filter in a second state.
Figure 49B:
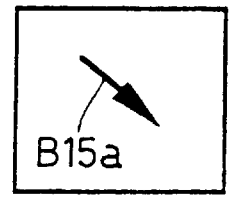

When the variable spatial filter 220 described above is in the second state, the birefringence plates 223 and 225 are angularly displaced by 180 degrees from the first state and the separation vectors B13a and B15a are kept in the states shown in FIGS. 49A and 49B. These separation vectors B13a and B15a are parallel with and orient in the opposite direction from the separation vectors B13 and B15 in the first state on the HV plane.

Figures 50A, 50B, 50C:
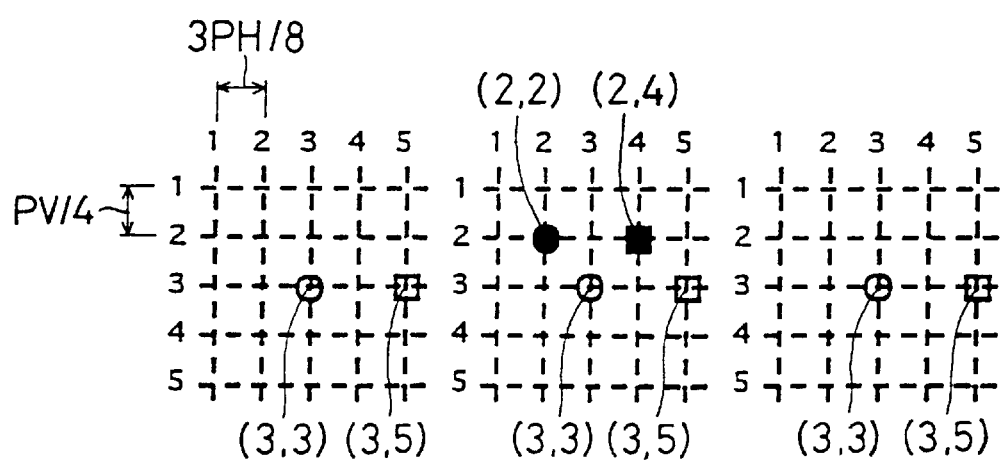
FIGS. 50A through 50C are diagrams showing an imaginary image forming plane indicating image forming positions of the picture image light which has passed through the birefringence plates 223 through 225 of the variable spatial filter 200 in the second state.

The behavior of the picture image light passing through the variable spatial filter 220 at this time will be explained below with reference to the imaginary image forming planes shown in FIGS. 48A and 48B and FIGS. 50A, 50B and 50C. The image forming plane shown in FIG. 50 is the same with the image forming plane shown in FIG. 48C through 48E, except of the position of the intersection of the optical axis of the picture image light, and is dealt in the same manner.

In the variable spatial filter 220 in the second state, the intersection of the optical axis of the picture image light before entering the filter with the imaginary image forming plane is assumed to be Coordinate (3, 3). The behaviors of the picture image light in passing through the birefringence plates 221 and 222 are the same with that in the first state, so that its explanation will be omitted here.

The ordinary ray at Coordinate (3, 5) and the extraordinary ray at Coordinate (4, 3) to the birefringence plate 222 enter the birefringence plate 223 from the same coordinates. While the separation vectors B12 and B13a of the birefringence plates 222 and 223 are parallel each other, their orientation is opposite from each other. Therefore, the ordinary and extraordinary rays of the birefringence plate 222 turn out to be ordinary and extraordinary rays to the birefringence plate 223 as they are.

Accordingly, the ordinary ray of the birefringence plate 222 at Coordinate (3, 5) is output as the ordinary ray of the birefringence plate 223 and the intersection of the optical axis thereof is located at Coordinate (3, 5). The extraordinary ray of the birefringence plate 222 at Coordinate (4, 3) turns out to be the extraordinary ray of the birefringence plate 223 and the optical axis thereof is moved in the direction of the separation vector B13a along the vertical direction V by the separation length PV/4, seeing from the extension of the optical axis at Coordinate (4, 3). The intersection of the optical axis of the extraordinary ray is at Coordinate (3, 3). The ordinary and extraordinary rays are inputted to the birefringence plate 224 while keeping the positions of the intersections of the optical axes after turning and displacing the polarizing plane thereof by the angle θ2 by the optical rotary plate 226.

The pair of ordinary and extraordinary rays are separated into and output as the ordinary and extraordinary rays to the birefringence plate 224 with the same intensity similarly to the first state. The intersections of the optical axes of the ordinary and extraordinary rays of the birefringence plate 223 after outputting the ordinary ray to the birefringence plate 224 are at Coordinates (3, 5) and (3, 3). The optical axis of the extraordinary ray to the birefringence plate 224 of the ordinary and extraordinary rays of the birefringence plate 223 are moved in the direction of the separation vector B14 by the above-mentioned separation length seeing from the extension of the optical axis at Coordinates (3, 5) and (3, 3), respectively, and their coordinates are Coordinates (2, 4) and (2, 2).

The two pairs of ordinary and extraordinary rays are inputted to the birefringence plate 225 from the above-mentioned coordinates. The separation vectors B14 and B15a of the birefringence plates 224 and 225 are parallel each other and have the same length, though their orientation is opposite from each other. Accordingly, the ordinary and extraordinary rays of the birefringence plate 224 turn out to be an ordinary ray and an extraordinary ray to the birefringence plate 225 as they are.

Therefore, the ordinary ray of the birefringence plate 224 at Coordinates (3, 5) and (3, 3) is output as the ordinary ray of the birefringence plate 225 and the intersection of the optical axis thereof is Coordinates (3, 5) and (3, 3). The extraordinary ray of the birefringence plate 224 at Coordinate (2, 4) and (2, 2) turns out to be the extraordinary ray of the birefringence plate 225 and the optical axis thereof is moved in the direction of the separation vector B15a by the above-mentioned separation length seeing from the extension of the optical axis before the input. The intersection of the optical axis of the extraordinary ray is at Coordinates (3, 5) and (3, 3).

When the separation vectors B12 and B13a of the birefringence plates 222 and 223 and the separation vectors B14 and B15a of the birefringence plates 224 and 225 are parallel, the length thereof are the same and the orientation is opposite from each other as described above, the intersections of the optical axes of the ordinary and extraordinary rays to the birefringence plates 222 and 224 coincide after passing through the birefringence plates 223 and 225. Thereby, the light separating effect in the birefringence plates 222, 223; 224, 225 is canceled. Accordingly, the state of separation of the picture image light after passing through the birefringence plate 225 returns to the state right after passing through the birefringence plate 221.

The picture image light which has passed sequentially through the birefringence plates 221 through 225 as described above is separated into a pair of ordinary and extraordinary rays. The intersections of the optical axes of the ordinary and extraordinary rays with the imaginary image forming plane are separated in parallel to the horizontal direction H by the interval 3PH/4. With respect to the picture image light thus separated, a transfer function H2(fh, fv) of the spatial frequency (fh, fv) representing the second decrement may be expressed as follows:

$$H2(fh,fv)=F[½δ(h-⅜PH, v)+½δ(h+⅜PH, v)] \qquad (49)$$

From the result, it can be seen that the amplitude of the spatial frequency component is damped so that the response of only the component of the spatial frequency ±2fH/3 is eliminated among the spatial frequency components of the picture image light.

The imaging operations of the imaging apparatus having such a structure in the normal and high resolution modes will be explained below.

The operation for imaging the picture image light in the normal mode is similar to the operation for imaging the picture image light in the normal mode described in the first embodiment and the behaviors of the optical system, the circuits 35 and 36 and the picture image memory 37 are the same with those in the second embodiment. The behavior of the above-mentioned imaging device is almost the same with that of the imaging device 131 in FIG. 17. The signal processing circuit 44 finds a luminance signal and two kinds of color difference signals of the first output picture image signal from a signal original picture image signal. For instance, luminance data Y(2, 4), color difference data (R–Y)(2, 4) and (B–Y)(2, 4) of the picture element D(2, 4) at the second row and the fourth column corresponding to the light-transmitting domain L (2, 4) in FIG. 44 may be expressed as follows. It is noted that the picture element D(2, 4) is a corresponding picture element for only red received light data.

$$Y(2,4)=0.30·R(2,4)+0.59·⅓\{G(1,3)+G(2,6)+G(3,3)\}+0.11·⅓\{B(1,5)+B(2,2)+B(3,5)\} \qquad (50)$$

$$(R-Y)(2,4)=0.70·R(2,4)-0.59·⅓\{G(1,3)+G(2,6)+G(3,3)\}-0.11·⅓\{B(1,5)+B(2,2)+B(3,5)\} \qquad (51)$$

$$(R-Y)(2,4)=-0.30·R(2,4)-0.59·⅓\{G(1,3)+G(2,6)+G(3,3)\}+0.89·⅓\{B(1,5)+B(2,2)+B(3,5)\} \qquad (52)$$

The luminance data Y may be directly found separately per each picture element D. Therefore, the corresponding picture elements of the original picture image is the actual picture elements of all the luminance data, the number and array of the actual picture elements of the luminance signal of the first output picture image signal is equal to the number and array of the corresponding picture elements of the original picture image.

It can be seen from FIG. 44 that the array periods of the array of all the corresponding picture elements of the original picture image in the horizontal and vertical directions H and V are the periods Ph/2 and PV, respectively. It is assumed from this fact that sampling frequencies of the luminance signal of the first output picture image signal in the horizontal and vertical directions H and V are spatial frequencies 2fH and fV, respectively. Further, it can be seen from FIG. 44 that the array periods of the array of only the same kind of corresponding picture elements in the horizontal and vertical directions H and V are periods 3PH/2 and PV, respectively. It is assumed from this fact that the sampling frequencies of the color difference signal in the horizontal and vertical directions H and V are spatial frequencies 2fH/3 and fV, respectively. Further, the corresponding picture elements of each chromatic light are arrayed periodically at intervals of a length 3PH/2 in the horizontal direction H and of a length PV/2 in the vertical direction V. The lowest frequency among the sampling frequencies in the diagonal direction of this array is represented as (±fH/3, ±fV/2) by using the spatial frequencies fH and fV. The direction parallel to the spatial axis with respect to this sampling frequency will be referred to as a second diagonal direction Uα.

Figure 51:
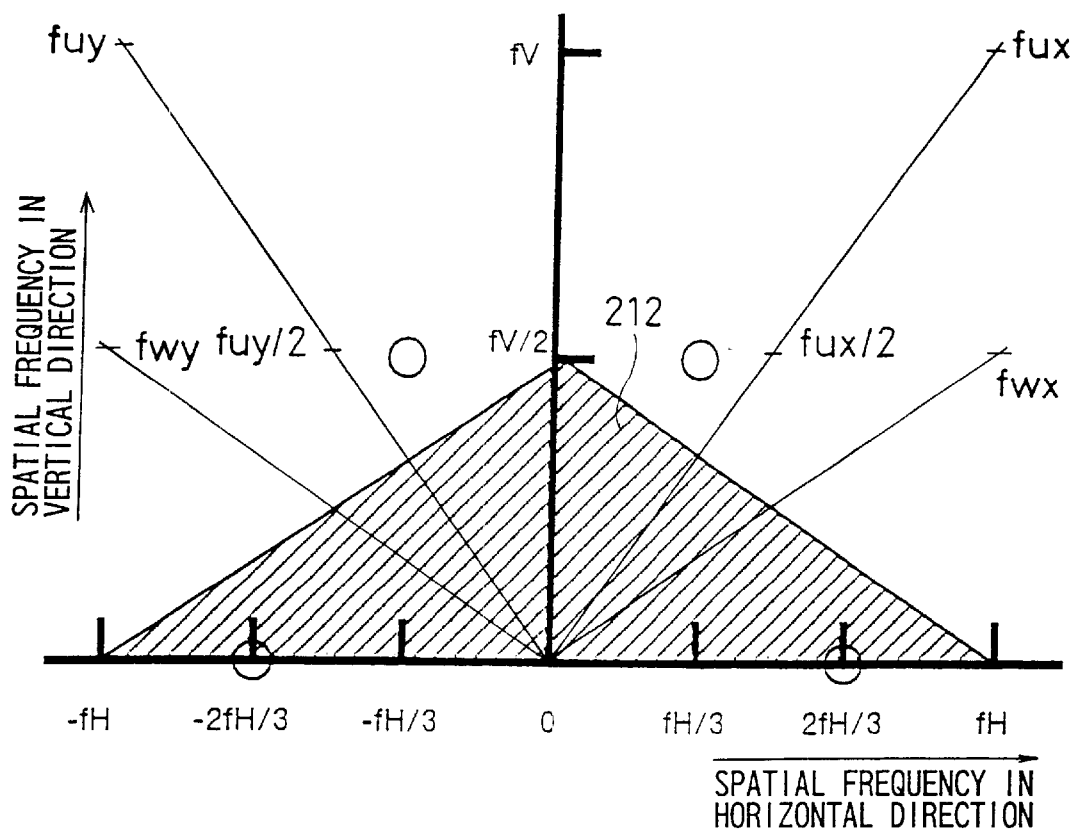
FIG. 51 is a spatial frequency plan view showing a normal band 212 of luminance of a first output picture image signal and carrier frequencies of Moire of the color difference signal of the imaging apparatus of the seventh embodiment.

FIG. 51 is a spatial frequency plan view showing a normal band 212 of luminance of the first output picture image signal described above and positions of carrier frequency of Moire of the color difference signal. The range of the normal band 212 of luminance on the spatial frequency axes in the horizontal and vertical directions H and V may be expressed as follows:

$$-fH \leq f \leq fH \qquad (53)$$

$$(-fV/2) \leq f \leq (fV/2) \qquad (54)$$

Accordingly, the normal band 212 of luminance of the first and second quadrants is a triangular area having the three vertexes:
(–fH, 0)
(fH, 0)
(0, fV/2)

The carrier frequencies of Moire of the color difference signal appearing within the normal band 212 exist at the following two locations:
(–2fH/3, 0)
(2fH/3, 0)

Carrier frequencies of Moire of the color difference signal appearing by the sampling frequencies (fH/3, fV/2) in the second diagonal direction Ua described above appear at the following two spots near the normal band 212:
(–fH/3. fV/2)
(fH/3. fV/2)

The first decrement of the variable spatial filter 220 in the first state described above is set so as to damp the spatial frequency component near the spatial frequencies (±2fH/3, 0) (±fH/3, ±fV/2) and (0, ±fV) within the normal band 212. Thereby, the amplitude of the desired signal component of the normal band 212 in the horizontal direction H is limited so that it is zeroed at the part of the spatial frequency ±fH/3 in the horizontal direction H. Due to that, the substantial width of the normal band 212 on the spatial frequency axis in the horizontal direction H is reduced to be less than the spatial frequency ±fH/3. Further, the substantial width of the normal band 212 in the vertical direction V is also reduced to be less than the spatial frequency ±fV/2. Thereby, the substantial resolution of the first output picture image in the horizontal and vertical directions H and V is lowered by that than the ideal resolution estimated from the normal band 212.

The operation for imaging the picture image light in the high resolution mode is similar to the operation for imaging the picture image light in the high resolution mode in the first embodiment and the behaviors of the optical system, the circuits 35 and 36 and the picture image memory 37 are the same with those in the second embodiment. The behavior of the above-mentioned imaging device is almost the same with that of the imaging device 131. At this time, the image shifting mechanism 62 moves the image forming point of the picture image light to the following two spots.

Figure 52:
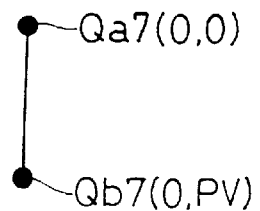
FIG. 52 is a diagram showing the positional relationship between the first and second image forming positions of the picture image light on the image forming plane of the imaging device in the high resolution mode of the seventh embodiment.

FIG. 52 is a diagram showing the positional relationship between the first and second image forming positions in imaging the picture image light in the above-mentioned high resolution mode. Based on the first image forming position Qa7, the second image forming position Qb7 is separated by-the length PV of the array period of the photo-receiving domains PD in the vertical direction V. The imaginary reference axial line of the image shifting mechanism 62 and the inclination of the refracting plate 71 in the second state are set so that those image forming positions take the above-mentioned positional relationship.

The signal processing circuit 44 generates a composite picture image signal from the first and second original picture image signals by the same method with the second embodiment. The composite picture image is composed of M×2N corresponding picture elements D which are arrayed in M rows and 2N columns. The array periods of the picture elements of the composite picture image in the horizontal and vertical directions H and V are periods Ph/2 and PV, respectively.

Figure 53:
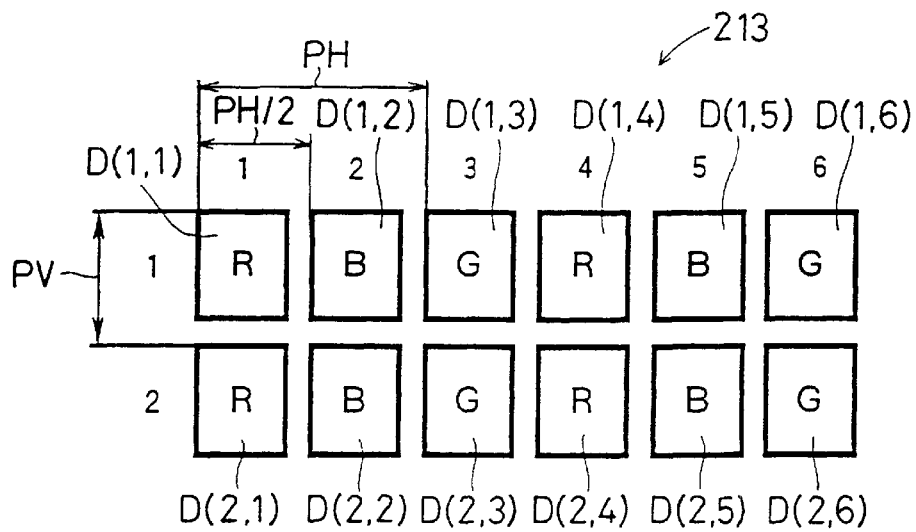
FIG. 53 is a diagram showing an equivalent basic array pattern 213 of the array of picture elements D of a composite picture image in the high resolution mode in the imaging apparatus of the seventh embodiment.

FIG. 53 is a diagram showing an equivalent basic array pattern 213 of an array of picture elements D of the composite picture image which is represented by the above-mentioned composite picture image signal. The basic array pattern 213 is composed of 12 picture elements arrayed in two rows and six columns. The picture elements D(1, 1), D(1, 4), D(2, 1) and D(2, 4) are corresponding picture elements of red received light data. The picture elements D(1, 3), D(1, 6), D(2, 3) and D(2, 6) are corresponding picture elements of green received light data. The picture elements D(1, 2), D(1, 5), D(2, 2) and D(2, 5) are corresponding picture elements of blue received light data. It can be seen from this fact that the array of picture elements of the composite picture image is the same with the basic array of picture elements of the original picture image and that the picture elements which have been imaginary picture elements in the original picture image all turn out to be corresponding picture elements.

The signal processing circuit 44 finds a luminance signal and two kinds of color difference signals of the second output picture image signal from the composite picture image signal. For instance, luminance data Y(2, 4) and color difference data (R−Y)(2, 4) and (B−Y)(2,4) of the picture element D(2, 4) in the second row and the fourth column may be represented by the following expressions. It is noted that the picture element D(2, 4) is a corresponding picture element of only red received light data:

$Y(2,4)=0.30·R(2,4)+0.59·⅓\{2·G(2,3)+G(2,6)\}+0.11·⅓\{B(2,2)+2·B(2,5)\}$ (55)

$(R−Y)(2,4)=0.70·R(2,4)−0.59·⅓\{2·G(2,3)+G(2,6)\}−0.11·⅓55\ B(2,2)+2·B(2,5)\}$ (56)

$(B−Y)(2,4)=−0.30·R(2,4)−0.59·⅓\{2·G(2,3)+G(2,6)\}+0.89·⅓\{2·B(2,2)+B(2,5)\}$ (57)

The luminance data Y may be directly found separately per only each corresponding picture element D of the composite picture Image. Therefore, the picture elements D of the composite picture image turn out to be the actual picture elements of all the luminance data, so that a number and array of the actual picture elements of the luminance signal of the first output picture image signal are equal to the number and array of the picture elements D of the composite picture image.

It can be seen from FIG. 53 that the array periods of the array of all the corresponding picture elements of the composite picture image in the horizontal and vertical directions H and V are the periods Ph/2 and PV, respectively. It is assumed from this fact that sampling frequencies of the luminance signal of the second output picture image signal in the horizontal and vertical directions H and V are the spatial frequencies 2fH and fV, respectively. Further, it can be seen from FIG. 53 that the array periods of the array of only the same kind of corresponding picture elements in the horizontal and vertical directions H and V are the periods 3PH/2 and PV, respectively. It is assumed from this fact that the sampling frequencies of the color difference signal in the horizontal and vertical directions H and V are the spatial frequencies 2fH/3 and fV, respectively. Further, it can be seen from FIG. 53 that the array period with respect to the above-mentioned second diagonal direction Uα has become a half.

Figure 54:
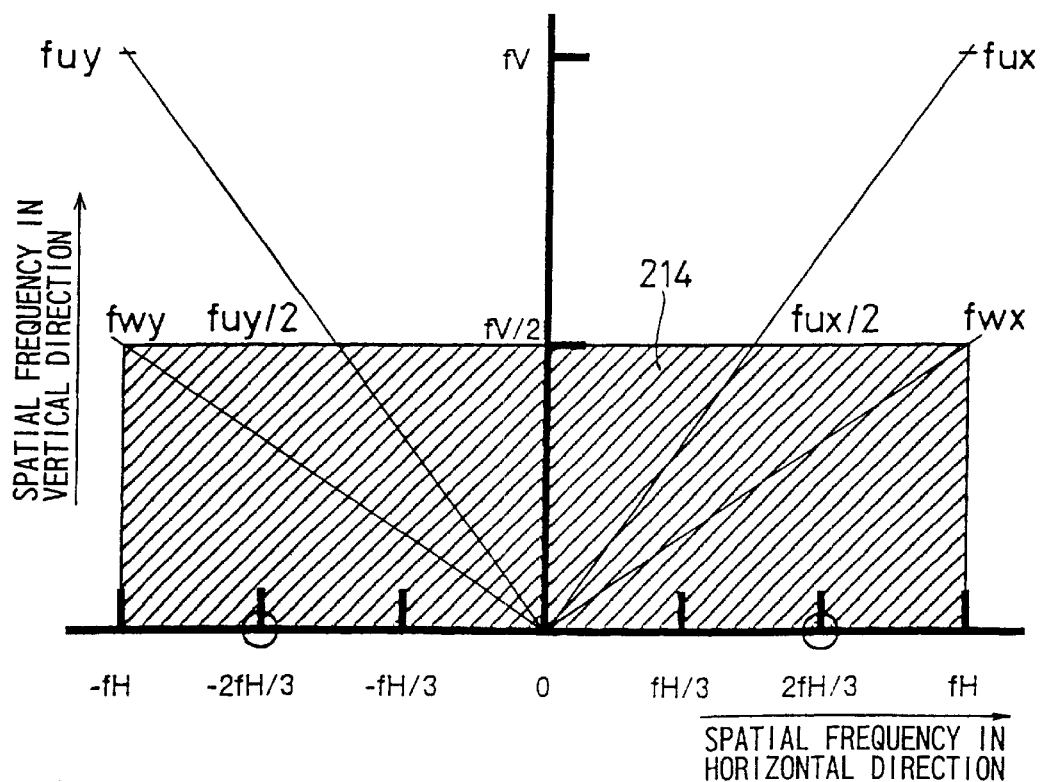
FIG. 54 is a spatial frequency plan view showing a normal band 214 of luminance of a second output picture image signal and carrier frequencies of Moire of the color difference signal of the imaging apparatus of the seventh embodiment.

FIG. 54 is a spatial frequency plan view showing a normal band 214 of luminance of the second output picture image signal described above and positions of carrier frequency of Moire of the color difference signal. The range of the normal band 214 of luminance on the spatial frequency axes in the horizontal and vertical directions H and V is equal to each range of the normal band 211 of luminance of the first output picture image signal and may be expressed as follows:

$-fH \leq f \leq fH$ (53)

$(-fV/2) \leq f \leq (fV/2)$ (54)

Consider also third diagonal directions Wx and Wy. The third diagonal directions Wx and Wy are directions specified by composition of two basic vectors which are parallel with the horizontal and vertical directions H and V, respectively, and their size is a half of the array periods PH and PV, respectively. The array periods PWx and PWy of the third diagonal directions Wx and Wy may be expressed as follows:

$$PWx = PWy = \frac{2PH \cdot PV}{\sqrt{(PH^2 + 4PV^2)}}$$ (58)

Sampling frequencies fwx and fwy of the picture image light in the third diagonal directions Wx and Wy are inverse number of the array periods PWx and PWy in the above expression:

$$fwx = fwy = \frac{\sqrt{(PH^2 + 4PV^2)}}{2PH \cdot PV}$$ (59)

With respect to the third diagonal directions Wx and Wy, the range on the spatial frequency axes in that directions is doubled in the high resolution mode. Therefore, the normal band 214 of luminance in the first and second quadrants turns out to be a rectangular area having the following four vertexes:

(−fH, 0)
(fH, 0)
(−fH, fV/2)
(fH, fV/2)

The carrier frequencies of Moire of the color difference signal appearing within the normal band 214 exist at the following two locations:

(−2fH/3, 0)
(2fH/3, 0)

The second decrement of the variable spatial filter 220 in the first state described above is set so as to damp the spatial frequency component near the spatial frequency ±2fH/3. Thereby, the amplitude of the desired signal component of the normal band 214 in the horizontal direction H is limited so that it is zeroed at the part of the spatial frequency ±2fH/3 in the horizontal direction H. Due to that, the substantial width of the normal band 214 on the spatial frequency axis in the horizontal direction H is reduced to be less than the spatial frequency ±2fH/3.

Because the carrier frequency of Moire appearing at (±fH/3, fV/2) has disappeared in the second output picture image signal, Moire which is centered on this carrier frequency disappears. Thereby, it becomes unnecessary to limit the spatial frequency component in the vertical direction V, so that the substantial width of the normal band 214 may be expanded to the whole range of the normal band. Due to that, the resolution of the second output picture image in the vertical direction V is improved more than that of the first output picture image.

An imaging apparatus of an eighth embodiment of the present invention will be explained below. The structure of the components of the imaging apparatus of the present embodiment is the same with the imaging apparatus of the seventh embodiment, except of the optical system and the color filter, so that the same components will be denoted by the same reference numerals and an explanation thereof will be omitted here. Using the whole picture element reading type imaging device, the imaging apparatus of the present embodiment images the picture image light in the normal and high resolution modes and obtains first and second output picture image signals whose resolution is different.

In the optical system, although the internal structure of the image shifting mechanism 62 and the variable spatial filter 220 is the same, its setting is different. The image shifting mechanism 62 will be described later. The variable spatial filter 220 is set so that the separation vector B11 of the birefringence plate 221 is parallel with the vertical direction V. Thereby, the variable spatial filter 220 in the first state damps the amplitude of the spatial frequency component so that the response of the component satisfying the following expression is eliminated among the spatial frequencies (fh, fv) of the picture image light:

$$\pm fV \cdot fh - \frac{3}{2} fH \cdot fv \pm fH \cdot fV = 0 \qquad (60)$$

The signs of the first and third terms may be combined regardless of the order of description and there exists four ways of combination.

Considering the spatial frequency axes in particular, the response of the component of a spatial frequency ±fH on the spatial frequency axis in the horizontal direction H is eliminated and the response of the component of a spatial frequency ±2fV/3 on the spatial frequency axis in the vertical direction V is eliminated. Further, the variable spatial filter 220 in the second state eliminates the response of the component of the spatial frequency ±2fV/3 among the spatial frequency components in the vertical direction V.

Although the color filter is the same with the color filter of the seventh embodiment with respect to the location where it is disposed, the combination of transmissible chromatic lights, and the number of the light-transmitting domains L, it is different in terms of the array of the light-transmitting domains L and the array of colors. The first through third chromatic lights are three primary colors of red, blue and green. The array periods in the horizontal and vertical directions H and V of the light-transmitting domains L are periods PH and PV/2, respectively.

Figure 55:
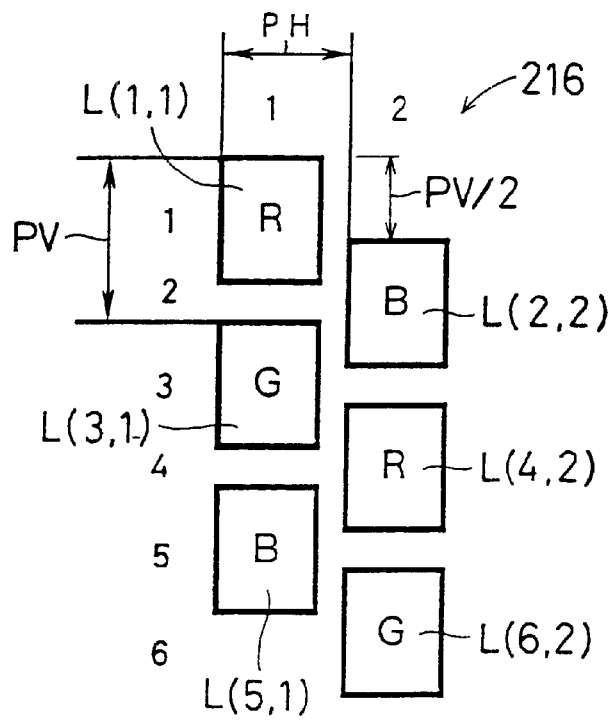
FIG. 55 is a diagram showing a basic array pattern 216 of an array of colors of light-transmitting domains L of a color filter in an imaging apparatus of an eighth embodiment.

FIG. 55 is diagram showing a basic array pattern 216 of the array of colors of the light-transmitting domains L of the above-mentioned color filter. This basic array pattern 216 is composed of six light-transmitting domains L and contains the same kind of light-transmitting domains L by two each. The light-transmitting domains L are equivalent to an array in which each light-transmitting domain L of two adjacent columns are arrayed while slipping off by a length PV/2 in dice in the basic array of six rows and two columns.

In the basic array pattern 216, the light-transmitting domains L(1, 1) and L(4, 2) are red light-transmitting domains L which transmit red chromatic light. The light-transmitting domains L(3, 1) and L(6, 2) are green light-transmitting domains L. The light-transmitting domains L(5, 1) and L(2, 2) are blue light-transmitting domains L. The basic array pattern 216 is an array in which only the array of row and column and the array of colors of the light-transmitting domains L of the basic array pattern 211 of the color filter of the imaging apparatus of the seventh embodiment is replaced with respect to the horizontal and vertical directions H and V while keeping the array periods of the horizontal and vertical directions H and V.

The photo-receiving domains PD of the imaging device of the present embodiment are arrayed on the image forming plane with an array equivalent to the array of the actual light-transmitting domains L of the color filter. This is the array in which the arrangement of the rows and columns of the array of the photo-receiving domains PD of the imaging device in the seventh embodiment is replaced with respect to the horizontal and vertical directions H and V while keeping the array periods of the horizontal and vertical directions H and V.

The imaging device images the picture image light to be formed via the color filter and outputs the original picture image signal. The array of the picture elements of the original picture image signal and the correspondence of each picture element with received light data are equivalent to the array of the light-transmitting domains L and the array of colors of the color filter and each corresponding picture element has received light data of a single chromatic light.

The operation of the above-mentioned imaging apparatus for imaging the picture image light in the normal mode is similar to the operation for imaging the picture image light in the normal mode of the seventh embodiment and the behaviors of the optical system, the imaging device, the circuits 35 and 36 and the picture image memory 37 are the same with those of the fifth embodiment. The signal processing circuit 44 finds a luminance signal and two kinds of color difference signals of the first output picture image signal from the single original picture image signal. Calculation expressions of this case are the same with the expressions (50) through (52) described above except of that the numbers of row and column of the corresponding picture element are replaced with respect to the row and column. A spatial frequency plan view showing the normal band of luminance of the first output picture image signal and the carrier frequency of Moire thus obtained is a graphic line-symmetrical to FIG. 51 about the spatial frequency axis in the first diagonal direction Ux. Therefore, it is equal to a graph in which only the spatial frequency axes in the horizontal and vertical directions H and V in the spatial frequency plan view in FIG. 51 are replaced.

It can be seen from this graph that although there exists no carrier frequency of Moire on the spatial frequency axis in the horizontal direction H, there exist carrier frequencies of Moire at the nearby spatial frequencies (±fH/2, fV/3). Therefore, the substantial width of the normal band in the horizontal direction H is reduced to be less than the spatial frequency ±fH/2 on the spatial frequency axis in the horizontal direction H. Further, it can be seen that there exist a carrier frequency of Moire on the spatial frequency ±2fV/3 on the spatial frequency axis in the vertical direction V. Therefore, the substantial width of the normal band in the vertical direction V of the first output picture image signal is limited to be less than the spatial frequency ±2fV/3. Therefore, the resolution in the vertical direction V of the first output picture image of the present embodiment in the normal mode is improved as compared to the first output picture image in the seventh embodiment.

The operation of the imaging apparatus of the present embodiment for imaging the picture image light in the high resolution mode is similar to the operation for imaging the picture image light in the high resolution mode of the seventh embodiment and the behaviors of the optical system, the imaging device, the circuits 35 and 36 and the picture image memory 37 are the same with those of the seventh embodiment. At this time, the first and second image forming positions of the picture image light keep the positional relationship in which they are separated from each other in the horizontal direction H by a length PH. The imaginary reference axial line of the refracting plate 71 of the image shifting mechanism 62 and the inclination of the refracting plate 71 in the second state are set by replacing the horizontal and vertical directions H and V of each member as compared to the setting of the seventh embodiment so as to be able to move the optical axis of the picture image light in parallel in correspondence to the positional relationship.

The equivalent basic array pattern of the array of picture elements of a composite picture image signal generated by the signal processing circuit 44 is similar to the basic array pattern 213 in FIG. 53, in which only the array of row and column and the array of colors are replaced with respect to the horizontal and vertical directions H and V while keeping the array periods of the horizontal and vertical directions. The signal processing circuit 44 finds a luminance signal and two kinds of color difference signals of the second output picture image signal from the composite picture image signal. Calculation expressions in this case are the same with the aforementioned expressions (55) through (57), except of that the numbers of row and column of each corresponding picture element are replaced with respect to the row and column. A spatial frequency plan view showing the normal band of luminance and a carrier frequency of Moire of this second output picture image signal is a plan view line-symmetrical to FIG. 54 about the spatial frequency axis in the first diagonal direction Ux. That is, it is the same with a plan view in which only the spatial frequency axes in the horizontal and vertical directions H and V in the spatial frequency plan view of FIG. 54 are replaced.

It can be seen from this figure that the normal band of luminance of the second output picture image signal is equal in the horizontal and vertical directions H and V and the range in the direction of the spatial frequency (fH/2, ±fV) from the origin is expanded twice as compared to the normal band of luminance of the first output picture image signal. Further, because the carrier frequencies of Moire which have appeared near the spatial frequency axis in the horizontal direction H in the first output picture image signal disappears, it becomes unnecessary to limit the spatial frequency component near the spatial frequency ±fH/2. Therefore, the substantial width of the normal band in the horizontal direction H after the limitation of the spatial frequency component of the picture image light is expanded to the whole range of the normal band. From these facts, the resolution of the second output picture image in the horizontal direction H is improved more than the first output picture image.

From the result described above, the resolution of the first and second output picture images of the imaging apparatus of the present embodiment in the vertical direction V is improved as compared to the first and second output picture images of the seventh embodiment.

An imaging apparatus of a ninth embodiment of the present invention will be explained below. The structures of the components of the imaging apparatus of the present embodiment other than the color filter are the same with the imaging apparatus of the second embodiment, so that the same components will be denoted by the same reference numerals and an explanation thereof will be omitted here. Using the whole picture element reading type imaging device 131, the imaging apparatus images picture image light in the normal and high resolution modes and obtains first and second output picture image signals whose resolution is different.

Although the color filter is the same with the color filter of the second embodiment with respect to the location where it is disposed and the number and array of the light-transmitting domains L, it is different in terms of the combination of transmissible chromatic lights and the array of colors. Therefore, the array periods in the horizontal and vertical directions H and V of the light-transmitting domains L are periods PH and PV, respectively. The first through third transmissible chromatic lights are three primary colors of red, blue and green.

In the color filter, the green light-transmitting domains L are prepared twice of the number of the red and blue light-transmitting domains L. It has been known that human eyes can perceive the green chromatic light more and the green chromatic light contributes in the luminance signal more than red and blue chromatic lights. Further, the spatial frequency band of luminance perceived by human sense of sight is wider than that of chromaticity. Accordingly, the spatial frequency band of luminance may be expanded by increasing the green light-transmitting domains L to increase the number of photo-receiving domains PD which receive the green chromatic light.

Figure 56:
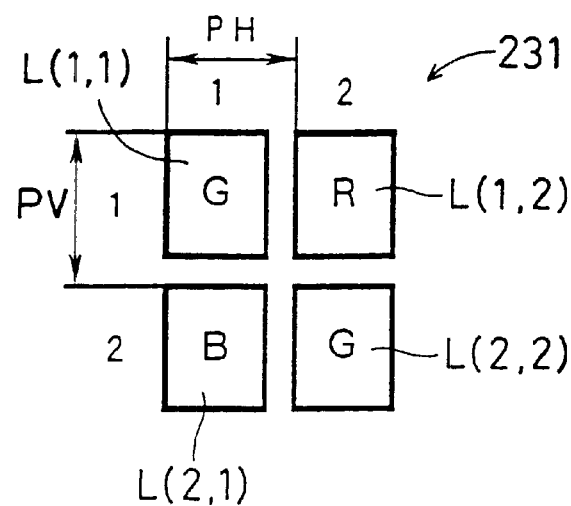
FIG. 56 is a diagram showing a basic array pattern 231 of an array of colors of light-transmitting domains L of a color filter in an imaging apparatus of a ninth embodiment.

FIG. 56 is diagram showing a basic array pattern 231 of the array of colors of the light-transmitting domains L of the above-mentioned color filter. This basic array pattern 231 is composed of four light-transmitting domains L arrayed in two rows and two columns. The pattern 231 contains two green light-transmitting domains L and one each light-transmitting domains of red and blue. In the basic array pattern 231, the light-transmitting domains L(1, 1) and L(2, 2) are the green light-transmitting domains L, the light-transmitting domain L(1, 2) is the red light-transmitting domain L and the light-transmitting domain L(2, 1) is the blue light-transmitting domain L.

The imaging device 131 images the picture image light to be formed via the color filter and outputs the original picture image signal. The array of picture elements D of the original picture image signal and the correspondence between the picture elements D and received light data are equivalent to the array of the light-transmitting domains L and the array of colors of the color filter in FIG. 56 and each corresponding picture element has received light data of a single chromatic light.

The operation for imaging the picture image light in the normal mode is similar to the operation for imaging the picture image light in the normal mode described in the first embodiment and the behaviors of the optical system, the imaging device 131, the circuits 35 and 36 and the picture image memory 37 are the same with those in the second embodiment. The signal processing circuit 44 finds a luminance signal and two kinds of color difference signals of the first output picture image signal from a signal original picture image signal. For instance, luminance data Y(2, 2), color difference data (R−Y)(2, 2) and (B−Y)(2, 2) of the picture element D(2, 2) at the second row and the second column corresponding to the light-transmitting domain L(2, 2) in FIG. 56 may be expressed as follows. It is noted that the picture element D(2, 2) is a corresponding picture element for only green received light data.

$$Y(2,2)=0.30\cdot\tfrac{1}{2}\{R(1,2)+R(3,2)\}+0.59\cdot G(2,2)+ \\ 0.11\cdot\tfrac{1}{2}\{B(2,1)+B(2,3)\} \quad (61)$$

$$(R-Y)(2,2)=0.70\cdot\tfrac{1}{2}\{R(1,2)+R(3,2)\}-0.59\cdot G(2,2)-0.11\cdot\tfrac{1}{2}\{B(2,1)+ \\ B(2,3)\} \quad (62)$$

$$(B-Y)(2,2)=-0.30\cdot\tfrac{1}{2}\{R(1,2)+R(3,2)\}-0.59\cdot G(2,2)+0.89\cdot\tfrac{1}{2}\{B(2,1)+ \\ B(2,3)\} \quad (63)$$

The luminance data Y may be directly found separately per each picture element D. Therefore, the corresponding picture elements of the original picture image is the actual picture elements of all the luminance data, the number and array of the actual picture elements of the luminance signal of the first output picture image signal is equal to the number and array of the corresponding picture elements of the original picture image.

It can be seen from FIG. 56 that the array periods of the array of all the corresponding picture elements of the original picture image in the horizontal and vertical directions H and V are the periods PH and PV, respectively. It is assumed from this fact that sampling frequencies of the luminance signal of the first output picture image signal in the horizontal and vertical directions H and V are spatial frequencies fH and fV, respectively. Further, it can be seen from FIG. 56 that the array periods of the array of only the corresponding picture elements of the green chromatic light in the horizontal, vertical and diagonal directions H, V and U, among the arrays of only one kind of corresponding picture elements, are periods PH, PV and 2PU, respectively. It can be also seen from FIG. 56 that the array periods of the array of only the corresponding picture elements of the red and blue chromatic lights in the horizontal, vertical and diagonal directions H, V and U are periods 2PH, 2PV and 2PU, respectively. It is assumed from this fact that the sampling frequencies of the color difference signal in the horizontal, vertical and diagonal directions H, V and U are spatial frequencies fH, fV and fU/2, respectively, in terms of green and the spatial frequencies fH/2, fV/2 and fU/2, respectively, in terms of red and blue.

Figure 57:
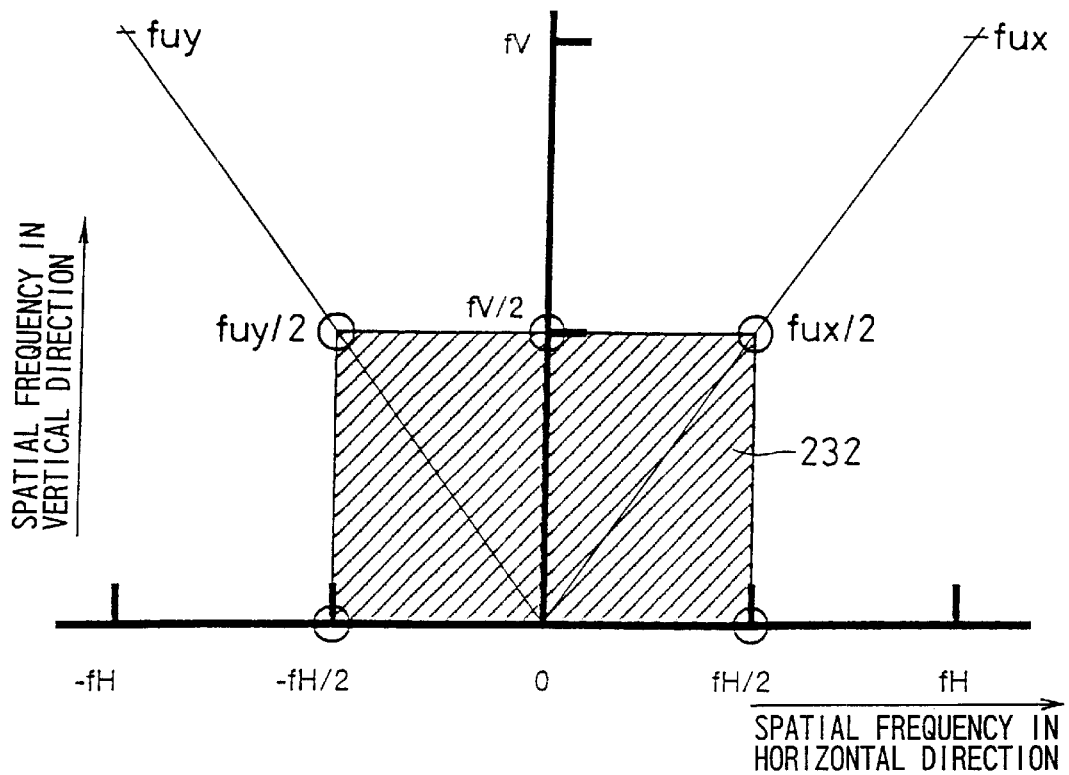
FIG. 57 is a spatial frequency plan view showing a normal band 232 of luminance of a first output picture image signal and carrier frequencies of Moire of the color difference signal of the imaging apparatus of the ninth embodiment.

FIG. 57 is a spatial frequency plan view showing a normal band 232 of luminance of the above-mentioned first output picture image signal and positions of carrier frequency of Moire of the color difference signal. The range of the normal band 232 of luminance on the spatial frequency axes of horizontal and vertical directions H, and V is equal to the normal band 111 of luminance of the first output picture image signal of the imaging apparatus 31 of the first embodiment, and is expressed as follows:

$$(-fH/2)\leq f\leq(fH/2) \quad (13)$$

$$(-fV/2)\leq f\leq(fV/2) \quad (14)$$

$$(-fu/2)\leq f\leq(fu/2) \quad (15)$$

Accordingly, the normal band 232 of luminance of the first and second quadrants is a rectangular area having the four vertexes:
(−fH/2, 0)
(fH/2, 0)
(−fH/2, fV/2)
(fH/2, fV/2)

The carrier frequencies of Moire of the color difference signal appearing within the normal band 232 exist at the following five locations:

(−fH/2, 0)
(fH/2, 0)
(−fH/2, fV/2)
(fH/2, fV/2)
(0, fV/2)

The first decrement of the variable spatial filter 90 in the first state described above is set so as to damp the spatial frequency component near the spatial frequencies ±fH/2 and ±fV/2 within the normal band 23 two-dimensionalue to that, the substantial width of the normal band 232 on the spatial frequency axis in the horizontal and vertical directions H and V is reduced to be less than the whole range of the normal band 232. Thereby, the substantial resolution of the first output picture image in the horizontal and vertical directions H and V is lowered by that than the ideal resolution estimated from the normal band 232.

The operation of the above-mentioned imaging apparatus for imaging the picture image light in the high resolution mode is similar to the operation for imaging the picture image light in the high resolution mode in the second embodiment and the behaviors of the optical system, the imaging device 131, the circuits 35 and 36 and the picture image memory 37 are the same with those in the second embodiment. At this time, the image shifting mechanism 62 moves the image forming point of the picture image light to the first and second image forming positions Qa1 and Qb1 separated by an interval PH in the horizontal direction H as shown in FIG. 14. The signal processing circuit 44 generates a composite picture image signal from the first and second original picture image signals by the same method with that shown the second embodiment. The composite picture image is composed of M×N corresponding picture elements arrayed in M rows and N columns. The array periods of the picture elements of the composite picture image in the horizontal and vertical directions H and V are the periods PH and PV, respectively. Each corresponding picture element has received light data of two kinds of chromatic lights which are different from each other.

Figure 58:
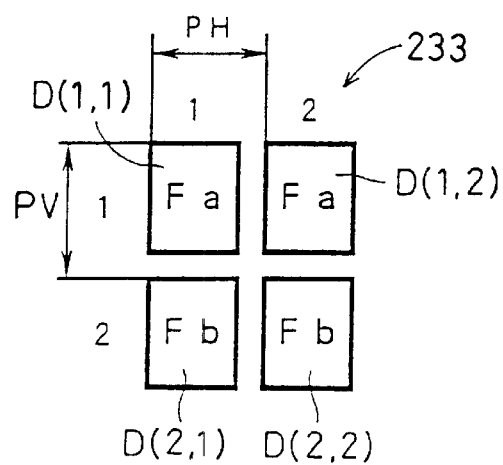
FIG. 58 is a diagram showing an equivalent basic array pattern 233 of the array of picture elements D of a composite picture image in the high resolution mode in the imaging apparatus of the ninth embodiment.

FIG. 58 is a diagram showing a basic array pattern 233 of the array of the equivalent picture elements D of the composite picture image represented by the above-mentioned composite picture image signal. This basic array pattern 233 is composed of four picture elements arrayed in two rows and two columns. The picture elements D(1, 1) and D(1, 2) are the corresponding picture elements of green and red and the picture elements D(2, 1) and D(2, 2) are the corresponding picture elements of green and blue. In FIG. 58, the corresponding picture elements of green and red are denoted by a reference character "Fa" and the corresponding picture elements of green and blue are denoted by a reference character "Fb". It can be seen from this fact that the array of picture elements in the composite picture image is the same with the array of picture elements of the original picture image and that the whole picture elements are corresponding picture elements of green.

The signal processing circuit 44 finds a luminance signal and two kinds of color difference signals of the second output picture image signal from the composite picture image signal. For instance, luminance data Y(2, 2) and color difference data (R−Y)(2, 2) and (B−Y)(2,2) of the picture element D(2, 2) in the second row and the second column may be represented by the following expressions. It is noted that the picture element D(2, 2) is a corresponding picture element of only green and blue received light data:

$$Y(2,2)=0.30\cdot\tfrac{1}{2}\{R(1,2)+R(3,2)\}+0.59\cdot G(2,2)+0.11\cdot B(2,2) \quad (64)$$

$$(R-Y)(2,2)=0.70\cdot\tfrac{1}{2}\{R(1,2)+R(3,2)\}-0.59\cdot G(2,2)-0.11\cdot B(2,2) \quad (65)$$

$$(B-Y)(2,2)=-0.30\cdot\tfrac{1}{2}\{R(1,2)+R(3,2)\}-0.59\cdot G(2,2)+0.89\cdot B(2,2) \quad (66)$$

The luminance data Y may be directly found separately per only each corresponding picture element of the composite picture image. Therefore, the corresponding picture elements of the composite picture image turn out to be the actual picture elements of all the luminance data, so that a number and array of the actual picture elements of the luminance signal of the second output picture image signal are equal to the number and array of the corresponding picture elements of the composite picture image.

It can be seen from FIG. 58 that the array periods of the array of all the corresponding picture elements of the original picture image in the horizontal, vertical and diagonal directions H, V and U and the array periods of only the corresponding picture elements of green in the horizontal, vertical and diagonal directions H, V and U are the periods PH, PV and PU, respectively. It is assumed from this fact that sampling frequencies of the luminance signal of the second output picture image signal in the horizontal, vertical and diagonal directions H, V and U are spatial frequencies fH, fV and fu, respectively. Further, it can be seen from FIG. 58 that the array periods of the array of only the corresponding picture elements of red and blue chromatic lights in the horizontal and vertical directions H and V are periods PH and 2PV, respectively. It is assumed from this fact that the sampling frequencies of the color difference signal in the horizontal, vertical and diagonal directions H, V and U are spatial frequencies fH, fV and fU with respect to green and spatial frequencies fH and fV/2, respectively, with respect to red and blue.

The normal band of luminance of the second output picture image signal and carrier frequency of Moire of the color difference signal are the same with the normal band 184 of luminance of the second output picture image signal and the carrier frequency of Moire of the imaging apparatus of the second embodiment shown in FIG. 29. That is, the normal band is equal to the normal band 232 of the first output picture image signal and the carrier frequency of Moire appears only at the position (0, fV/2). Therefore, the resolution of the second output picture image may be improved in the horizontal direction H as compared to the first output picture image.

An imaging apparatus of a tenth embodiment of the present invention will be explained below. The structure of the components of the imaging apparatus of the present embodiment other than the color filter and imaging device are the same with the imaging apparatus of the second embodiment, so that the same components will be denoted by the same reference numerals and an explanation thereof will be omitted here. Instead of the whole picture element reading type imaging device 131, the imaging apparatus uses the imaging device in the imaging apparatus of the seventh embodiment. It images picture image light in the normal and high resolution modes and obtains first and second output picture image signals whose resolution is different.

Although the color filter is the same with the color filter of the seventh embodiment with respect to the location where it is disposed, the combination of transmissible chromatic lights, and the number and array of the light-transmitting domains L, it is different in terms of the array of colors. The first through third chromatic lights are three primary colors of red, blue and green. The array periods in the horizontal and vertical directions H and V of the light-transmitting domains L are equal with the array of the photo-receiving domains PD and are periods Ph/2 and PV, respectively. Further, the green light-transmitting domains are prepared twice of the number of the red and blue light-transmitting domains from the same reason with the color filter in the ninth embodiment.

Figure 59:
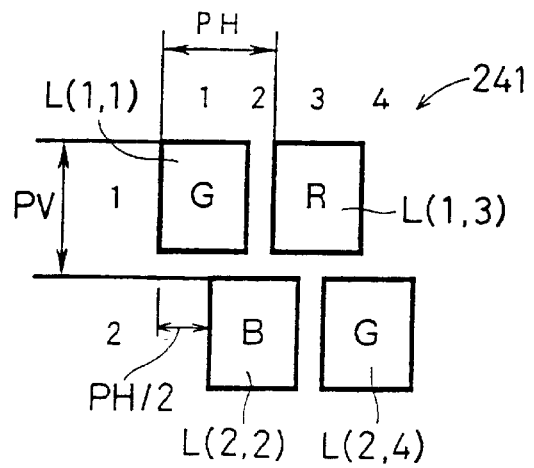
FIG. 59 is a diagram showing a basic array pattern 241 of an array of colors of light-transmitting domains L of a color filter in an imaging apparatus of a tenth embodiment.

FIG. 59 is diagram showing a basic array pattern 241 of the array of colors of the light-transmitting domains L of the above-mentioned color filter. This basic array pattern 241 is composed of four light-transmitting domains L. Within the light-transmitting domains L, there exist two green light-transmitting domains L and one each light-transmitting domains of red and blue. These light-transmitting domains L are equivalent to an array in which they are arrayed in an imaginary array of two rows and four columns in dice and it may be considered that there exist imaginary light-transmitting domains L not shown between the light-transmitting domains L of each row.

In the basic array pattern 241, the light-transmitting domains L(1, 1) and L(2, 4) are the green light-transmitting domains L, the light-transmitting domain L(1, 3) is the red light-transmitting domain L and the light-transmitting domain L(2, 2) is the blue light-transmitting domain L. The color filter having the array of colors composed of this basic array pattern 241 is disposed so that the actual light-transmitting domains L are arrayed on the light incident side of at least one actual photo-receiving domain PD.

The imaging device 131 images the picture image light to be formed via the color filter and outputs the original picture image signal. The array of picture elements D of the original picture image signal and the correspondence between the picture elements D and received light data are equivalent to the array of the light-transmitting domains L and the array of colors of the color filter in FIG. 59 and each corresponding picture element has received light data of a single chromatic light.

The operation for imaging the picture image light in the normal mode is similar to the operation for imaging the picture image light in the normal mode described in the seventh embodiment and the behaviors of the optical system, the circuits 35 and 36 and the picture image memory 37 are the same with those in the second embodiment. The behavior of the above-mentioned imaging device is almost the same with that of the imaging device 131 in FIG. 17. The signal processing circuit 44 finds a luminance signal and two kinds of color difference signals of the first output picture image signal from a signal original picture image signal. For instance, luminance data Y(2, 4), color difference data (R−Y)(2, 4) and (B−Y)(2, 4) of the picture element D(2, 4) at the second row and the fourth column corresponding to the light-transmitting domain L (2, 4) in FIG. 44 may be expressed as follows. It is noted that the picture element D(2, 4) is a corresponding picture element for only green received light data.

$$Y(2,4)=0.30 \cdot \tfrac{1}{8}[\{R(1,7)+R(3,7)\}+3 \cdot \{R(1,3)+R(3,3)\}]+0.59 \cdot G(2,4)+ 0.11 \cdot \tfrac{1}{2}\{B(2,2)+B(2,6)\} \quad (67)$$

$$(R-Y)(2,4)=0.70 \cdot \tfrac{1}{8}[\{R(1,7)+R(3,7)\}+3 \cdot \{R(1,3)+R(3,3)\}]-0.59 \cdot G(2,4)-0.11 \cdot \tfrac{1}{2}\{B(2,2)+B(2,6)\} \quad (68)$$

$$(B-Y)(2,4)=-0.30 \cdot \tfrac{1}{8}[\{R(1,7)+R(3,7)\}+3 \cdot \{R(1,3)+R(3,3)\}]- 0.59 \cdot G(2,4)+0.89 \cdot \tfrac{1}{2}\{B(2,2)+B(2,6)\} \quad (69)$$

The luminance data Y may be directly found separately per each picture element D. Therefore, the corresponding picture elements of the original picture image is the actual picture elements of all the luminance data, the number and array of the actual picture elements of the luminance signal of the first output picture image signal is equal to the number and array of the corresponding picture elements of the original picture image.

It can be seen from FIG. 59 that the array periods of the array of all the corresponding picture elements of the original picture image in the horizontal and vertical directions H and V are the periods Ph/2 and PV, respectively. It is assumed from this fact that sampling frequencies of the luminance signal of the first output picture image signal in the horizontal and vertical directions H and V are spatial frequencies 2fH and fV, respectively. Further, it can be seen from FIG. 59 that the array periods of the arrays of only the corresponding picture elements of red and blue color lights in the horizontal and vertical directions H and V are periods 2PH and 2PV, respectively. It is assumed from this fact that the sampling frequencies of the color difference signal in the horizontal and vertical directions H and V are spatial frequencies fH/2 and fV/2, respectively on Uα.

Figure 60:
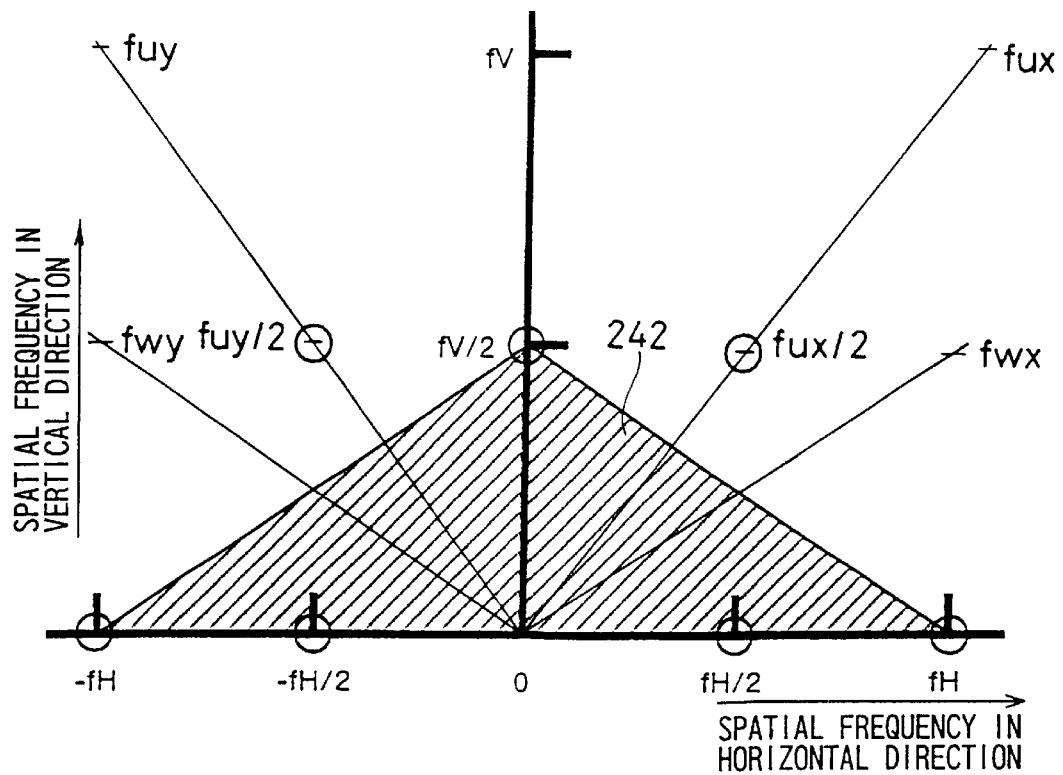
FIG. 60 is a spatial frequency plan view showing a normal band 242 of luminance of a first output picture image signal and carrier frequencies of Moire of the color difference signal of the imaging apparatus of the tenth embodiment.

FIG. 60 is a spatial frequency plan view showing a normal band 242 of luminance of the above-mentioned first output picture image signal and positions of carrier frequency of Moire of the color difference signal. The range of the normal band 242 of luminance on the spatial frequency axes of the horizontal and vertical directions H and V may be expressed as follows:

$$-fH \leq f \leq fH \quad (53)$$

$$(-fV/2) \leq f \leq (fV/2) \quad (54)$$

Further, the range of the normal band 242 on the spatial frequency axes of the third diagonal directions Wx and Wy is a half of the above-mentioned sampling frequencies fwx and fwy. Accordingly, the normal band 242 of luminance in the first and second quadrants is a triangular area whose vertexes are the following three points:
(−fH, 0)
(fH, 0)
(0, fV/2)

The carrier frequencies of Moire of the color difference signal appearing within the normal band 242 exist at the following five locations:
(−fH, 0)
(fH, 0)
(−fH/2, 0)
(fH/2, 0)
(0, fV/2)

The carrier frequencies of Moire of the color difference signal exist also at the following two locations near the normal band 242:
(−fH/2, fV/2)
(fH/2, fV/2)

The first decrement of the variable spatial filter 90 in the first state described above is set so as to damp the components on the spatial frequencies ±fH/2 and ±fV/2 within the normal band 24 two-dimensionalue to that, the substantial width of the normal band 242 on the spatial frequency axis in the vertical direction V is reduced to be less than the each of the whole range of the normal band 242. Further, the substantial width of the normal band 242 in the horizontal direction H is also reduced to a half of the range of the normal band 242. Thereby, the substantial resolution of the first output picture image in the horizontal and vertical directions H and V is lowered by that than the ideal resolution estimated from the normal band 232.

The operation of the above-mentioned imaging apparatus for imaging the picture image light in the high resolution mode is similar to the operation for imaging the picture image light in the high resolution mode in the seventh embodiment and the behaviors of the optical system, the circuits 35 and 36 and the picture image memory 37 are the same with those in the second embodiment. The behavior of the imaging device is almost the same with that of the imaging device 131. At this time, the image shifting mechanism 62 moves the image forming point of the picture image light to the first and second image forming positions Qa1 and Qb1 shown in FIG. 14.

The signal processing circuit 44 generates a composite picture image signal from the first and second original picture image signals by the same method with the second embodiment. The composite picture image is composed of M×N corresponding picture elements and the same number of imaginary picture elements arrayed in M rows and 2N columns. Each corresponding picture element has two kinds of received light data. The array periods of the picture elements of the composite picture image in the horizontal and vertical directions H and V are periods PH/2 and PV, respectively.

Figure 61:
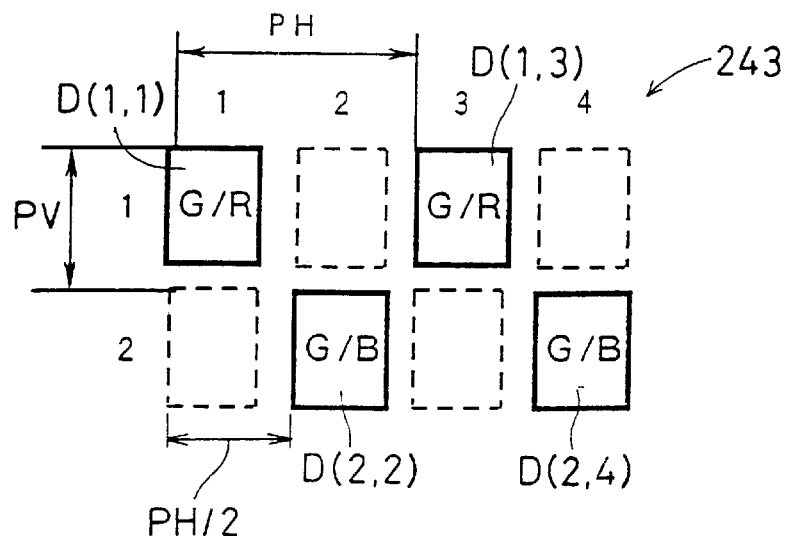
FIG. 61 is a diagram showing an equivalent basic array pattern 243 of the array of picture elements of a composite picture image in the high resolution mode in the imaging apparatus of the tenth embodiment.

FIG. 61 is a diagram showing a basic array pattern 243 of the array of the equivalent picture elements D of the composite picture image represented by the above-mentioned composite picture image signal. The basic array pattern 243 is composed of eight picture elements array in two rows and four columns. The picture elements D(1, 1) and D(1, 3) are corresponding picture elements to green and red and the picture elements D(2, 2) and D(2, 4) are corresponding picture elements to green and blue. The remaining picture elements are all imaginary picture elements. It can be seen from this fact that the array of the corresponding picture elements of the composite picture image is the same with the array of corresponding picture elements of the original picture image and is diced.

The signal processing circuit 44 finds a luminance signal and two kinds of color difference signals of the second output picture image signal from the composite picture image signal. For instance, luminance data Y(2, 2) and color difference data (R−Y)(2, 2) and (B−Y)(2, 2) of the picture element D(2, 2) in the second row and the second column may be represented by the following expressions. It is noted that the picture element D(2, 2) is a corresponding picture element of green and blue received data:

$$Y(2,2)=0.30 \cdot \tfrac{1}{4}\{R(1,1)+R(1,3)+R(3,1)+R(3,3)\}+ \\ 0.59 \cdot G(2,2)+0.11 \cdot B(2,2) \quad (70)$$

$$(R-Y)(2,2)=0.70 \cdot \tfrac{1}{4}\{R(1,1)+R(1,3)+R(3,1)+R(3,3)\}-0.59 \cdot G(2,2)- \\ 0.11 \cdot B(2,2) \quad (71)$$

$$(B-Y)(2,2)=-0.30 \cdot \tfrac{1}{4}\{R(1,1)+R(1,3)+R(3,1)+R(3,3)\}- \\ 0.59 \cdot G(2,2)+0.89 \cdot B(2,2) \quad (72)$$

The luminance data Y may be directly found separately per only each corresponding picture element of the composite picture image. The luminance data of the imaginary picture elements is interpolated from the calculation result of the corresponding picture elements around that. Therefore, the corresponding picture elements of the composite picture image turn out to be the actual picture elements of all the luminance data, so that a number and array of the actual picture elements of the luminance signal of the second output picture image signal are equal to the number and array of the corresponding picture elements of the composite picture image and the actual picture elements are arrayed in dice.

It can be seen from FIG. 61 that the array periods of the array of all the corresponding picture elements of the composite picture image in the horizontal and vertical directions H and V and the array periods of only the corresponding picture elements to green in the horizontal and vertical directions H and V are the periods Ph/2 and PV, respectively. It is assumed from this fact that sampling frequencies of the luminance signal of the second output picture image signal in the horizontal and vertical directions H and V are spatial frequencies 2fH and fV, respectively. Further, it can be seen from FIG. 61 that the array periods of each array of only the corresponding picture elements to red and blue chromatic lights in the horizontal and vertical directions H and V are periods PH and 2PV, respectively. It is assumed from this fact that the sampling frequencies of the color difference signal in the horizontal and vertical directions H and V are spatial frequencies 2fH and fV with respect to green and spatial frequencies fH and fV/2 with respect to red and blue, respectively. Further, it can be seen from FIG. 61 that the array period of the aforementioned second diagonal direction Uα is doubled.

Figure 62:
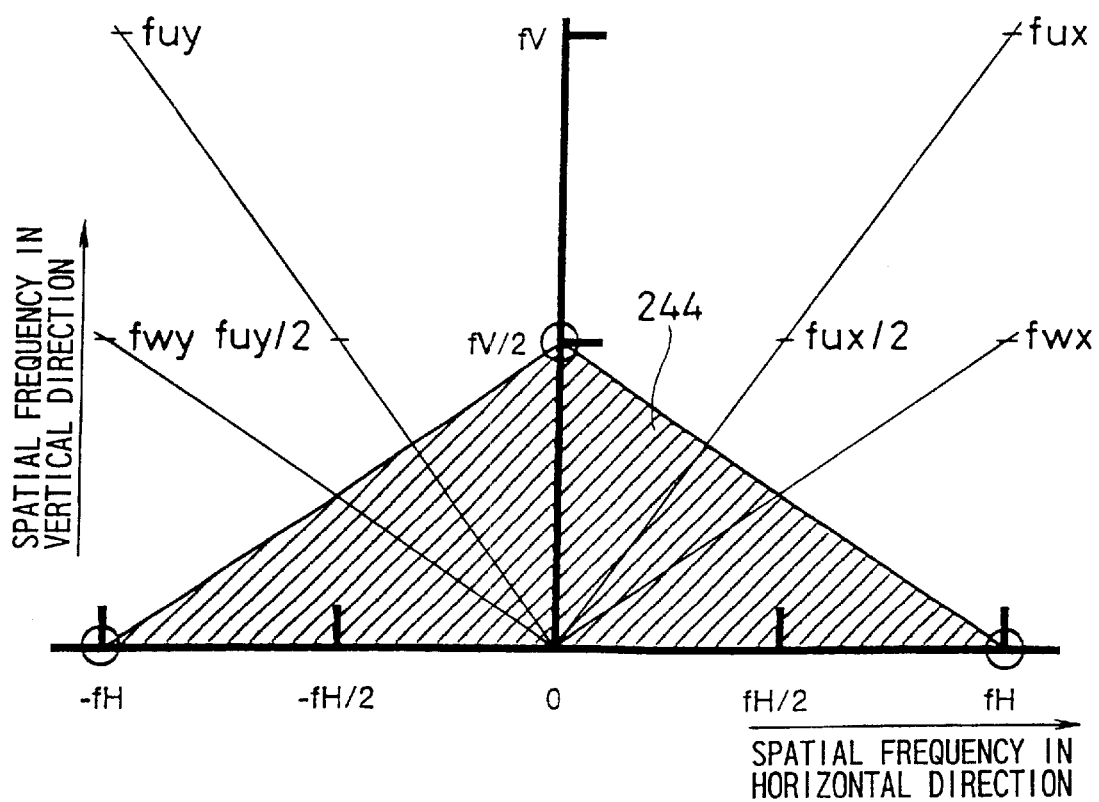
FIG. 62 is a spatial frequency plan view showing a normal band 244 of luminance of a second output picture image signal and carrier frequencies of Moire of the color difference signal of the imaging apparatus of the tenth embodiment.

FIG. 62 is a spatial frequency plan view showing a normal band 244 of luminance of the above-mentioned second output picture image signal and positions of carrier frequency of Moire of the color difference signal. The normal band 244 of luminance is equal to the normal band 242 of the first output picture image signal and its range on the spatial frequency axes in the horizontal and vertical directions H and V may be expressed as follows:

$$-fH \leq f \leq fH \quad (53)$$

$$(-fV/2) \leq f \leq (fV/2) \quad (54)$$

Therefore, the normal band 244 of luminance in the first and second quadrants is a triangular area having the following three vertexes:
(−fH, 0)
(fH, 0)
(0, fV/2)

The carrier frequencies of Moire of the color difference signal appearing within the normal band 244 exist at the following three spots:
(−fH, 0)
(fH, 0)
(0, fV/2)

The variable spatial filter 90 in the second state described above damps the component of the spatial frequency ±fV/2 among the spatial frequency components of the picture image light. Thereby, the substantial width of the normal band 244 on the spatial frequency axis in the vertical direction V is reduced to be less than the whole range of the normal band 244 in the vertical direction V. Further, although the variable spatial filter 90 in the second state will not damp the spatial frequency component in the horizontal direction H, the component near the spatial frequency ±fH in the horizontal direction H is damped by the aperture effect of the MTF and the imaging device of the optical system. Thereby, the substantial width of the normal band 244 on the spatial frequency axis in the horizontal direction H is reduced to be less than the range of the normal band 244, though it is expanded more than the substantial width of the first output picture image signal. Thereby, the substantial resolution of the second output picture image in the horizontal direction H is improved more than the substantial resolution of the first output picture image in the horizontal direction H.

An imaging apparatus of an eleventh embodiment of the present invention will be explained below. The structure of the components of the imaging apparatus of the present embodiment other than the optical system, the color filter and the imaging device are the same with the imaging apparatus of the tenth embodiment, so that the same components will be denoted by the same reference numerals and an explanation thereof will be omitted here. The imaging apparatus of the present embodiment uses the whole picture element reading type imaging device shown in the eight embodiment. It images picture image light in the normal and high resolution modes and obtains first and second output picture image signals whose resolution is different.

Within the optical system, although the internal structure of the image shifting mechanism 62 and the variable spatial filter 90 is the same, their setting is different. The image shifting mechanism 62 will be described later. The variable spatial filter 90 is set so that the separation vector B1 of a birefringence plate 91 is parallel with the horizontal direction H. Thereby, the variable spatial filter 90 in the first state damps the component of the spatial frequency ±fH/2 among the spatial frequency components in the horizontal and vertical directions H and V and damps the amplitude of the component of the spatial frequency ±fV/2. The variable spatial filter 90 in the second state also damps the amplitude of the component of the spatial frequency ±fH/2 among the spatial frequency components in the horizontal direction H.

Although the color filter is the same with the color filter of the tenth embodiment with respect to the location where it is disposed, the combination of transmissible chromatic lights, and the number of the light-transmitting domains, it is different in terms of the array of colors. Therefore, the first through third chromatic lights are three primary colors of red, blue and green. The array periods of the light-transmitting domains L in the horizontal and vertical directions H and V are periods PH and PV/2, respectively, and are the same with those of the color filter in the eighth embodiment. Further, the green light-transmitting domains are prepared twice of each number of the red and blue light-transmitting domains by the same reason described with respect to the color filter in the ninth embodiment.

Figure 63:
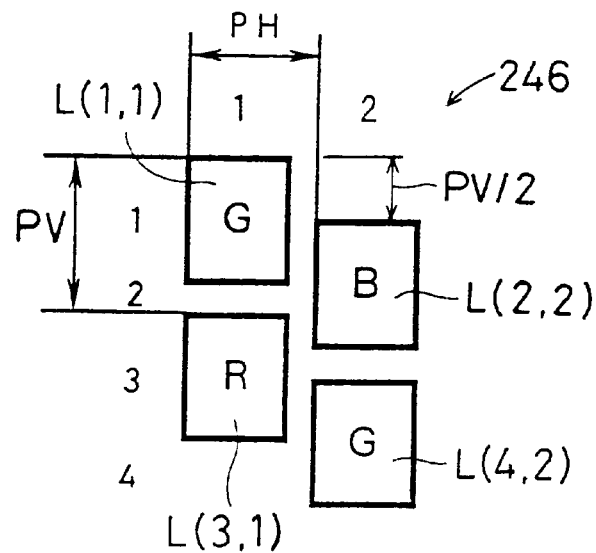
FIG. 63 is a diagram showing a basic array pattern 246 of an array of colors of light-transmitting domains L of a color filter in an imaging apparatus of an eleventh embodiment.

FIG. 63 is a diagram showing a basic array pattern 246 of the array of colors of the light-transmitting domains L of the above-mentioned color filter. The basic array pattern 246 is composed of four light-transmitting domains L and transmit the first through third chromatic lights. These light-transmitting domains L are equivalent to an array in which each light-transmitting domain L in two, adjacent columns is arrayed while slipping off each other by a length PV/2 and which is diced in the basic array of four rows and two columns.

In the basic array pattern 246, the light-transmitting domains L(1, 1) and L(4, 2) are green light-transmitting domains L. The light-transmitting domain L(3, 1) is a red light-transmitting domain L. The light-transmitting domain L(2, 2) is a blue light-transmitting domain L. The basic array pattern 246 is an array in which the array of row and column and the array of colors of the light-transmitting domains L of the basic array pattern of the color filter of the imaging apparatuses of the tenth embodiment are replaced with respect to the horizontal and vertical directions H and V while keeping the array periods of the horizontal and vertical directions H and V.

The imaging device images the picture image light to be formed via the color filter and outputs the original picture image signal. The array of the picture elements of the original picture image signal and the correspondence of each picture element with received light data are equivalent to the array of the light-transmitting domains L and the array of colors of the color filter and each corresponding picture element has received light data of a single chromatic light.

The operation for imaging the picture image light in the normal mode is similar to the operation for imaging the picture image light in the normal mode of the tenth embodiment and the behaviors of the optical system, the imaging device, the circuits 35 and 36 and the picture image memory 37 are the same with those of the tenth embodiment. The signal processing circuit 44 finds a luminance signal and two kinds of color difference signals of the first output picture image signal from the single original picture image signal. Calculation expressions of this case are the same with the expressions (67) through (69) described above except of that the numbers of row and column of the corresponding picture elements of the normal band 244 are replaced with respect to the row and column.

A spatial frequency plan view showing the normal band of luminance of the first output picture image signal and the carrier frequency of Moire thus obtained is a graphic line-symmetrical to FIG. 60 about the spatial frequency axis in the first diagonal direction Ux. Therefore, it is equal to a graph in which only the spatial frequency axes in the horizontal and vertical directions H and V in the spatial frequency plan view in FIG. 60 are replaced.

It can be seen from this graph that there exist carrier frequencies of Moire respectively at spatial frequencies ±fH/2 and ±fV/2 on the spatial frequency axes in the horizontal and vertical directions H and V. Accordingly, the substantial widths of the normal band of luminance of the first output picture image signal in the horizontal and vertical directions H and V are limited to be less than the spatial frequencies ±fH/2 and ±fV/2, respectively. Accordingly, the resolution of the first output picture image in the normal mode of the present embodiment is almost equal to that of the first output picture image signal of the tenth embodiment.

The operation for imaging the picture image light in the high resolution mode is similar to the operation for imaging the picture image light in the high resolution mode described in the tenth embodiment and the behaviors of the optical system, the imaging device, the circuits 35 and 36 and the picture image memory 37 are the same with those of the tenth embodiment. At this time, the first and second image forming positions keep the positional relationship that they are separated by the length PV in the vertical direction V. The imaginary reference axial line of the refracting plate 71 of the image shifting mechanism 62 and the inclination of the refracting plate 71 of the second state are set by replacing the horizontal and vertical directions H and V of each member as compared to the state of disposition of the tenth embodiment so that the optical axis of the picture image light can be shifted in parallel to the first and second image forming positions.

The equivalent basic array pattern of the array of picture elements D of a composite picture image signal generated by the signal processing circuit 44 is similar to the basic array pattern 243 in FIG. 61. The picture element array of the corresponding picture elements and imaginary picture elements as well as the array periods of the whole picture elements are the same, except of that the horizontal and vertical directions H and V of the array of colors of the corresponding picture elements are replaced. The signal processing circuit 44 finds a luminance signal and two kinds of color difference signals of the second output picture image signal from the composite picture image signal. Calculation expressions in this case are the same with the aforementioned expressions (70) through (72), except of that the numbers of row and column of each corresponding picture element are replaced with respect to the row and column.

The spatial frequency plan view showing the normal band of luminance of the second output picture image signal and the carrier frequencies of Moire is a graph line-symmetrical to FIG. 62 about the spatial frequency axis in the first diagonal direction Ux. That is, it is equivalent to a graph in which only the spatial frequency axes in the horizontal and vertical directions H and V of the spatial frequency plan view in FIG. 62 are replaced.

It can be seen from this graph that the normal band of luminance of the second output picture image signal is equal to the normal band of luminance of the first output picture image signal. Further, the carrier frequency of Moire appearing at the spatial frequency ±fV/2 in the vertical direction in the first output picture image signal disappears. Thereby, the substantial width of the normal band on the spatial frequency axis in the vertical direction V is reduced to be less than the range of the normal band, though it is expanded more than the substantial width of the first output picture image signal. Thereby, the substantial resolution of the second output picture image signal in the vertical direction V is improved more than the substantial resolution of the first output picture image signal. From the above results, the resolution of the second output picture image of the imaging apparatus of the present embodiment is improved as compared to the second output picture image in the tenth embodiment with respect to the vertical direction V.

As described above, the imaging apparatuses in the first through eleventh embodiments perform the image shifting operation so that Moire caused in the original picture image signal may be removed by the composite process with respect to the spatial frequency axis in the main scan direction of display means. Further, according to the present invention, the first and second image forming positions of the image shifting operation are determined by considering the array of colors of each light-transmitting domain of the color filter and the type of the imaging device so that the effect for removing Moire takes effect as described above and the normal band is expanded in the horizontal direction in the same time. Thereby, it becomes unnecessary to limit the width of the normal band of the original composite picture image signal on the spatial frequency plane with respect to the spatial frequency axis of at least the horizontal or vertical direction. Accordingly, it allows the same effect of expanding the width of the normal band to be obtained and the resolution of the picture image to be improved.

In the imaging apparatuses of the first through eleventh embodiments described above, a variable vertical angle prism 251 which will be described below may be used instead of the image shifting mechanism 62.

The variable vertical angle prism 251 will be explained below in detail with reference to FIGS. 64 through 67. The variable vertical angle prism is disclosed in "ITEJ Technical Report Vol. 17, No. 5, pp. 15 through 20, CE' 93-3 (January, 1993)" for example.

Figure 64:
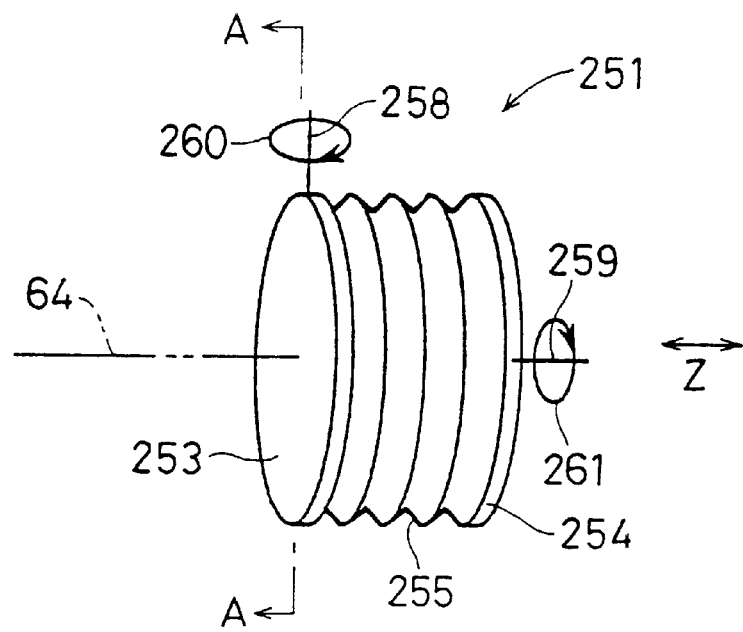
FIG. 64 is a perspective view showing a variable vertical angle prism 251 which is another example of the image shifting mechanism of the imaging apparatuses in the first through eleventh embodiments of the present invention.
Figure 65:
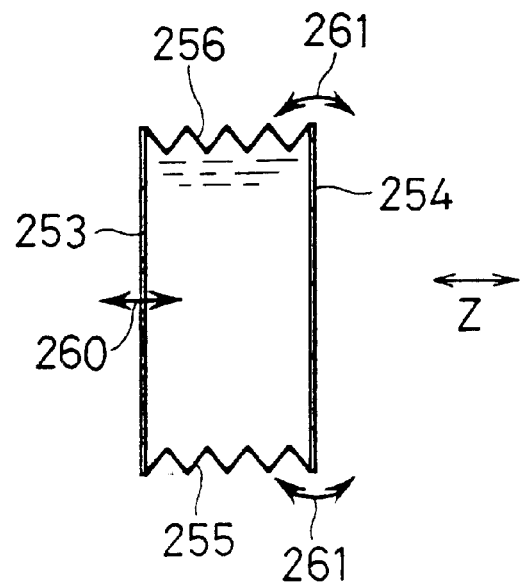
FIG. 65 is a section view of the variable vertical angle prism 251 shown in FIG. 64 along a line A—A.

FIG. 64 is a perspective view for explaining the concrete structure of the variable vertical angle prism 251. FIG. 65 is a section view along a line A—A of the variable vertical angle prism 251 shown in FIG. 64. The variable vertical angle prism 251 will be explained by using both FIGS. 64 and 65.

The variable vertical angle prism 251 comprises transparent discs 253 and 254, a bellows member 255 and a fluid layer 256. The bellows member 255 is formed of a film member having nearly a cylindrical shape and a hollow section is formed along the center axis thereof. The transparent disks 253 and 254 are realized by a glass plate for example and are set so as to close the apertures of the hollow section of the bellows member 255. The fluid layer 256 is formed by filling highly refractive fluid whose refractive index is more than or equal to 1 in the hollow section before closing the hollow section within the bellows member 255 by the transparent disks 253 and 254. The center axis of the bellows member 255 is parallel with the optical axis direction Z of the picture image light and the optical axis 64 of the picture image light passes through the transparent disk 253, the fluid layer 256 and the transparent disk 254 sequentially in this order.

The transparent disks 253 and 254 are provided with rotary shafts 258 and 259 in the direction crossing at right angles each other. Thereby, each of the transparent disks 253 and 254 displaces angularly in the two directions indicated by arrows 260 and 261 which cross at right angles. Among the two rotary shafts 258 and 259, one rotary shaft 258 is provided so as to be parallel with the direction of the imaginary reference axis of the image shifting mechanism 6 two-dimensionalescribed above. The other rotary shaft 259 may be also provided so as to be parallel with the direction of the imaginary reference axis of the image shifting mechanism 62.

These rotary shafts 258 and 259 are attached with driving coils not shown as driving means, damping coils and turning angle detecting sensors. When the transparent disk 253 is displaced angularly by the driving coil and the damping coil, the turning angle detecting sensor always detects the angular displacement thereof. The coils minutely control the inclination of the transparent disk 253 to the optical axis 64 based on the detected result. For instance, the detected result of the sensor is compared with a predetermined target value to find their error and the angular displacement of the transparent disk 253 is determined so that the error is zeroed to drive the coils. This control method is a so-called feedback control.

The variable vertical angle prism 251 assumes the first and second states corresponding to the angle formed by the transparent disks 253 and 254. When the variable vertical angle prism 251 holds the first and second states, the image forming point of the picture image light is held at the first and second image forming positions, respectively. The principle of operation of the variable vertical angle prism 251 will be explained below.

Figure 66:
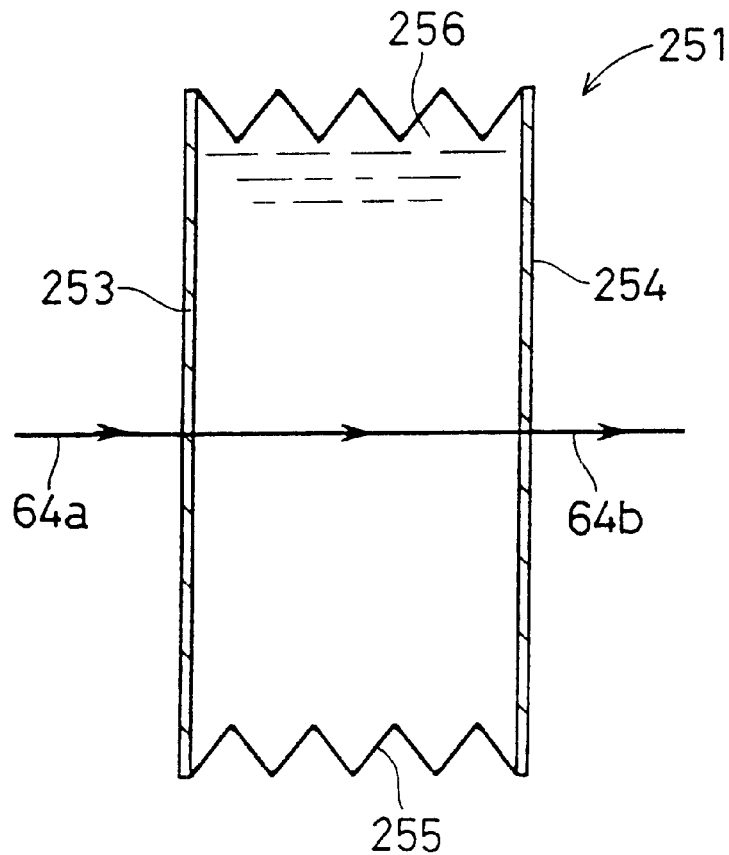
FIG. 66 is a section view of the variable vertical angle prism 251 shown in FIG. 64 along the line A—A in a first state.

FIG. 66 is a section view showing the variable vertical angle prism 251 in the first state. In the first state, the transparent disks 253 and 254 are disposed in parallel each other and each of the transparent disks 253 and 254 crosses at right angles with the optical axis 64a of the picture image light before the input. At this time, the beam which enters the variable vertical angle prism 251 advances straightforwardly within the fluid layer 256. Therefore, the optical axis 64b of the picture image light after being output from the variable vertical angle prism 251 coincides with the extension of the optical axis 64a before the input.

Figure 67:
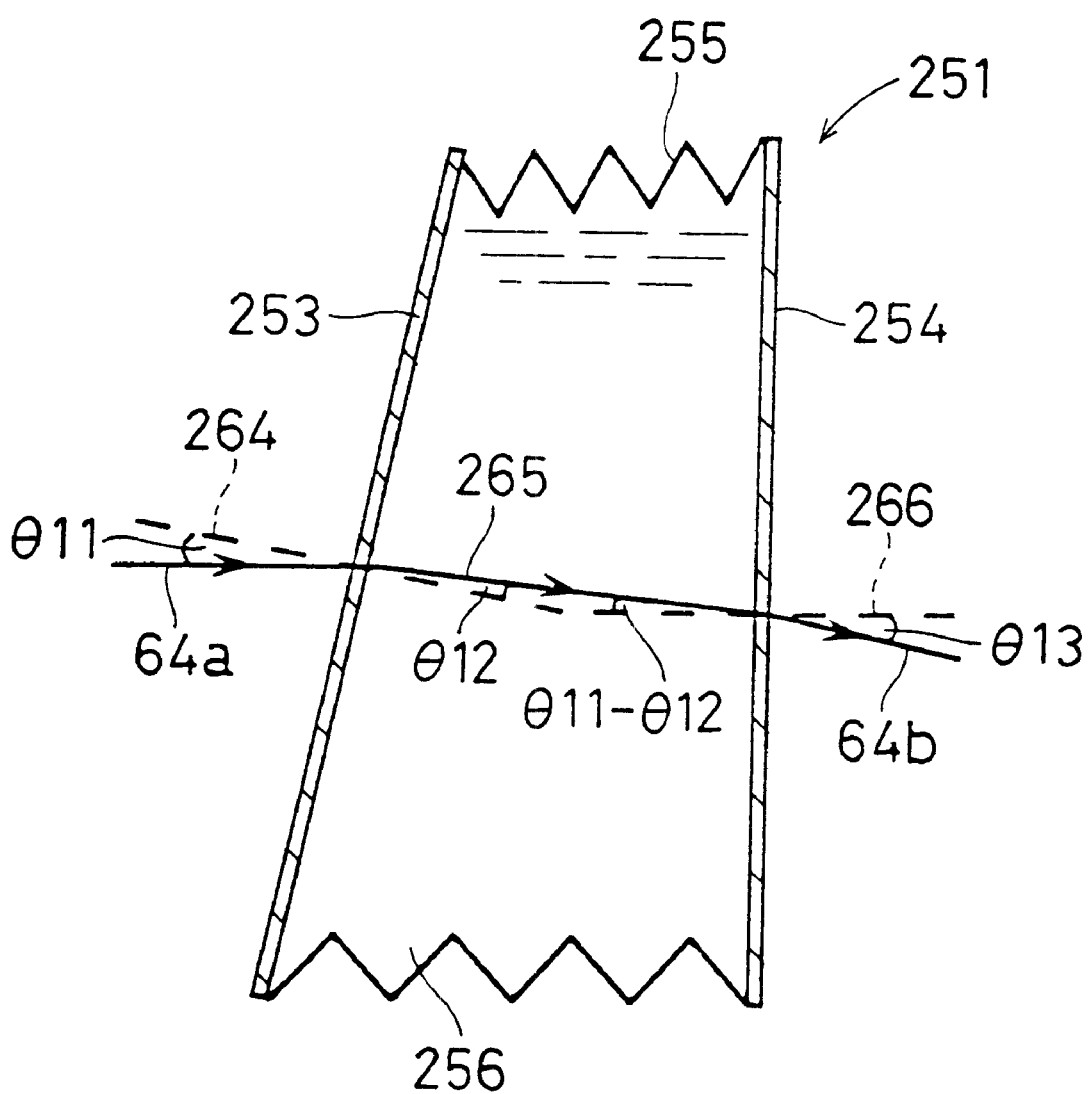
FIG. 67 is a section view of the variable vertical angle prism 251 shown in FIG. 64 along the line A—A in a second state.
Figure 68:
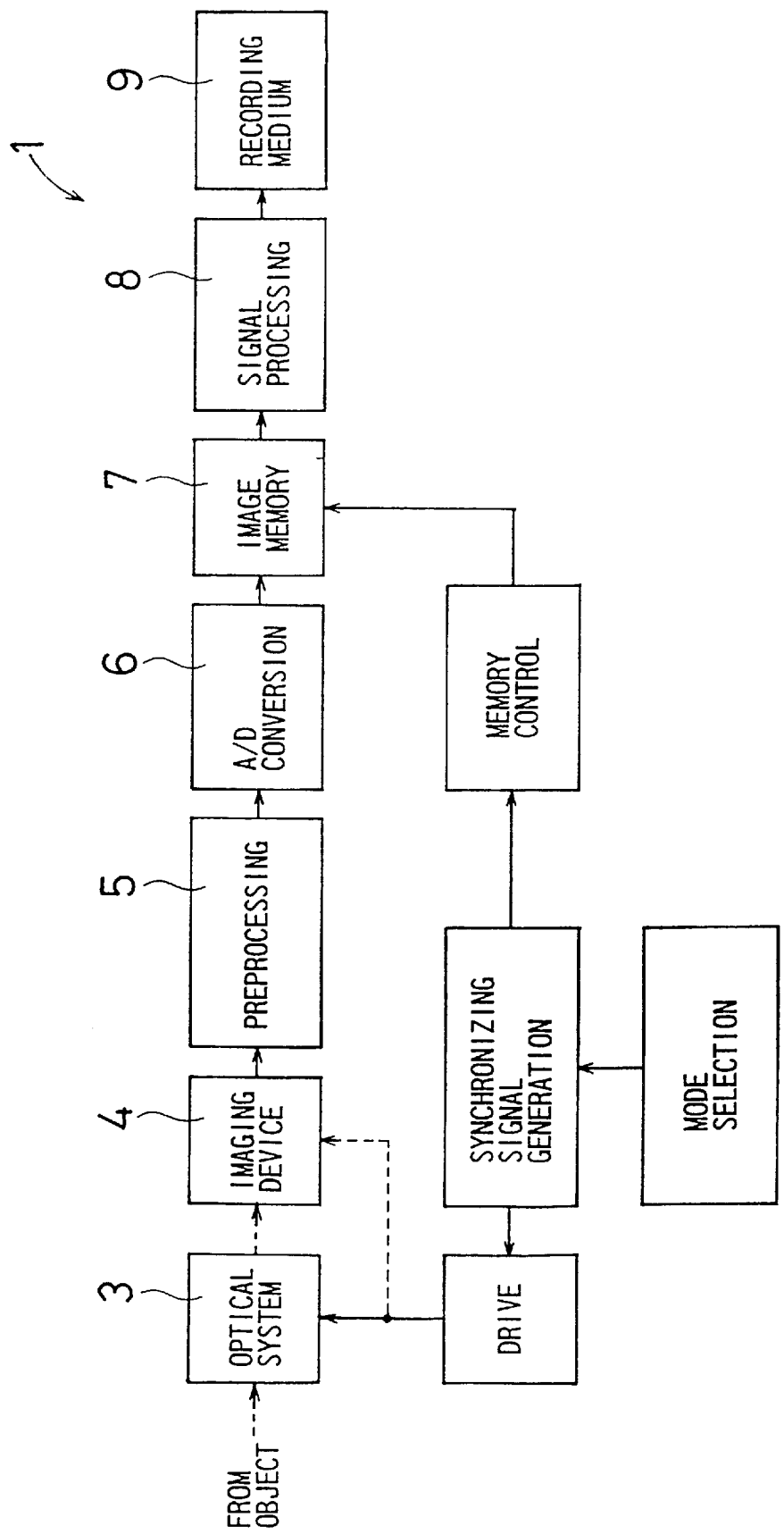
FIG. 68 is a block diagram showing a structure of an electronic still camera 1 according to a second prior art technology.
Figure 69:
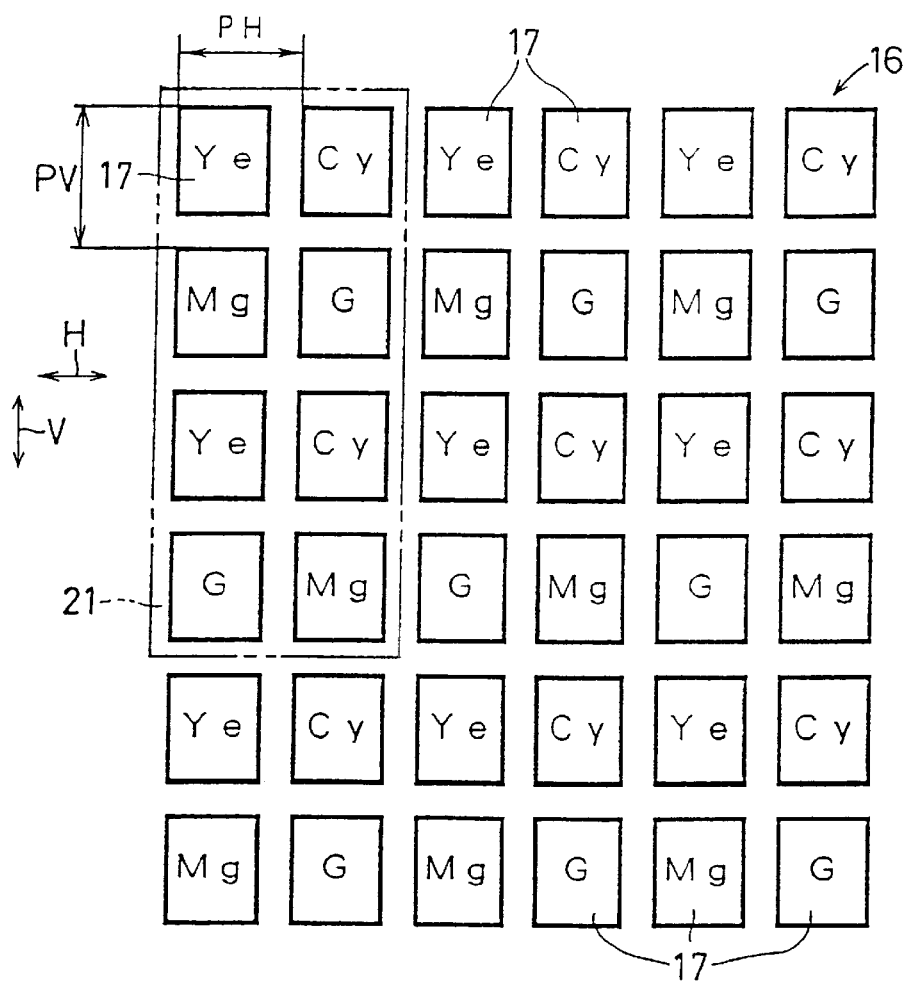
FIG. 69 is a diagram showing the state of array of light-transmitting domains 17 of a color filter 16 provided on the light incident side of an imaging device 4 of the electronic still camera 1.
Figure 70:
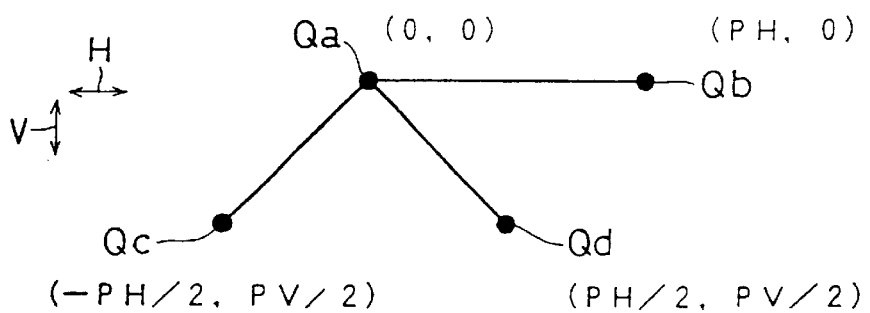
FIG. 70 is a diagram showing the positional relationship among the moved positions of image forming positions of the picture image light on the image forming plane of the imaging device in the first case of the high resolution mode of the electronic still camera 1.
Figure 71:
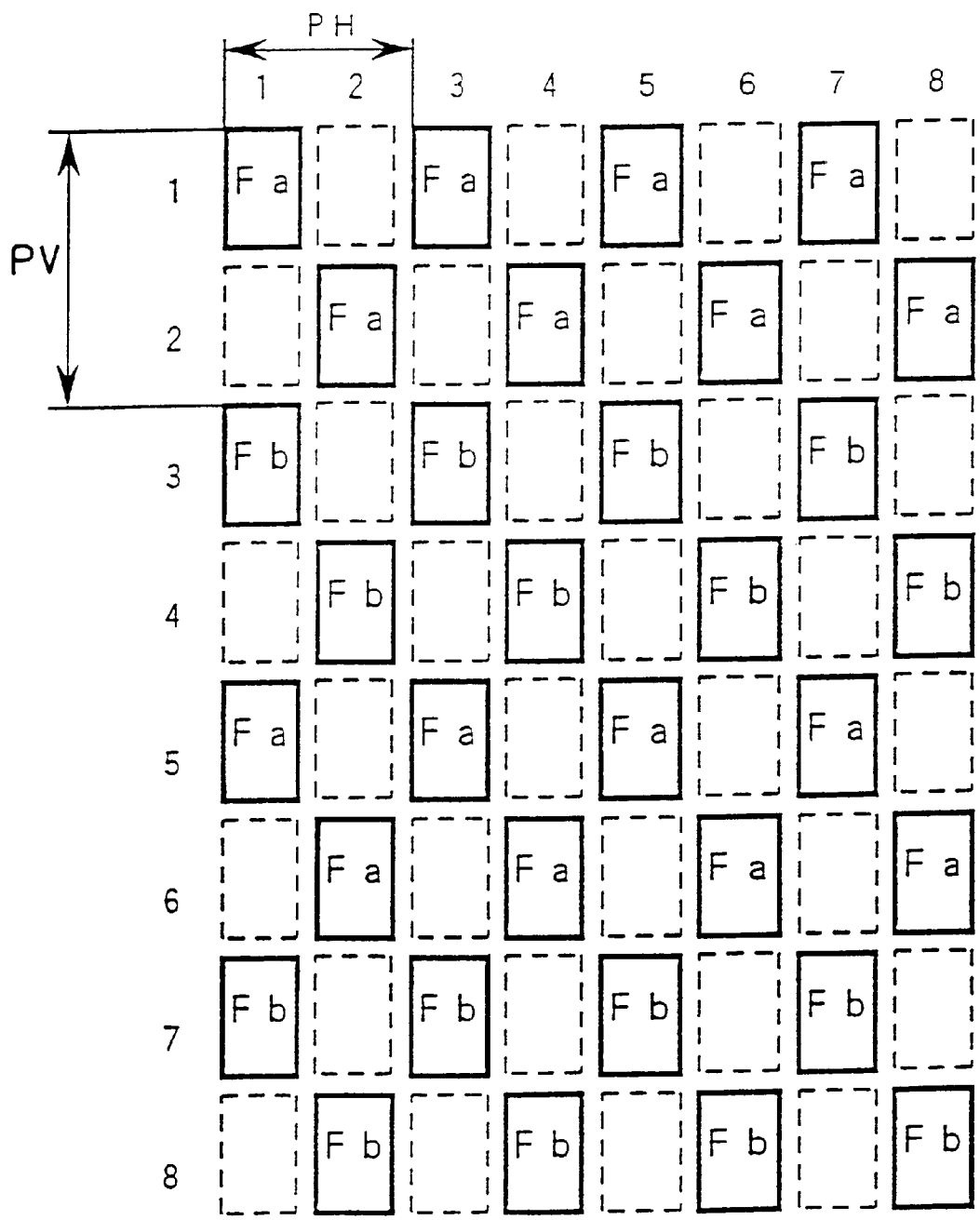
FIG. 71 is a diagram showing an array of picture elements of an output picture image of a part corresponding to a basic array pattern 21 in the output picture image generated in the first case of the high resolution mode of the electronic still camera 1.
Figure 72:
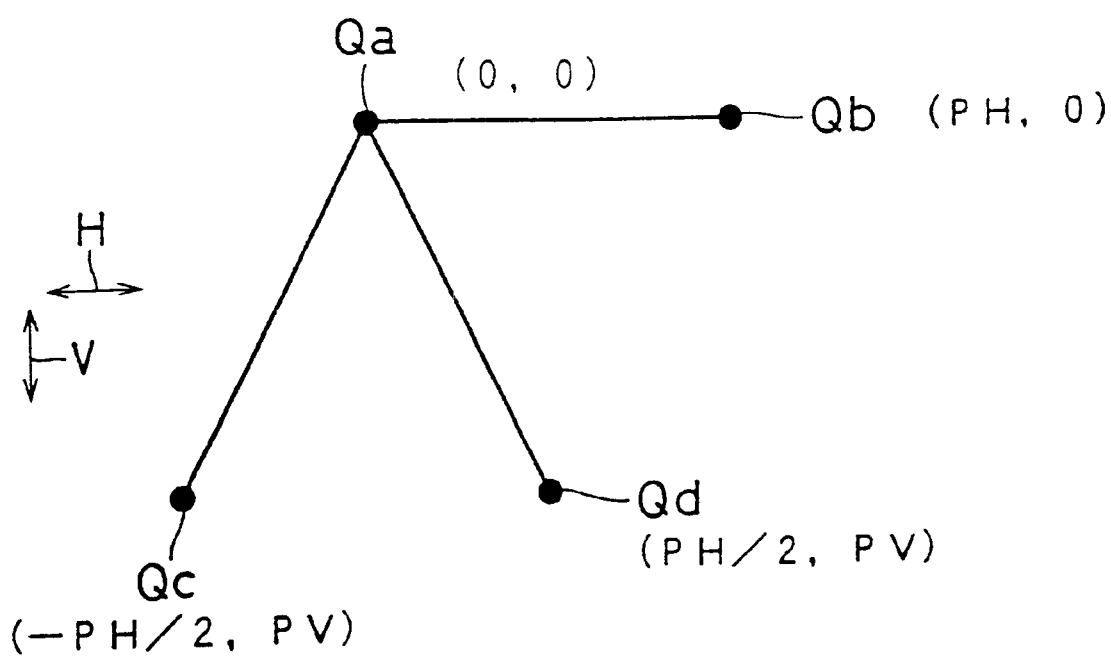
FIG. 72 is a diagram showing the positional relationship among the moved positions of image forming positions of the picture image light on the image forming plane of the solid imaging device in the second case of the high resolution mode of the electronic still camera 1.
Figure 73:
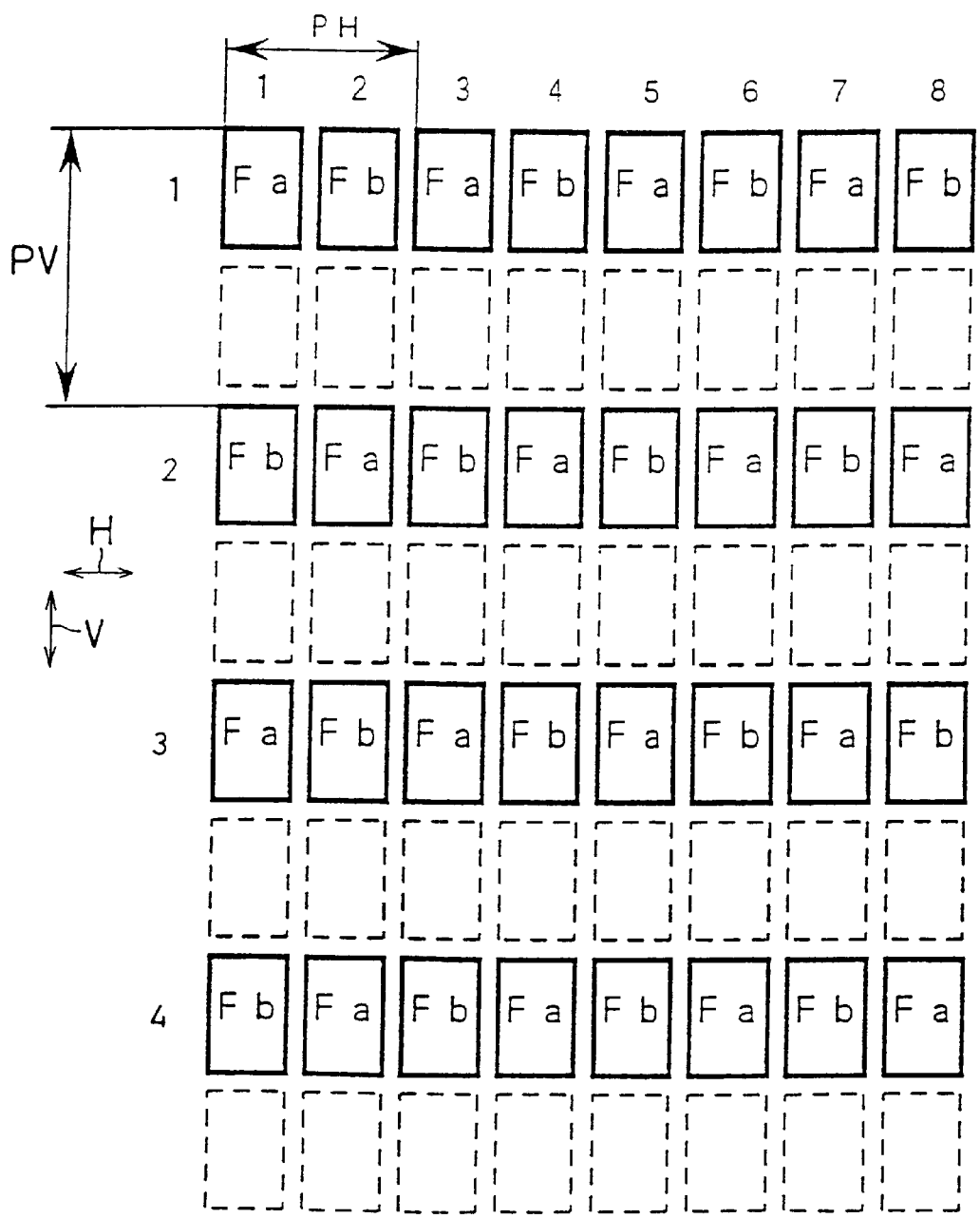
FIG. 73 is a diagram showing an array of picture elements of an output picture image of a part corresponding to a basic array pattern 21 in the output picture image generated in the second case of the high resolution mode of the electronic still camera 1.

FIG. 67 is a section view showing the variable vertical angle prism 251 in the second state. In the second state, the transparent disk 253 is inclined so that an angle formed between a normal line of the incident plane of the transparent disk 253 and the optical axis 64a of the picture image light before the input turns out to be an angle θ11. The transparent disk 254 crosses at right angles with the optical axis 64a.

At this time, an optical axis 265 of the picture image light inputted to the fluid layer 256 passing through the transparent disk 253 intersects with the normal line 264 of the transparent disk 253 with an angle θ12. The following relationship holds between the angle θ12 and the angle θ11:

$$\sin(\theta 11) = n \cdot \sin(\theta 12) \tag{73}$$

In the above expression, "n" denotes the refractive index of the fluid filled in the fluid layer 256.

This picture image light advances straightforwardly within the fluid layer 256, passes through the transparent disk 254 and is output from the variable vertical angle prism 251. At this time, an angle of incident of the picture image light to the transparent disk 254 is an angle θ11–θ12 which is a difference between the angle θ11 and θ12. An angle formed between the optical axis 64b after the output from the variable vertical angle prism 251 and a normal line 266 of the incident plane of the transparent disk 254 is an angle θ13. The following relationship holds between these angles θ11–θ12 and θ13:

$$n \cdot \sin(\theta 11 - \theta 12) = \sin(\theta 13) \tag{74}$$

When the angles θ11, θ12 and θ13 are assumed to small angles δθ11, δθ12 and δθ13, respectively, the following approximate expressions hold:

$$\delta\theta 11 = n \cdot \delta\theta 12 \tag{75}$$

$$n \cdot \delta(\theta 11 - \theta 12) = \delta\theta 13 \tag{76}$$

From the above expressions, the following relationship holds between the small angles δθ11 and δθ13:

$$\delta\theta 13/\delta\theta 11 = n - 1 \tag{77}$$

From the above expression, the optical axis of the picture image light after the output may be inclined with an angle which is about a half of the inclination of the transparent disk 253 when the fluid layer 256 is formed by fluid whose refractive index n is around 1.5 for example.

The optical axis of the picture image light may be moved based on the operation as described above. Then, the aforementioned image shifting operation may be performed by switching the first and second image forming positions by switching the states of the variable vertical angle prism 251, respectively.

Further, in the imaging apparatuses in the first through eleventh embodiments described above, the image shifting operation may be performed by having a structure in which any one or a plurality of lenses within the optical system is displaced by using a component such as a piezoelectric element while detecting the movement thereof and by moving the lens, instead of the image shifting mechanism 62. The image shifting operation may be performed also by having a structure in which a block containing the imaging device or the imaging device and the optical system is displaced by using a component such as a piezoelectric element while detecting the movement thereof and by moving the imaging device while fixing the optical axis of the picture image light, instead of the image shifting mechanism 62. The mechanism for performing the image shifting operation is not limited only to the aforementioned mechanism and may be a mechanism having any structure so long as it is capable of moving the image forming points to the first and second image forming positions described above.

The refracting plate 71 of the image shifting mechanism 6 two-dimensionalescribed above may be realized by a chromo-transparent plate colored to remove infrared rays, instead of the achromatic transparent glass plate. Because the transparent plane plate for removing infrared rays must be inserted within the optical system of the imaging apparatus at this time, a number of parts of the imaging apparatus may be reduced by using the refracting plate 71 together with this transparent plane plate.

Further, the variable spatial filter is not limited only to the one described above and a filter having any kinds of mechanism may be used so long as it can damp the spatial frequency component of the picture image light with the first and second decrements as described above.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An imaging apparatus comprising:

color separating filter means having a plurality of light-transmitting domains each of which corresponds to one of a plurality of chromatic lights, wherein each of the light-transmitting domains separatley transmits only corresponding chromatic light of a picture image light inputted from an object, and which are arrayed in a predetermined array on a two-dimensional plane;

an imaging device for imaging the picture image light and outputting a picture image signal, the imaging device having photo-receiving domains corresponding to the light-transmitting domains of the color separating filter means, the photo-receiving domains being arrayed on a two-dimensional plane with a same array as the predetermined array of the light-transmitting domains, each of the photo-receiving domains receiving only chromatic light which has passed through the corresponding light-transmitting domain, the imaging device outputting the picture image signal composed of picture element data representing a quantity of received light of each photo-receiving domain;

moving means for moving an image forming point of the picture image light inputted to the imaging device only to predetermined first and second positions, thereby outputting two picture image signals;

exposure permitting means for permitting the imaging device to receive the picture image light for only a predetermined exposure time every time when the image forming point is moved by the moving means;

picture image generating means for generating a composite picture image signal by shifting and superimposing only the two outputted picture image signals in a direction opposite from a moving direction of the image forming point by a distance of the image forming points at the time of the imaging operation in response to the output of the imaging device; and control means for causing the moving means to move the image forming point of the picture image light either to the first or second position when the operation for imaging the picture image light is started, for causing the imaging device to image the picture image light only during the time permitted by the exposure permitting means at that position to give the picture image signal to the picture image generating means, for causing the moving means to move the image forming point only to the other of the first or second position and for causing the imaging device to image the picture image light only during the time permitted by the exposure permitting means at the other of the first or second position to give the picture image signal to the picture image generating means, wherein the light-transmitting domains of the color separating filter means are divided into first through fourth light-transmitting domains which transmit predetermined first through fourth chromatic lights;

the predetermined array of the light-transmitting domains is an array in a matrix form in which the light-transmitting domains are arrayed respectively in parallel with one and other directions which cross each other at right angles in the one direction with a predetermined first period and in the other direction with a predetermined second period, a first group in which the first and fourth light-transmitting domains are arrayed alternately and linearly in the one direction and a second group in which the second and third light-transmitting domains are arrayed alternately and linearly in the one direction are disposed alternately in the other direction, the first light-transmitting domain and the fourth light-transmitting domain adjoin the second light-transmitting domain in the other direction and a direction opposite thereto, respectively, and the second light-transmitting domains adjoin the fourth light-transmitting domain in the other direction and the direction opposite thereto;

the imaging device mixes the picture element data from each photo-receiving domain per two each photo-receiving domain adjoining in the other direction or in the direction opposite thereto to output in a batch;

the first position is a predetermined reference position; and the second position is a position shifted in parallel to the one direction by the length of the first period from the first position.

2. An imaging apparatus comprising:

color separating filter means having a plurality of light-transmitting domains each of which corresponds to one of a plurality of chromatic lights, wherein each of the light-transmitting domains separately transmits only corresponding chromatic light of a picture image light inputted from an object, and which are arrayed in a predetermined array on a two-dimensional plane;

an imaging device for imaging the picture image light and outputting a picture image signal, the imaging device having photo-receiving domains corresponding to the light-transmitting domains of the color separating filter means, the photo-receiving domains being arrayed on a two-dimensional plane with a same array as the predetermined array of the light-transmitting domains, each of the photo-receiving domains receiving only chromatic light which has passed through the corresponding light-transmitting domain, the imaging device outputting the picture image signal composed of picture element data representing a quantity of received light of each photo-receiving domain;

moving means for moving an image forming point of the picture image light inputted to the imaging device only to predetermined first and second positions, thereby outputting two picture image signals;

exposure permitting means for permitting the imaging device to receive the picture image light for only a predetermined exposure time every time when the image forming point is moved by the moving means;

picture image generating means for generating a composite picture image signal by shifting and superimposing only the two outputted picture image signals in a direction opposite from a moving direction of the image forming point by a distance of the image forming points at the time of the imaging operation in response to the output of the imaging device; and control means for causing the moving means to move the image forming point of the picture image light either to the first or second position when the operation for imaging the picture image light is started, for causing the imaging device to image the picture image light only during the time permitted by the exposure permitting means at that position to give the picture image signal to the picture image generating means, for causing the moving means to move the image forming point only to the other of the first or second position and for causing the imaging device to image the picture image light only during the time permitted by the exposure permitting means at the other of the first or second position to give the picture image signal to the picture image generating means, wherein the light-transmitting domains of the color separating filter means are divided into first through fourth light-transmitting domains which transmit predetermined first through fourth chromatic lights, respectively;

the predetermined array of the light-transmitting domains is an array in a matrix form, in which the light-transmitting domains are arrayed respectively in parallel in one direction and in an other direction which cross each other at right angles in the one direction with a predetermined first period, and in the other direction with a predetermined second period, the fourth light-transmitting domains adjoin the first light-transmitting domain in the one direction and in a direction opposite thereto, the second light-transmitting domain adjoins thereto in the other direction and the third light-transmitting domain also adjoin thereto in a direction opposite from the other direction, and the second light-transmitting domain adjoins the fourth light-transmitting domain in the direction opposite from the other direction;

the imaging device outputs the picture element data from each of the photo-receiving domains separately;

the first position is the predetermined reference position; and the second position is a position shifted in parallel to the one direction by the length of the first period from the first position.

3. An imaging apparatus comprising:

color separating filter means having a plurality of light-transmitting domains each of which corresponds to one of a plurality of chromatic lights, wherein each of the light-transmitting domains separately transmits only corresponding chromatic light of a picture image light inputted from an object, and which are arrayed in a predetermined array on a two-dimensional plane;

an imaging device for imaging the picture image light and outputting a picture image signal, the imaging device having photo-receiving domains corresponding to the light-transmitting domains of the color separating filter means, the photo-receiving domains being arrayed on a two-dimensional plane with a same array as the predetermined array of the light-transmitting domains, each of the photo-receiving domains receiving only chromatic light which has passed through the corresponding light-transmitting domain, the imaging device outputting the picture image signal composed of picture element data representing a quantity of received light of each photo-receiving domain;

moving means for moving an image forming point of the picture image light inputted to the imaging device only to predetermined first and second positions, thereby outputting the picture image signals;

exposure permitting means for permitting the imaging device to receive the picture image light for only a predetermined exposure time every time when the image forming point is moved by the moving means;

picture image generating means for generating a composite picture image signal by shifting and superimposing only the two outputted picture image signals in a direction opposite from a moving direction of the image forming point by a distance of the image forming points at the time of the imaging operation in response to the output of the imaging device; and control means for causing the moving means to move the image forming point of the picture image light either to the first or second position when the operation for imaging the picture image light is started, for causing the imaging device to image the picture image light only during the time permitted by the exposure permitting means at that position to give the picture image signal to the picture image generating means, for causing the moving means to move the image forming point only to the other of the first or second position and for causing the imaging device to image the picture image light only during the time permitted by the exposure permitting means at the other of the first or second position to give the picture image signal to the picture image generating means, wherein the light-transmitting domains of the color separating filter means are divided into a plurality of first through third light-transmitting domains which transmit predetermined first through third chromatic lights, respectively;

the predetermined array of the light-transmitting domains is an array in a matrix form in which the light-transmitting domains are arrayed respectively in parallel in one direction and in an other direction which cross each other at right angles in the one direction with a predetermined first period, and in the other direction with a predetermined second period, one of the plurality of second light-transmitting domains adjoins one of the plurality of first light-transmitting domains in the one direction, the third light-transmitting domain adjoins thereto in a direction opposite from the one direction, and another one of the plurality of first light-transmitting domains also adjoin thereto in the other direction and in a direction opposite thereto, one of the plurality of third light-transmitting domain adjoins said one of the plurality of second light-transmitting domains in the one direction and another one of the plurality of second light-transmitting domains also adjoin thereto in the other direction and in the direction opposite thereto, and another one of the plurality of third light-transmitting domains adjoin said one of the plurality of third light-transmitting domains in the other direction and in the direction opposite thereto;

the imaging device mixes the picture element data from each photo-receiving domain per two each photo-receiving domain adjoining in the other direction or in the direction opposite thereto to output in a batch;

the first position is a predetermined reference position; and the second position is a position shifted in parallel to the one direction by a length of one and a half times the length of the first period from the first position and in parallel to the other direction by a length of a half of the length of the second period from the first position.

4. An imaging apparatus comprising:

color separating filter means having a plurality of light-transmitting domains each of which corresponds to one of a plurality of chromatic lights, wherein each of the light-transmitting domains separately transmits only corresponding chromatic light of a picture image light inputted from an object, and which are arrayed in a predetermined array on a two-dimensional plane;

an imaging device for imaging the picture image light and outputting a picture image signal, the imaging device having photo-receiving domains corresponding to the light-transmitting domains of the color separating filter means, the photo-receiving domains being arrayed on a two-dimensional plane with a same array as the predetermined array of the light-transmitting domains, each of the photo-receiving domains receiving only chromatic light which has passed through the corresponding light-transmitting domain, the imaging device outputting the picture image signal composed of picture element data representing a quantity of received light of each photo-receiving domain;

moving means for moving an image forming point of the picture image light inputted to the imaging device only to predetermined first and second positions, thereby outputting two picture image signals;

exposure permitting means for permitting the imaging device to receive the picture image light for only a predetermined exposure time every time when the image forming point is moved by the moving means;

picture image generating means for generating a composite picture image signal by shifting and superimposing only the two outputted picture image signals in a direction opposite from a moving direction of the image forming point by a distance of the image forming points at the time of the imaging operation in response to the output of the imaging device; and control means for causing the moving means to move the image forming point of the picture image light either to the first or second position when the operation for imaging the picture image light is started, for causing the imaging device to image the picture image light only during the time permitted by the exposure permitting means at that position to give the picture image signal to the picture image generating means, for causing the moving means to move the image forming point only to the other of the first or second position and for causing the imaging device to image the picture image light only during the time permitted by the exposure permitting means at the other of the first or second position to give the picture image signal to the picture image generating means, wherein the light-transmitting domains of the color separating filter means are divided into a plurality of first through third light-transmitting domains which transmit predetermined first through third chromatic lights, respectively;

the predetermined array of the light-transmitting domains is an array in a matrix form in which the light-transmitting domains are arrayed respectively in parallel in one direction and in an other direction which cross each other at right angles in the one direction with a predetermined first period and in the other direction with a predetermined second period, one of the plurality of second light-transmitting domains adjoins one of the plurality of first light-transmitting domains in the one direction, one of the plurality of third light-transmitting domains adjoins thereto in a direction opposite from the one direction, and another one of the first light-transmitting domain also adjoin thereto in the other direction and in a direction opposite thereto, one of the plurality of third light-transmitting domain adjoins said one of the plurality of second light-transmitting domains in the one direction and another one of the plurality of second light-transmitting domains also adjoin thereto in the other direction and in the direction opposite thereto, and another one of the plurality of third light-transmitting domains adjoin said one of the plurality of third light-transmitting domains in the other direction and in the direction opposite thereto;

the imaging device outputs the picture element data from each photo-receiving domain separately;

the first position is a predetermined reference position; and the second position is a position shifted in parallel to the one direction by a length of one and a half times the length of the first period from the first position and in parallel to the other direction by a length of a half of the length of the second period from the first position.

5. An imaging apparatus comprising:

color separating filter means having a plurality of light-transmitting domains each of which corresponds to one of a plurality of chromatic lights, wherein each of the light-transmitting domains separately transmits only corresponding chromatic light of a picture image light inputted from an object, and which are arrayed in a predetermined array on a two-dimensional plane;

an imaging device for imaging the picture image light and outputting a picture image signal, the imaging device having photo-receiving domains corresponding to the light-transmitting domains of the color separating filter means, the photo-receiving domains being arrayed on a two-dimensional plane with a same array as the predetermined array of the light-transmitting domains, each of the photo-receiving domains receiving only chromatic light which has passed through the corresponding light-transmitting domain, the imaging device outputting the picture image signal composed of picture element data representing a quantity of received light of each photo-receiving domain;

moving means for moving an image forming point of the picture image light inputted to the imaging device only to predetermined first and second positions, thereby outputting two picture image signals;

exposure permitting means for permitting the imaging device to receive the picture image light for only a predetermined exposure time every time when the image forming point is moved by the moving means;

picture image generating means for generating a composite picture image signal by shifting and superimposing only the two outputted picture image signals in a direction opposite from a moving direction of the image forming point by a distance of the image forming points at the time of the imaging operation in response to the output of the imaging device; and control means for causing the moving means to move the image forming point of the picture image light either to the first or second position when the operation for imaging the picture image light is started, for causing the imaging device to image the picture image light only during the time permitted by the exposure permitting means at that position to give the picture image signal to the picture image generating means, for causing the moving means to move the image forming point only to the other of the first or second position and for causing the imaging device to image the picture image light only during the time permitted by the exposure permitting means at the other of the first or second position to give the picture image signal to the picture image generating means, wherein the plurality of light-transmitting domains of the color separating filter means are divided into first through third light-transmitting domains which transmit predetermined first through third chromatic lights, respectively;

the predetermined array of the light-transmitting domains is an array in which groups of light-transmitting domains arrayed linearly with a first period in parallel to a predetermined one direction are arrayed in an other direction which crosses at right angles with the one direction with a second period, and the position of each light-transmitting domain in the groups adjoining in the other direction is shifted in the one direction by a length of the half of the first period, the second light-transmitting domain adjoins the first light-transmitting domain in the one direction and the third light-transmitting domain adjoins thereto in a direction opposite from the one direction, and the third light-transmitting domain adjoins the second light-transmitting domain in the one direction and the first light-transmitting domain adjoins thereto in a third direction shifted in the one direction by a half of the first period and in the other direction by a length of the second period;

the imaging device outputs the picture element data from each photo-receiving domain separately;

the first position is a predetermined reference position; and the second position is a position shifted in parallel to the other direction by a length of the second period from the first position.

6. An imaging apparatus comprising:

color separating filter means having a plurality of light-transmitting domains each of which corresponds to one of a plurality of chromatic lights, wherein each of the light-transmitting domains separately transmits only corresponding chromatic light of a picture image light inputted from an object, and which are arrayed in a predetermined array on a two-dimensional plane;

an imaging device for imaging the picture image light and outputting a picture image signal, the imaging device having photo-receiving domains corresponding to the light-transmitting domains of the color separating filter means, the photo-receiving domains being arrayed on a two-dimensional plane with a same array as the predetermined array of the light-transmitting domains, each of the photo-receiving domains receiving only chromatic light which has passed through the corresponding light-transmitting domain, the imaging device outputting the picture image signal composed of picture element data representing a quantity of received light of each photo-receiving domain;

moving means for moving an image forming point of the picture image light inputted to the imaging device only to predetermined first and second positions, thereby outputting two picture image signals;

exposure permitting means for permitting the imaging device to receive the picture image light for only a predetermined exposure time every time when the image forming point is moved by the moving means;

picture image generating means for generating a composite picture image signal by shifting and superimposing only the two outputted picture image signals in a direction opposite from a moving direction of the image forming point by a distance of the image forming points at the time of the imaging operation in response to the output of the imaging device; and control means for causing the moving means to move the image forming point of the picture image light either to the first or second position when the operation for imaging the picture image light is started, for causing the imaging device to image the picture image light only during the time permitted by the exposure permitting means at that position to give the picture image signal to the picture image generating means, for causing the moving means to move the image forming point only to the other of the first or second position and for causing the imaging device to image the picture image light only during the time permitted by the exposure permitting means at the other of the first or second position to give the picture image signal to the picture image generating means, wherein the plurality of light-transmitting domains of the color separating filter means are divided into first through third light-transmitting domains which correspond to predetermined first through third chromatic lights, respectively;

the predetermined array of the light-transmitting domains is an array in a matrix form in which the light-transmitting domains are arrayed respectively in parallel with one and other predetermined directions which cross each other at right angles in the one direction with a predetermined first period and in the other direction with a predetermined second period;

a first linear group in which the first and second light-transmitting domains are arrayed alternately in parallel to the one direction and a second linear group in which the first and third light-transmitting domains are arrayed alternately in parallel to the one direction are disposed alternately in the other direction, and the third light-transmitting domains adjoin the first light-transmitting domain in the first group in the other direction and a direction opposite thereto;

the imaging device outputs the picture element data from each photo- receiving domain separately;

the first position is a predetermined reference position; and the second position is a position shifted in parallel to the one direction by a length of the first period from the first position.

7. An imaging apparatus comprising:

color separating filter means having a plurality of light-transmitting domains each of which corresponds to one of a plurality of chromatic lights, wherein each of the light-transmitting domains separately transmits only corresponding chromatic light of a picture image light inputted from an object, and which are arrayed in a predetermined array on a two-dimensional plane;

an imaging device for imaging the picture image light and outputting a picture image signal, the imaging device having photo-receiving domains corresponding to the light-transmitting domains of the color separating filter means, the photo-receiving domains being arrayed on a two-dimensional plane with a same array as the predetermined array of the light-transmitting domains, each of the photo-receiving domains receiving only chromatic light which has passed through the corresponding light-transmitting domain, the imaging device outputting the picture image signal composed of picture element data representing a quantity of received light of each photo-receiving domain;

moving means for moving an image forming point of the picture image light inputted to the imaging device only to predetermined first and second positions, thereby outputting two picture image signals;

exposure permitting means for permitting the imaging device to receive the picture image light for only a predetermined exposure time every time when the image forming point is moved by the moving means;

picture image generating means for generating a composite picture image signal by shifting and superimposing only the two outputted picture image signals in a direction opposite from a moving direction of the image forming point by a distance of the image forming points at the time of the imaging operation in response to the output of the imaging device; and control means for causing the moving means to move the image forming point of the picture image light either to the first or second position when the operation for imaging the picture image light is started, for causing the imaging device to image the picture image light only during the time permitted by the exposure permitting means at that position to give the picture image signal to the picture image generating means, for causing the moving means to move the image forming point only to the other of the first or second position and for causing the imaging device to image the picture image light only during the time permitted by the exposure permitting means at the other of the first or second position to give the picture image signal to the picture image generating means, wherein the plurality of light-transmitting domains of the color separating filmter means are divided into first through third light-transmitting domains which correspond to predetermined first through third chromatic lights, respectively;

the predetermined array of the light-transmitting domains is an array in which a first group in which the first and second light-transmitting domains are arrayed linearly in parallel to one predetermined direction with a first period and a second group in which the first and third light-transmitting domains are arrayed linearly in parallel to the one direction with the first period are arrayed alternately with a predetermined second period in an other direction which crosses at right angles with the one direction, and the third light-transmitting domain adjoins the first light-transmitting domain in the first group in a direction shifted in parallel to the one direction by a length of a half of the first period and in parallel to the other direction by a length of the second period;

the imaging device outputs the picture element data from each photo-receiving domain separately;

the first position is a predetermined reference position; and the second position is a position shifted in parallel to the one direction by a length of the first period from the first position.

8. An imaging apparatus comprising:

color separating filter means having a plurality of light-transmitting domains each of which corresponds to one of a plurality of chromatic lights, wherein each of the light-transmitting domains separately transmits only corresponding chromatic light of a picture image light inputted from an object, and which are arrayed in a predetermined array on a two-dimensional plane;

an imaging device for imaging the picture image light and outputting a picture image signal, the imaging device having photo-receiving domains corresponding to the light-transmitting domains of the color separating filter means, the photo-receiving domains being arrayed on a two-dimensional plane with a same array as the predetermined array of the light-transmitting domains, each of the photo-receiving domains receiving only chromatic light which has passed through the corresponding light-transmitting domain, the imaging device outputting the picture image signal composed of picture element data representing a quantity of received light of each photo-receiving domain;

moving means for moving an image forming point of the picture image light inputted to the imaging device only to predetermined first and second positions, thereby outputting two picture image signals;

exposure permitting means for permitting the imaging device to receive the picture image light for only a predetermined exposure time every time when the image forming point is moved by the moving means;

picture image generating means for generating a composite picture image signal by shifting and superimposing only the two outputted picture image signals in a direction opposite from a moving direction of the image forming point by a distance of the image forming points at the time of the imaging operation in response to the output of the imaging device; and control means for causing the moving means to move the image forming point of the picture image light either to the first or second position when the operation for imaging the picture image light is started, for causing the imaging device to image the picture image light only during the time permitted by the exposure permitting means at that position to give the picture image signal to the picture image generating means, for causing the moving means to move the image forming point only to the other of the first or second position and for causing the imaging device to image the picture image light only during the time permitted by the exposure permitting means at the other of the first or second position to give the picture image signal to the picture image generating means, wherein the exposure permitting means comprises first permitting means for permitting/inhibiting electric charge to be accumulated in the photo-receiving domains of the imaging device, and second permitting means for transmitting/shutting off the picture image light to be inputted to the imaging device; and in imaging the image light at the either one position among the first and second positions, the control means causes the second permitting means to transmit the picture image light and causes the first permitting means to permit to accumulate electric charge only during the exposure time, and in imaging the image light at the other position among the first and second positions, the control means causes the first permitting means to permit to accumulate electric charge in the photo-receiving domains and causes the second permitting means to transmit the picture image light only during the exposure time.

9. An imaging apparatus comprising:

color separating filter means having a plurality of light-transmitting domains each of which corresponds to one of a plurality of chromatic lights, wherein each of the light-transmitting domains separately transmits only corresponding chromatic light of a picture image light inputted from an object, and which are arrayed in a predetermined array on a two-dimensional plane;

an imaging device for imaging the picture image light and outputting a picture image signal, the imaging device having photo-receiving domains corresponding to the light-transmitting domains of the color separating filter means, the photo-receiving domains being arrayed on a two-dimensional plane with a same array as the predetermined array of the light-transmitting domains, each of the photo-receiving domains receiving only chromatic light which has passed through the corresponding light-transmitting domain, the imaging device outputting the picture image signal composed of picture element data representing a quantity of received light of each photo-receiving domain;

moving means for moving an image forming point of the picture image light inputted to the imaging device only to predetermined first and second positions, thereby outputting two picture image signals;

exposure permitting means for permitting the imaging device to receive the picture image light for only a predetermined exposure time every time when the image forming point is moved by the moving means;

picture image generating means for generating a composite picture image signal by shifting and superimposing only the two outputted picture image signals in a direction opposite from a moving direction of the image forming point by a distance of the image forming points at the time of the imaging operation in response to the output of the imaging device; and control means for causing the moving means to move the image forming point of the picture image light either to the first or second position when the operation for imaging the picture image light is started, for causing the imaging device to image the picture image light only during the time permitted by the exposure permitting means at that position to give the picture image signal to the picture image generating means, for causing the moving means to move the image forming point only to the other of the first or second position and for causing the imaging device to image the picture image light only during the time permitted by the exposure permitting means at the other of the first or second position to give the picture image signal to the picture image generating means, wherein the imaging apparatus further comprises an optical system for condensing the picture image light to form an image on the two-dimensional plane of the imaging device; and the moving means comprises:

a plate-like refracting plate having a light-transmitting quality, a pair of bimorph type piezoelectric elements which are disposed on the both sides of the refracting plate so that the surface thereof is almost parallel to the surface of the refracting plate, in which one free end in a longitudinal direction of the elements is bonded with one end of the refracting plate to support the refracting plate so that the other end of the refracting plate extends toward a fixed end on the other side of the elements and which inclines the refracting plate centering on an imaginary center of rotation which passes within the refracting plate, detecting means for detecting an inclination formed between an optical axis of the optical system and a normal line of the refracting plate, comparator means for comparing output of the detecting means with a predetermined target value to output the error thereof, and driving means for driving the pair of bimorph type piezoelectric elements in response to output of the comparator means so that the inclination of the refracting plate coincides with the predetermined target value.

10. An imaging apparatus comprising:

color separating filter means having a plurality of light-transmitting domains each of which corresponds to one of a plurality of chromatic lights, wherein each of the light-transmitting domains separately transmits only corresponding chromatic light of a picture image light inputted from an object, and which are arrayed in a predetermined array on a two-dimensional plane;

an imaging device for imaging the picture image light and outputting a picture image signal, the imaging device having photo-receiving domains corresponding to the light-transmitting domains of the color separating filter means, the photo-receiving domains being arrayed on a two-dimensional plane with a same array as the predetermined array of the light-transmitting domains, each of the photo-receiving domains receiving only chromatic light which has passed through the corresponding light-transmitting domain, the imaging device outputting the picture image signal composed of picture element data representing a quantity of received light of each photo-receiving domain;

moving means for moving an image forming point of the picture image light inputted to the imaging device only to predetermined first and second positions, thereby outputting two picture image signals;

exposure permitting means for permitting the imaging device to receive the picture image light for only a predetermined exposure time every time when the image forming point is moved by the moving means;

picture image generating means for generating a composite picture image signal by shifting and superimposing only the two outputted picture image signals in a direction opposite from a moving direction of the image forming point by a distance of the image forming points at the time of the imaging operation in response to the output of the imaging device; and control means for causing the moving means to move the image forming point of the picture image light either to the first or second position when the operation for imaging the picture image light is started, for causing the imaging device to image the picture image light only during the time permitted by the exposure permitting means at that position to give the picture image signal to the picture image generating means, for causing the moving means to move the image forming point only to the other of the first or second position and for causing the imaging device to image the picture image light only during the time permitted by the exposure permitting means at the other of the first or second position to give the picture image signal to the picture image generating means, wherein the imaging apparatus further comprises an optical system for condensing the picture image light to form on the two-dimensional plane of the imaging device; and the moving means comprises:

a pair of transparent plates having imaginary centers of rotation which cross each other at right angles, inclining means for inclining the transparent plates centering on each imaginary center for rotation, a refractory substance layer which is interposed between the transparent plates, which can be deformed and which has a refractive index greater than that of air, detecting means for detecting an inclination formed between an optical axis of the optical system and a normal line of each transparent plate, comparator means for comparing output of the detecting means with a predetermined target angle to output the error thereof, and driving means for driving the inclining means in response to output of the comparator means so that the inclination coincides with the predetermined target angle.

11. An imaging apparatus comprising:

color separating filter means having a plurality of light-transmitting domains each of which corresponds to one of a plurality of chromatic lights, wherein each of the light-transmitting domains separately transmits only corresponding chromatic light of a picture image light inputted from an object, and which are arrayed in a predetermined array on a two-dimensional plane;

an imaging device for imaging the picture image light and outputting a picture image signal, the imaging device having photo-receiving domains corresponding to the light-transmitting domains of the color separating filter means, the photo-receiving domains being arrayed on a two-dimensional plane with a same array as the predetermined array of the light-transmitting domains, each of the photo-receiving domains receiving only chromatic light which has passed through the corresponding light-transmitting domain, the imaging device outputting the picture image signal composed of picture element data representing a quantity of received light of each photo-receiving domain;

moving means for moving an image forming point of the picture image light inputted to the imaging device only to predetermined first and second positions, thereby outputting two picture image signals;

exposure permitting means for permitting the imaging device to receive the picture image light for only a predetermined exposure time every time when the image forming point is moved by the moving means;

picture image generating means for generating a composite picture image signal by shifting and superimposing only the two outputted picture image signals in a direction opposite from a moving direction of the image forming point by a distance of the image forming points at the time of the imaging operation in response to the output of the imaging device; and control means for causing the moving means to move the image forming point of the picture image light either to the first or second position when the operation for imaging the picture image light is started, for causing the imaging device to image the picture image light only during the time permitted by the exposure permitting means at that position to give the picture image signal to the picture image generating means, for causing the moving means to move the image forming point only to the other of the first or second position and for causing the imaging device to image the picture image light only during the time permitted by the exposure permitting means at the other of the first or second position to give the picture image signal to the picture image generating means, wherein the imaging apparatus further comprises:

move determining means for permitting/inhibiting the move of the image forming point in the moving means; and a variable spatial filter for damping the spatial frequency component of the picture image light to be inputted to the imaging device, i.e. damping the spatial frequency component by a first decrement when the move of the image forming point is inhibited and damping it by a second decrement when it is permitted.

* * * * *